US012777481B2

(12) United States Patent
Yi et al.

(10) Patent No.: US 12,777,481 B2
(45) Date of Patent: Oct. 27, 2026

(54) HYBRID AUTOMATIC REPEAT REQUEST CODEBOOK DETERMINATION FOR MULTI-PHYSICAL DOWNLINK SHARED CHANNEL SCHEDULING

(71) Applicant: Ofinno, LLC, Reston, VA (US)

(72) Inventors: Yunjung Yi, Vienna, VA (US); Hyoungsuk Jeon, Centreville, VA (US); Esmael Hejazi Dinan, McLean, VA (US); Jonghyun Park, Syosset, NY (US); Ali Cagatay Cirik, Chantilly, VA (US); Nazanin Rastegardoost, McLean, VA (US)

(73) Assignee: Ofinno, LLC, Reston, VA (US)

( * ) Notice: Subject to any disclaimer, the term of this patent is extended or adjusted under 35 U.S.C. 154(b) by 293 days.

(21) Appl. No.: 18/374,509

(22) Filed: Sep. 28, 2023

(65) Prior Publication Data

US 2024/0032031 A1 Jan. 25, 2024

Related U.S. Application Data

(63) Continuation of application No. PCT/US2022/022361, filed on Mar. 29, 2022.
(Continued)

(51) Int. Cl.
*H04W 72/1273* (2023.01)
*H04L 1/1607* (2023.01)
*H04W 72/232* (2023.01)

(52) U.S. Cl.
CPC ....... *H04W 72/1273* (2013.01); *H04L 1/1607* (2013.01); *H04W 72/232* (2023.01)

(58) Field of Classification Search
CPC ... H04L 1/1607; H04L 1/1854; H04L 1/1861; H04L 1/1887; H04L 1/1896; H04W 72/1273; H04W 72/232
See application file for complete search history.

(56) References Cited

U.S. PATENT DOCUMENTS 11,824,666 B2 * 11/2023 Kim ...................... H04L 1/1887
11,831,445 B2 * 11/2023 Yang ..................... H04L 1/1896
(Continued)

FOREIGN PATENT DOCUMENTS

WO WO-2020134725 A1 * 7/2020 ............ H04W 72/23
WO WO-2023212041 A1 * 11/2023 .......... H04W 72/232

OTHER PUBLICATIONS

R1-2101457; 3GPP TSG-RAN WG1 #104-e; e-Meeting, Jan. 25-Feb. 5, 2021; Agenda item: 8.2.5; Source: Qualcomm Incorporated; Title: PDSCH and PUSCH enhancements for 52.6-71GHz band; Document for: Discussion/Decision.
(Continued)

*Primary Examiner* — Eric Nowlin
(74) *Attorney, Agent, or Firm* — Brett K. Gardner; Kavon Nasabzadeh; Jacob L. Mangan

(57) ABSTRACT

A wireless device transmits, via an uplink resource, a sub-codebook comprising feedback bits for at least one of downlink control information (DCI) or a multi-physical downlink shared channel (PDSCH) scheduling DCI (M-DCI). The DCI schedules a PDSCH reception via code block groups (CBGs). The M-DCI schedules multiple PDSCH receptions for a cell. A number of the feedback bits is based on a larger of a first number of schedulable PDSCHs by the M-DCI and a second number of the CBGs.

18 Claims, 34 Drawing Sheets

Related U.S. Application Data

(60) Provisional application No. 63/167,314, filed on Mar. 29, 2021.

(56) References Cited

U.S. PATENT DOCUMENTS

| | | | | |
|---|---|---|---|---|
| 12,003,335 B2* | 6/2024 | Yang | H04L 1/1812 |
| 12,245,219 B2* | 3/2025 | Oteri | H04W 72/20 |
| 12,335,042 B2* | 6/2025 | Yuan | H04L 5/0094 |
| 2019/0103943 A1* | 4/2019 | Wang | H04L 1/1854 |
| 2020/0374045 A1* | 11/2020 | Yin | H04L 1/1854 |
| 2021/0037551 A1* | 2/2021 | Khoshnevisan | H04L 5/0044 |
| 2021/0092759 A1* | 3/2021 | Xiong | H04W 72/0446 |
| 2022/0029750 A1* | 1/2022 | Matsumura | H04L 5/0053 |
| 2022/0045805 A1* | 2/2022 | Karaki | H04L 1/1864 |
| 2022/0046610 A1* | 2/2022 | Cheng | H04L 5/0044 |
| 2022/0046693 A1* | 2/2022 | Takeda | H04L 1/1896 |
| 2022/0174693 A1* | 6/2022 | Takeda | H04W 72/1263 |
| 2022/0201726 A1* | 6/2022 | Papasakellariou | H04W 72/1273 |
| 2022/0240289 A1* | 7/2022 | Karaki | H04L 1/1896 |
| 2022/0256572 A1* | 8/2022 | Kim | H04W 72/23 |
| 2022/0272724 A1* | 8/2022 | Oteri | H04L 5/0094 |
| 2023/0029963 A1* | 2/2023 | Yuan | H04L 1/1861 |
| 2023/0049739 A1* | 2/2023 | Yang | H04L 5/0055 |
| 2023/0163900 A1* | 5/2023 | Kim | H04L 1/1893 370/329 |
| 2023/0171043 A1* | 6/2023 | Yang | H04L 5/0055 714/726 |
| 2023/0309107 A1* | 9/2023 | Karaki | H04L 5/0044 |
| 2023/0412320 A1* | 12/2023 | Lei | H04L 1/1854 |
| 2024/0023098 A1* | 1/2024 | Wang | H04W 72/1273 |
| 2024/0137952 A1* | 4/2024 | Li | H04W 72/232 |
| 2024/0237025 A9* | 7/2024 | Li | H04L 5/0055 |
| 2024/0297744 A1* | 9/2024 | Yang | H04W 72/0446 |
| 2024/0340899 A1* | 10/2024 | Wang | H04L 1/1861 |
| 2025/0070948 A1* | 2/2025 | Choi | H04W 72/23 |

OTHER PUBLICATIONS

R1-2101606; 3GPP TSG RAN WG1 Meeting #104-e; Electronic Meeting, Jan. 25-Feb. 5, 2021; Source: NTT Docomo, Inc.; Title: PDCCH monitoring enhancements for NR from 52.6 to 71 GHz; Agenda Item: 8.2.2; Document for: Discussion and Decision.
R1-2101609; 3GPP TSG RAN WG1 Meeting #104-e; Electronic Meeting, Jan. 25-Feb. 5, 2021; Source: NTT Docomo, Inc.; Title: PDSCH/PUSCH enhancements for NR from 52.6 to 71 GHz; Agenda Item: 8.2.5; Document for: Discussion and Decision.
R1-2101776; 3GPP TSG RAN WG1 Meeting #104-e; E-meeting, Jan. 25-Feb. 5, 2021; Source: Moderator (vivo); Title: Summary of PDSCH/PUSCH enhancements (Bandwidth/Timeline/Reference signals); Agenda item: 8.2.5; Document for: Discussion and decision.
R1-2101780; 3GPP TSG RAN WG1 #104-e; e-Meeting, Jan. 25-Feb. 5, 2021; Agenda Item: 8.2.5; Source: InterDigital, Inc.; Title: Discussions on PDSCH/PUSCH enhancements; Document for: Discussion and Decision.
R1-2101799; 3GPP TSG RAN WG1 #104-e; e-Meeting, Jan. 25-Feb. 5, 2021; Agenda Item: 8.2.5; Source: Moderator (LG Electronics); Title: Summary #1 of PDSCH/PUSCH enhancements (Scheduling/HARQ); Document for: Discussion and decision.
R1-2101819; 3GPP TSG RAN WG1 #104-e; e-Meeting, Jan. 25-Feb. 5, 2021; Title: Discussion on the data channel enhancements for 52.6 to 71GHz; Source: ZTE, Sanechips; Agenda Item: 8.2.5; Document for: Discussion and Decision.
R1-2101858; 3GPP TSG RAN WG1 #104-e; e-Meeting, Jan. 25-Feb. 5, 2021; Agenda Item: 8.2.5; Source: Moderator (LG Electronics); Title: Summary #2 of PDSCH/PUSCH enhancements (Scheduling/HARQ); Document for: Discussion and decision.
R1-2101874; 3GPP TSG RAN WG1#104-e; e-Meeting, Jan. 25-Feb. 5, 2021; Agenda Item: 8.2.2; Source: Moderator (Lenovo); Title: Feature lead summary for [104-e-NR-52-71GHz-02] Email discussion/approval on PDCCH monitoring enhancements; Document for: Discussion, Decision.
R1-2101883; 3GPP TSG RAN WG1 Meeting #104-e; E-meeting, Jan. 25-Feb. 5, 2021; Source: Moderator (vivo); Title: Discussion summary #1 of [104-e-NR-52-71GHz-05]; Agenda item: 8.2.5; Document for: Discussion and decision.
R1-2101958; 3GPP TSG-RAN WG1 Meeting #104-e; eMeeting, Jan. 25-Feb. 5, 2021; Agenda item: 8.2.5; Source: Charter Communications; Title: PDSCH-PUSCH Enhancement Aspects for NR beyond 52.6 GHz; Document for: Discussion.
R1-2101972; 3GPP TSG RAN WG1 #104-e; e-Meeting, Jan. 25-Feb. 5, 2021; Agenda Item: 8.2.5; Source: Moderator (LG Electronics); Title: Summary #3 of PDSCH/PUSCH enhancements (Scheduling/HARQ); Document for: Discussion and decision.
R1-2102072; 3GPP TSG RAN WG1 Meeting #104-e; E-meeting, Jan. 25-Feb. 5, 2021; Source: Moderator (vivo); Title: Discussion summary #2 of [104-e-NR-52-71GHz-05]; Agenda item: 8.2.5; Document for: Discussion and decision.
R1-2102080; 3GPP TSG RAN WG1 #104-e; e-Meeting, Jan. 25-Feb. 5, 2021; Agenda Item: 8.2.5; Source: Moderator (LG Electronics); Title: Summary #4 of PDSCH/PUSCH enhancements (Scheduling/HARQ); Document for: Discussion and decision.
R1-2102090; 3GPP TSG RAN WG1 Meeting #104-e; e-Meeting, Jan. 25-Feb. 5, 2021; Title: [Draft] LS on the maximum/minimum channel bandwidth and channelization for NR operation in 52.6 to 71 GHz; Response to:; Release: Rel-17; Work Item: NR_ext_to_71GHz.
R1-2102128; 3GPP TSG RAN WG1 Meeting #104-e; e-Meeting, Jan. 25-Feb. 5, 2021; Title: LS on the maximum/minimum channel bandwidth and channelization for NR operation in 52.6 to 71 GHz; Response to:; Release: Rel-17; Work Item: NR_ext_to_71GHz.
R1-2102142; 3GPP TSG RAN WG1#104-e; e-Meeting, Jan. 25-Feb. 5, 2021; Agenda Item: 8.2.2; Source: Moderator (Lenovo); Title: Feature lead summary#2 for [104-e-NR-52-71GHz-02] on PDCCH monitoring enhancements; Document for: Discussion, Decision.
R1-2102192; 3GPP TSG-RAN WG1 Meeting #104-e; e-Meeting, Jan. 25-Feb. 5, 2021; Agenda item: 8.2; Title: Session notes for 8.2 (Study on supporting NR from 52.6 GHz to 71 GHz); Source: Ad-hoc Chair (Ericsson); Document for: Endorsement.
R1-2102237; 3GPP TSG RAN WG1 Meeting #104-e; E-meeting, Jan. 25-Feb. 5, 2021; Source: Moderator (vivo); Title: Discussion summary #3 of [104-e-NR-52-71GHz-05]; Agenda item: 8.2.5; Document for: Discussion and decision.
R1-2102242; 3GPP TSG RAN WG1#104-e; e-Meeting, Jan. 25-Feb. 5, 2021; Agenda Item: 8.2.2; Source: Moderator (Lenovo); Title: Feature lead summary#3 for [104-e-NR-52-71GHz-02] on PDCCH monitoring enhancements; Document for: Discussion, Decision.
International Search Report and Written Opinion of the International Searching Authority mailed Jun. 22, 2022, in International Application No. PCT/US2022/022361.
R1-1911099; 3GPP TSG RAN WG1 Meeting #98bis; Chongqing, CN; Oct. 14-Oct. 20, 2019; Agenda Item: 7.2.2.2.3; Source: Qualcomm Incorporated; Title: Enhancements to Scheduling and HARQ operation for NR-U; Document for: Discussion/Decision.
R1-1907214; 3GPP TSG RAN WG1 Meeting #97; Reno, Nevada, US, May 13-17, 2019; Source: Sharp; Title: HARQ enhancement for NR unlicensed operation; Agenda Item: 7.2.2.2.3; Document for: Discussion and Decision.
3GPP TS 38.211 V16.2.0 (Jun. 2020); Technical Specification; 3rd Generation Partnership Project; Technical Specification Group Radio Access Network; NR; Physical channels and modulation; (Release 16).
3GPP TS 38.212 V16.1.0 (Mar. 2020); Technical Specification; 3rd Generation Partnership Project; Technical Specification Group Radio Access Network; NR; Multiplexing and channel coding; (Release 16).
3GPP TS 38.213 V16.4.0 (Dec. 2020); Technical Specification; 3rd Generation Partnership Project; Technical Specification Group Radio Access Network; NR; Physical layer procedures for control; (Release 16).

(56) References Cited

OTHER PUBLICATIONS

3GPP TS 38.214 V16.3.0 (Sep. 2020); Technical Specification; 3rd Generation Partnership Project; Technical Specification Group Radio Access Network; NR; Physical layer procedures for data; (Release 16).
3GPP TS 38.321 V16.3.0 (Dec. 2020); Technical Specification; 3rd Generation Partnership Project; Technical Specification Group Radio Access Network; NR; Medium Access Control (MAC) protocol specification; (Release 16).
3GPP TS 38.331 V16.3.1 (Jan. 2021); Technical Specification; 3rd Generation Partnership Project; Technical Specification Group Radio Access Network; NR; Radio Resource Control (RRC) protocol specification; (Release 16).
R1-2100050; 3GPP TSG RAN WG1 #104-e; e-Meeting, Jan. 25-Feb. 5, 2021; Agenda Item: 8.2.5; Source: FUTUREWEI; Title: Considerations for higher SCS support in beyond 52.6GHz; Document for: Discussion/Decision.
R1-2100058; 3GPP TSG RAN WG1 #104-e; e-meeting, Jan. 25-Feb. 5, 2021; Source: Lenovo, Motorola Mobility; Title: PDCCH monitoring enhancements for NR from 52.6 GHz to 71GHz; Agenda Item: 8.2.2; Document for: Discussion.
R1-2100061; 3GPP TSG RAN WG1 #104-e; e-meeting, Jan. 25-Feb. 5, 2021; Source: Lenovo, Motorola Mobility; Title: PDSCH/PUSCH scheduling enhancements for NR from 52.6 GHz to 71GHz; Agenda Item: 8.2.5; Document for: Discussion.
R1-2100074; 3GPP TSG RAN WG1 #104-e; e-Meeting, Jan. 25-Feb. 5, 2021; Title: Discussion on the PDCCH monitoring enhancements for 52.6 to 71 GHz; Source: ZTE, Sanechips; Agenda Item: 8.2.2; Document for: Discussion and Decision.
R1-2100077; 3GPP TSG RAN WG1 #104-e; e-Meeting, Jan. 25-Feb. 5, 2021; Title: Discussion on the data channel enhancements for 52.6 to 71GHz; Source: ZTE, Sanechips; Agenda Item: 8.2.5; Document for: Discussion and Decision.
R1-2100150; 3GPP TSG RAN WG1 #104-e; e-Meeting, Jan. 25-Feb. 5, 2021; Source: OPPO; Title: Discussion on PDCCH monitoring; Agenda Item: 8.2.2; Document for: Discussion and Decision.
R1-2100153; 3GPP TSG RAN WG1 #104-e; e-Meeting, Jan. 25-Feb. 5, 2021; Source: OPPO; Title: Discussion on PDSCH/PUSCH enhancements; Agenda Item: 8.2.5; Document for: Discussion and Decision.
R1-2100201; 3GPP TSG RAN WG1 Meeting #104-e; E-meeting, Jan. 25-Feb. 5, 2021; Agenda Item: 8.2.5; Source: Huawei, HiSilicon; Title: PDSCH/PUSCH enhancements for 52-71GHz band; Document for: Discussion and Decision.
R1-2100241; 3GPP TSG RAN WG1 Meeting #104-e; E-meeting, Jan. 25-Feb. 5, 2021; Agenda Item: 8.2.2; Source: Huawei, HiSilicon; Title: Enhancement on PDCCH monitoring; Document for: Discussion and Decision.
R1-2100258; 3GPP TSG RAN WG1 #104-e; e-Meeting, Jan. 25-Feb. 5, 2021; Agenda item: 8.2.2; Source: Nokia, Nokia Shanghai Bell; Title: PDCCH monitoring enhancements; Document for: Discussion and Decision.
R1-2100261; 3GPP TSG RAN WG1 #104-e; e-Meeting, Jan. 25-Feb. 5, 2021; Agenda item: 8.2.5; Source: Nokia, Nokia Shanghai Bell; Title: PDSCH/PUSCH enhancements; Document for: Discussion and Decision.
R1-2100300; 3GPP TSG RAN WG1 #104-e; e-Meeting, Jan. 25-Feb. 5, 2021; Source: CAICT; Title: Discussions on PDSCH and PUSCH enhancements for 52.6-71GHz; Agenda Item: 8.2.5; Document for: Discussion / Decision.
R1-2100371; 3GPP TSG RAN WG1 #104-e; e-Meeting, Jan. 25-Feb. 5, 2021; Source: CATT; Title: PDCCH monitoring enhancements for up to 71GHz operation; Agenda Item: 8.2.2; Document for: Discussion and Decision.
R1-2100374; 3GPP TSG RAN WG1 #104-e; e-Meeting, Jan. 25-Feb. 5, 2021; Source: CATT; Title: PDSCH/PUSCH enhancements for up to 71GHz operation; Agenda Item: 8.2.5; Document for: Discussion and Decision.
R1-2100430; 3GPP TSG RAN WG1 #104-e; e-Meeting, Jan. 25-Feb. 5, 2021; Source: vivo; Title: Discussions on PDCCH monitoring enhancements for NR operation from 52.6-71GHz; Agenda Item: 8.2.2; Document for: Discussion and Decision.
R1-2100433; 3GPP TSG RAN WG1 #104-e; e-Meeting, Jan. 25-Feb. 5, 2021; Source: vivo; Title: Discussions on PDSCH PUSCH enhancements for NR operation from 52.6GHz to 71GHz; Agenda Item: 8.2.5; Document for: Discussion and Decision.
R1-2100553; 3GPP TSG RAN WG1 #104-e; e-Meeting, Jan. 25-Feb. 5, 2021; Source: Mitsubishi Electric; Title: PT-RS enhancements for NR from 52.6GHz to 71GHz; Agenda Item: 8.2.5—PDSCH/PUSCH enhancements; Document for: Discussion/Decision.
R1-2100605; 3GPP TSG RAN WG1 #104-e; e-Meeting, Jan. 25-Feb. 5, 2021; Agenda item: 8.2.5; Title: On Enhancements of PDSCH Reference Signals; Source: MediaTek Inc.; Document for: Discussion.
R1-2100608; 3GPP TSG RAN WG1 #104-e; e-Meeting, Jan. 25-Feb. 5, 2021; Agenda item: 8.2.2; Title: PDCCH monitoring enhancement for 52.6-71 GHz NR operation; Source: MediaTek Inc.; Document for: Discussion.
R1-2100644; 3GPP TSG RAN WG1 Meeting #104-e; e-Meeting, Jan. 25-Feb. 5, 2021; Source: Intel Corporation; Title: Discussion on PDCCH monitoring enhancements for extending NR up to 71 GHz; Agenda item: 8.2.2; Document for: Discussion/Decision.
R1-2100647; 3GPP TSG RAN WG1 Meeting #104-e; e-Meeting, Jan. 25-Feb. 5, 2021; Source: Intel Corporation; Title: Discussion on PDSCH/PUSCH enhancements for extending NR up to 71 GHz; Agenda item: 8.2.5; Document for: Discussion/Decision.
R1-2100741; 3GPP TSG RAN WG1 #104-e; e-Meeting, Jan. 25-Feb. 5, 2021; Agenda Item: 8.2.5; Source: Fujitsu; Title: Considerations on multi-PDSCH/PUSCH with a single DCI and HARQ for NR from 52.6 GHz to 71 GHz; Document for: Discussion/Decision.
R1-2100817; 3GPP TSG RAN WG1 #104-e; e-Meeting, Jan. 25-Feb. 5, 2021; Source: Spreadtrum Communications; Title: Discussion on PDCCH monitoring enhancement for NR beyond 52.6 GHz; Agenda Item: 8.2.2; Document for: Discussion and Decision.
R1-2100820; 3GPP TSG RAN WG1#104-e; e-Meeting, Jan. 25-Feb. 5, 2021; Agenda Item: 8.2.5; Source: Spreadtrum Communications; Title: Discussion on PDSCH and PUSCH enhancements for above 52.6GHz; Document for: Discussion and decision.
R1-2100837; 3GPP TSG RAN WG1 #104-e; e-Meeting, Jan. 25-Feb. 5, 2021; Agenda Item: 8.2.2; Source: InterDigital, Inc.; Title: Discussions on PDCCH monitoring enhancements; Document for: Discussion and Decision.
R1-2100840; 3GPP TSG RAN WG1 #104-e; e-Meeting, Jan. 25-Feb. 5, 2021; Agenda Item: 8.2.5; Source: InterDigital, Inc.; Title: Discussions on PDSCH/PUSCH enhancements; Document for: Discussion and Decision.
R1-2100851; 3GPP TSG RAN WG1#104e; E-meeting, Jan. 25-Feb. 5, 2021; Agenda Item: 8.2.2; Source: Sony; Title: PDCCH enhancement for NR from 52.6GHz to 71GHz; Document for: Discussion.
R1-2100853; 3GPP TSG RAN WG1 #104-e; e-Meeting, Jan. 25-Feb. 5, 2021; Agenda Item: 8.2.5; Source: Sony; Title: PDSCH/PUSCH enhancements for NR from 52.6 GHz to 71 GHz; Document for: Discussion / Decision.
R1-2100893; 3GPP TSG RAN WG1 #104-e; e-Meeting, Jan. 25-Feb. 5, 2021; Agenda Item: 8.2.2; Source: LG Electronics; Title: PDCCH monitoring enhancements to support NR above 52.6 GHz; Document for: Discussion and decision.
R1-2100896; 3GPP TSG RAN WG1 #104-e; e-Meeting, Jan. 25-Feb. 5, 2021; Agenda Item: 8.2.5; Source: LG Electronics; Title: PDSCH/PUSCH enhancements to support NR above 52.6 GHz; Document for: Discussion and decision.
R1-2100940; 3GPP TSG RAN WG1 #104-e; e-Meeting, , Jan. 25-Feb. 5, 2021; Source: NEC; Title: PDSCH enhancements on supporting NR from 52.6GHz to 71 GHZ; Agenda Item: 8.2.5; Document for: Discussion and Decision.
R1-2101110; 3GPP TSG RAN WG1 #104; e-Meeting, Jan. 25-Feb. 5, 2021; Agenda item: 8.2.2; Source: Xiaomi; Title: PDCCH monitoring enhancement for NR 52.6-71 GHz; Document for: Discussion.
R1-2101112; 3GPP TSG RAN WG1 #104; e-Meeting, Jan. 25-Feb. 5, 2021; Agenda item: 8.2.5; Source: Xiaomi; Title: PDSCH/PUSCH for NR 52.6-71 GHz; Document for: Discussion.

(56) References Cited

OTHER PUBLICATIONS

R1-2101195; 3GPP TSG RAN WG1 #104; e-Meeting, Jan. 25-Feb. 5, 2020; Agenda Item: 8.2.2; Source: Samsung; Title: PDCCH monitoring enhancements for NR from 52.6 GHz to 71 GHz; Document for: Discussion and decision.
R1-2101198; 3GPP TSG RAN WG1 #104-e; e-Meeting, Jan. 25-Feb. 5, 2021; Agenda item: 8.2.5; Source: Samsung; Title: PDSCH/PUSCH enhancements for NR from 52.6 GHz to 71 GHz; Document for: Discussion and Decision.
R1-2101307; 3GPP TSG-RAN WG1 Meeting #104-e; Online, Jan. 25-Feb. 5, 2021; Agenda Item: 8.2.2; Source: Ericsson; Title: PDCCH monitoring enhancements; Document for: Discussion, Decision.
R1-2101310; 3GPP TSG-RAN WG1 Meeting #104-e; Online, Jan. 25-Feb. 5, 2021; Agenda Item: 8.2.5; Source: Ericsson; Title: PDSCH/PUSCH enhancements; Document for: Discussion, Decision.
R1-2101320; 3GPP TSG RAN WG1 #104-e; e-meeting, Jan. 25-Feb. 5, 2021; Source: CEWIT; Title: Enhancements on Reference signals for PDSCH/PUSCH for NR beyond 52.6 GHz; Agenda Item: 8.2.5; Document for: Discussion.
R1-2101321; 3GPP TSG-RAN WG1 Meeting #104-e; e-Meeting, Jan. 25-Feb. 5, 2021; Agenda Item: 8.2.2; Source: CEWIT; Title: Discussion on PDCCH monitoring enhancements for NR above 52.6GHz; Document for: Discussion.
R1-2101330; 3GPP TSG-RAN WG1 Meeting #104-e; eMeeting, Jan. 25-Feb. 5, 2021; Agenda item: 8.2.5; Source: Charter Communications; Title: PDSCH-PUSCH Enhancement Aspects for NR beyond 52.6 GHZ; Document for: Discussion.
R1-2101373; 3GPP TSG RAN WG1 #104-e; e-Meeting, Jan. 25-Feb. 5, 2021; Agenda Item: 8.2.2; Source: Apple Inc.; Title: PDCCH monitoring enhancements for NR between 52.6GHz and 71 GHz; Document for: Discussion/Decision.
R1-2101376; 3GPP TSG RAn WG1 #104-e; e-Meeting, Jan. 25-Feb. 5, 2021; Agenda Item: 8.2.5; Source: Apple Inc.; Title: PDSCH/PUSCH enhancements for NR between 52.6GHz and 71 GHz; Document for: Discussion/Decision.
R1-2101418; 3GPP TSG-RAN WG1 #104; e-Meeting, Jan. 25-Feb. 5, 2021; Agenda item: 8.2.2; Title: Consideration for PDCCH Monitoring for Supporting NR from 52.6 GHz to 71 GHz; Source: Convida Wireless; Document for: Discussion.
R1-2101454; 3GPP TSG-RAN WG1 #104-e; e-Meeting, Jan. 25-Feb. 5, 2021; Agenda item: 8.2.2; Source: Qualcomm Incorporated; Title: PDCCH monitoring enhancements; Document for: Discussion/Decision.

* cited by examiner

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources as defined in Clause [x.x] of [10, TS 38.473] |
| 2_6 | Notifying the power saving information outside DRX Active Time for one or more UEs |
| 3_0 | Scheduling of NR sidelink in one cell |
| 3_1 | Scheduling of LTE sidelink in one cell |

FIG. 17

| Index | Slot Offset (K0) | SLIV#1 Start Symbol | SLIV#1 Length | SLIV#2 Start Symbol | SLIV#2 Length | ••• | SLIV#K Start Symbol | SLIV#K Length |
|---|---|---|---|---|---|---|---|---|
| 0 | 0 | 4 | 8 | 4 | 8 | ... | 1 | 0 |
| 1 | 4 | 6 | 5 | 1 | 14 | ... | 4 | 10 |
| 2 | 8 | 3 | 2 | 1 | 0 | ... | 1 | 0 |
| ... | ... | ... | ... | ... | ... | ... | ... | ... |

HYBRID AUTOMATIC REPEAT REQUEST CODEBOOK DETERMINATION FOR MULTI-PHYSICAL DOWNLINK SHARED CHANNEL SCHEDULING

CROSS-REFERENCE TO RELATED APPLICATIONS

This application is a continuation of International Application No. PCT/US2022/022361, filed Mar. 29, 2022, which claims the benefit of U.S. Provisional Application No. 63/167,314, filed Mar. 29, 2021, which are hereby incorporated by reference in their entireties.

BRIEF DESCRIPTION OF THE DRAWINGS

Examples of several of the various embodiments of the present disclosure are described herein with reference to the drawings.

FIG. 17 illustrates an example of various DCI formats used for various purposes.

DETAILED DESCRIPTION

Figure 1A:
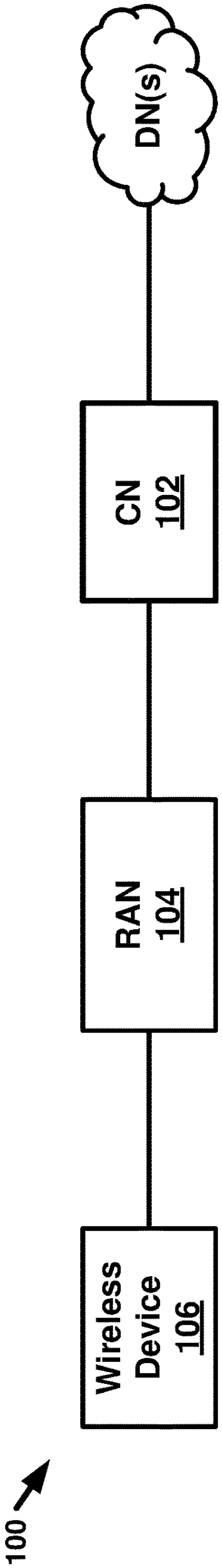
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
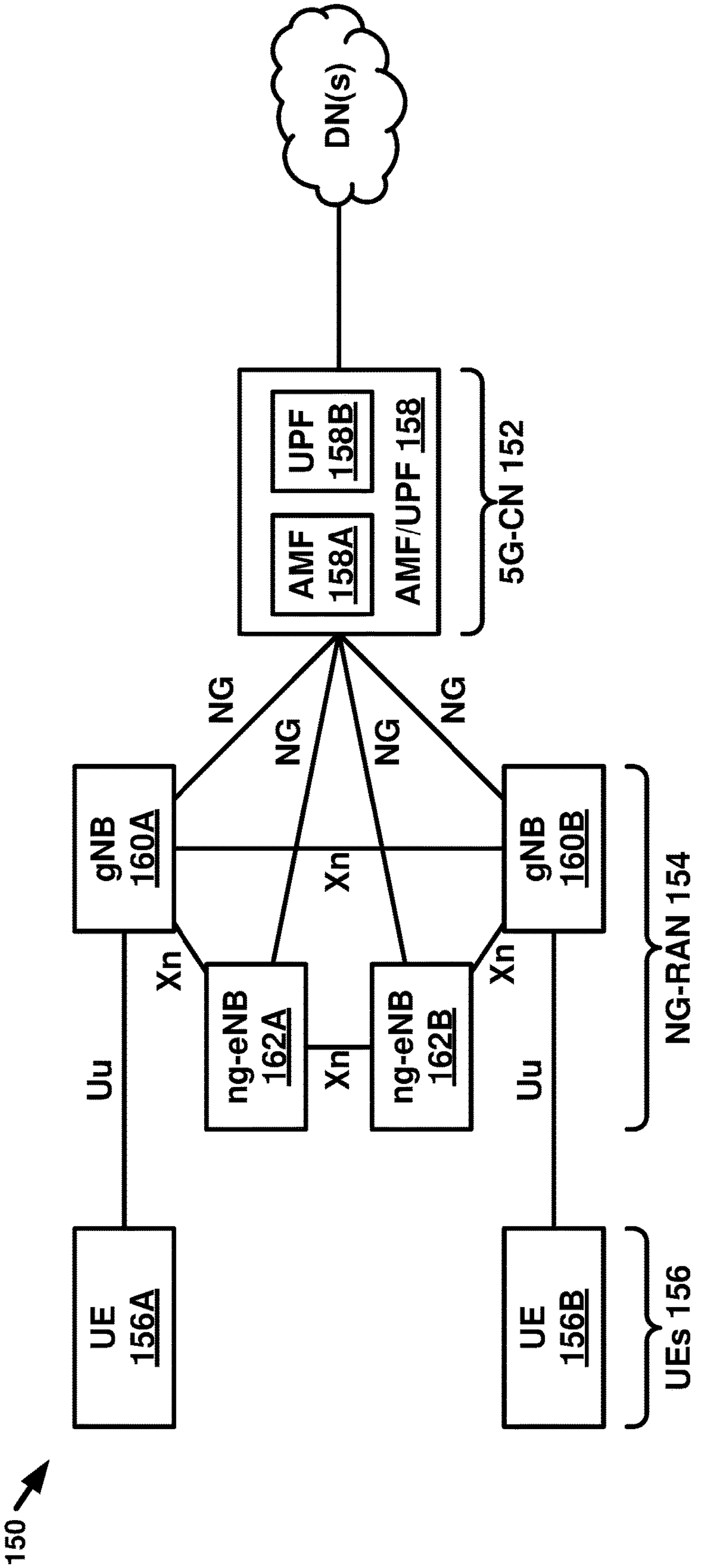

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
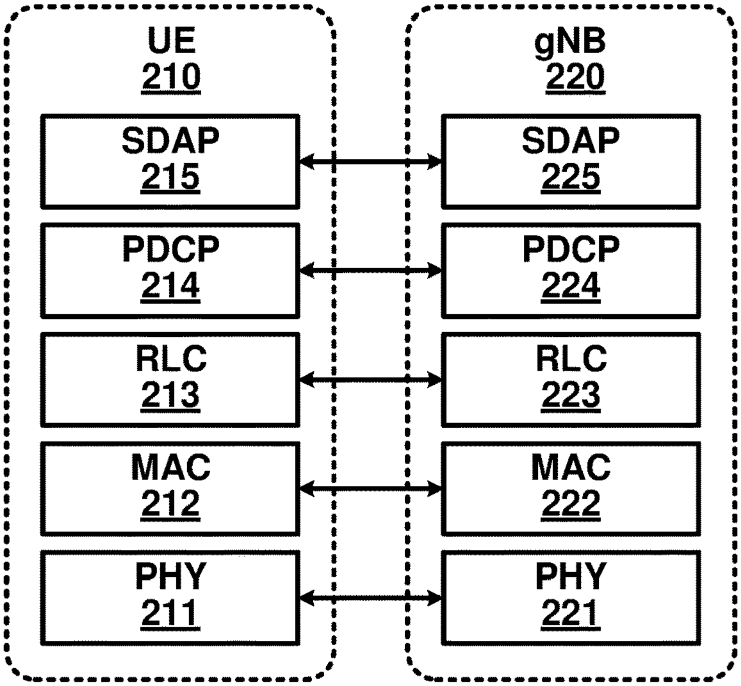
FIG. 2A and FIG. 2B respectively illustrate a New Radio (NR) user plane and control plane protocol stack.
Figure 2B:
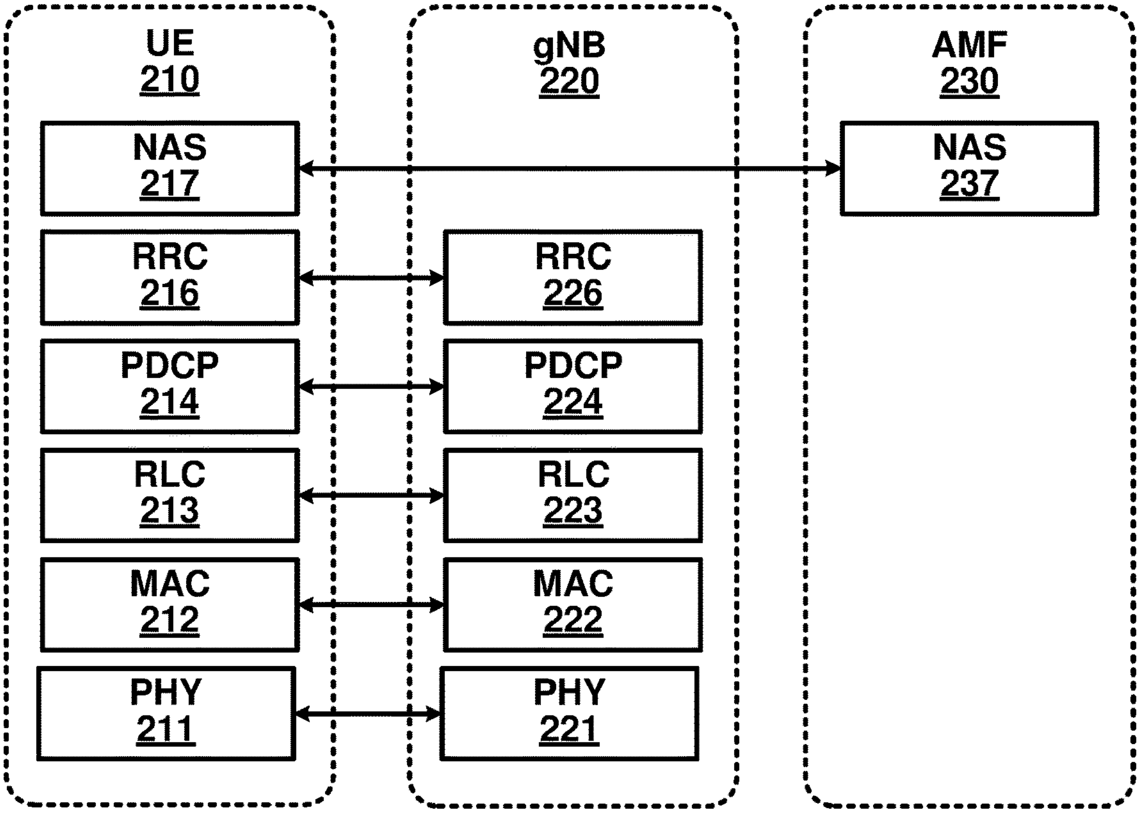

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
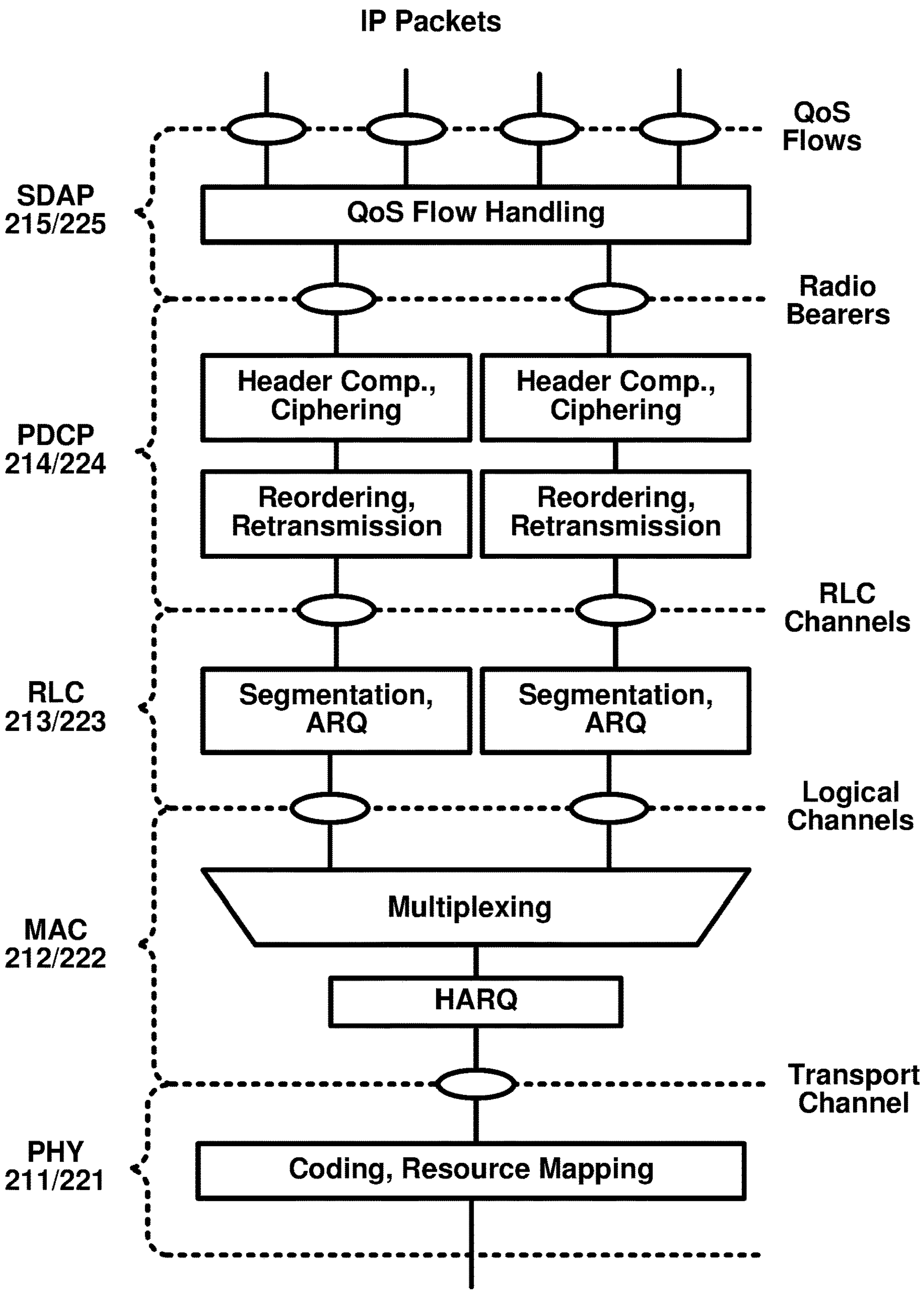
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figure 4A:
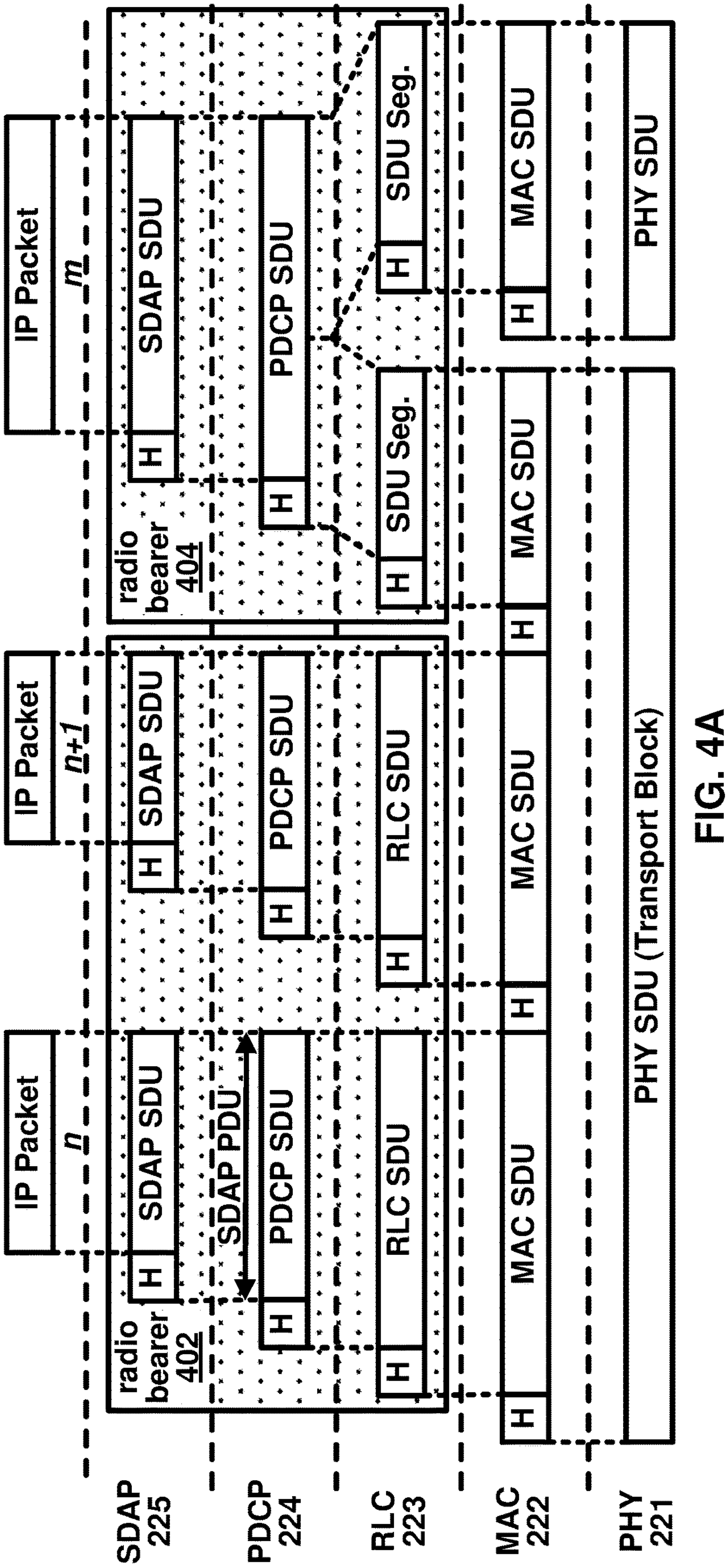
FIG. 4A illustrates an example downlink data flow through the NR user plane protocol stack of FIG. 2A.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

Figure 4B:
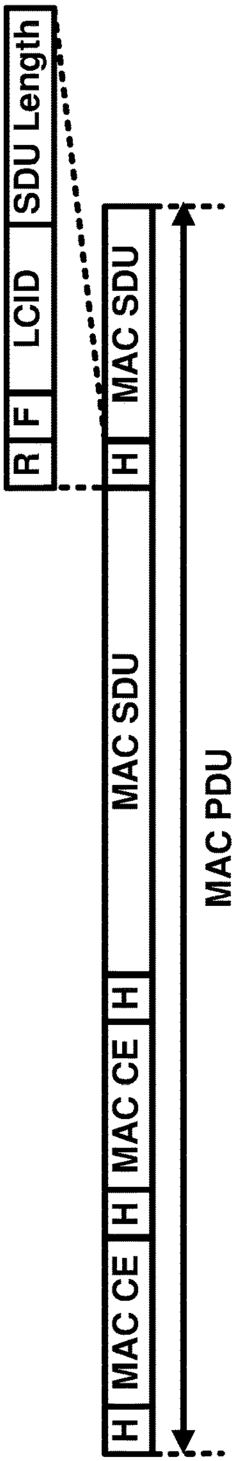
FIG. 4B illustrates an example format of a MAC subheader in a MAC PDU.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 212 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figure 5A:
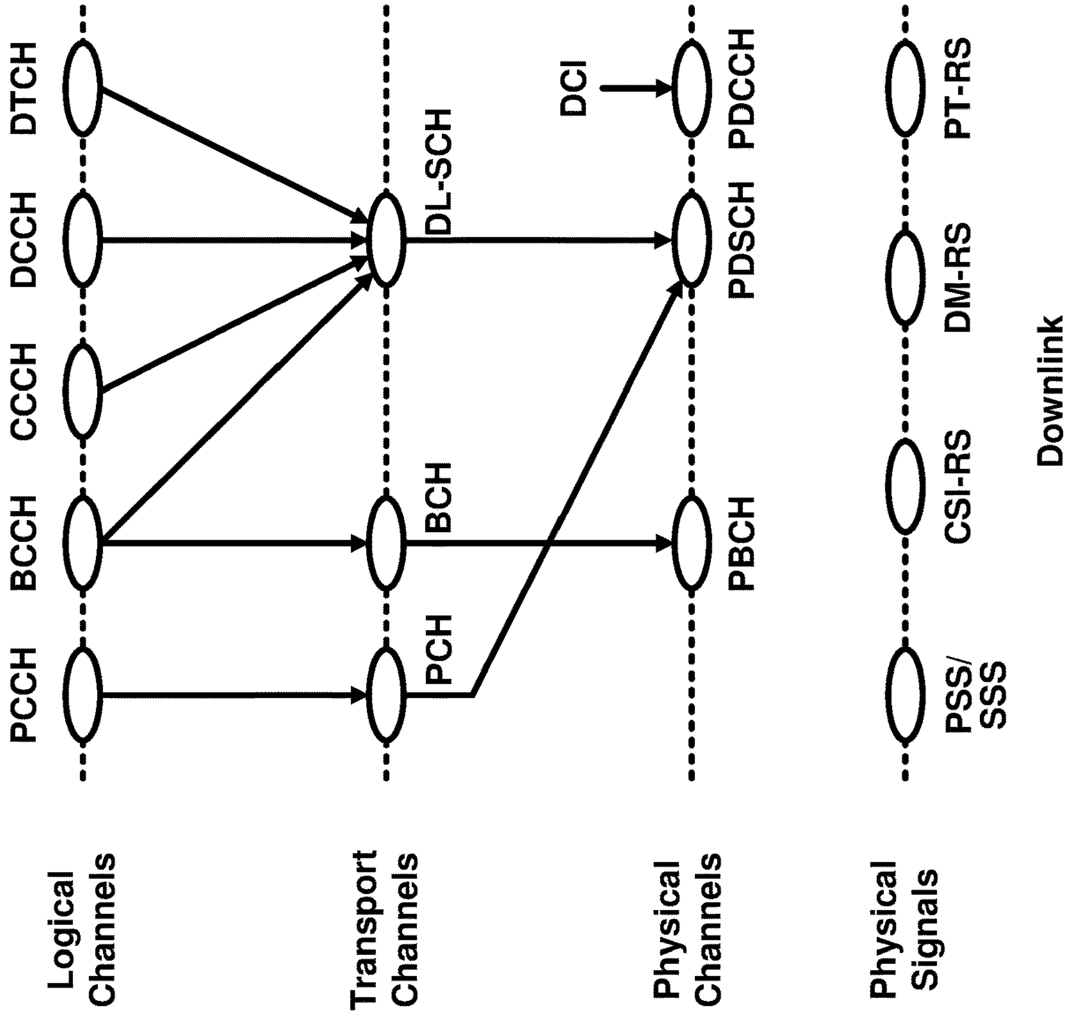
FIG. 5A and FIG. 5B respectively illustrate a mapping between logical channels, transport channels, and physical channels for the downlink and uplink.
Figure 5B:
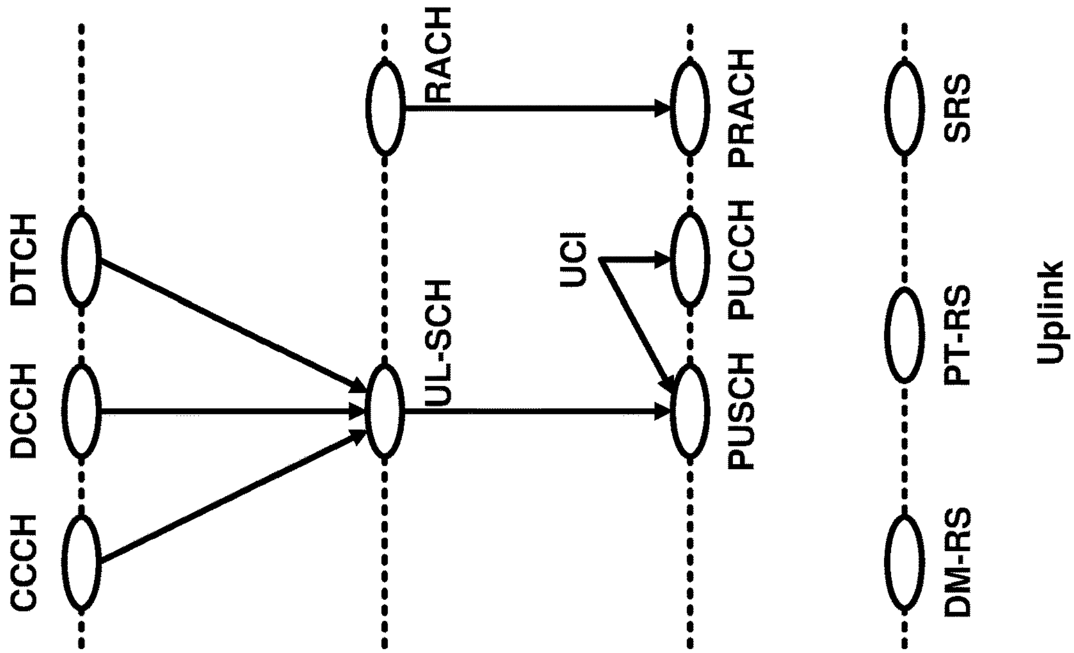

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

- a paging control channel (PCCH) for carrying paging messages used to page a UE whose location is not known to the network on a cell level;
- a broadcast control channel (BCCH) for carrying system information messages in the form of a master information block (MIB) and several system information blocks (SIBs), wherein the system information messages may be used by the UEs to obtain information about how a cell is configured and how to operate within the cell;
- a common control channel (CCCH) for carrying control messages together with random access;
- a dedicated control channel (DCCH) for carrying control messages to/from a specific the UE to configure the UE; and
- a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

- a paging channel (PCH) for carrying paging messages that originated from the PCCH;
- a broadcast channel (BCH) for carrying the MIB from the BCCH;
- a downlink shared channel (DL-SCH) for carrying downlink data and signaling messages, including the SIBs from the BCCH;
- an uplink shared channel (UL-SCH) for carrying uplink data and signaling messages; and
- a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

- a physical broadcast channel (PBCH) for carrying the MIB from the BCH;
- a physical downlink shared channel (PDSCH) for carrying downlink data and signaling messages from the DL-SCH, as well as paging messages from the PCH;
- a physical downlink control channel (PDCCH) for carrying downlink control information (DCI), which may include downlink scheduling commands, uplink scheduling grants, and uplink power control commands;

- a physical uplink shared channel (PUSCH) for carrying uplink data and signaling messages from the UL-SCH and in some instances uplink control information (UCI) as described below;
- a physical uplink control channel (PUCCH) for carrying UCI, which may include HARQ acknowledgments, channel quality indicators (CQI), pre-coding matrix indicators (PMI), rank indicators (RI), and scheduling requests (SR); and
- a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
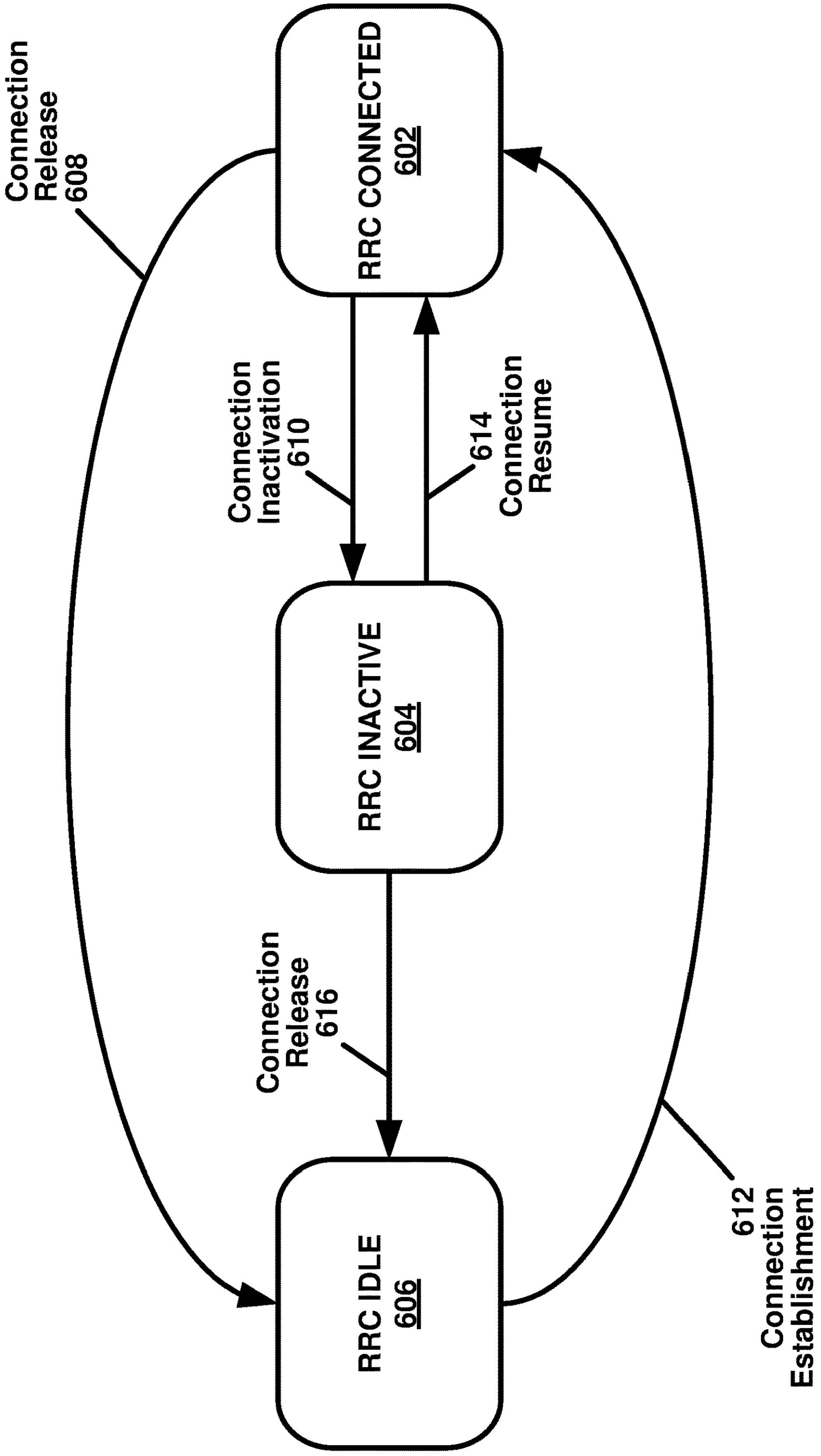
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection.

The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
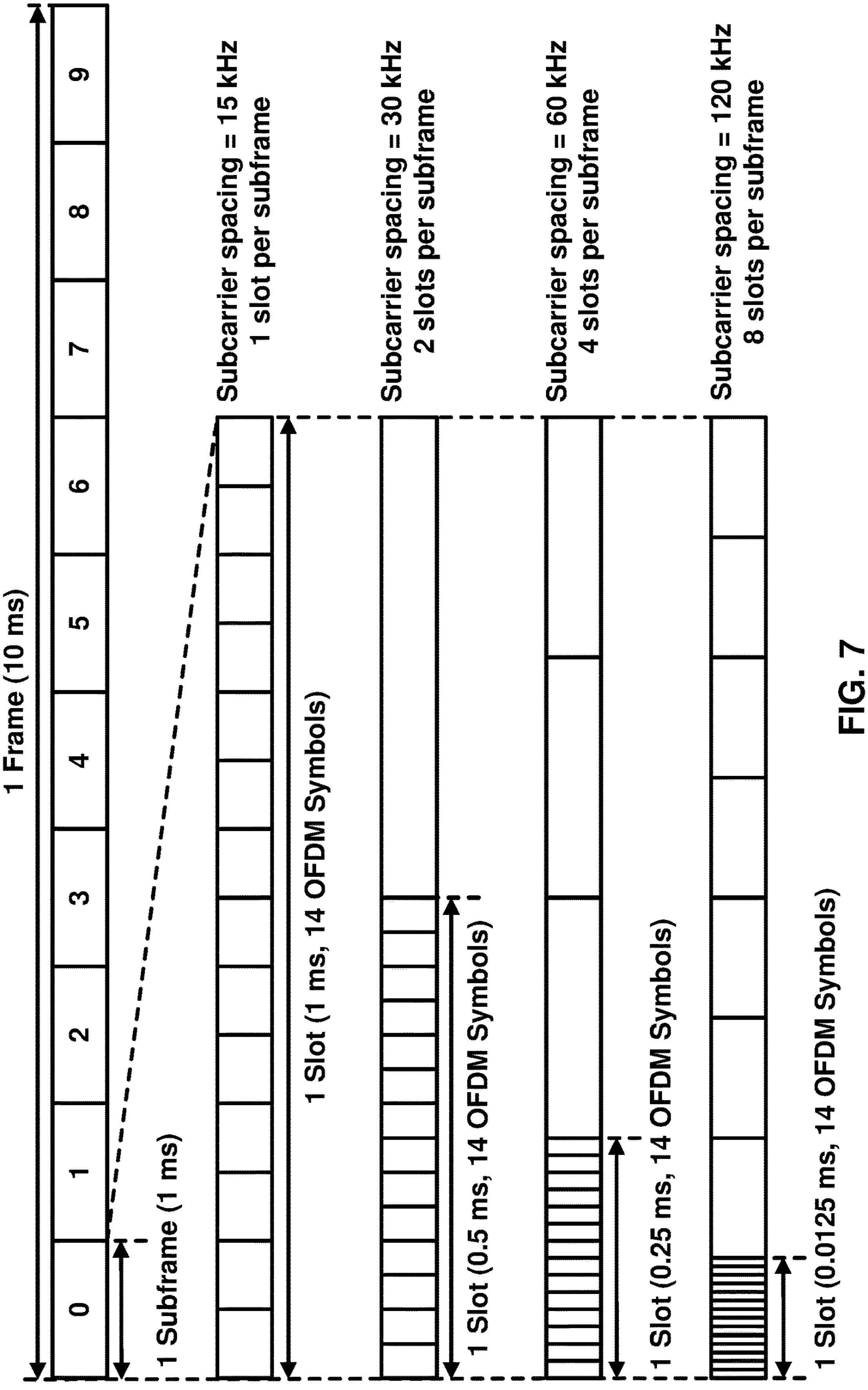
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 s. For example, NR defines numerologies with the following subcarrier spacing/cyclic prefix duration combinations: 15 kHz/4.7 s; 30 kHz/2.3 s; 60 kHz/1.2 s; 120 kHz/0.59 s; and 240 kHz/0.29 s.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
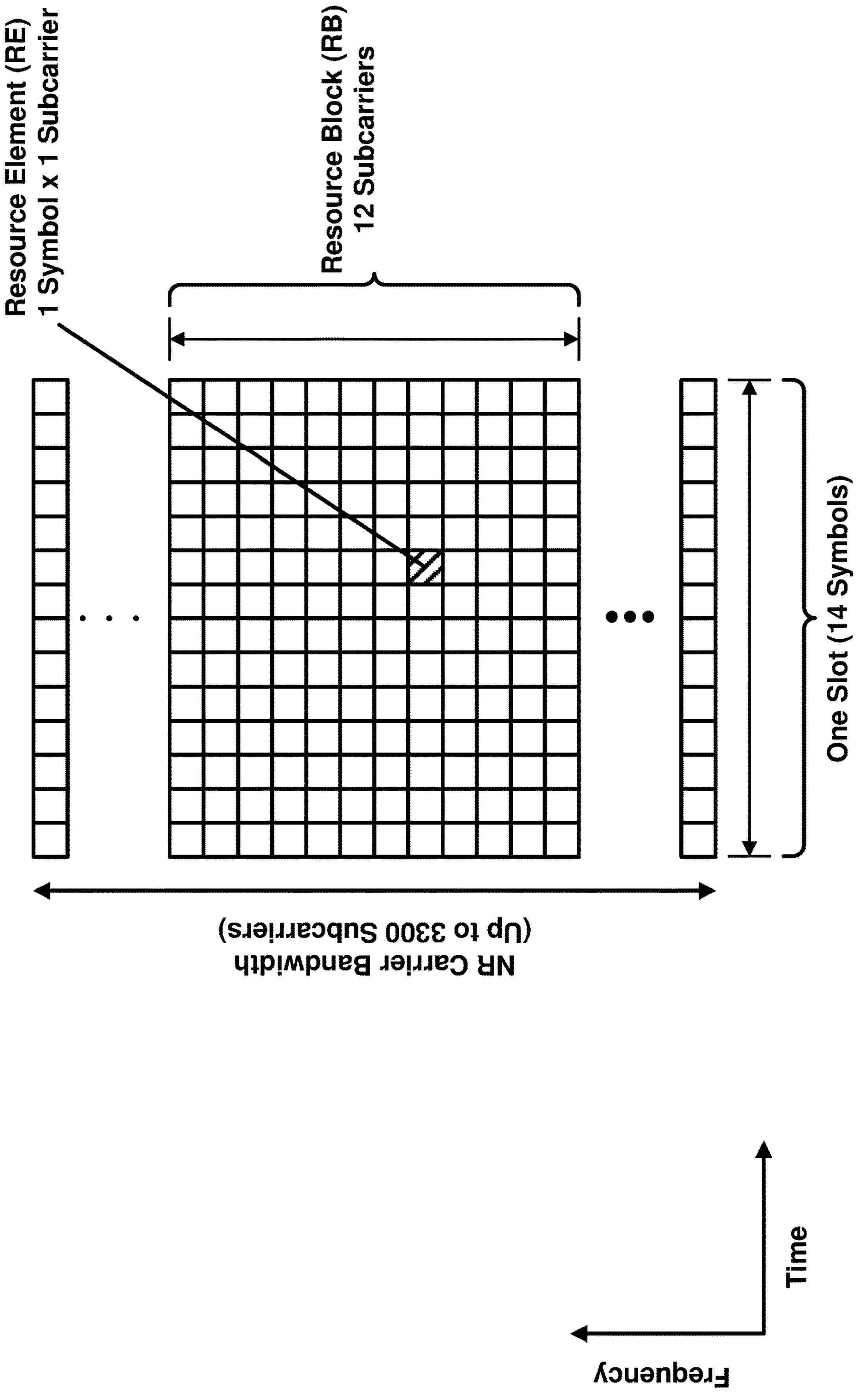
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
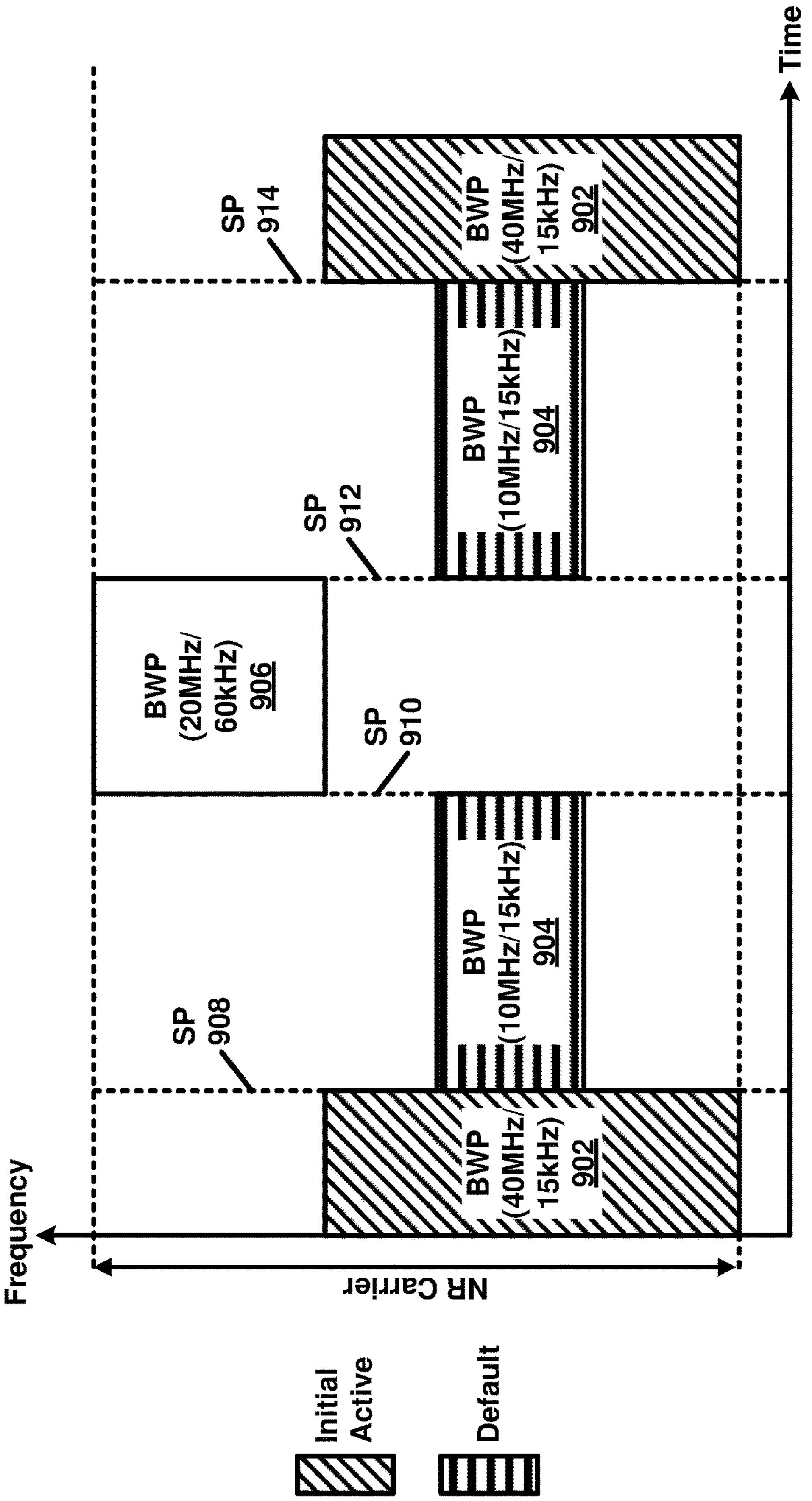
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
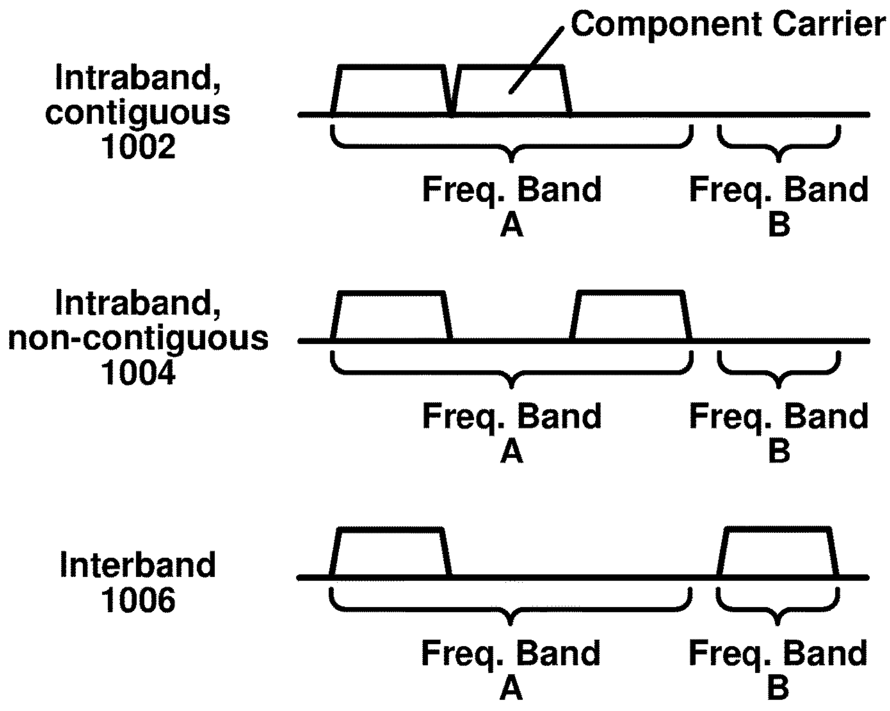
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
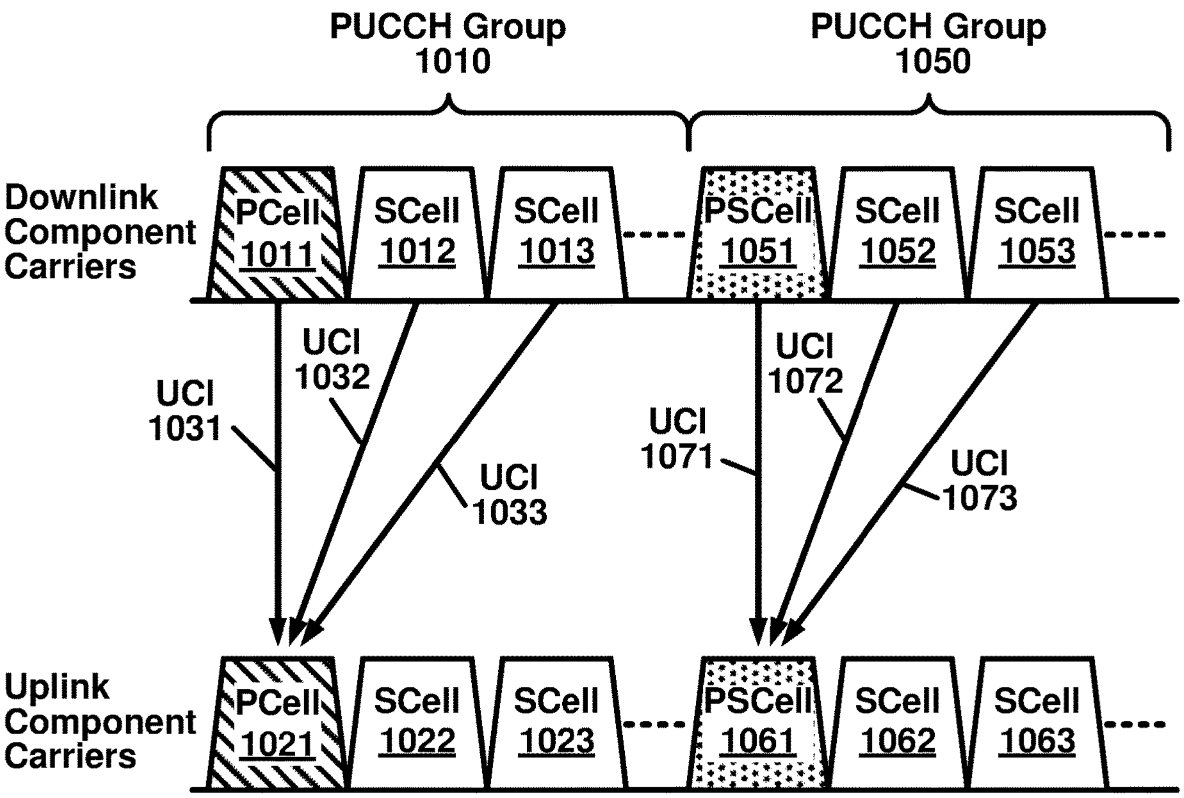
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a Pcell 1011, an Scell 1012, and an Scell 1013. The PUCCH group 1050 includes three downlink CCs in the present example: a Pcell 1051, an Scell 1052, and an Scell 1053. One or more uplink CCs may be configured as a Pcell 1021, an Scell 1022, and an Scell 1023. One or more other uplink CCs may be configured as a primary Scell (PSCell) 1061, an Scell 1062, and an Scell 1063. Uplink control information (UCI) related to the downlink CCs of the PUCCH group 1010, shown as UCI 1031, UCI 1032, and UCI 1033, may be transmitted in the uplink of the Pcell 1021. Uplink control information (UCI) related to the downlink CCs of the PUCCH group 1050, shown as UCI 1071, UCI 1072, and UCI 1073, may be transmitted in the uplink of the PScell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the Pcell 1021 and the PScell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
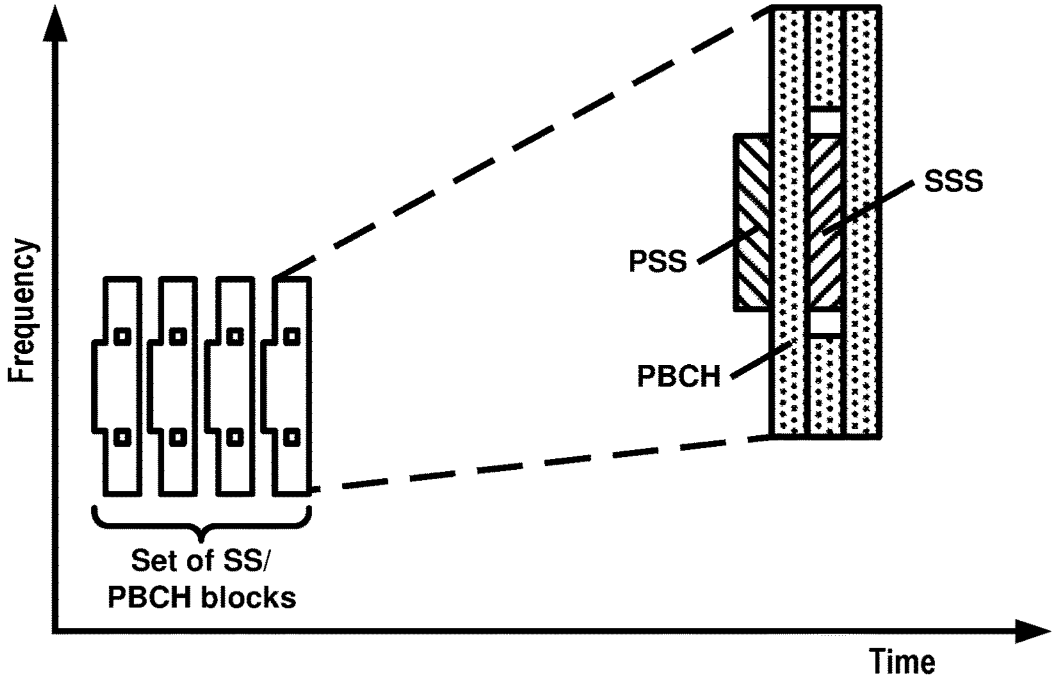
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
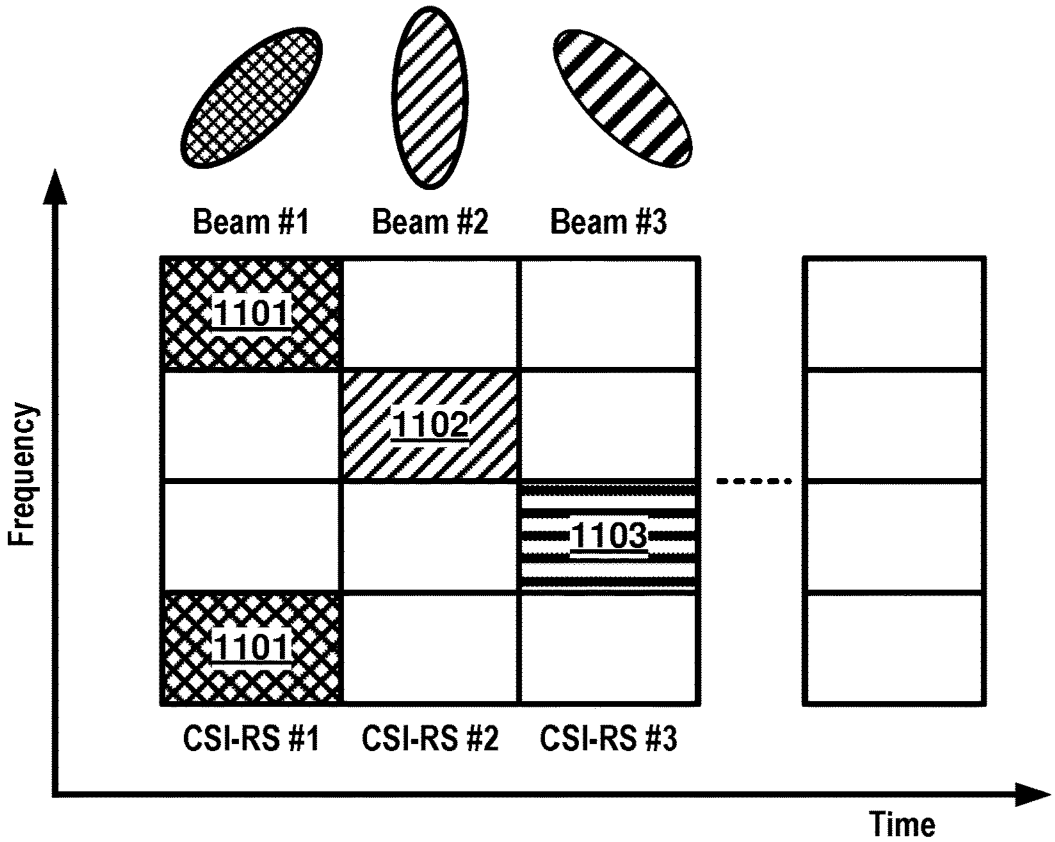
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figure 12A:
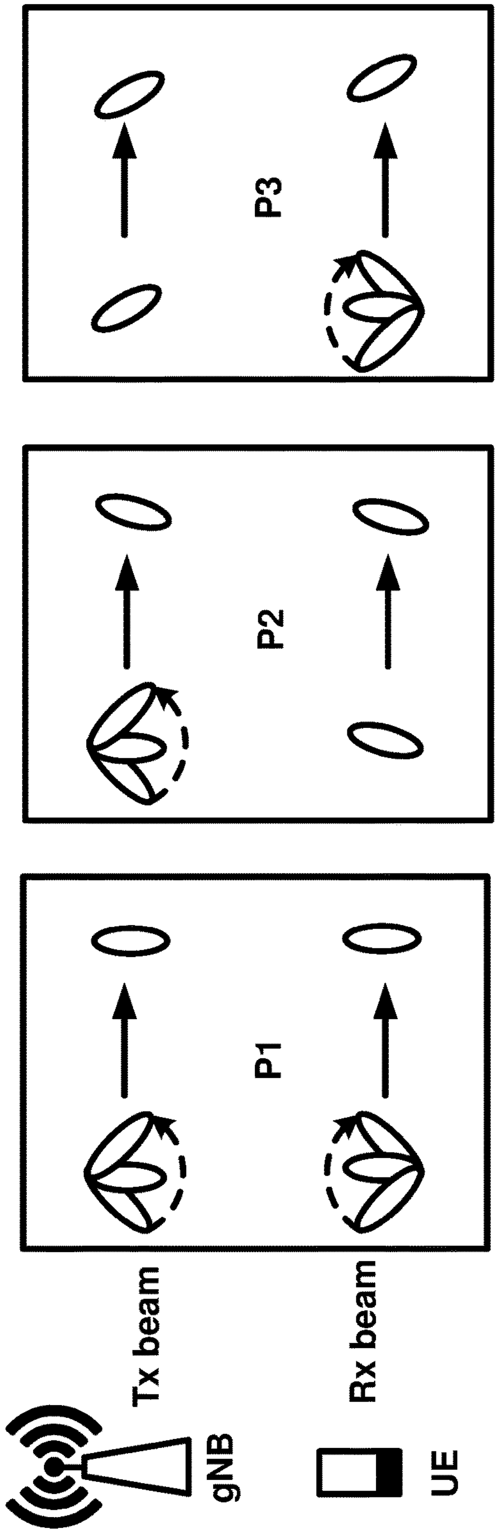
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

Figure 12B:
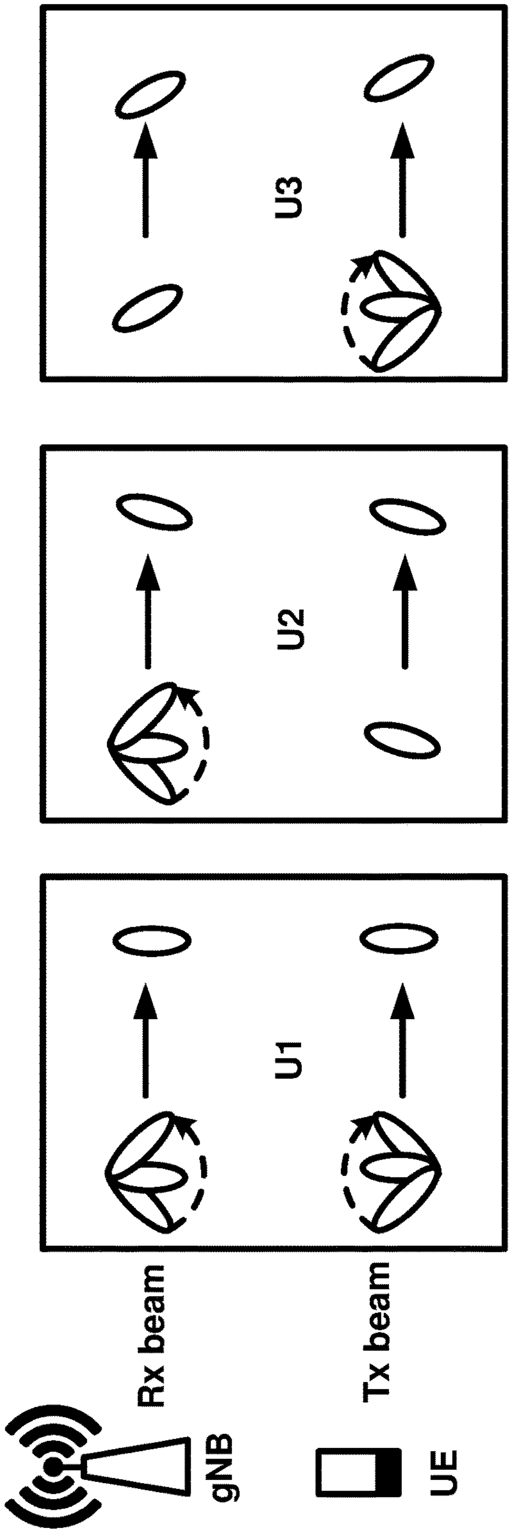

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13A:
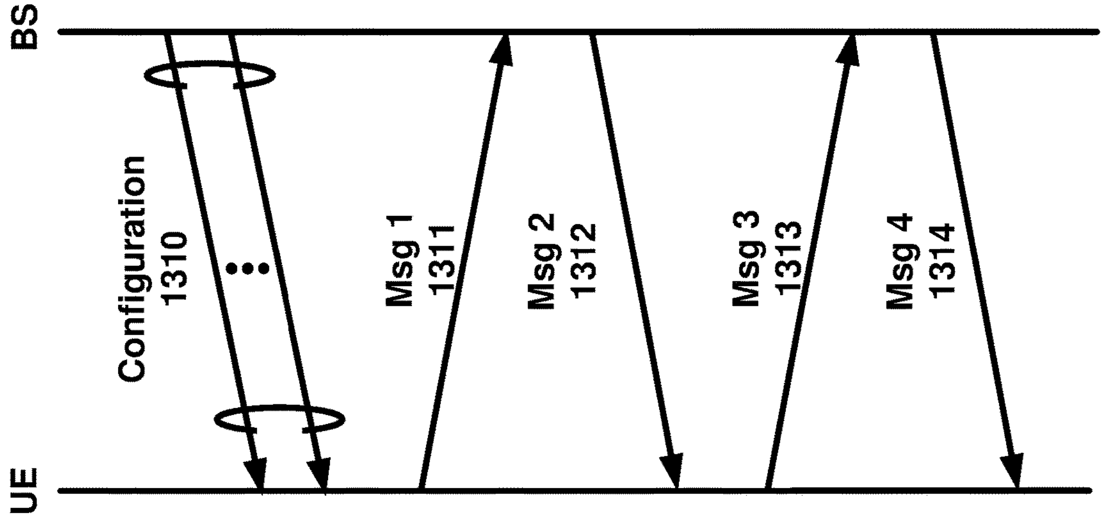
FIG. 13A, FIG. 13B, and FIG. 13C respectively illustrate a four-step contention-based random access procedure, a two-step contention-free random access procedure, and another two-step random access procedure.

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs.

For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$\text{RA-RNTI}=1+s\_id+14\times t\_id+14\times 80\times f\_id+14\times 80\times 8\times ul\_\text{carrier}\_id,$$

where s_id may be an index of a first OFDM symbol of the PRACH occasion (e.g., $0\le s\_id\le 14$), t_id may be an index of a first slot of the PRACH occasion in a system frame (e.g., $0\le t\_id\le 80$), f_id may be an index of the PRACH occasion in the frequency domain (e.g., $0\le f\_id\le 8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

Figure 13B:
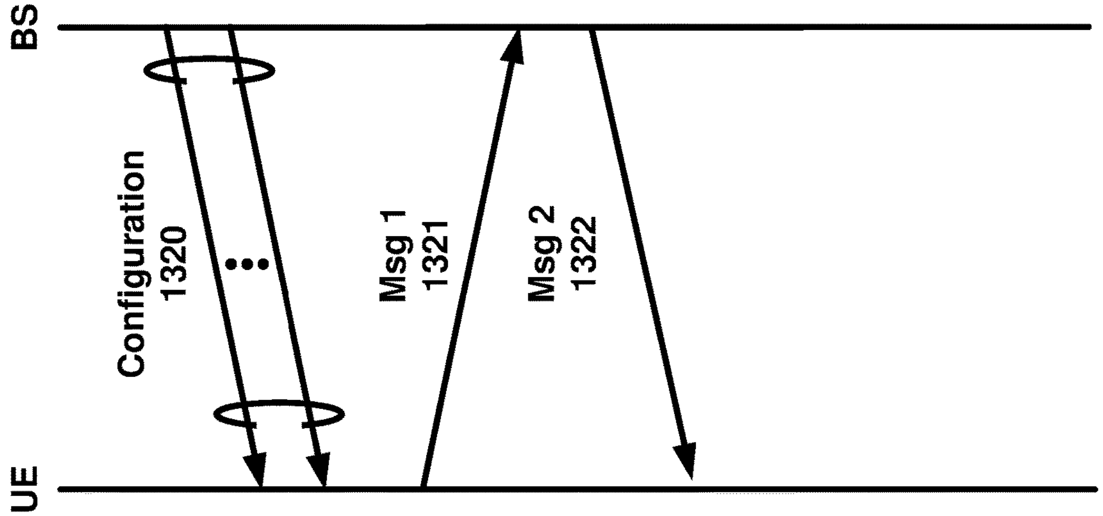

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

Figure 13C:
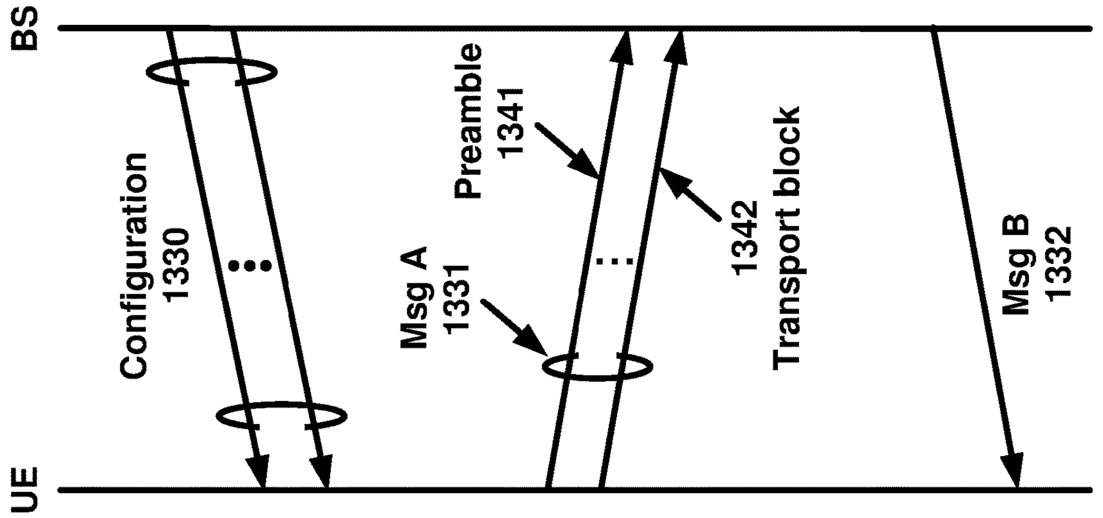

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
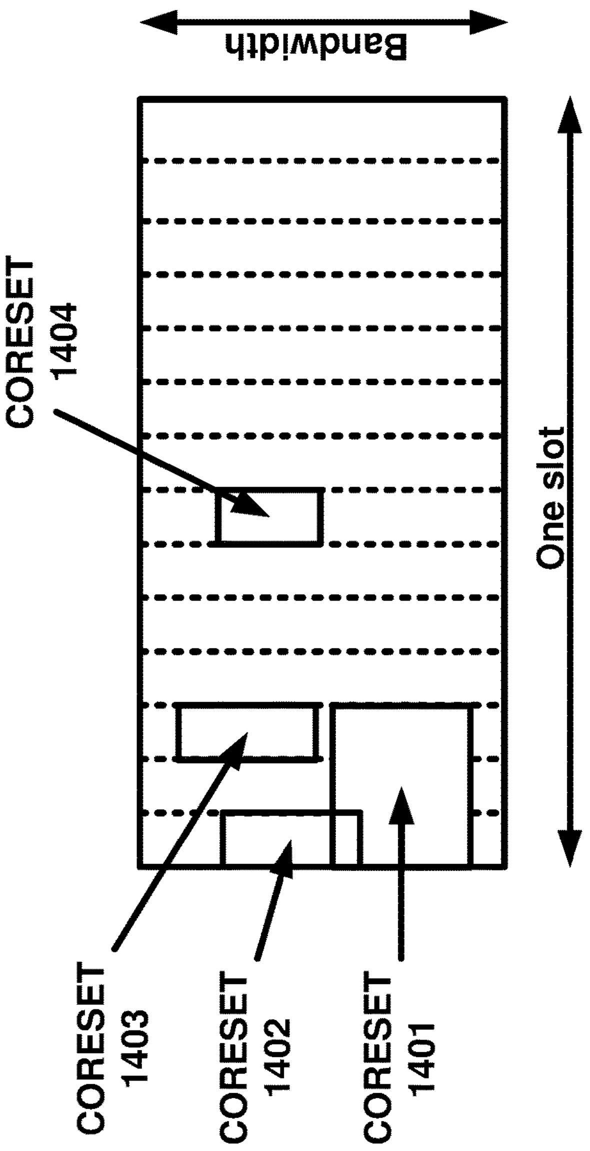
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a size and a location of the CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
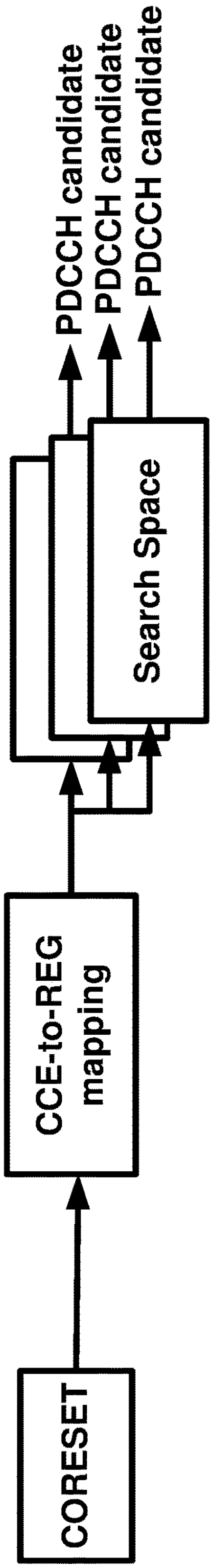
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
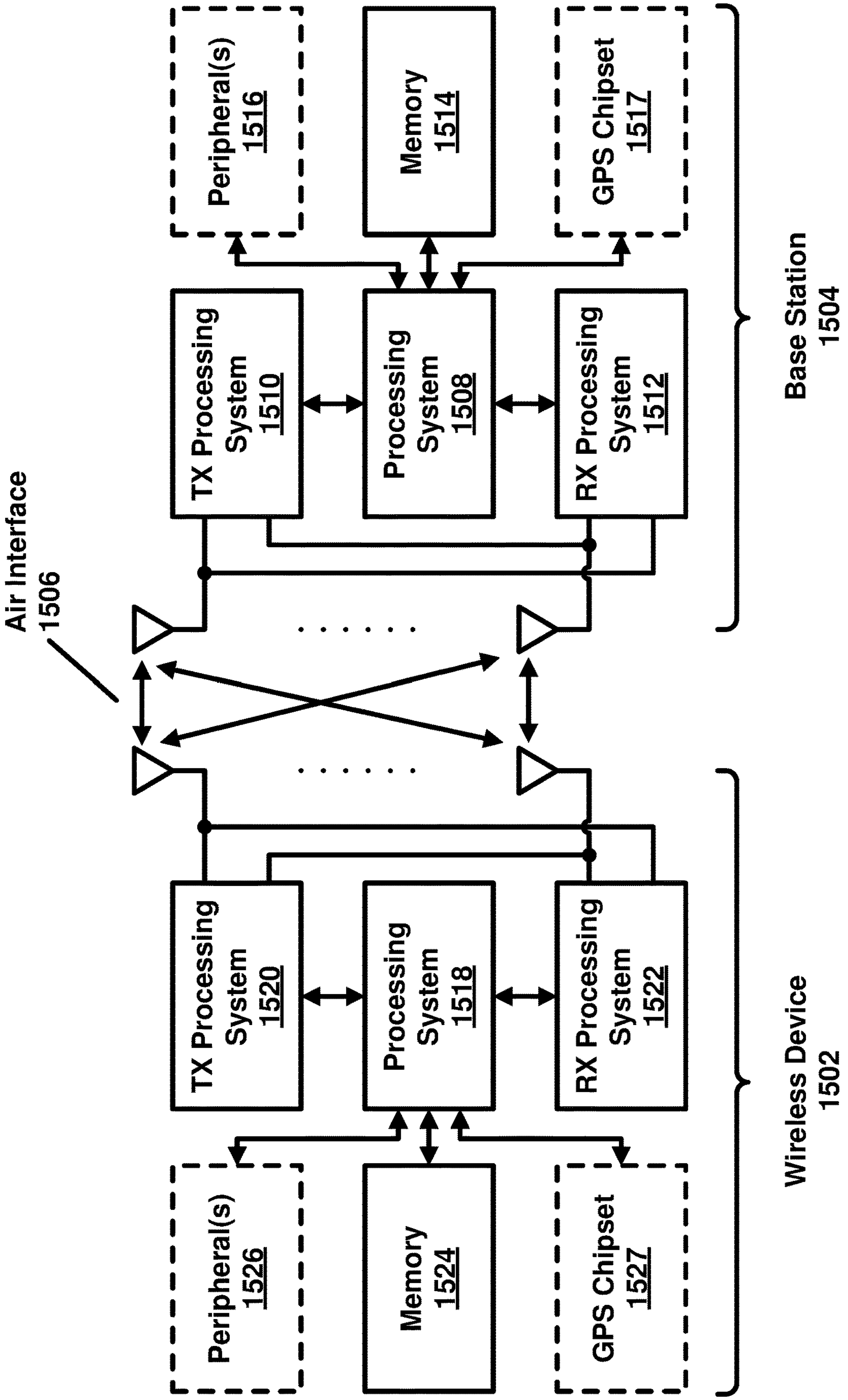
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figure 16A:
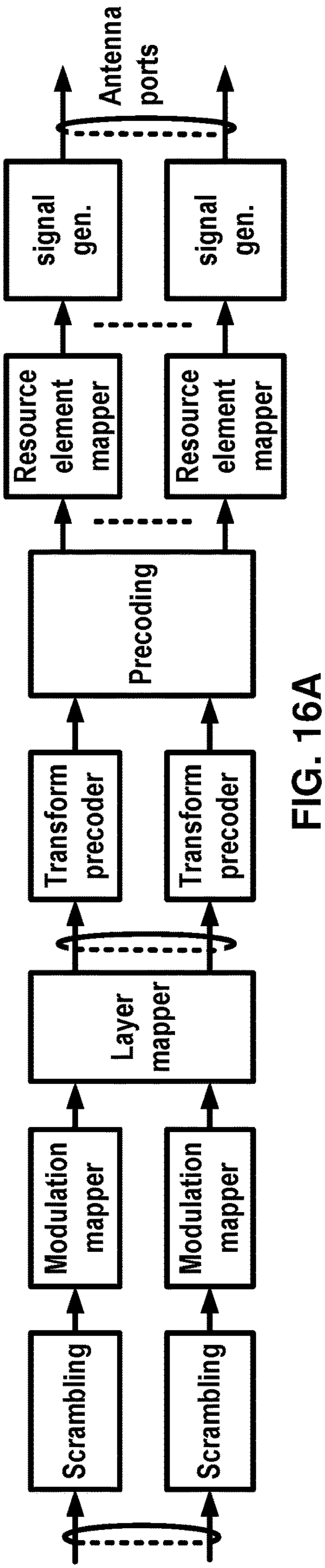
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

Figure 16B:
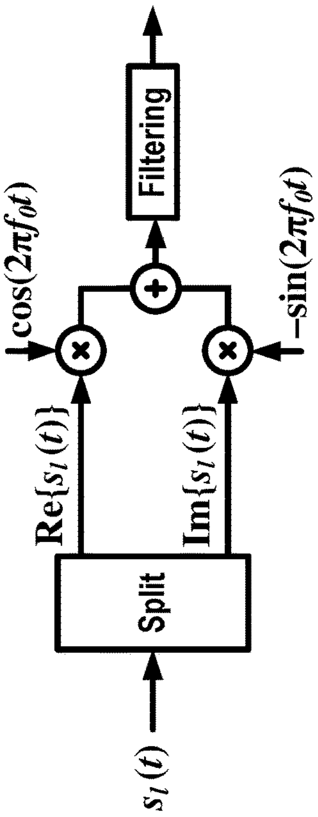

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

Figure 16D:
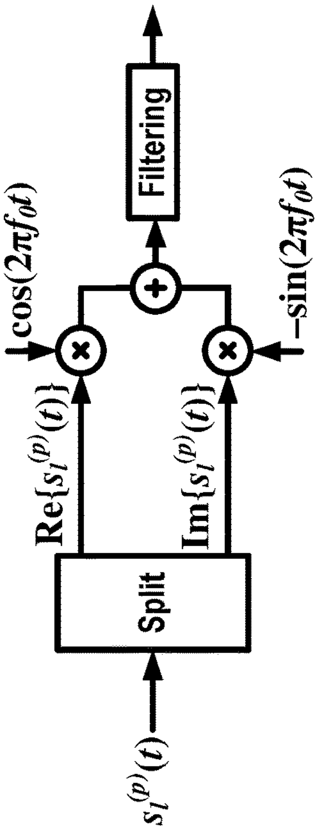
Figure 16C:
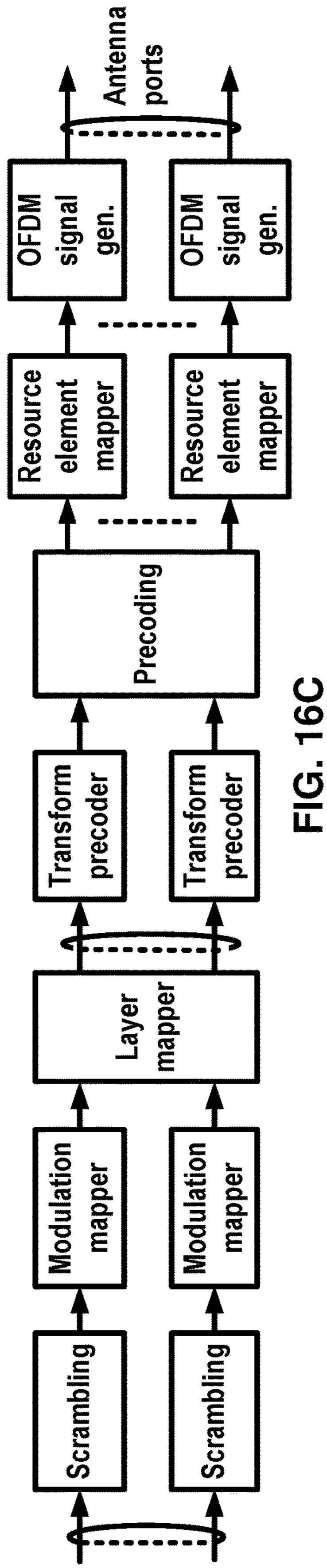

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g., two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

In carrier aggregation (CA), two or more component carriers (CCs) may be aggregated. A wireless device may simultaneously receive or transmit on one or more CCs, depending on capabilities of the wireless device, using the technique of CA. In an example, a wireless device may support CA for contiguous CCs and/or for non-contiguous CCs. CCs may be organized into cells. For example, CCs may be organized into one primary cell (PCell) and one or more secondary cells (SCells).

When configured with CA, a wireless device may have one RRC connection with a network. During an RRC connection establishment/re-establishment/handover, a cell providing NAS mobility information may be a serving cell. During an RRC connection re-establishment/handover procedure, a cell providing a security input may be a serving cell. In an example, the serving cell may denote a PCell. In an example, a gNB may transmit, to a wireless device, one or more messages comprising configuration parameters of a plurality of one or more SCells, depending on capabilities of the wireless device.

When configured with CA, a base station and/or a wireless device may employ an activation/deactivation mechanism of an SCell to improve battery or power consumption of the wireless device. When a wireless device is configured with one or more SCells, a gNB may activate or deactivate at least one of the one or more SCells. Upon configuration of an SCell, the SCell may be deactivated unless an SCell state associated with the SCell is set to "activated" or "dormant".

In an example, a wireless device may activate/deactivate an SCell in response to receiving an SCell Activation/Deactivation MAC CE.

In an example, a gNB may transmit, to a wireless device, one or more messages comprising an SCell timer (e.g., sCellDeactivationTimer). In an example, a wireless device may deactivate an SCell in response to an expiry of the SCell timer.

When a wireless device receives an SCell Activation/Deactivation MAC CE activating an SCell, the wireless device may activate the SCell. In response to the activating the SCell, the wireless device may perform operations comprising: SRS transmissions on the SCell; CQI/PMI/RI/CRI reporting for the SCell; PDCCH monitoring on the SCell; PDCCH monitoring for the SCell; and/or PUCCH transmissions on the SCell.

In an example, in response to the activating the SCell, the wireless device may start or restart a first SCell timer (e.g., sCellDeactivationTimer) associated with the SCell. The wireless device may start or restart the first SCell timer in the slot when the SCell Activation/Deactivation MAC CE activating the SCell has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

When a wireless device receives an SCell Activation/Deactivation MAC CE deactivating an activated SCell, the wireless device may deactivate the activated SCell. In an example, when a first SCell timer (e.g., sCellDeactivationTimer) associated with an activated SCell expires, the wireless device may deactivate the activated SCell. In response to the deactivating the activated SCell, the wireless device may stop the first SCell timer associated with the activated SCell. In an example, in response to the deactivating the activated SCell, the wireless device may clear one or more configured downlink assignments and/or one or more configured uplink grants of a configured uplink grant Type 2 associated with the activated SCell. In an example, in response to the deactivating the activated SCell, the wireless device may: suspend one or more configured uplink grants of a configured uplink grant Type 1 associated with the activated SCell; and/or flush HARQ buffers associated with the activated SCell.

In an example, when an SCell is deactivated, a wireless device may not perform operations comprising: transmitting SRS on the SCell; reporting CQI/PMI/RI/CRI for the SCell; transmitting on UL-SCH on the SCell; transmitting on RACH on the SCell; monitoring at least one first PDCCH on the SCell; monitoring at least one second PDCCH for the SCell; and/or transmitting a PUCCH on the SCell.

In an example, when at least one first PDCCH on an activated SCell indicates an uplink grant or a downlink assignment, a wireless device may restart a first SCell timer (e.g., sCellDeactivationTimer) associated with the activated SCell. In an example, when at least one second PDCCH on a serving cell (e.g. a PCell or an SCell configured with PUCCH, i.e. PUCCH SCell) scheduling the activated SCell indicates an uplink grant or a downlink assignment for the activated SCell, a wireless device may restart the first SCell timer (e.g., sCellDeactivationTimer) associated with the activated SCell.

In an example, when an SCell is deactivated, if there is an ongoing random access procedure on the SCell, a wireless device may abort the ongoing random access procedure on the SCell.

In an example, a base station and a wireless device may use a plurality of downlink control information (DCI) formats to communicate control information to schedule downlink data and/or uplink data or to deliver control information. For example, a DCI format 0_0 may be used to schedule an uplink resource for a PUSCH over a cell. A DCI format 0_1 may be used to schedule one or more PUSCHs in one cell or may be used to indicate downlink feedback information for configured grant PUSCH (CG-DFI). A DCI format 0_2 may be used to schedule a resource for a PUSCH in one cell. Similarly, for downlink scheduling, a DCI format 10 may schedule a resource for a PDSCH in one cell. A DCI format 11 may be used to schedule a PDSCH in one cell or trigger one shot HARQ-ACK feedback. A DCI format 1_2 may be used to schedule a resource for a PDSCH in one cell. There are one or more DCI formats carrying non-scheduling information. For example, a DCI format 2_0 may be used to indicate a slot formation information for one or more slots of one or more cells. A DCI format 22 may be used to indicate one or more transmit power control commands for PUCCH and PUSCH. A DCI format 2_3 may be used to indicate one or more transmit power control for SRS. A DCI format 24 may be used to indicate an uplink cancellation information. A DCI format 2_5 may be used to indicate a preemption information. A DCI format 2_6 may be used to indicate a power saving state outside of DRX active time. A DCI format 3_0 or 3_1 may be used to schedule NR sidelink resource or LTE sidelink resource in one cell.

FIG. 17 illustrates example cases of various DCI formats. In an example, a DCI format 0_0 and a DCI format 10 may be referred as a fallback DCI format for scheduling uplink and downlink respectively. In an example, a DCI format 0_1 and a DCI format 1_1 may be referred as a non-fallback DCI format scheduling uplink and downlink respectively. In an example, a DCI format 0_2 and a DCI format 12 may be referred as a compact DCI format for scheduling uplink and downlink respectively. A base station may configure one or more DCI formats for scheduling downlink and/or uplink resources. FIG. 17 illustrates that a DCI format 00, 0_1 and 0_2 may be used to schedule uplink resource(s) for one or more PUSCHs. A DCI format 10, 1_1 and 1_2 may be used to schedule downlink resource(s) for one or more PDSCHs. A DC format 2_0, 2_1, 2_2, 2_3, 2_4, 2_5 and 2_6 may be used for a group-common DCI transmission. Each format of DCI format 2_x may be used for different information. For example, the DCI format 24 may be used to indicate uplink resources for a group of wireless devices. In response to receiving a DCI based on the DCI format 24, a wireless device may cancel any uplink resource, scheduled prior to the receiving, when the uplink resource may be overlapped with the indicated uplink resources.

A DCI format may comprise one or more DCI fields. A DCI field may have a DCI size. A wireless device may determine one or more bitfield sizes of one or more DCI fields of the DCI format based on one or more radio resource control (RRC) configuration parameters by a base station. For example, the one or more RRC configuration parameters may be transmitted via master information block (MIB). For example, the one or more RRC configuration parameters may be transmitted via system information blocks (SIBs). For example, the one or more RRC configuration parameters may be transmitted via one or more a wireless device specific messages. For example, the wireless device may determine one or more DCI sizes of one or more DCI fields of a DCI format 0_0 based on the one or more RRC configuration parameters transmitted via the MIB and/or the SIBs. The wireless device may be able to determine the one or more DCI sizes of the DCI format 0_0 without receiving any the wireless device specific message. Similarly, the wireless device may determine one or more DCI sizes of one or more second DCI fields of a DCI format 1_0 based on the one or more RRC configuration parameters transmitted via the MIB and/or the SIBs.

For example, the wireless device may determine one or more first DCI sizes of one or more first DCI fields of a DCI format 0_1 based on one or more RRC configuration parameters transmitted via the MIB and/or the SIBs and/or the wireless device specific RRC message(s). The wireless device may determine one or more bitfield sizes of the one or more first DCI fields based on the one or more RRC configuration parameters. For example, FIG. 19 may illustrate the one or more first DCI fields of the DCI format 0_1. In FIG. 19, there are one or more second DCI fields that may present in the DCI format 0_1 regardless of the wireless device specific RRC message(s). For example, the DCI format 01 may comprise a 1-bit DL/UL indicator where the bit is configured with zero ('0') to indicate an uplink grant for the DCI format 0_1. DCI field(s) shown in dotted boxes may not be present or a size of the DCI field(s) may be configured as zero. For example, a carrier indicator may be present when the DCI format 0_1 is used to schedule a cell based on cross-carrier scheduling. The carrier indicator may indicate a cell index of a scheduled cell by the cross-carrier scheduling. For example, UL/SUL indicator (shown UL/SUL in FIG. 18) may indicate whether a DCI based the DCI format 0_1 schedules a resource for an uplink carrier or a supplemental uplink. The UL/SUL indicator field may be present when the wireless device is configured with a supplemental uplink for a scheduled cell of the DCI. Otherwise, the UL/SUL indicator field may not be present.

A field of BWP index may indicate a bandwidth part indicator. The base station may transmit configuration parameters indicating one or more uplink BWPs for the scheduled cell. The wireless device may determine a bit size of the field of BWP index based on a number of the one or more uplink BWPs. For example, 1 bit may be used. The number of the one or more uplink BWPs (excluding an initial UL BWP) is two. The field of BWP index may be used to indicate an uplink BWP switching. The wireless device may switch to a first BWP in response to receiving the DCI indicating an index of the first BWP. The first BWP is different from an active uplink BWP (active before receiving the DCI).

A DCI field of frequency domain resource allocation (frequency domain RA in FIG. 18-19) may indicate uplink resource(s) of the scheduled cell. For example, the base station may transmit configuration parameters indicating a resource allocation type 0. With the resource allocation type 0, a bitmap over one or more resource block groups (RBGs) may schedule the uplink resource(s). With a resource allocation type 1, a starting PRB index and a length of the scheduled uplink resource(s) may be indicated. The base station may transmit configuration parameters indicating a dynamic change between the resource allocation type 0 and the resource allocation type 1 (e.g., 'dynamicswitch'). The wireless device may determine a field size of the frequency domain RA field based on the configured resource allocation type and a bandwidth of an active UL BWP of the scheduled cell. For example, when the resource allocation type 0 is configured, the bitmap may indicate each of the one or more RBGs covering the bandwidth of the active UL BWP. A size of the bitmap may be determined based on a number of the one or more RBGs of the active UL BWP. For example, the wireless device may determine the size of the frequency domain RA field based on the resource allocation type 1 based on the bandwidth of the active uplink BWP (e.g., ceil (log 2(BW(BW+1)/2), wherein BW is the bandwidth of the active uplink BWP).

The wireless device may determine a resource allocation indicator value (RIV) table, where an entry of the table may comprise a starting PRB index and a length value. For example, when the dynamic change between the resource allocation type 0 and the resource allocation type 1 is used, a larger size between a first size based on the resource allocation type 0 (e.g., the bitmap size) and a second size based on the resource allocation type 1 (e.g., the RIV table size) with additional 1 bit indication to indicate either the resource allocation type 0 or the resource allocation type 1. For example, the frequency domain RA field may indicate a frequency hopping offset. The base station may use K (e.g., 1 bit for two offset values, 2 bits for up to four offset values) bit(s) to indicate the frequency hopping offset from one or more configured offset values, based on the resource allocation type 1. The base station may use ceil(log 2(BW(BW+1)/2)−K bits to indicate the uplink resource(s) based on the resource allocation type 1, when frequency hopping is enabled.

A DCI field of time domain resource allocation (time domain RA shown in FIG. 18) may indicate time domain resource of one or more slots of the scheduled cell. The base station may transmit configuration parameters indicating one or more time domain resource allocation lists of a time domain resource allocation table for an uplink BWP of the scheduled cell. The wireless device may determine a bit size of the time domain RA field based on a number of the one or more time domain resource allocation lists of the time domain resource allocation table. The base station may indicate a frequency hopping flag by a FH flag (shown as FH in FIG. 18). For example, the FH flag may present when the base station may enable a frequency hopping of the scheduled cell or the active UL BWP of the scheduled cell. A DCI field of modulation and coding scheme (MCS) (shown as MCS in FIG. 18) may indicate a coding rate and a modulation scheme for the scheduled uplink data. A new data indicator (NDI) field may indicate whether the DCI schedules the uplink resource(s) for a new/initial transmission or a retransmission. A redundancy version (RV) field may indicate one or more RV values (e.g., a RV value may be 0, 2, 3, or 1) for one or more PUSCHs scheduled over the one or more slots of the scheduled cells. For example, the DCI may schedule a single PUSCH via one slot, a RV value is indicated. For example, the DCI may schedule two PUSCHs via two slots, two RV values may be indicated. A number of PUSCHs scheduled by a DCI may be indicated in a time domain resource allocation list of the one or more time domain resource allocation lists.

A DCI field of hybrid automatic repeat request (HARQ) process number (HARQ process # in FIG. 18) may indicate an index of a HARQ process used for the one or more PUSCHs. The wireless device may determine one or more HARQ processes for the one or more PUSCHs based on the index of the HARQ process. The wireless device may determine the index for a first HARQ process of a first PUSCH of the one or more PUSCHs and select a next index as a second HARQ process of a second PUSCH of the one or more PUSCHs and so on. The DCI format 0_1 may have a first downlink assignment index ($1^{st}$ DAI) and/or a second DAI ($2^{nd}$ DAI). The first DAI may be used to indicate a first size of bits of first HARQ-ACK codebook group. The second DAI may be present when the base station may transmit configuration parameters indicating a plurality of HARQ-ACK codebook groups. When there is no HARQ-ACK codebook group configured, the wireless device may assume the first HARQ-ACK codebook group only. The second DAI may indicate a second size of bits of second HARQ-ACK codebook group. The first DAI may be 1 bit when a semi-static HARQ-ACK codebook generation mechanism is used. The first DAI may be 2 bits or 4 bits when a dynamic HARQ-ACK codebook generation mechanism is used.

A field of transmission power control (TPC shown in FIG. 18) may indicate a power offset value to adjust transmission power of the one or more scheduled PUSCHs. A field of sounding reference signal (SRS) resource indicator (SRI) may indicate an index of one or more configured SRS resources of an SRS resource set. A field of precoding information and number of layers (shown as PMI in FIG. 18) may indicate a precoding and a MIMO layer information for the one or more scheduled PUSCHs. A field of antenna ports may indicate DMRS pattern(s) for the one or more scheduled PUSCHs. A field of SRS request may indicate to trigger a SRS transmission of a SRS resource or skip SRS transmission. A field of CSI request may indicate to trigger a CSI feedback based on a CSI-RS configuration or skip CSI feedback. A field of code block group (CBG) transmission information (CBGTI) may indicate HARQ-ACK feedback(s) for one or more CBGs. A field of phase tracking reference signal (PTRS)-demodulation reference signal (DMRS) association (shown as PTRS in FIG. 18) may indicate an association between one or more ports of PTRS and one or more ports of DM-RS. The one or more ports may be indicated in the field of antenna ports. A field of beta_offset indicator (beta offset in FIG. 18) may indicate a code rate for transmission of uplink control information (UCI) via a PUSCH of the one or more scheduled PUSCHs. A field of DM-RS sequence initialization (shown as DMRS in FIG. 18) may present based on a configuration of transform precoding. A field of UL-SCH indicator (UL-SCH) may indicate whether a UCI may be transmitted via a PUSCH of the one or more scheduled PUSCHs or not. A field of open loop power control parameter set indication (open loop power in FIG. 18) may indicate a set of power control configuration parameters. The wireless device is configured with one or more sets of power control configuration parameters. A field of priority indicator (priority) may indicate a priority value of the one or more scheduled PUSCHs. A field of invalid symbol pattern indicator (invalid OS) may indicate one or more unavailable/not-available OFDM symbols to be used for the one or more scheduled PUSCHs. A field of SCell dormancy indication (Scell dormancy) may indicate transitioning between a dormant state and a normal state of one or more secondary cells.

Figure 18:
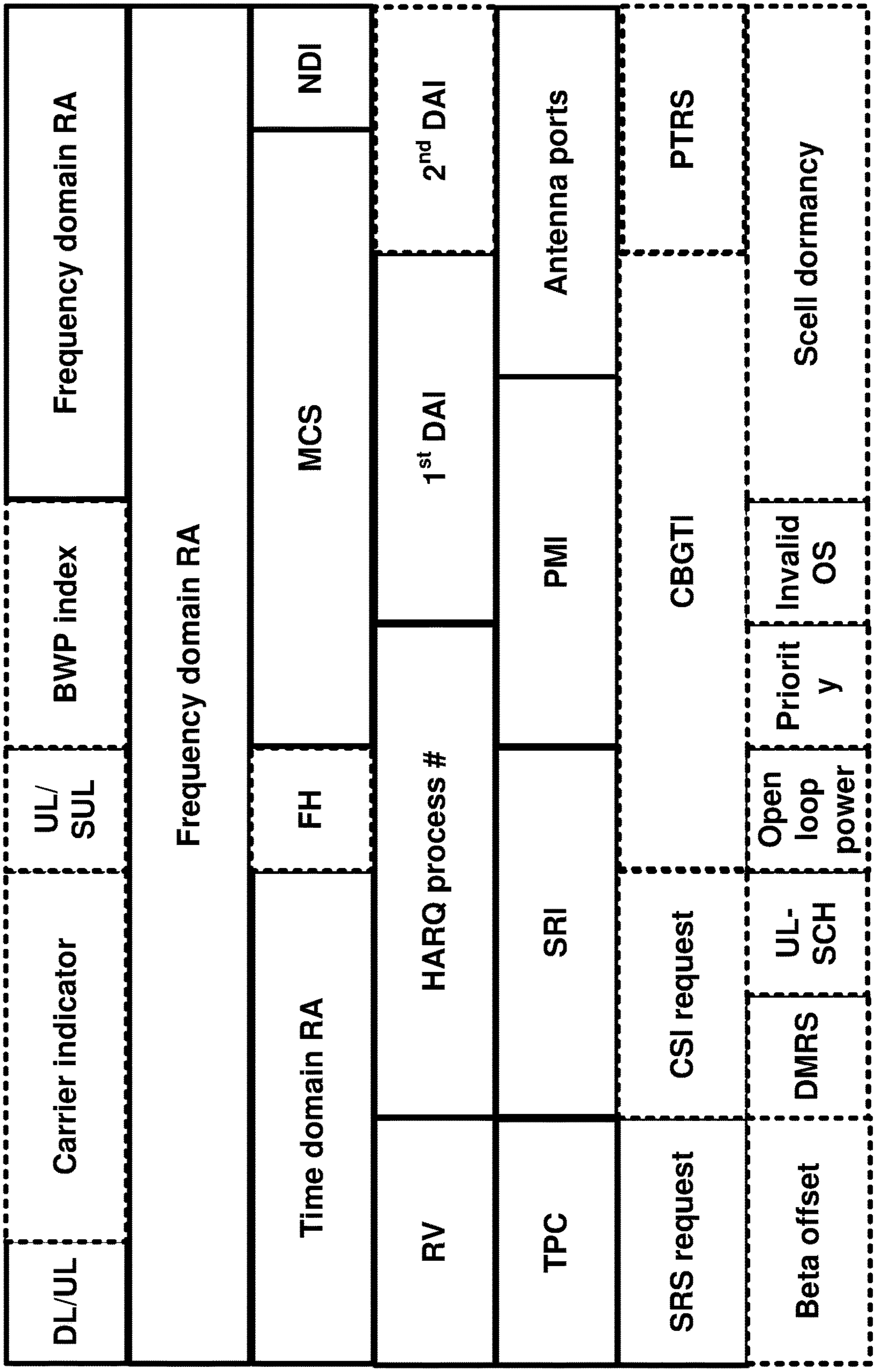
FIG. 18 illustrates an example DCI format for scheduling uplink resource of a single cell.
Figure 19:
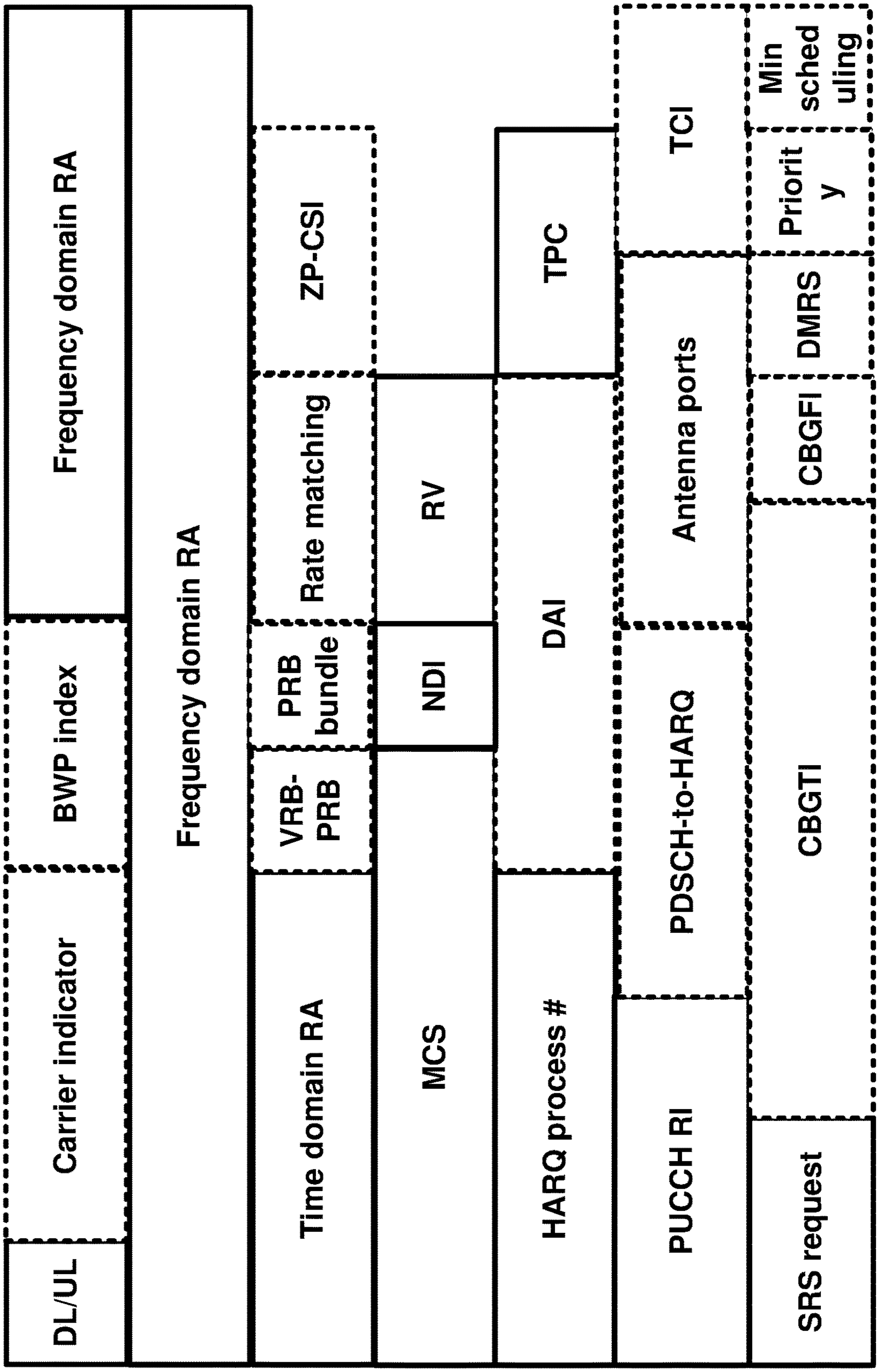
FIG. 19 illustrates an example DCI format for scheduling downlink resource of a single cell.

Note that additional DCI field(s), though not shown in FIG. 18, may present for the DCI format 0_1. For example, a downlink feedback information (DFI) field indicating for one or more configured grant resources may present for an unlicensed/shared spectrum cell. For example, the unlicensed/shared spectrum cell is a scheduled cell. When the DCI format 0_1 is used for indicating downlink feedback information for the one or more configured grant resources, other DCI fields may be used to indicate a HARQ-ACK bitmap for the one or more configured grant resources and TPC commands for a scheduled PUSCH. Remaining bits may be reserved and filled with zeros (‘0’s).

FIG. 18 shows an example of a DCI format 1_1. For example, the DCI format 1_1 may schedule a downlink resource for a scheduled downlink cell. The DCI format 11 may comprise one or more DCI fields such as an identifier for DCI formats (DL/UL), a carrier indicator, bandwidth part indicator (BWP index), a frequency domain resource assignment (frequency domain RA), a time domain resource assignment (time domain RA), a virtual resource block to physical resource block mapping (VRB-PRB), Physical resource block (PRB) bundling size indicator (PRB bundle), rate matching indicator (rate matching), zero power CSI-RS (ZP-CSI), a MCS, a NDI, a RV, a HARQ process number, a downlink assignment index (DAI), a TPC command for a PUCCH, a PUCCH resource indicator (PUCCH-RI), a PDSCH-to-HARQ_feedback timing indicator (PDSCH-to-HARQ in FIG. 18), an antenna ports, a transmission configuration indication (TCI), a SRS request, a CBG transmission information (CBGTI), a CBG flushing out information (CBGFI), DMRS sequence initialization (DMRS), a priority indicator (priority), and a minimum applicable scheduling offset indicator.

For example, the VRB-PRB field may indicate whether a mapping is based on a virtual RB or a physical RB. For example, the PRB bundle may indicate a size of PRB bundle when a dynamic PRB bundling is enabled. For example, the rate matching may indicate one or more rate matching resources where the scheduled data may be mapped around based on the rate matching. For example, the ZP-CSI field may indicate a number of aperiodic ZP CSI-RS resource sets configured by the base station. For example, the DCI format 1_1 may also include MCS, NDI and RV for a second transport block, in response to a max number of codewords scheduled by DCI may be configured as two. The DCI format 1_1 may not include MCS, NDI and RV field for the second transport block, in response to the max number of codewords scheduled by DCI may be configured as one. For example, the DAI field may indicate a size of bits of HARQ-ACK codebook. The TPC field may indicate a power offset for the scheduled PUCCH. The wireless device may transmit the scheduled PUCCH comprising HARQ-ACK bit(s) of the scheduled downlink data by the DCI. The PUCCH-RI may indicate a PUCCH resource of one or more PUCCH resources configured by the base station. The PDSCH-to-HARQ field may indicate a timing offset between an end of a scheduled PDSCH by the DCI and a starting of the scheduled PUCCH. The field of antenna ports may indicate DMRS patterns for the scheduled PDSCH. The TCI field may indicate a TCI code point of one or more active TCI code points/active TCI states. The base station may transmit configuration parameters indicating one or more TCI states for the scheduled cell. The base station may active one or more second TCI states of the one or more TCI states via one or more MAC CEs/DCIs. The wireless device may map an active TCI code point of the one or more active TCI code points to an active TCI of the one or more second TCI states. For example, the CBGTI may indicate whether to flush a soft buffer corresponding to a HARQ process indicated by the HARQ process #. For example, the Min scheduling field may indicate enable or disable applying a configured minimum scheduling offset (e.g., when a minimum scheduling offset is configured) or select a first minimum scheduling offset or a second minimum scheduling offset (e.g., when the first minimum scheduling offset and the second minimum scheduling offset are configured).

For example, the wireless device may determine one or more first DCI sizes of one or more first DCI fields of a DCI format 0_2 based on one or more RRC configuration parameters transmitted via the MIB and/or the SIBs and/or the wireless device specific RRC message(s). The wireless device may determine one or more bitfield sizes of the one or more first DCI fields based on the one or more RRC configuration parameters. For example, there are one or more second DCI fields that may present in the DCI format 0_2 regardless of the wireless device specific RRC message(s). For example, the one or more second DCI fields may comprise at least one of DL/UL indicator, frequency domain resource allocation, MCS, NDI, and TPC fields. For example, the one or more first DCI fields may comprise the one or more second DCI fields and one or more third DCI fields. A DCI field of the one or more third DCI fields may be present or may not be present based on one or more configuration parameters transmitted by the base station. For example, the one or more third DCI fields may comprise at least one of a BWP index, RV, HARQ process #, PMI, antenna ports, and/or beta offset.

For example, the DCI format 0_2 may comprise a 1-bit DL/UL indicator where the bit is configured with zero ('0') to indicate an uplink grant for the DCI format 0_2. For example, a carrier indicator may be present when the DCI format 0_2 is used to schedule a cell based on cross-carrier scheduling. The carrier indicator may indicate a cell index of a scheduled cell by the cross-carrier scheduling. For example, UL/SUL indicator (shown UL/SUL in FIG. 18) may indicate whether a DCI based the DCI format 0_2 schedules a resource for an uplink carrier or a supplemental uplink. The UL/SUL indicator field may be present when the wireless device is configured with a supplemental uplink for a scheduled cell of the DCI. Otherwise, the UL/SUL indicator field is not present.

A field of BWP index may indicate a bandwidth part indicator. The base station may transmit configuration parameters indicating one or more uplink BWPs for the scheduled cell. The wireless device may determine a bit size of the field of BWP index based on a number of the one or more uplink BWPs. For example, 1 bit may be used. The number of the one or more uplink BWPs (excluding an initial UL BWP) is two. The field of BWP index may be used to indicate an uplink BWP switching. The wireless device may switch to a first BWP in response to receiving the DCI indicating an index of the first BWP. The first BWP is different from an active uplink BWP (active before receiving the DCI).

A DCI field of frequency domain resource allocation (frequency domain RA in FIG. 18) may indicate uplink resource(s) of the scheduled cell. For example, the base station may transmit configuration parameters indicating a resource allocation type 0. With the resource allocation type 0, a bitmap over one or more resource block groups (RBGs) may schedule the uplink resource(s). With a resource allocation type 1, a starting PRB index and a length of the scheduled uplink resource(s) may be indicated. In an example, a length may be a multiple of K1 resource blocks. For example, the configuration parameters may comprise a resource allocation type1 granularity for the DCI format 0_2 (e.g., K1). A default value of the K1 may be one ('1'). The base station may transmit configuration parameters indicating a dynamic change between the resource allocation type 0 and the resource allocation type 1 (e.g., 'dynamicswitch'). The wireless device may determine a field size of the frequency domain RA field based on the configured resource allocation type and a bandwidth of an active UL BWP of the scheduled cell. The wireless device may further determine the field size of the frequency domain RA field based on the K1 value, when the resource allocation type 1 may be used/configured. For example, when the resource allocation type 0 is configured, the bitmap may indicate each of the one or more RBGs covering the bandwidth of the active UL BWP. A size of the bitmap may be determined based on a number of the one or more RBGs of the active UL BWP. For example, the wireless device may determine the size of the frequency domain RA field based on the resource allocation type 1 based on the bandwidth of the active uplink BWP (e.g., ceil (log 2(BW/K1(BW/K1+1)/2) and the resource allocation type1 granularity. E.g., the BW is the bandwidth of the active uplink BWP. E.g., the K1 is the resource allocation type1 granularity).

The wireless device may determine a resource allocation indicator value (RIV) table, where an entry of the table may comprise a starting PRB index and a length value. The wireless device may determine the RIV table based on the resource allocation type1 granularity. For example, when the dynamic change between the resource allocation type 0 and the resource allocation type 1 is used, a larger size between a first size based on the resource allocation type 0 (e.g., the bitmap size) and a second size based on the resource allocation type 1 (e.g., the RIV table size) with additional 1 bit indication to indicate either the resource allocation type 0 or the resource allocation type 1. For example, the frequency domain RA field may indicate a frequency hopping offset. The base station may use K (e.g., 1 bit for two offset values, 2 bits for up to four offset values) bit(s) to indicate the frequency hopping offset from one or more configured offset values, based on the resource allocation type 1. The base station may use ceil(log 2(BW/K1(BW/K1+1)/2)−K bits to indicate the uplink resource(s) based on the resource allocation type 1, when frequency hopping is enabled. Otherwise, the base station/wireless device may use ceil(log 2(BW/K1(BW/K1+1)/2) bits to indicate the uplink resource(s) based on the resource allocation type 1.

In an example, a base station may transmit one or more messages comprising configuration parameters of a BWP of a cell. The configuration parameters may comprise a resource allocation type for one or more PUSCHs scheduled by one or more DCIs, based on a first RNTI. The resource allocation type may be a resource allocation type 0 or a resource allocation type 1 or a dynamic switching between the resource allocation type 0 and the resource allocation type 1. For example, the first RNTI is a C-RNTI. The configuration parameters may comprise a configured grant configuration or a SPS configuration. The configuration parameters may indicate a resource allocation type for the configured grant configuration or the SPS configuration. The resource allocation type may be a resource allocation type 0 or a resource allocation type 1 or a dynamic switching between the resource allocation type 0 and the resource allocation type 1.

A DCI field of time domain resource allocation (time domain RA shown in FIG. 18) may indicate time domain resource of one or more slots of the scheduled cell. The base station may transmit configuration parameters indicating one or more time domain resource allocation lists of a time domain resource allocation table for an uplink BWP of the scheduled cell. The wireless device may determine a bit size of the time domain RA field based on a number of the one or more time domain resource allocation lists of the time domain resource allocation table. The base station may indicate a frequency hopping flag by a FH flag (shown as FH in FIG. 18). For example, the FH flag may present when the base station may enable a frequency hopping of the scheduled cell or the active UL BWP of the scheduled cell. A DCI field of modulation and coding scheme (MCS) (shown as MCS in FIG. 18) may indicate a coding rate and a modulation scheme for the scheduled uplink data. In an example, a bit size of the MCS field may be predetermined as a constant (e.g., 5 bits). A new data indicator (NDI) field may indicate whether the DCI schedules the uplink resource(s) for a new/initial transmission or a retransmission. A bit size of the NDI may be fixed as a constant value (e.g., 1 bit). A redundancy version (RV) field may indicate one or more RV values (e.g., a RV value may be 0, 2, 3, or 1) for one or more PUSCHs scheduled over the one or more slots of the scheduled cells. For example, the DCI may schedule a single PUSCH via one slot, a RV value is indicated. For example, the DCI may schedule two PUSCHs via two slots, two RV values may be indicated. A number of PUSCHs scheduled by a DCI may be indicated in a time domain resource allocation list of the one or more time domain resource allocation lists. The configuration parameters may comprise a bit size of the RV field. For example, the bit size may be 0, 1 or 2 bits for a single PUSCH. When the bit size is configured as zero ('0'), the wireless device may apply a RV=0 for any uplink resource scheduled by a DCI based on the DCI format 0_2.

A DCI field of hybrid automatic repeat request (HARQ) process number (HARQ process # in FIG. 18) may indicate an index of a HARQ process used for the one or more PUSCHs. The wireless device may determine one or more HARQ processes for the one or more PUSCHs based on the index of the HARQ process. The wireless device may determine the index for a first HARQ process of a first PUSCH of the one or more PUSCHs and select a next index as a second HARQ process of a second PUSCH of the one or more PUSCHs and so on. The configuration parameters may comprise a bit size for the HARQ process # field. For example, the bit size may be 0, 1, 2, 3 or 4 bits for a single PUSCH. The wireless device may assume that a HARQ process index=0 in case the bit size is configured as zero. The wireless device may assume that a HARQ process index in a range of [0, 1] when the bit size is configured as one. The wireless device may assume that a HARQ process index in a range of [0, . . . , 3] when the bit size is configured as two. The wireless device may assume that a HARQ process index in a range of [0, . . . , 7] when the bit size is configured as three. For the 4 bits of bit size, the wireless device may use a HARQ process in a range of [0, . . . , 15].

The DCI format 0_2 may have a first downlink assignment index ($1^{st}$ DAI) and/or a second DAI ($2^{nd}$ DAI). The configuration parameters may comprise a parameter to indicate whether to use DAI for the DCI format 02 (e.g., Downlinkassignmentindex-ForDCIFormat0_2). The first DAI may be used to indicate a first size of bits of first HARQ-ACK codebook group. The second DAI may be present when the base station may transmit configuration parameters indicating a plurality of HARQ-ACK codebook groups. When there is no HARQ-ACK codebook group configured, the wireless device may assume the first HARQ-ACK codebook group only. The second DAI may indicate a second size of bits of second HARQ-ACK codebook group. The first DAI may be 1 bit when a semi-static HARQ-ACK codebook generation mechanism is used. The first DAI may be 2 bits or 4 bits when a dynamic HARQ-ACK codebook generation mechanism is used.

A field of transmission power control (TPC shown in FIG. 18) may indicate a power offset value to adjust transmission power of the one or more scheduled PUSCHs. A field of sounding reference signal (SRS) resource indicator (SRI) may indicate an index of one or more configured SRS resources of an SRS resource set. A field of precoding information and number of layers (shown as PMI in FIG. 18) may indicate a precoding and a MIMO layer information for the one or more scheduled PUSCHs. A field of antenna ports may indicate DMRS pattern(s) for the one or more scheduled PUSCHs. A field of SRS request may indicate to trigger a SRS transmission of a SRS resource or skip SRS transmission. A field of CSI request may indicate to trigger a CSI feedback based on a CSI-RS configuration or skip CSI feedback. A field of phase tracking reference signal (PTRS)-demodulation reference signal (DMRS) association (shown as PTRS in FIG. 18) may indicate an association between one or more ports of PTRS and one or more ports of DM-RS. The one or more ports may be indicated in the field of antenna ports. A field of beta_offset indicator (beta offset in FIG. 18) may indicate a code rate for transmission of uplink control information (UCI) via a PUSCH of the one or more scheduled PUSCHs. A field of DM-RS sequence initialization (shown as DMRS in FIG. 18) may present based on a configuration of transform precoding. A field of UL-SCH indicator (UL-SCH) may indicate whether a UCI may be transmitted via a PUSCH of the one or more scheduled PUSCHs or not. A field of open loop power control parameter set indication (open loop power in FIG. 18) may indicate a set of power control configuration parameters. The wireless device is configured with one or more sets of power control configuration parameters. A field of priority indicator (priority) may indicate a priority value of the one or more scheduled PUSCHs. A field of invalid symbol pattern indicator (invalid OS) may indicate one or more unavailable/not-available OFDM symbols to be used for the one or more scheduled PUSCHs.

Note that additional DCI field(s), though not shown in FIG. 18, may present for the DCI format 0_1/0_2. For example, a downlink feedback information (DFI) field indicating for one or more configured grant resources may present for an unlicensed/shared spectrum cell. For example, the unlicensed/shared spectrum cell is a scheduled cell. When the DCI format 0_2 is used for indicating downlink feedback information for the one or more configured grant resources, other DCI fields may be used to indicate a HARQ-ACK bitmap for the one or more configured grant resources and TPC commands for a scheduled PUSCH. Remaining bits may be reserved and filled with zeros ('0's).

FIG. 19 shows an example of a DCI format 1_1 and/or 1_2. For example, the DCI format 1_1 or 1_2 may schedule a downlink resource for a scheduled downlink cell. The DCI format 1_1 or 1_2 may comprise one or more DCI fields such as an identifier for DCI formats (DL/UL), a carrier indicator, bandwidth part indicator (BWP index), a frequency domain resource assignment (frequency domain RA), a time domain resource assignment (time domain RA), a virtual resource block to physical resource block mapping (VRB-PRB), Physical resource block (PRB) bundling size indicator (PRB bundle), rate matching indicator (rate matching), zero power CSI-RS (ZP-CSI), a MCS, a NDI, a RV, a HARQ process number, a downlink assignment index (DAI), a TPC command for a PUCCH, a PUCCH resource indicator (PUCCH-RI), a PDSCH-to-HARQ_feedback timing indicator (PDSCH-to-HARQ in FIG. 19), an antenna ports, a transmission configuration indication (TCI), a SRS request, DMRS sequence initialization (DMRS), and a priority indicator (priority).

The base station may transmit one or more messages indicating configuration parameters for the DCI format 1_2. The configuration parameters may comprise one or more DCI bit sizes and/or related configuration parameters/values for the one or more DCI fields.

For example, the VRB-PRB field may indicate whether a mapping is based on a virtual RB or a physical RB. For example, the PRB bundle may indicate a size of PRB bundle when a dynamic PRB bundling is enabled. For example, the rate matching may indicate one or more rate matching resources where the scheduled data may be mapped around based on the rate matching. For example, the ZP-CSI field may indicate a number of aperiodic ZP CSI-RS resource sets configured by the base station. For example, the DCI format 1_2 may also include MCS, NDI and RV for a second transport block, in response to a max number of codewords scheduled by DCI may be configured as two. The DCI format 12 may not include MCS, NDI and RV field for the second transport block. For example, the DAI field may indicate a size of bits of HARQ-ACK codebook. The TPC field may indicate a power offset for the scheduled PUCCH. The wireless device may transmit the scheduled PUCCH comprising HARQ-ACK bit(s) of the scheduled downlink data by the DCI. The PUCCH-RI may indicate a PUCCH resource of one or more PUCCH resources configured by the base station. The PDSCH-to-HARQ field may indicate a timing offset between an end of a scheduled PDSCH by the DCI and a starting of the scheduled PUCCH. The field of antenna ports may indicate DMRS patterns for the scheduled PDSCH. The TCI field may indicate a TCI code point of one or more active TCI code points/active TCI states. The base station may transmit configuration parameters indicating one or more TCI states for the scheduled cell. The base station may active one or more second TCI states of the one or more TCI states via one or more MAC CEs/DCIs. The wireless device may map an active TCI code point of the one or more active TCI code points to an active TCI of the one or more second TCI states.

In a NR system, in order to support wide bandwidth operation, a gNB may transmit one or more PDCCH in different control resource sets. A gNB may transmit one or more RRC message comprising configuration parameters of one or more control resource sets. At least one of the one or more control resource sets may comprise at least one of: a first OFDM symbol; a number of consecutive OFDM symbols; a set of resource blocks; a CCE-to-REG mapping; and a REG bundle size, in case of interleaved CCE-to-REG mapping.

A base station (gNB) may configure a wireless device (UE) with uplink (UL) bandwidth parts (BWPs) and downlink (DL) BWPs to enable bandwidth adaptation (BA) on a PCell. If carrier aggregation is configured, the gNB may further configure the UE with at least DL BWP(s) (i.e., there may be no UL BWPs in the UL) to enable BA on an SCell. For the PCell, an initial active BWP may be a first BWP used for initial access. For the SCell, a first active BWP may be a second BWP configured for the UE to operate on the SCell upon the SCell being activated.

In paired spectrum (e.g. FDD), a gNB and/or a UE may independently switch a DL BWP and an UL BWP. In unpaired spectrum (e.g. TDD), a gNB and/or a UE may simultaneously switch a DL BWP and an UL BWP.

In an example, a gNB and/or a UE may switch a BWP between configured BWPs by means of a DCI or a BWP inactivity timer. When the BWP inactivity timer is configured for a serving cell, the gNB and/or the UE may switch an active BWP to a default BWP in response to an expiry of the BWP inactivity timer associated with the serving cell. The default BWP may be configured by the network.

In an example, for FDD systems, when configured with BA, one UL BWP for each uplink carrier and one DL BWP may be active at a time in an active serving cell. In an example, for TDD systems, one DL/UL BWP pair may be active at a time in an active serving cell. Operating on the one UL BWP and the one DL BWP (or the one DL/UL pair) may improve UE battery consumption. BWPs other than the one active UL BWP and the one active DL BWP that the UE may work on may be deactivated. On deactivated BWPs, the UE may: not monitor PDCCH; and/or not transmit on PUCCH, PRACH, and UL-SCH.

In an example, a serving cell may be configured with at most a first number (e.g., four) of BWPs. In an example, for an activated serving cell, there may be one active BWP at any point in time.

In an example, a BWP switching for a serving cell may be used to activate an inactive BWP and deactivate an active BWP at a time. In an example, the BWP switching may be controlled by a PDCCH indicating a downlink assignment or an uplink grant. In an example, the BWP switching may be controlled by a BWP inactivity timer (e.g., bwp-Inactivity-Timer). In an example, the BWP switching may be controlled by a MAC entity in response to initiating a Random Access procedure. Upon addition of an SpCell or activation of an SCell, one BWP may be initially active without receiving a PDCCH indicating a downlink assignment or an uplink grant. The active BWP for a serving cell may be indicated by RRC and/or PDCCH. In an example, for unpaired spectrum, a DL BWP may be paired with a UL BWP, and BWP switching may be common for both UL and DL.

In an example, a MAC entity may apply normal operations on an active BWP for an activated serving cell configured with a BWP comprising: transmitting on UL-SCH; transmitting on RACH; monitoring a PDCCH; transmitting PUCCH; receiving DL-SCH; and/or (re-) initializing any suspended configured uplink grants of configured grant Type 1 according to a stored configuration, if any.

In an example, on an inactive BWP for each activated serving cell configured with a BWP, a MAC entity may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

In an example, if a MAC entity receives a PDCCH for a BWP switching of a serving cell while a Random Access procedure associated with this serving cell is not ongoing, a UE may perform the BWP switching to a BWP indicated by the PDCCH.

In an example, if a bandwidth part indicator field is configured in DCI format 1_1, the bandwidth part indicator field value may indicate the active DL BWP, from the configured DL BWP set, for DL receptions. In an example, if a bandwidth part indicator field is configured in DCI format 0_1, the bandwidth part indicator field value may indicate the active UL BWP, from the configured UL BWP set, for UL transmissions.

In an example, for a primary cell, a UE may be provided by a higher layer parameter Default-DL-BWP a default DL BWP among the configured DL BWPs. If a UE is not provided a default DL BWP by the higher layer parameter Default-DL-BWP, the default DL BWP is the initial active DL BWP.

In an example, a UE may be provided by higher layer parameter bwp-InactivityTimer, a timer value for the primary cell. If configured, the UE may increment the timer, if running, every interval of 1 millisecond for frequency range 1 or every 0.5 milliseconds for frequency range 2 if the UE may not detect a DCI format 1_1 for paired spectrum operation or if the UE may not detect a DCI format 1_1 or DCI format 0_1 for unpaired spectrum operation during the interval.

In an example, if a UE is configured for a secondary cell with higher layer parameter Default-DL-BWP indicating a default DL BWP among the configured DL BWPs and the UE is configured with higher layer parameter bwp-InactivityTimer indicating a timer value, the UE procedures on the secondary cell may be same as on the primary cell using the timer value for the secondary cell and the default DL BWP for the secondary cell.

In an example, if a UE is configured by higher layer parameter Active-BWP-DL-SCell a first active DL BWP and by higher layer parameter Active-BWP-UL-SCell a first active UL BWP on a secondary cell or carrier, the UE may use the indicated DL BWP and the indicated UL BWP on the secondary cell as the respective first active DL BWP and first active UL BWP on the secondary cell or carrier.

In an example, a wireless device may transmit one or more uplink control information (UCI) via one or more PUCCH resources to a base station. The one or more UCI may comprise at least one of: HARQ-ACK information; scheduling request (SR); and/or CSI report. In an example, a PUCCH resource may be identified by at least: frequency location (e.g., starting PRB); and/or a PUCCH format associated with initial cyclic shift of a base sequence and time domain location (e.g., starting symbol index). In an example, a PUCCH format may be PUCCH format 0, PUCCH format 1, PUCCH format 2, PUCCH format 3, or PUCCH format 4. A PUCCH format 0 may have a length of 1 or 2 OFDM symbols and be less than or equal to 2 bits. A PUCCH format 1 may occupy a number between 4 and 14 of OFDM symbols and be less than or equal to 2 bits. A PUCCH format 2 may occupy 1 or 2 OFDM symbols and be greater than 2 bits. A PUCCH format 3 may occupy a number between 4 and 14 of OFDM symbols and be greater than 2 bits. A PUCCH format 4 may occupy a number between 4 and 14 of OFDM symbols and be greater than 2 bits. The PUCCH resource may be configured on a PCell, or a PUCCH secondary cell.

In an example, when configured with multiple uplink BWPs, a base station may transmit to a wireless device, one or more RRC messages comprising configuration parameters of one or more PUCCH resource sets (e.g., at most 4 sets) on an uplink BWP of the multiple uplink BWPs. Each PUCCH resource set may be configured with a PUCCH resource set index, a list of PUCCH resources with each PUCCH resource being identified by a PUCCH resource identifier (e.g., pucch-Resourceid), and/or a maximum number of UCI information bits a wireless device may transmit using one of the plurality of PUCCH resources in the PUCCH resource set.

In an example, when configured with one or more PUCCH resource sets, a wireless device may select one of the one or more PUCCH resource sets based on a total bit length of UCI information bits (e.g., HARQ-ARQ bits, SR, and/or CSI) the wireless device will transmit. In an example, when the total bit length of UCI information bits is less than or equal to 2, the wireless device may select a first PUCCH resource set with the PUCCH resource set index equal to "0". In an example, when the total bit length of UCI information bits is greater than 2 and less than or equal to a first configured value, the wireless device may select a second PUCCH resource set with the PUCCH resource set index equal to "1". In an example, when the total bit length of UCI information bits is greater than the first configured value and less than or equal to a second configured value, the wireless device may select a third PUCCH resource set with the PUCCH resource set index equal to "2". In an example, when the total bit length of UCI information bits is greater than the second configured value and less than or equal to a third value (e.g., 1706), the wireless device may select a fourth PUCCH resource set with the PUCCH resource set index equal to "3".

In an example, a wireless device may determine, based on a number of uplink symbols of UCI transmission and a number of UCI bits, a PUCCH format from a plurality of PUCCH formats comprising PUCCH format 0, PUCCH format 1, PUCCH format 2, PUCCH format 3 and/or PUCCH format 4. In an example, the wireless device may transmit UCI in a PUCCH using PUCCH format 0 if the transmission is over 1 symbol or 2 symbols and the number of HARQ-ACK information bits with positive or negative SR (HARQ-ACK/SR bits) is 1 or 2. In an example, the wireless device may transmit UCI in a PUCCH using PUCCH format 1 if the transmission is over 4 or more symbols and the number of HARQ-ACK/SR bits is 1 or 2. In an example, the wireless device may transmit UCI in a PUCCH using PUCCH format 2 if the transmission is over 1 symbol or 2 symbols and the number of UCI bits is more than 2. In an example, the wireless device may transmit UCI in a PUCCH using PUCCH format 3 if the transmission is over 4 or more symbols, the number of UCI bits is more than 2 and PUCCH resource does not include an orthogonal cover code. In an example, the wireless device may transmit UCI in a PUCCH using PUCCH format 4 if the transmission is over 4 or more symbols, the number of UCI bits is more than 2 and the PUCCH resource includes an orthogonal cover code.

In an example, in order to transmit HARQ-ACK information on a PUCCH resource, a wireless device may determine the PUCCH resource from a PUCCH resource set. The PUCCH resource set may be determined as mentioned above. The wireless device may determine the PUCCH resource based on a PUCCH resource indicator field in a DCI (e.g., with a DCI format 1_0 or DCI for 1_1) received on a PDCCH. A 3-bit PUCCH resource indicator field in the DCI may indicate one of eight PUCCH resources in the PUCCH resource set. The wireless device may transmit the HARQ-ACK information in a PUCCH resource indicated by the 3-bit PUCCH resource indicator field in the DCI.

In an example, the wireless device may transmit one or more UCI bits via a PUCCH resource of an active uplink BWP of a PCell or a PUCCH secondary cell. Since at most one active uplink BWP in a cell is supported for a wireless device, the PUCCH resource indicated in the DCI is naturally a PUCCH resource on the active uplink BWP of the cell.

In an example, DRX operation may be used by a wireless device (UE) to improve UE battery lifetime. In an example, in DRX, UE may discontinuously monitor downlink control channel, e.g., PDCCH or EPDCCH. In an example, the base station may configure DRX operation with a set of DRX parameters, e.g., using RRC configuration. The set of DRX parameters may be selected based on the application type such that the wireless device may reduce power and resource consumption. In an example, in response to DRX being configured/activated, a UE may receive data packets with an extended delay, since the UE may be in DRX Sleep/Off state at the time of data arrival at the UE and the base station may wait until the UE transitions to the DRX ON state.

In an example, during a DRX mode, the UE may power down most of its circuitry when there are no packets to be received. The UE may monitor PDCCH discontinuously in the DRX mode. The UE may monitor the PDCCH continuously when a DRX operation is not configured. During this time the UE listens to the downlink (DL) (or monitors PDCCHs) which is called DRX Active state. In a DRX mode, a time during which UE does not listen/monitor PDCCH is called DRX Sleep state.

In an example, a frequency range of 52.6 to 71 GHz (e.g., a frequency region 3, a frequency range 3, a third frequency range, a third frequency region) may support additional numerologies. For example, the additional numerologies may comprise a 120 kHz subcarrier spacing with a normal CP. For example, the additional numerologies may comprise a 240 kHz subcarrier spacing with the normal CP. For example, the additional numerologies may comprise a 480 kHz subcarrier spacing with the normal CP and/or an extended CP. For example, the additional numerologies may comprise a 960 kHz subcarrier spacing with the normal CP and/or the extended CP.

Figure 20:
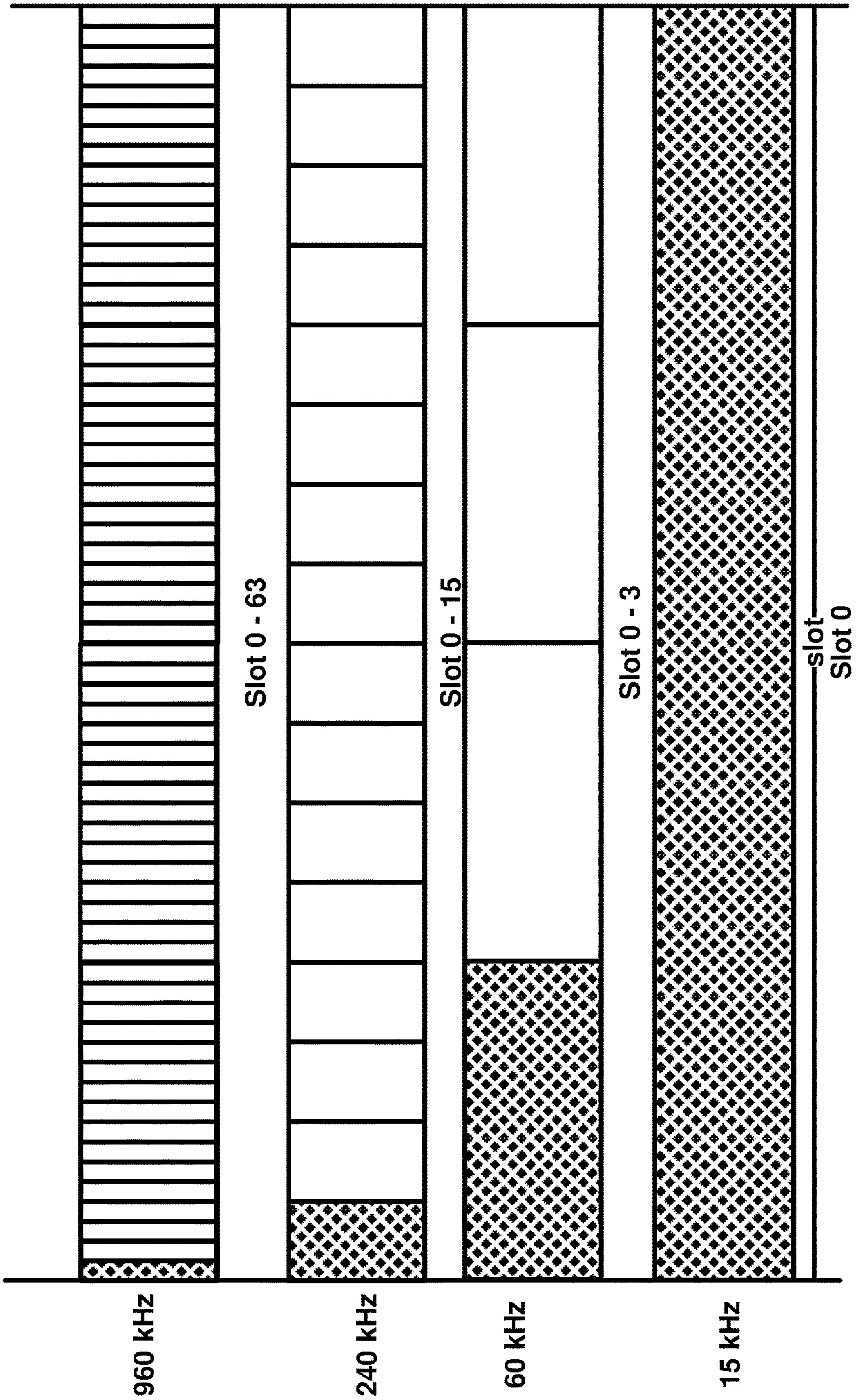
FIG. 20 illustrates an example of different numerologies as per an aspect of an embodiment of the present disclosure.

FIG. 20 illustrates an example of different numerologies that the wireless device may support for one or more cells in different frequency ranges. For example, 15 kHz subcarrier spacing with the normal CP and/or the extended CP may be supported in a frequency region 1 (e.g., FR1). For example, 60 kHz (and/or 120 kHz) subcarrier spacing with the normal CP and/or the extended CP may be supported in a frequency region 2 (e.g., FR2). For example, 240 kHz and/or 480 kHz and/or 960 kHz subcarrier spacings with the normal CP and/or the extended Cp may be supported in a frequency region 3 (e.g., FR3).

A length of a slot with the 15 kHz subcarrier spacing may be 1 msec. A length of a slot with a subcarrier spacing that is 15 kHz*2^u may be ½^u msec. For example, a length of the slot with a subcarrier spacing 120 kHz is ⅛=0.125 msec. A length of a slot with a subcarrier spacing 240 kHz is 1/16=62.5 us. A length of a slot with a subcarrier spacing 960 kHz is 1/64=16 us.

In a millisecond, one slot may be present with a subcarrier spacing of 15 kHz, 4 slots with 60 kHz subcarrier spacing, 16 slots with 240 kHz subcarrier spacing and 64 slots with 960 kHz subcarrier spacing.

Figure 21:
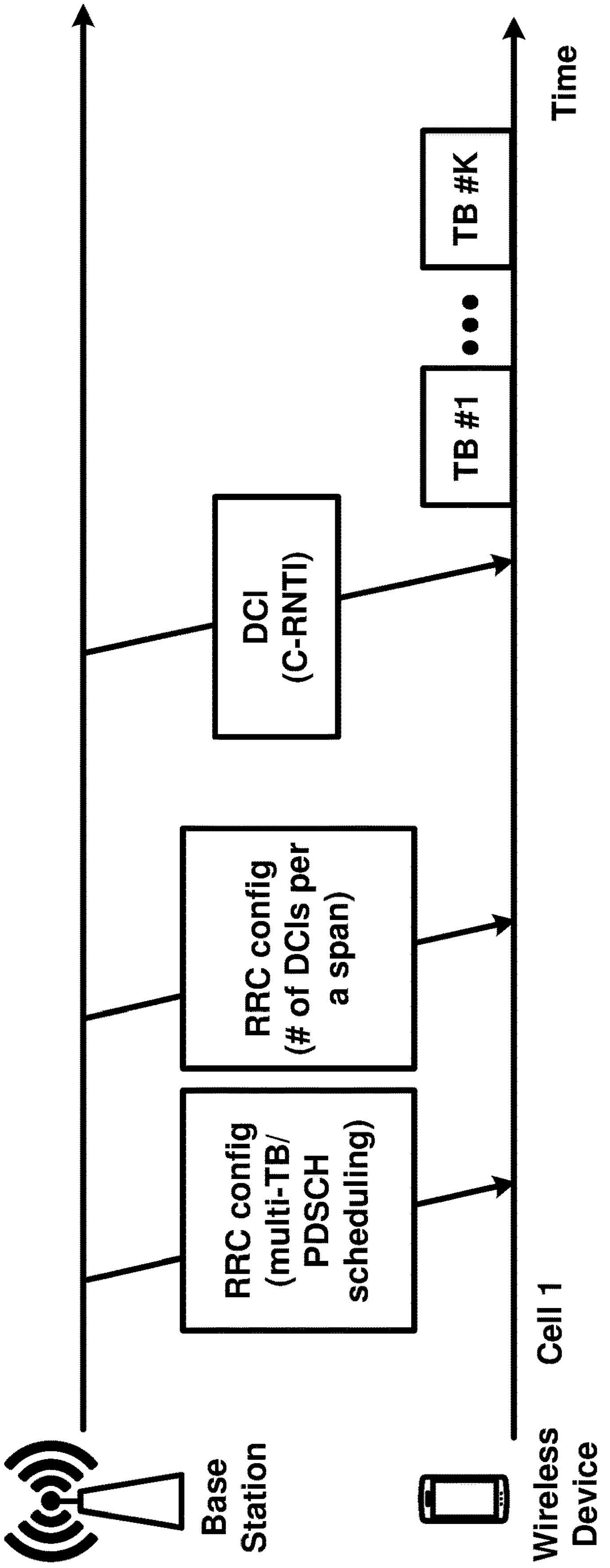
FIG. 21 illustrates an example of embodiments of a multi-PDSCH scheduling as per an aspect of an embodiment of the present disclosure.

FIG. 21 illustrates an example of embodiments of a multi-PDSCH scheduling as per an aspect of an embodiment of the present disclosure. When a wireless device is configured with a multi-PDSCH scheduling for a serving cell, the wireless device may receive a DCI that indicates resource assignment(s) and/or CSI/SRS requests for one or more PDSCHs via the serving cell. Each PDSCH of the one or more PDSCHs may comprise one or more transport blocks. A first PDSCH of the one or more PDSCHs may comprise a first transport block. A second PDSCH of the one or more PDSCHs may comprise a second transport block. The first transport block may be different from the second transport block. The DCI may comprise one or more NDI bits or one or more NDI fields. Each NDI bit of the one or more NDI bits or each NDI field of the one or more NDI fields may correspond to each of the one or more PDSCHs. The DCI may comprise one or more RV bits or one or more RV fields. Each RV bit of the one or more RV bits or each RV field of the one or more RV fields may correspond to the each of the one or more PDSCHs.

In an example, a multi-PDSCH scheduling may be configured for a cell based on a cross-carrier scheduling and/or a self-carrier scheduling. For example, when the cross-carrier scheduling is used, a second cell (e.g., cell 2) is a scheduled cell by a first cell (e.g., cell 1). For example, when the self-carrier scheduling is used, a scheduling cell may be same to a scheduled cell. The first cell may operate with a first numerology (e.g., 15 kHz with a normal CP). The second cell may operate with a second numerology (e.g., 960 kHz with an extended CP or 480 kHz with an extended CP). During 1 msec, the first cell may have 1 slot. During 1 msec, the second cell may have a plurality of slots (e.g., 32 slots with 480 kHz, 64 slots with 960 kHz).

The base station may transmit one or more RRC messages indicating configuration parameters. The configuration parameters may comprise/indicate a multi-PDSCH scheduling for the second cell. The configuration parameters may comprise/indicate a number of PDSCHs schedulable by a single DCI. For example, a maximum number of PDSCHs by a single DCI may be indicated by the configuration parameters. A DCI, of a multi-PDSCH scheduling, may comprise resource assignment(s) for one or more PDSCHs, where a number of the one or more PDSCHs or one or more slots scheduled with the one or more PDSCHs is less than or equal to the maximum number of PDSCHs. For example, the configuration parameters may comprise/indicate a number of DCIs that may be transmitted/scheduled via a span or a PDCCH monitoring occasion or a slot of the scheduling cell. The base station may transmit one or more second RRC messages indicating second configuration parameters. The second configuration parameters may comprise/indicate a cross-carrier scheduling for the second cell. For example, the first cell is indicated as a scheduling cell. The first cell may schedule the second cell.

The DCI may be CRC-scrambled with a first RNTI (e.g., C-RNTI, CS-RNTI). The DCI may schedule a first TB (TB #1) via a first PDSCH, a second TB (TB #2) via a second PDSCH, and so on. For example, FIG. 21 illustrates that up to K TBs via K PDSCHs are scheduled by the DCI. FIG. 21 illustrates that the DCI schedules the TB #1 to TB #K. For example, one or more slots of the one or more PDSCHs may be contiguous. For example, the one or more slots may be non-contiguous. The DCI may comprise a time domain resource allocation field that indicates time domain resources indicating the one or more slots. The time domain resource allocation field may indicate a starting symbol and a duration in each slot of the one or more slots. A first slot of the one or more slots may have a first starting symbol and a first duration. A second slot of the one or more slots may have a second starting symbol and a second duration. The first starting symbol may be different from the second starting symbol. The first duration may be different from the second duration.

The configuration parameters may indicate to enable or disable the multi-PDSCH scheduling. The second cell may operate with a plurality of TRPs/coreset pools. The one or more TBs or the one or more PDSCHs may be scheduled via the plurality of TRPs/coreset pools.

For example, a first PDSCH of the one or more PDSCHs may be associated with a first transmission and reception point (TRP) or a first coreset pool/group or a first group or a first TCI group. The second PDSCH of the one or more PDSCHs may be associated with a second TRP or a second coreset pool/group or a second group or a second TCI group. When the second cell is operating with a single TRP, the first TRP may e same as the second TRP. The first TRP or the first coreset pool is assumed to be present as a default for the single TRP operation.

A multi-PDSCH or a multi-TB DCI (DCI-M) may represent a DCI based on a multi-PDSCH scheduling or a multi-TB scheduling. For example, the one or more configuration parameters may comprise one or more control resource set (coreset)s and/or one or more search spaces. The DCI of the multi-PDSCH scheduling may be transmitted via the one or more coresets and/or the one or more search spaces. The one or more configuration parameters may comprise/indicate one or more RNTIs that may be used for the DCI of the multi-PDSCH scheduling. The one or more RNTIs may not comprise a C-RNTI. The one or more RNTIs may comprise the C-RNTI.

The base station may transmit one or more MAC CEs/one or more DCIs to activate the multi-PDSCH scheduling. For example, the one or more MAC CEs may comprise a MAC CE activating and/or deactivating one or more secondary cells. The base station may transmit one or more DCIs. The one or more DCIs may indicate a BWP switching from a first BWP to a second BWP of a cell. The first BWP is an active BWP of the cell. The first BWP may not comprise one or more coresets of the multi-PDSCH scheduling. The second BWP may comprise one or more second coresets of the multi-PDSCH scheduling. For example, the one or more MAC CEs may comprise indication(s) of activating and/or deactivating a multi-PDSCH scheduling. For example, the one or more DCIs may comprise an indication to activate or deactivate the multi-PDSCH scheduling of the second cell. For example, the configuration parameters may comprise/indicate a plurality of BWPs. A first BWP of the plurality of BWPs may comprise/indicate a first DCI format that is used for a multi-PDSCH scheduling. A second BWP of the plurality of BWPs may comprise/indicate a second DCI format that is used for a single-PDSCH scheduling. The wireless device may determine the multi-PDSCH scheduling is activated in response to the first BWP being an active BWP of the second cell. The wireless device may determine the multi-PDSCH scheduling is deactivated in response to the second BWP being an active BWP of the second cell.

Similar mechanisms may be applied for a PUSCH scheduling. Similarly, a multi-PUSCH scheduling may be used for scheduling one or more PUSCHs via a single DCI. For a cell, the multi-PDSCH scheduling and the multi-PUSCH scheduling may be configured/activated/deactivated simultaneously or may be independently configured/activated/deactivated. For example, when a first DCI format used for scheduling PDSCH(s) for a cell may be size-aligned with a second DCI format used for scheduling PUSCH(s) for the cell. When the first DCI format and the second DCI format are size-aligned, the multi-PDSCH and the multi-PUSCH scheduling may be both activated or both deactivated.

The wireless device may activate the multi-PDSCH (and/or multi-PUSCH) scheduling in response to receiving the one or more RRC messages. The one or more MAC CEs/the one or more DCIs may be optional. The base station may reconfigure to deactivate or activate the multi-PDSCH (or the multi-PUSCH) scheduling of a cell via RRC signaling. In response to activating the multi-PDSCH (or the multi-PUSCH) scheduling, the base station may transmit a DCI, based on the multi-PDSCH (or the multi-PUSCH) scheduling, comprising resource assignments for the first downlink/uplink carrier/cell (e.g., cell 2). The DCI may indicate a plurality of downlink/uplink resources for a repetition of a TB via one or more slots (e.g., TB #1, . . . TB #K are same).

In an example, a DCI, of a multi-PDSCH and/or a multi-PUSCH scheduling, may comprise a MCS field or one or more MCS fields. A value of the MCS field or one or more values of the one or more MCS fields may be applied to each of the one or more PDSCHs. The one or more values of the one or more MCS fields may be applied for one or more TBs scheduled via each PDSCH of the one or more PDSCHs. For example, the DCI may comprise a first MCS field indicating a value of MCS values (e.g., 32 values). The DCI may additionally comprise one or more second MCS fields where each of the one or more second MCS fields indicates a gap/offset compared to the first MCS field. For example, the each of the one or more second MCS fields may have kl bits (e.g., k1=2) that is smaller than k2 bits of the first MCS field (e.g., k2=5).

In an example, the DCI may comprise one or more MCS fields where each of the one or more MCS fields may correspond to each of the one or more PDSCHs.

In an example, the DCI may comprise a first RV field indicating an index of a redundancy version for a first PDSCH. When two TBs may be scheduled for the first PDSCH, the first RV field may comprise two RV values where each corresponds to a first TB and a second TB of the two TBs.

The wireless device may determine one or more second RV values for one or more second PDSCHs of the one or more PDSCHs. The one or more second PDSCHs may be present when the one or more PDSCHs comprise additional PDSCHs than the first PDSCH. The wireless device may determine the one or more second RVs based on configuration parameters configured by the base station. For example, the configuration parameters may comprise a list of RV values, where each entry of the list of RV values comprises a set of RV values {the first RV value, a second RV value, a third RV value, and son on}. The first RV value is determined based on the first RV field. The second RV value may correspond to a second PDSCH of the one or more PDSCHs. The second PDSCH is a PDSCH occurring in a second earliest among the one or more PDSCHs. The third RV value may be applied or correspond to a third PDSCH (e.g., a third earliest PDSCH) of the one or more PDSCHs.

For example, the DCI may comprise a RV field indicating an index of the first RV. For example, the second RV may be determined based on the first RV and one or more configuration parameters. The configuration parameters may comprise/indicate a RV offset. The second RV may be determined as the index of (the first RV+the RV offset) mod K. The K is a number of RVs (e.g., K=4). An index of RV may be determined as an order in the RV sequence. For example, an index of RV 3 is 3, and an index of RV 1 is 4. Similarly, the DCI may comprise a HARQ process ID field indicating an index of the first HARQ process ID. The wireless device may determine the second HARQ process ID based on the first HARQ process ID and one or more configuration parameters. The configuration parameters may comprise/indicate a HARQ process ID offset or a list of HARQ process IDs of the one or more PDSCHs. For example, the wireless device may increment the HARQ process ID for each PDSCH of the one or more PDSCHs. For example, the wireless device may apply the HARQ process ID indicated by the DCI for an earliest PDSCH of the one or more PDSCHs. The wireless device may increment the HARQ process ID for a second earliest PDSCH of the one or more PDSCHs. The wireless device may determine a HARQ process ID of a PDSCH of the one or more PDSCHs as (HARQ process ID+i) % MAX HARQ process ID where i is an order of the PDSCH among the one or more PDSCHs or i is a slot offset of the PDSCH from a first slot of the earliest PDSCH of the one or more PDSCHs. The MAX HARQ process ID may represent a number of maximum HARQ processes that the wireless device is configured with or supports for the cell.

In an example, the DCI may comprise a first NDI bit for the first PDSCH of the one or more PDSCHs. The DCI may comprise a second NDI bit for the second PDSCH of the one or more PDSCHs. The DCI may comprise one or more NDI bits for the one or more PDSCHs. Each NDI bit of the one or more of NDI bits may correspond to each PDSCH of the one or more PDSCHs.

For example, the DCI may comprise a first frequency domain resource assignment field and a second frequency domain resource assignment field. The first frequency domain resource assignment field may indicate first resource(s) of the first TRP/coreset pool in frequency domain. The second frequency domain resource assignment field may indicate a second resource of the second TRP/coreset pool in frequency domain. For example, the DCI may comprise a first frequency domain resource assignment (RA) field. The first frequency domain RA field may indicate an entry of one or more frequency domain resource allocation lists. The entry may comprise a first field indicating first resource(s) of the first TRP/coreset pool and a second field indicating second resource(s) of the second TRP/coreset pool.

For example, the DCI may comprise a first time domain resource assignment field and a second time frequency domain resource assignment field. The first time domain resource assignment field may indicate first resource(s) of the first TRP/coreset pool in time domain. The second time domain resource assignment field may indicate a second resource of the second TRP/coreset pool in time domain. For example, the DCI may comprise a first time domain resource assignment (RA) field. The first time domain RA field may indicate an entry of one or more time domain resource allocation lists. The entry may comprise a first field indicating first resource(s) of the first TRP/coreset pool and a second field indicating second resource(s) of the second TRP/coreset pool. An entry of the one or more time domain resource allocation lists may comprise a plurality of fields/sub-entries.

In an example, a physical downlink control channel (PDCCH) may comprise one or more control-channel elements (CCEs). For example, the PDCCH may comprise one CCE, that may correspond to an aggregation level (AL)=1. For example, the PDCCH may comprise two CCEs, that may correspond to an AL of two (AL=2). For example, the PDCCH may comprise four CCEs, that may correspond to an AL of four (AL=4). For example, the PDCCH may comprise eight CCEs, that may correspond to an AL of eight (AL=8). For example, the PDCCH may comprise sixteen CCEs, that may correspond to an AL of sixteen (AL=16).

In an example, a PDCCH may be carried over one or more control resource set (coreset). A coreset may comprise N_rb_coreset resource blocks (RBs) in the frequency domain and N_symbol_coreset symbols in the time domain. For example, the N_rb_coreset may be multiple of 6 RBs (e.g., 6, 12, 18, . . . ). For example, N_symbol_coreset may be 1, 2 or 3. A CCE may comprise M (e.g., M=6) resource-element groups (REGs). For example, one REG may comprise one RB during one OFDM symbol. REGs within the coreset may be ordered/numbered in increasing order in a time-first manner, starting with 0 for a first OFDM symbol and a lowest number (e.g., a lowest frequency) RB in the coreset. The wireless device may increase the numbering in the first OFDM symbol by increasing a frequency location or a RB index. The wireless device may move to a next symbol in response to all RBs of the first symbol may have been indexed. The wireless device may map one or more REG indices for one or more 6 RBs of N_rb_coreset RBs within N_symbol_coreset OFDM symbols of the coreset.

In an example, a wireless device may receive configuration parameters from a base station. The configuration parameters may comprise one or more coresets. One coreset may be associated with one CCE-to-REG mapping. For example, a single coreset may have a single CCE mapping to physical RBs/resources of the single coreset. For example, a CCE-to-REG of a coreset may be interleaved or non-interleaved. For example, a REG bundle may comprise L consecutive REGs (e.g., iL, iL+1, . . . , iL+L−1). For example, L may be a REG bundle size (e.g., L=2 or 6 for N_symbol_coreset=1 and L=N_symbol_coreset or 6 when N_symbol_coreset is 2 or 3). A index of a REG bundle (e.g., i), may be in a range of [0, 1, . . . N_reg_coreset/L−1]. For example, N_reg_coreset may be defined as N_rb_coreset*N_symbol_coreset (e.g., a total number of REGs in the single coreset). For example, a j-th indexed CCE may comprise one or more REG bundles of {f(6j/L), f(6j/L+1), . . . , f(6j/L+6/L−1)}. For example, f(x) may be an interleaver function. In an example, f(x) may be x (e.g., j-th CCE may comprise 6j/L, 6j/L+1, . . . , and 6j/L+6/L−1), when the CCE-to-REG mapping may be non-interleaved. When the CCE-to-REG mapping may be interleaved, L may be defined as one of {2, 6} when N_symbol_coreset is 1 or may be defined as one of {N_symbol_coreset, 6} when N_symbol_coreset is 2 or 3. When the CCE-to-REG mapping may be interleaved, the function f(x) may be defined as (rC+c+n_shift) mod (N_reg_coreset/L), wherein x=cR+r, r=0, 1, . . . , R−1, c=0, 1, . . . , C−1, C=N_reg_coreset/(L*R), and R is one of {2, 3, 6}.

For example, the configuration parameters may comprise a frequencyDomainResources that may define N_rb_coreset. The configuration parameters may comprise duration that may define N_symbol_coreset. The configuration parameters may comprise cce-REG-MappingType that may be selected between interleaved or non-interleaved mapping. The configuration parameters may comprise reg-BundleSize that may define a value for L for the interleaved mapping. For the non-interleaved mapping, L=6 may be predetermined. The configuration parameters may comprise shfitIndex that may determine n_shift as one of {0, 1, . . . , 274}. The wireless device may determine/assume a same precoding for REGs within a REG bundle when precorder granularity (e.g., a precoderGranularity indicated/configured by the configuration parameters) is configured as sameAsREG-bundle. The wireless device may determine/assume a same precoding for all REGs within a set of contiguous RBs of a coreset when the precoderGranularity is configured as allContiguousRBs.

For a first coreset (e.g., CORESET #0) may be defined/configured with L=6, R=2, n_shift=cell ID, and precoderGranularity=sameAsREG-bundle.

In an example, a wireless device may receive up to M DCIs via a slot or a PDCCH monitoring occasion or a span of a scheduling cell. Each DCI of the M DCIs may schedule one or more PDSCHs for a scheduled cell. The wireless device may inform a wireless device capability of the M for a band/band combination or for each numerology pair between a scheduling cell and a scheduled cell.

In an example, two downlink resource allocation schemes, type 0 and type 1, are supported. A wireless device may determine a frequency domain resource based on a DCI based on a fallback DCI format such as DCI format 0_1 based on a resource allocation type 1. A base station may transmit configuration parameters indicating a dynamic switch between the type 0 and the type 1 resource allocation via an indication in a DCI. The configuration parameters may comprise 'dynamicswitch' to enable dynamic switching between the type 0 and the type 1 via the DCI. The dynamic switching may be supported for a DCI based on a non-fallback DCI format such as DCI format 1_1 or DCI format 1_2. The configuration parameters may comprise/indicate either the type 0 or the type 1 as a resource allocation type via an RRC signaling. The wireless device may determine a frequency domain resource based on a DCI based on the resource allocation configured via the RRC signaling, in response to 'dynamicswitch' being not configured. The wireless device may determine a frequency domain resource based on a frequency domain resource assignment field of a DCI based on an active downlink BWP of a cell. The cell is a scheduled cell. The DCI may indicate a BWP index. The wireless device may determine the frequency domain resource based on one or more configuration parameters of an indicated BWP by the BWP index. For a PDSCH scheduled with a DCI based on a fallback DCI format (e.g., DCI format 1_0) via any common search space, a RB numbering, to determine a frequency domain resource, may start from a lowest RB of a coreset. For example, the DCI has been received via the coreset. In other cases, the RB numbering may start from a lowest RB of an active BWP of the scheduled cell.

For example, a resource allocation type 0 may use a bitmap to indicate a frequency domain resource. The bitmap may indicate one or more resource block groups (RBGs) that may allocate the frequency domain resource. One RBG may represent a set of consecutive virtual resource blocks defined by a rgb-Size. For example, the rbg-Size may be indicated as a parameter of a PDSCH-Config under a servingCellConfig. For example, the rbg-Size may be determined based on a parameter of 'Configuration 1' or 'Configuration 2' and a bandwidth of an active BWP of a scheduled cell. For example, when the bandwidth of the active BWP is between 1 to 36 RBs, 'Configuration 1' indicates the rbg-Size of 2 and 'Configuration 2' indicates the rbg-Size of 4. For example, when the bandwidth of the active BWP is between 37 to 72 RBs, 'Configuration 1' indicates the rbg-Size of 4 and 'Configuration 2' indicates the rbg-Size of 8. For example, when the bandwidth of the active BWP is between 73 to 144 RBs, 'Configuration 1' indicates the rbg-Size of 8 and 'Configuration 2' indicates the rbg-Size of 16. For example, when the bandwidth of the active BWP is between 145 to 275 (or 550) RBs, 'Configuration 1' indicates the rbg-Size of 16 and 'Configuration 2' indicates the rbg-Size of 16. A number of RBGs (N_RBG) for a downlink BWP may present. A DCI field size of a frequency domain resource allocation based on the resource allocation type 0 would be ceil (N_RBG+(N_start_BWP mode P))/P) where a size of a first RBG is P−N_start_BWP mode P, a size of a last RBG is (N_start_BWP+bandwidth) mode P wherein is (N_start_BWP+bandwidth) mode P is greater than zero, a size of other RBGs are P, and P is the rbg-Size. The bitmap of N_RBG bits with one bitmap bit per a corresponding RBG, such that the corresponding RBG may be scheduled. The one or more RBGs may be indexed in an order of increasing frequency, and indexing may start from a lowest frequency of the active BWP. The order of the bitmap may be determined such that RBG #0 to RBG #N_RBG−1 may be mapped to most significant bit to least significant bit of the bitmap. The wireless device may assume an RBG is allocated in response to a corresponding bit of the bitmap being allocated/assigned as 1. The wireless device may assume a second RBG is not allocated in response to a corresponding bit of the bitmap being allocated/assigned as 0.

When a virtual RB to a physical RB mapping is enabled, the wireless device may determine one or more physical RBGs based on the indicated bitmap for the virtual RBGs. Otherwise, the indicated bitmap may determine the one or more physical RBGs.

For example, a resource allocation type 1, a frequency domain resource allocation may indicate a set of contiguously allocated non-interleaved or interleaved virtual resource blocks within an active bandwidth part of a scheduled cell. For example, a DCI may be scheduled via a USS. The frequency domain resource allocation field based on the resource allocation type 1 may use a resource allocation value (RIV). The RIV may indicate a starting virtual RB (RB_start) and a length in terms of contiguously allocated virtual RBs (L_rbs). The RIV value may be determined as the RIV=bandwidth (L_rbs−1)+RB_start when (L_rbs−1) is smaller than or equal to floor (bandwidth/2), or the RIV=bandwidth (bandwidth−L_rbs+1)+(bandwidth−1−RB_start) otherwise. The bandwidth may represent a bandwidth of the active BWP.

A base station may enable a PRB bundling. A wireless device may assume a same precoding over a number RBs of the PRB bundle (e.g., two PRBs, four PRBs or the bandwidth). The base station may schedule the PRB bundle or not, and may not schedule partial PRB bundle to the wireless device.

Similar to downlink, for an uplink transmission, a few resource allocation types are supported. For the uplink transmission, a resource allocation type 0, resource allocation type 1 or resource allocation type 2 may be supported. The resource allocation type 0 may be used in response to a transform precoding being disabled. The resource allocation type 1 or the resource allocation type 2 may be used in response to the transform precoding being enabled or being disabled. For the uplink transmission, a 'dynamicswitch' may be configured. In response to the 'dynamicswitch', the wireless device may switch between the resource allocation type 0 and the resource allocation type 1 based on a DCI. The base station may configure a resource allocation type via an RRC signaling in response to the 'dynamicswitch' being not configured/enabled. The resource allocation type 2 may be used in response to an interlaced PUSCH being enabled. The wireless device may apply the resource allocation type 1 for a DCI based on a fallback DCI format such as a DCI format 0_0. The interlaced PUSCH is disabled for the fallback DCI format. When the interlaced PUSCH is enabled, the wireless device may apply the resource allocation type 2 for the DCI. The wireless device may determine a frequency domain resource based on a frequency domain resource allocation field of a DCI based on an active uplink BWP of a scheduled cell. The DCI may not comprise a BWP index. The wireless device may determine the frequency domain resource based on an indicated BWP by a BWP index when the DCI comprises the BWP index.

In an example, a resource allocation type 0 for an uplink transmission may use a bitmap indicating one or more RBGs within an active UL BWP of a scheduled cell. One RBG may represent a set of consecutive virtual resource blocks defined by a rbg-Size. The rbg-Size may be indicated as a parameter of a PUSCH-Config under a servingCellConfig. For example, the rbg-Size may be determined based on a parameter of 'Configuration 1' or 'Configuration 2' and a bandwidth of an active UL BWP of a scheduled cell. For example, when the bandwidth of the active UL BWP is between 1 to 36 RBs, 'Configuration 1' indicates the rbg-Size of 2 and 'Configuration 2' indicates the rbg-Size of 4. For example, when the bandwidth of the active UL BWP is between 37 to 72 RBs, 'Configuration 1' indicates the rbg-Size of 4 and 'Configuration 2' indicates the rbg-Size of 8. For example, when the bandwidth of the active UL BWP is between 73 to 144 RBs, 'Configuration 1' indicates the rbg-Size of 8 and 'Configuration 2' indicates the rbg-Size of 16. For example, when the bandwidth of the active UL BWP is between 145 to 275 (or 550) RBs, 'Configuration 1' indicates the rbg-Size of 16 and 'Configuration 2' indicates the rbg-Size of 16. A number of RBGs (N_RBG) for a uplink BWP may present. Determination of a bit of the bitmap of the uplink resource allocation type 1 is same as that of the downlink resource allocation type 1. In frequency range 1 (e.g., below 7 GHz), almost contiguous allocation may be supported. In frequency range 2 (e.g., above 7 GHz and below 52.6 GHz), contiguous resource allocation may be supported.

The resource allocation type 0 for an uplink transmission may follow similar procedure to the resource allocation type 0 for an downlink transmission.

The resource allocation type 2 may be used to indicate an interlaced resource allocation, wherein M is a number of interlaces. For example, a frequency domain resource allocation field may comprise a RIV. For the RIV between 0 and M (M+1)/2 (e.g., 0<=RIV<M(M+1)/2), the RIV may indicate a starting interlace index m_0 and a number of contiguous interlace indices L (L>=1). For example, when (L−1)<=floor (M/2), the RIV may define M (L−1)+m_0. Otherwise, the RIV may define M (M−L+1)+(M−1−m_0). For the RIV larger than or equal to M(M+1)/2 (e.g., RIV>=M(M+1)/2), the RIV may indicate a starting interlace index m_0 and a set of values 1 based on one or more set of values. For example, an entry may represent {RIV−M(M+1)/2, m_0, 1}. For example, the one or more set of values may comprise {0, 0, {0, 5}}, {1, 0, {0, 1, 5, 6}}, {2, 1, {0, 5}}, {3, 1, {0, 1, 3, 5, 6, 7, 8}}, {4, 2, {0, 5}}, {5, 2, {0, 1, 2, 5, 6, 7}}, {6, 3, {0, 5}}, and/or {7, 4, {0, 5}}.

Resource allocation type and mechanism based on a DCI may be also applied to a configured grant configuration or semi-persistent scheduling configuration.

In an example, a base station may transmit a DCI. The DCI may comprise a time domain resource allocation field. A value of the time domain resource allocation field (e.g., m) may indicate a row index m+1 of a time domain resource allocation lists/a time domain resource allocation table. The base station may transmit configuration parameters indicating one or more time domain resource allocation tables. For example, a first time domain resource allocation table may be used for a fallback DCI format scheduled via a CSS. For example, a second time domain resource allocation table may be used for a fallback DCI format and/or a non-fallback DCI format via a USS. The wireless device may determine a time domain resource allocation table from the one or more time domain resource allocation tables for the DCI in response to receiving the DCI. The configuration parameters may comprise one or more time domain resource allocation entries for a time domain resource allocation table. One time domain resource allocation entry may comprise a starting and a length indicator value (SLIV), a PUSCH mapping type, and K2 value. The K2 may represent a scheduling offset between a scheduling DCI of a PUSCH and a starting slot index of the PUSCH. The one time domain resource allocation (TDRA) entry may comprise a repetition number (numberOfRepetitions). The one TDRA entry may comprise a starting symbol (startSymbol) and a length addition to the SLIV. For a PUSCH, scheduled by a non-fallback DCI format such as DCI format 0_1, a base station may transmit, to a wireless device, configuration parameters indicating PUSCHRepTypeIndicaor-ForDCIFormat0_1 to ‘puschRepTypeB’ indicating a repetition type B. In response to being configured with ‘puschRepTypeB’, the wireless device may determine a resource based on a procedure for the repetition type B and a time domain resource allocation field of a DCI based on the DCI format 0_1. Similarly, the configuration parameters may comprise PUSCHRepTypeIndicator-ForDCIformat0_2 to ‘puschRepTypeB’ to apply the repetition type B for a second DCI based on a DCI format 0_2. When the base station may not configure PUSCHRepTypeIndicaor-ForDCIFormat0_1 indicating ‘puschRepTypeB’, the wireless device may determine a time domain resource based on a DCI based on a repetition type A.

For example, when the repetition type A is configured/enabled, the wireless device may determine a starting symbol S in a starting slot and a number of consecutive symbols L from the starting symbol S based on a SLIV value. For example, the SLIV value may define SLIV=14*(L−1)+S when (L−1) is smaller than or equal to 7 (half slot based on a normal CP). The SLF value may define SLIV=14*(14−L+1)+(14-1-S) when (L−1) is larger than 7. For example, L would be greater than 0, and may be smaller than or equal to 14−S. In an uplink BWP with an extended CP, 12 OFDM symbols may be assumed for a slot. A SLIV value may be determined by 12*(L−1)+S or 12*(12−L+1)+(14−1−S) respectively based on L−1 being smaller than/equal to 6 or larger than 6. For the repetition type A, the configuration parameters may comprise/indicate a TypeA or Type B for a PUSCH mapping type. For example, the base station may determine a first OFDM symbol comprising a DM-RS based on a fixed location (e.g., a first symbol of a slot) when the TypeA is configured for the PUSCH mapping type. For example, the base station may determine a first OFDM symbol comprising a DM-RS based on a starting OFDM symbol of the PUSCH in response to the typeB being configured for the PUSCH mapping type.

For example, when the repetition type B is configured/enabled, the wireless device may determine a starting OFDM symbol S in a starting slot, and a number of consecutive OFDM symbols L based on a row of a time domain resource allocation table. For example, the row of the time domain resource allocation table may comprise startSymbol for the starting OFDM symbol S and length for the number of consecutive OFDM symbols L. For the repetition type B, the wireless device may assume that the TypeB is configured for the PUSCH mapping type. For example, when a TypeA is configured for a PUSCH mapping type, a staring OFDM symbol S, a length L, and S+L may represent one or more values. For example, {S, L, S+L} may be {0, {4, . . . , 14}, {4, . . . , 14}} for a normal CP, and {0, {4, . . . , 12}, {4, . . . , 12}} for an extended CP. When a TypeB is configured for the PUSCH mapping type, {S, L, S+L} may be {{0, . . . , 13}, {1, . . . , 14}, {1, . . . , 14} for a repetition type A, {1, . . . , 27} for a repetition type B} for the normal CP, and {{0, . . . , 11}, {1, . . . , 12}, {1, . . . , 12}} for the extended CP.

For a repetition type A, a wireless device may determine a repetition number K based on a row of a time domain resource allocation table. The row may comprise a number of repetitions. The wireless device may determine based on an RRC parameter, ‘pusch-AggregationFactor’ when the row may not comprise the number of repetitions. The wireless device may determine a single transmission based on the row may not comprise the number of repetitions nor the ‘pusch-AggregationFactor’ is not configured. The wireless device may determine the single transmission for a PUSCH scheduled by a fallback DCI such as a DCI format 0_0.

For a repetition type A with a repetition number K being larger than 1, a wireless device may apply a starting OFDM symbol S and a length L in a slot across K consecutive slots based on a single transmission layer. The wireless device may repeat a TB across the K consecutive slots applying same OFDM symbols in each slot. A redundancy version (RV) applied on a i-th transmission of the K consecutive slots may be determined based on a repetition type. For example, when a RV value indicated by a DCI is 0, a second RV value for i-th transmission occasion (when a repetition type A is configured) or i-th actual repetition (when a repetition type B is configured) may be determined as 0 for i mod 4=0, 2 for i mod 4=1, 3 for i mod 4=2, 4 for i mod 4=3. When the RV value is 2, the second RV value may be determined as 2 for i mod 4=0, 3 for i mod 4=1, 1 for i mod 4=2, 0 for i mod 4=3. When the RV value is 3, the second RV value may be determined as 3 for i mod 4=0, 1 for i mod 4=1, 0 for i mod 4=2, 0 for i mod 4=2. When the RV value is 1, the second RV value may be determined as 1 for i mod 4=0, 0 for i mod 4=1, 2 for i mod 4=2, 3 for i mod 4=3.

For a repetition type A, a PUSCH transmission of a slot over a plurality of slots may be omitted when the slot may not have a sufficient number of uplink OFDM symbols for the PUSCH transmission. For a repetition type B, a wireless device may determine one or more slots for a number of nominal repetition number N. For a i-th nominal repetition, wherein i is 0, . . . , N−1, wherein N may be configured by a base station via an RRC signaling or a time domain resource allocation of a DCI. The wireless device may determine a slot. The i-th nominal repetition may start, wherein a slot index would be Ks+floor ((S+iL)/N_slot_symbol), and a starting symbol in the slot may be given by mod (S+iL, N_slot_symbol). The N_slot_symbol may be 14 with a normal CP and 12 with an extended CP. The S may represent a starting OFDM symbol indicated by a time domain resource allocation field of a DCI and L may represent a length indicated by the time domain resource allocation field of the DCI. The wireless device may determine a second slot wherein the i-th nominal repetition may end wherein a second slot index of the second slot may be determined as Ks+floor ((S+(i+1)*L−1)/N_slot_symbol), and an ending symbol in the second slot may be determined as mod (S+(i+1)*L−1, N_slot_symbol). The Ks may be determined as a starting slot indicated by the time domain resource allocation field of the DCI.

When the wireless device is configured with the repetition type B, the wireless device may determine invalid OFDM symbol for PUSCH repetitions based on a tdd-UL-DL-ConfigurationCommon/a tdd-UL-DL-ConfigurationDedicated and/or an InvalidSymbolPattern indicated by an RRC signaling. For example, the wireless device may determine a downlink symbol based on the tdd-UL-DL-Configuration-Common or the tdd-UL-DL-ConfigurationDedicated as an invalid OFDM symbol for the repetition type B. The base station may transmit the InvalidSymbolPattern, a bitmap of OFDM symbols over one slot or two slots. A bit of the bitmap may indicate ‘1’ to invalidate a corresponding OFDM symbol. The base station may further configure periodicityAndPattern. A bit of the periodicityAndPattern may correspond to a unit equal to a duration of the bitmap of the InvalidSymbolPattern. The wireless device may determine invalid OFDM symbol(s) based on the InvalidSymbolPattern and the periodicityAndPattern. For example, when a PUSCH is scheduled/activated by a non-fallback DCI format such as a DCI format 0_1/0_2 and InvalidSymbolPatternIndicator-ForDCIFormat0_1/0_2 is configured, a invalid symbol pattern indicator field may indicate 1, the wireless device may apply an invalid symbol pattern (e.g., InvalidSymbolPattern). Otherwise, the wireless device may not apply the invalid symbol pattern. When the InvalidSymbolPatternIndicator-ForDCIFormat0_1/0_2 is not configured, the wireless device may not apply the invalid symbol pattern. The wireless device may determine remaining OFDM symbols. The remaining OFDM symbols may not comprise invalid OFDM symbol(s), the wireless device may consider the remaining OFDM symbols as valid OFDM symbols. When there is a sufficient number of valid OFDM symbols in a slot to transmit a PUSCH based on a scheduling DCI, the wireless device may determine an actual repetition of a slot wherein the slot may have consecutive sufficient valid consecutive OFDM symbols. The wireless device may skip the actual repetition based on a slot formation indication. The wireless device may apply a redundancy version based on the actual repetition.

In an example, a row of a time domain resource allocation may comprise one or more resource assignments for one or more contiguous PUSCHs. A K2 of the row may indicate a first PSCH of the one or more contiguous PUSCHs. Each PUSCH of the one or more contiguous PUSCHs may be indicated/scheduled with a separate SLIV value and a PUSCH mapping type.

A similar mechanism may be used to schedule a time domain resource for a downlink data.

Figure 22:
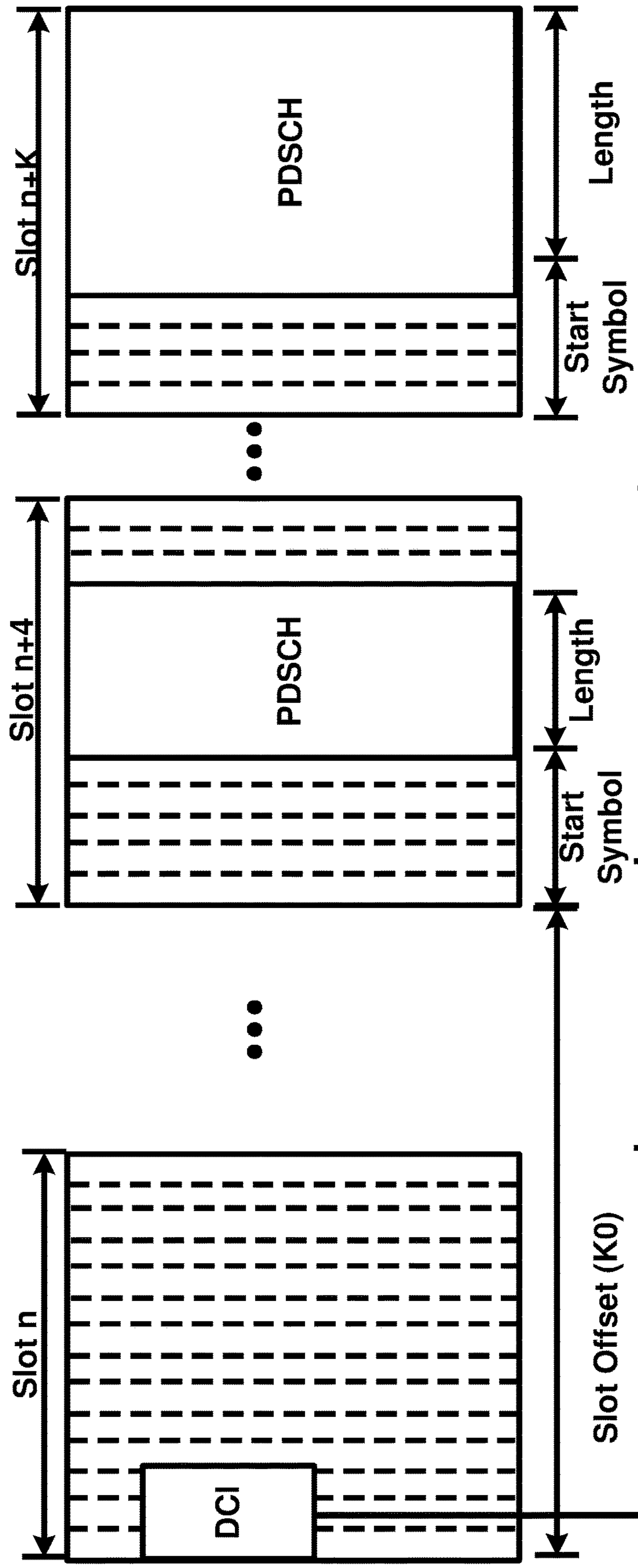
FIG. 22 illustrates a time domain resource allocation mechanism for downlink data as per an aspect of an embodiment of the present disclosure.

FIG. 22 illustrates a time domain resource allocation mechanism for downlink data as per an aspect of an embodiment of the present disclosure. A base station may transmit one or more RRC messages comprising/indicating configuration parameters. The configuration parameters may comprise/indicate a list of time domain resource allocation or a time domain resource allocation (TDRA) table. The list of TDRA or the TDRA table may comprise one or more entries/rows of TDRA. Each entry/row TDRA of the list of TDRA or the TDRA table comprises a slot offset (e.g., a scheduling offset, K0) and one or more SLIV values (e.g., indicating a starting symbol and a length). The each entry/row may comprise additionally/optionally a PDSCH mapping type (e.g., type A or type B).

A SLIV value may be jointly encoded a starting symbol and a length. For example, a SLIV value m may represent a starting symbol index s and a length 1. The wireless device may determine the SLIV value m, with a normal CP, as m=14*(1−1)+s when 1 is smaller than 9, and m=14*(14−1)+(14−1−s) when 1 is between [9, 14]. Instead of 14, 12 may be used in case of extended CP.

A reserved SLIV value (e.g., 0) may be reserved to indicate no resource allocation in a slot. For example, FIG. 22 show an index 2 of a TDRA entry comprises a SLIV #2 being set with the reserved SLIV value (e.g., length is zero or one). The wireless device may not expect any resource or schedule in the slot n+5 when the DCI indicates the index 2 via a time domain resource allocation.

Each TDRA entry may have one or more SLIV values, where each SLIV value may correspond to a slot. Each TDRA may have one or more SLIV values, where each SLIV value may correspond to a valid slot. For example, a valid slot may be determined as a slot comprising at least C (e.g., C=2 or 3) valid symbols. Valid symbols may comprise downlink or flexible symbol for downlink TDRA table. Valid symbols may comprise uplink or flexible symbol for uplink TDRA table.

A first TDRA entry may have a first number of SLIV values, scheduling up to the first number of PDSCHs. A DCI, indicating the first TDRA entry, may schedule up to the first number of PDSCH(s).

A second TDRA entry may have a second number of SLIV values, scheduling up to the second number of PDSCHs. A DCI, indicating the second TDRA entry, may schedule up to the second number of PDSCH(s). The first number may be different from the second number.

A TDRA entry may have a K SLIV values, where each SLIV value of K SLIV values may be set to the reserved SLIV value or may be set to a valid (s, 1). A wireless device may determine no scheduling in a slot configured/indicated with the reserved SLIV value.

For example, FIG. 22 shows that a TDRA entry with index 0, does not schedule a PDSCH in a slot n+K, when the DCI indicates the index 0 for the TDRA resource allocation.

For example, FIG. 22 shows that a TDRA entry with index 2, does not schedule a PDSCH in slots between [n+9, . . . , n+8+K], when the DCI indicates the index 2 for the TDRA resource allocation.

In an example, a TDRA entry may comprise a set of {a SLIV value, a mapping type, a number of repetition} and a scheduling/slot offset (e.g., k0, k2) for one or more PDSCHs or one or more PUSCHs.

In an example, a TDRA entry may comprise a set of {a SLIV value, a mapping type, a k0 or k2 scheduling/slot offset} for one or more PDSCHs or one or more PUSCHs.

In an example, a TDRA entry may comprise a set of {a SLIV value} and a scheduling/slot offset (e.g., k0, k2).

For example, each row may have an index that may be determined based on an order of the each row. For example, the index may be configured via the configuration parameters.

Based on the configuration parameters, the wireless device may determine a time domain resource allocation table shown in FIG. 22. For example, the time domain resource allocation (TDRA) table has a list of entries. Each entry comprises an index (e.g., an index of the entry, an index of a row of the entry in the time domain resource allocation table), a scheduling offset (or a slot offset, K0, k0), one or more SLIV (e.g., a starting symbol and a length) values (and a mapping type (e.g., PDSCH Mapping Type)). The wireless device may receive the DCI, scheduling one or more PDSCHs, in a slot n. The DCI may indicate an index=1 for the TDRA table. The wireless device may determine a scheduling offset value 4. The wireless device may determine a first slot of first PDSCH in a slot n+4 based on the scheduling offset. The wireless device may determine, for the first PDSCH, a starting symbol of 6 and a length of 5 based on an index=1 of the TDRA table. The wireless device may decode a transport block carried via the first PDSCH based on the receiving the first PDSCH.

The wireless device may determine resource for a second PDSCH of the one or more PDSCHs (e.g., based on SLIV #2), where starting symbol is 1 and length is 14 for the second PDSCH.

The wireless device may determine resource for K-th PDSC Hof the one or more PDSCHs (e.g., based on SLIV #K), where starting symbol is 4 and length is 10 for the K-th PDSCH.

In an example, a TDRA table (e.g., PUSCH-TimeDomainResourceAllocationList, PDSCH-TimeDomainResourceAllocatinoList) may comprise one or more entries of TDRA. Each TDRA entry may comprise a scheduling offset (e.g., k2-r17 for PUSCH, k0-r17 for PDSCH) and one or more indexes to the list of SLIV values. Each of the one or more indexes may correspond to each PDSCH of one or more PDSCHs scheduled by a DCI or each PSCH of one or more PUSCHs scheduled by a DCI.

For example, a first entry (e.g., PUSCH-SLIVList[0]) may be reserved for a skipping (e.g., a duration is 0 or a starting symbol is a last symbol of a slot).

In an example, the subset of SLIV values may comprise a reserved state or a duration of zero. For example, a first SLIV value of the subset of SLIV values (e.g., a SLIV value with index=0 or index=1) may be reserved for indicating zero duration or no resource allocation. When the reserved state or the first SLIV value is indicated by a DCI for a PDSCH or a slot n, the wireless device may determine that resource is not allocated for the PDSCH or the slot n. The wireless device may determine to skip the PDSCH or the slot.

For example, a DCI, of a multi-PDSCH scheduling, may comprise K indexes of SLIV values for K PDSCHs or K slots. When i-th index of the K indexes indicates the reserved state or the first SLIV value with duration 0, the wireless device may determine that i-th PDSCH is skipped or i-th slot (a slot with index n+i, where the first slot has a slot index n) is skipped.

The wireless device may determine that one or more slots or one or more PDSCHs are skipped for a multi-PDSCH scheduling based on one or more SLIV values corresponding to the one or more slots or the one or more PDSCHs. The wireless device may determine that a PDSCH or a slot is skipped in response to a SLIV value, corresponding to the PDSCH or the slot, being set to a reserved value (e.g., a duration is zero, a stating symbol is a last symbol) or an index of the SLIV value being a predetermined value (e.g., 0 or 1).

In an example, a DCI, of a multi-PDSCH or a multi-PUSCH scheduling, may comprise one or more NDI bits/fields, where each of the one or more NDI bits/fields corresponds to each PDSCH of one or more PDSCHs scheduled by the DCI or each PUSCH of one or more PUSCHs scheduled by the DCI. The DCI may also comprise one or more RV fields/bits, where each of the one or more RV bits/fields corresponds to the each PDSCH or the each PUSCH.

The wireless device may determine whether a PDSCH of the one or more PDSCHs or a PUSCH of the one or more PUSCHs is scheduled or is skipped in a slot based on a NDI bit/field of the one or more NDI bits/fields and a RV bit/field of the one or more RV bits/fields. For example, the NDI bit/field corresponds to the PDSCH or the PUSCH. The RV bit/field corresponds to the PDSCH or the PUSCH. For example, when the NDI bit/field is set to a first predetermined value and the RV bit/field is set to a second predetermined value, the wireless device may determine that the PDSCH or the PUSCH is skipped. For example, when the NDI bit/field is toggled (e.g., indicates a new data) and the RV bit/field is set to a second predetermined value, the wireless device may determine that the PDSCH or the PUSCH is skipped. For example, the first predetermined value may be 0 (or 1). For example, the second predetermined value may be RV=2 (or RV=3 or RV=1).

The wireless device may determine whether a PDSCH or a PUSCH is skipped or not based on a first field and a second field. A DCI, of a multi-PDSCH or a multi-PUSCH scheduling, may comprise the first field and the second field. The first field and the second field may correspond to the PDSCH or the PUSCH.

The wireless device may determine that the PDSCH or the PUSCH is skipped in response to the first field being set to a first predetermined value (or toggled or non-toggled) and the second field being set to a second predetermined value (or toggled or non-toggled). Examples of the first field may comprise at least one of a NDI field, a RV field, a MCS field, a HARQ process ID field, a TPC field. Examples of the second field may comprise at least one of a NDI field, a RV field, a MCS field, a HARQ process ID field, a TPC field. The first field and the second field may be different.

In an example, a DCI, of a multi-PDSCH or a multi-PUSCH scheduling, may comprise a HARQ process identifier (a HARQ ID). The DCI may comprise resources for one or more PDSCHs via one or more slots. The DCI may comprise resources for one or more PUSCHs via one or more second slots.

The wireless device may determine a HARQ process ID of a PDSCH of the one or more PDSCHs based on the HARQ ID and a gap between a second slot and a first slot. For example, the first slot is a slot where an earliest PDSCH of the one or more PDSCHs start. For example, the wireless device may determine the first slot based on a scheduling offset indicated by the DCI. The second slot is a slot where the PDSCH of the one or more PDSCHs is scheduled or mapped or determined.

For example, the DCI schedules K slots/PDSCHs with k0=p. The wireless device may determine an earliest slot (the first slot) as n+p where the wireless device receives the DCI in the slot n. The DCI indicates HARQ ID=Q. The wireless device may determine a HARQ process ID of a first PDSCH (e.g., an earliest PDSCH) of the one or more PDSCHs as Q. The wireless device may determine a HARQ process ID of a second PDSCH or a next slot (e.g., n+p+1) as a Q+1. The wireless device may determine a HARQ process ID of a i-th PDCCH or a i-th next slot (e.g., n+p+i) as a Q+i.

The wireless device may increment a HARQ process ID by 1 in every slot between an earliest slot and a latest slot of the one or more slots scheduled by the DCI.

The wireless device may determine one or more second PDSCHs of the one or more PDSCHs being skipped based on one or more rules in the specification. The wireless device may continue incrementing HARQ process IDs across the one or more second PDSCHs regardless the one or more second PDSCHs being skipped.

The wireless device may continue incrementing HARQ process ID based on a slot index or over contiguous slots starting from a first slot (or an earliest slot) determined based on a time domain resource allocation field of a DCI, regardless whether the wireless device may not have any data scheduled in one or more slots of the contiguous slots.

For example, the wireless device may not continue incrementing HARQ process IDs over slot(s) that are configured as uplink slots or the wireless device may not expect to receive any downlink data via the slot(s) as resources are indicated as uplink.

For example, the wireless device may increment a HARQ process ID in a slot that is skipped based on the one or more rules in the specification. The wireless device may not increment the HARQ process ID in the slot if the slot is skipped due to slot formation information or due to resource conflict (e.g., uplink resource for the downlink data).

Figure 23:
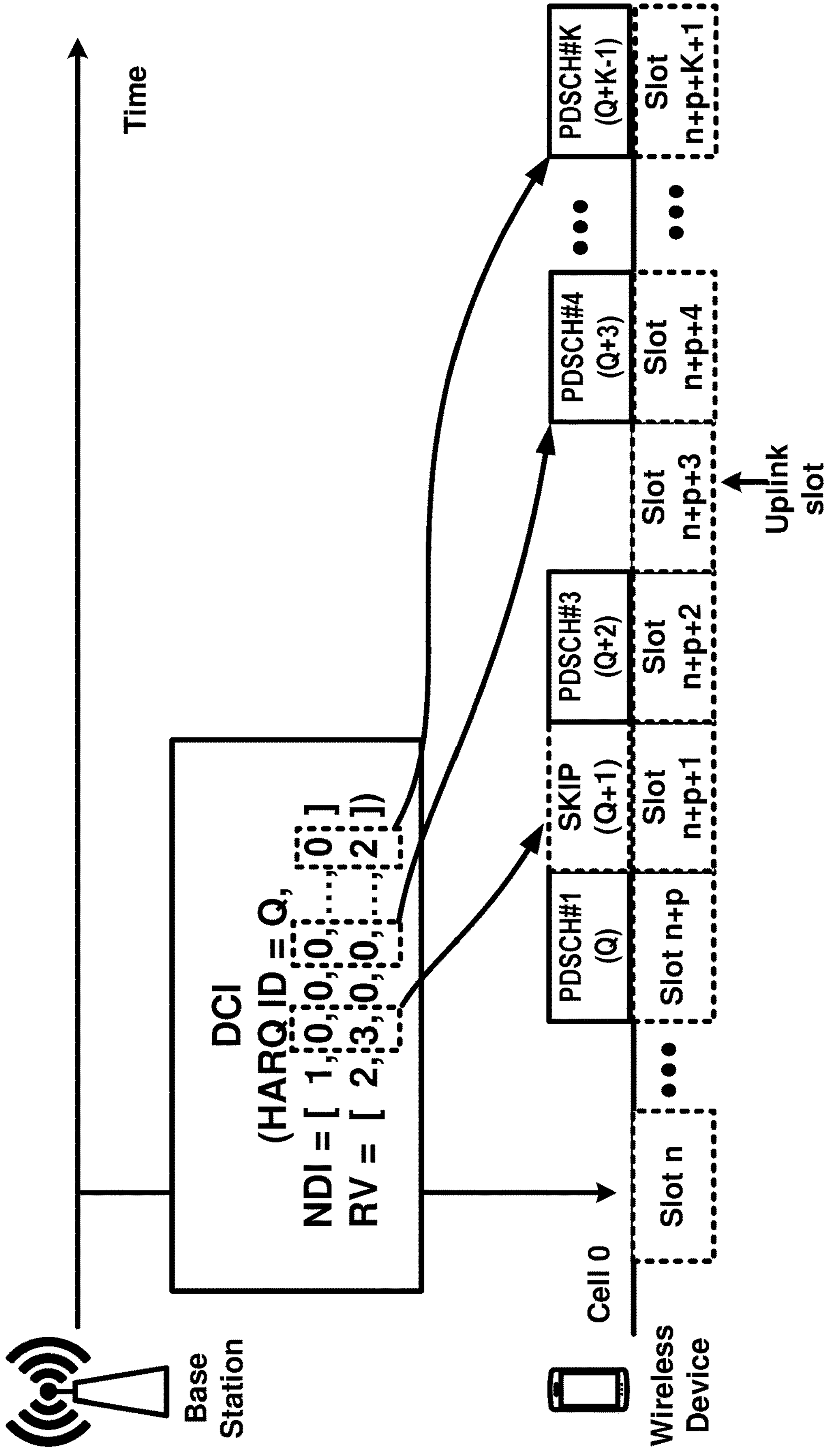
FIG. 23 illustrates an example embodiment for a HARQ process ID for a multi-PDSCH/multi-PUSCH scheduling as per an aspect of an embodiment of the present disclosure.

FIG. 23 illustrates an example of embodiment for a HARQ process ID for a multi-PDSCH/multi-PUSCH scheduling as per an aspect of an embodiment of the present disclosure.

For example, a DCI, of a multi-PDSCH scheduling, may schedule a plurality of PDSCHs over a plurality of slots. For example, the DCI may indicate a HARQ process ID=Q. The DCI may indicate a set of NDI fields/bits where each field/bit of the set of NDI fields/bits corresponds to a PDSCH of the plurality of PDSCHs or a slot of the plurality of slots. The DCI may indicate a set of RV fields/bits where each field/bits of the set of RV fields/bits corresponds to the PDSCH or the slot. For example, $2^{nd}$ bit of a NDI bitmap or a set of NDI fields/bits indicate a NDI value for a second PDSCH (e.g., PDSCH #2) or a second slot (e.g., slot n+p+1). For example, $2^{nd}$ two bits of a RV bitmap or a set of RV fields/bits may correspond to the second PDSCH or the second slot (e.g., NDI=0, RV=3).

For example, $3^{rd}$ NDI bit of the NDI bitmap and $3^{rd}$ two bits of RV bits of the RV bitmap may correspond to a third PDSCH (PDSCH #3) or a third slot (slot n+p+2). The k-th NDI bit of the NDI bitmap and k-th two bits of the RV bits of the RV bitmap may correspond to a K-th PDSCH (PDSCH #K) or k-th slot (slot n+p+K).

The DCI may indicate a first slot (slot n+p) for a first or an earliest PDSCH (e.g., PDSCH #1). The wireless device may map each PDSCH of the plurality of PDSCHs across one or more slots scheduled via a time domain resource allocation field by the DCI. For example, the time domain resource allocation field may comprise K SLIV values where each of the K SLIV values corresponds to each slot between [slot n+p, . . . , slot n+p+K]. For example, the K SLIV values may correspond to each downlink slot or each valid slot between slot [n+p, . . . , slot M] (e.g., M>=n+p+K). The wireless device may determine a slot is a valid slot or a downlink slot based on slot formation indication via RRC and/or DCI signaling. For example, the RRC signaling may comprise TDD-UL-DL-ConfigCommon indicating semi-static downlink and/or uplink resources within one or more periodicities. The RRC signaling may comprise TDD-UL-DL-Config (e.g., a UE-specific siganlign) indicating semi-static downlink and/or uplink resources for flexible resources indicated by the TDD-DL-UL-ConfigCommon.

The wireless device may determine a slot is a valid slot in response to symbol(s) indicated by a SLIV corresponding to the slot are configured with downlink resource and/or flexible resources by the RRC signaling. The wireless device may determine the slot is valid slot in response to the symbol(s) are indicated with downlink by RRC signaling and/or SFI DCI signaling.

In FIG. 23, the wireless device may determine slot n+p+3 are uplink slot. The wireless device may skip the slot n+p+3 from resource allocation by the DCI. The wireless device may determine a fourth PDSCH (PDSCH #4) in a slot n+p+4 by skipping the uplink slot or invalid slot.

For example, $4^{th}$ NDI bit of the NDI bitmap and $4^{th}$ two RV bits of the RV bitmap may correspond to a fourth PDSCH (PDSCH #4) in the slot n+p+4. The wireless device may skip the slot n+p+3 as the slot is an uplink slot or invalid slot.

The wireless device may determine a NDI bit is set to a first pre-determined value and a RV bits are set to a second pre-determined value for a PDSCH. In response to the determining, the wireless device may determine that the PDSCH is skipped.

For example, in FIG. 23, the wireless device may determine $2^{nd}$ NDI bit being set to the first predetermined value (e.g., 0, or toggled or non-toggled) and $2^{nd}$ two RV bits being set to the second predetermined value (e.g., 3, 2 or 1). The wireless device may determine that the second PDSCH or the second slot is skipped.

The wireless device may increment a HARQ process ID of each PDSCH by 1 in each slot allocated by the time domain resource allocation field of the DCI. The wireless device may determine a HARQ process ID of the first PDSCH (PDSCH #1) or the first slot as Q based on the DCI.

The wireless device may determine a HARQ process ID of the second PDSCH (PDSCH #2) or the second slot (slot n+p+1) as Q+1 even if the second PDSCH has been skipped. The wireless device may determine a HARQ process ID of the second slot as Q+1.

The wireless device may determine a HARQ process ID of the third PDSCH (PDSCH #3) or the third slot (slot n+p+2) as Q+2. The wireless device may skip incrementing the HARQ process ID for an invalid slot or uplink slot (e.g., skip slot n+p+3). The wireless device may determine a HARQ process ID of the fourth PDSCH (PDSCH #4) or the fifth slot (slot n+p+4) as Q+3 based on the fifth slot being fourth slot since the first slot based on the time domain resource allocation field of the DCI.

The wireless device may increment the HARQ process ID per each valid slot or for each allocated slot by the time domain allocation table by the DCI.

In an example, the wireless device may determine a slot is skipped or a PDSCH is skipped based on a SLIV value corresponding to the slot or the PDSCH. For example, if the SLIV value may indicate 0 duration or a reserved value, the wireless device may determine that the slot is skipped or the PDSCH is skipped.

In an example, a wireless device may have/support one or more capabilities (e.g., UE radio access capability parameters, radio access capability parameters, UE capabilities, wireless device capabilities). The wireless device may support a capability in response to the wireless device supporting a functionality indicated by the capability. The wireless device may have a capability where the base station configures a related functionality to the wireless device. For example, a capability of one or more capabilities may indicate whether the wireless device supports a carrier aggregation. Another capability may indicate a number of blind decodings and/or a number of non-overlapped CCEs in a slot. Another capability may indicate a number of antennas or a number of layers that the wireless device supports for a band and/or band combination. A capability may correspond to a functionality. One or more capabilities may correspond to a functionality.

The wireless device may indicate the one or more capabilities to a base station. The wireless device may support one or more second capabilities that are mandated by the wireless device to support. The wireless device may not indicate the one or more second capabilities. The base station may, based on the one or more capabilities and the one or more second capabilities, configure one or more configuration parameters (e.g., to support one or more functionalities) to the wireless device. The wireless device may support different functionalities between FDD and TDD, and/or between frequency range 1 (FR1) and frequency range 2 (FR2).

In an example, a wireless device may support one or more common search space (CSS) sets or one or more CSSs. For example, a Type0-PDCCH CSS set may be configured by pdcch-ConfigSIB1 in MIB or by searchSpaceSIB1 in PDCCH-ConfigCommon or by searchSpaceZero in PDCCH-ConfigCommon. The wireless device may monitor a DCI format with CRC scrambled by a SI-RNTI, via the Type0-PDCCH CSS (set) on a primary cell of the master cell group (MCG). For example, a Type0A-PDCCH CSS set may be configured by searchSpaceOtherSystemInformation in PDCCH-ConfigCommon. The wireless device may monitor a DCI format, via the Type0A-PDCCH CSS (set), with CRC scrambled by a SI-RNTI on the primary cell of the MCG. For example, a Type1-PDCCH CSS set may be configured by ra-SearchSpace in PDCCH-ConfigCommon. The wireless device may monitor a DCI format with CRC scrambled by a RA-RNTI, a MsgB-RNTI, or a TC-RNTI on the primary cell.

For example, a Type2-PDCCH CSS set may be configured by pagingSearchSpace in PDCCH-ConfigCommon. The wireless device may monitor a DCI format with CRC scrambled by a P-RNTI on the primary cell of the MCG. For example, a Type3-PDCCH CSS set may be configured by SearchSpace in PDCCH-Config with searchSpaceType=common. The wireless device may monitor DCI formats with CRC scrambled by INT-RNTI, SFI-RNTI, TPC-PUSCH-RNTI, TPC-PUCCH-RNTI, TPC-SRS-RNTI, or CI-RNTI and, only for the primary cell, C-RNTI, MCS-C-RNTI, CS-RNTI(s), or PS-RNTI. For example, a USS set may be configured by SearchSpace in PDCCH-Config with searchSpaceType=ue-Specific. The wireless device may monitor DCI formats with CRC scrambled by C-RNTI, MCS-C-RNTI, SP-CSI-RNTI, CS-RNTI(s), SL-RNTI, SL-CS-RNTI, or SL Semi-Persistent Scheduling V-RNTI.

In an example, a wireless device may support one or more basic functionalities for a downlink control channel and procedure. For example, a capability (e.g., radio access capability) of the wireless device supporting the downlink control channel and the procedure may be referred as "Basic DL control channel". The one or more basic functionalities for the downlink control channel and procedure may comprise the followings. First, the wireless device may support one configured coreset for a BWP for a cell where the one configured coreset may be different from a coreset with index 0 (e.g., coreset #0). The wireless device may support at least two coresets (e.g., a coreset with index being different from zero (e.g., non coreset #0) and a coreset #0). The wireless device may support a resource allocation for a coreset based on a bitmap, where each bit of the bitmap corresponds to contiguous P PRBs (e.g., P=6) in frequency domain. The resource allocation may comprise a time domain resource allocation of a duration of Q1 to Q3 symbols (e.g., Q1=1, Q3=3) for a first frequency range (e.g., a frequency below 6 GHz or below 7 GHz).

The wireless device may support Type1-PDCCH CSS set (e.g., a CSS where the wireless device monitors DCIs for receiving random access responses), where Type1-PDCCH CSS set may be configured via SIB message(s) or MIB message(s). For Type1-PDCCH CSS set configured based on non-wireless device specific RRC parameters, Type0-PDCCH CSS set (e.g., a CSS where the wireless device monitors DCIs for receiving SIB1 messages), Type0A-PDCCH CSS set (e.g., a CSS where the wireless device monitors DCIs for receiving SIB messages other than SIB1), and/or Type2-PDCCH CSS set (e.g., a CSS where the wireless device monitors DCIs for receiving paging messages/short messages), the wireless device may support up to Q3 symbols for a coreset (e.g., Q3=3) in a second frequency range (e.g., FR2).

For a Type1-PDCCH CSS set configured via a wireless device specific RRC signaling and/or for a type3-PDCCH CSS set (e.g., a CSS where the wireless device monitors group-common DCIs) and/or for one or more USS, the wireless device may support up to Q2 symbols for a coreset (e.g., Q2=2) for the second frequency range.

The wireless device may support a bundle size, of resource element groups (REGs) for a control channel elements (CCEs) of a coreset, of 2 or 3 RBs or 6 RBs. The wireless device may support interleaved or non-interleaved CCE-to-REG mapping. The wireless device may support precoder granularity of a REG bundle size. The wireless device may support a determination of a DM-RS scrambling sequence. The wireless device may support one or more TCI states for a coreset. The wireless device may support at least one CSS and at least one USS configurations for a unicast PDCCH transmission for a BWP of a cell. The wireless device may support aggregation levels, of 1, 2, 4, 8 and 16, for a PDCCH. The wireless device may support up to K (e.g., K=3) search space sets for a BWP of a secondary cell. The wireless device may support that a type1-PDCCH CSS set configured via a wireless device specific RRC signaling, a type3-PDCCH CSS set, and/or one or more USSs scheduled via first Q1-Q3 symbols (e.g., Q1=1 and Q3=3) of a slot (e.g., OFDM symbol 0, 1, and 2).

For Type1-PDCCH CSS set without a wireless device specific RRC signaling and for a Type0-PDCCH CSS/Type0A-PDCCH CSS/Type2-PDCCH CSS, a monitoring occasion may be in any symbol(s) of a slot. A Type1-PDCCH CSS without a wireless device specific RRC signaling and for a Type0-PDCCH CSS/Type0A-PDCCH CSS/Type2-PDCCH CSS within a single span may be confined within Q3 (e.g., Q3=3) consecutive symbols of a slot. A span may comprise one or more consecutive symbols where one or more monitoring occasions of one or more search spaces may be present.

The wireless device may support monitoring DCIs based on one or more DCI formats. The one or more DCI formats may comprise a DCI format 0_0, a DCI format 10, a DCI format 0_1 and a DCI format 1_1. The wireless device may support a number of PDCCH blind decodings per a slot based on a subcarrier spacing of an active BWP of a cell. For example, the wireless device may support M1 (e.g., 44) for a 15 kHz SCS active BWP of the cell.

For example, the wireless device may support M2 (e.g., 36) for a 30 kHz SCS active BWP of the cell. the wireless device may support M3 (e.g., M3=22) for a 60 kHz SCS active BWP of the cell. The wireless device may support M4 (e.g., M4=20) for a 120 kHz SCS active BWP of the cell.

In an example, a wireless device may monitor one or more monitoring occasions of one or more search spaces in a span. The one or more search spaces may be associated with one or more coresets of an active BWP of a cell. The span may be determined as one or more consecutive (OFDM) symbols in a slot, where the one or more monitoring occasions are present over the span. Each PDCCH monitoring occasion (e.g., determined based on a search space set configuration) may be within one span. The wireless device may have a capability indicating a combination (X, Y). The wireless device may support a PDCCH monitoring occasions in any symbol of a slot with a minimum time gap/separation (e.g., a minimum gap, a minimum separation, a gap, a space, an offset, a minimum offset, a minimum space, a separation) between first symbols of two consecutive/adjacent spans, including across slots, may be X. A span may start at a first symbol of a slot, where a first PDCCH monitoring occasion may start. The span may end at a second symbol of the slot where a second PDCCH monitoring occasion may end. The first PDCCH monitoring occasion may be same or different from the second PDCCH monitoring occasion. A span may be up to Y symbols. For example, a maximum number of symbols in a span may be less than or equal to Y.

The wireless device may support one or more combinations (X, Y) for a SCS for an active BWP of a cell.

In an example, a wireless device may support one or more cells in a third frequency region (e.g., FR3), where a frequency of the third frequency region may be between [52.6, 71] GHz. The third frequency region may be between [f1>=52.6 GHz and f2<=71 GHz]. The wireless device may support one or more subcarrier spacing for the one or more cells. For example, the one or more SCS may comprise at least one of {120 kHz, 240 kHz, 480 kHz, 960 kHz}. When an active BWP of a cell of the one or more cells operates based on 480 kHz or 960 kHz, a duration of a slot may be smaller than 32 us or 16 us.

In an example, the wireless device may support one or more blind decodings based on a single-slot span monitoring occasion. For example, the wireless device may have a span in each slot of the active BWP of the cell. The wireless device may support M number of blind decodings and P number of non-overlapped CCEs based on a single-slot span monitoring occasion. For example, M may be 4 for 480 kHz and M may be 2 for 960 kHz.

In an example, a wireless device may support a capability of a multi-slot PDCCH monitoring. The wireless device may support up to M blind decodings within a multi-slot span and up to P non-overlapped CCEs within the multi-slot span. A multi-slot span may comprise or span over a plurality of slots of an active BWP of a scheduling cell. For example, the wireless device may support the capability of the multi-slot PDCCH monitoring in response to a SCS of an active BWP of the scheduling cell is one of {480 kHz, 960 kHz, 240 kHz}. The wireless device may transmit a capability of the capability for each SCS of {240 kHz, 480 kHz, 960 kHz} and/or a band/band combination.

In an example, the capability of the multi-slot PDCCH monitoring may be determined based on a fixed pattern of N slots. For example, the wireless device may determine N slots based on a pre-determined pattern (e.g., a span is between slots with indices between [n+0, n+N−1] wherein (n % N)=0). For example, the wireless device may determine the N slots based on a pattern configured by an RRC/SIB/MIB message. For example, the wireless device may determine a starting slot with an index P where the wireless device may monitor/receive a cell-defining SSB. The wireless device may determine N that is a dividend of 64 or 32 (e.g., N=2, 4, 8, 16). The wireless device may determine an ending slot of N multi-slot span that is P+N—1. A span may be between [slot P, slot P+N−1]. The wireless device may determine a starting slot with an index P, where the wireless device may monitor/receive a type0-PDCCH CSS (or a type2-PDCCH CSS, or a type0A-PDCCH CSS).

In an example, a wireless device may support a capability (e.g., pdcch-Monitoring-R16 (X, Y)). The capability may comprise a combination of (X, Y) for a subcarrier spacing. For example, X may determine consecutive OFDM symbols of a span. The span may comprise one or more monitoring occasions. Y may determine a minimum time gap/separation between two consecutive/adjacent spans. For example, X may determine consecutive slots of a span. The span may comprise one or more monitoring occasions. Y may determine a minimum time gap/separation between first slot of a first span and first slot of a second span, where the first span and the second span is adjacent or consecutive spans. For example, Y may be determined as a minimum gap/separation between two monitoring occasions based on a search space configuration, where the two monitoring occasions are adjacent or consecutive. For example, Y may be determined as a minimum periodicity that a search space for an active BWP of a cell may be configured with.

Figure 24A:
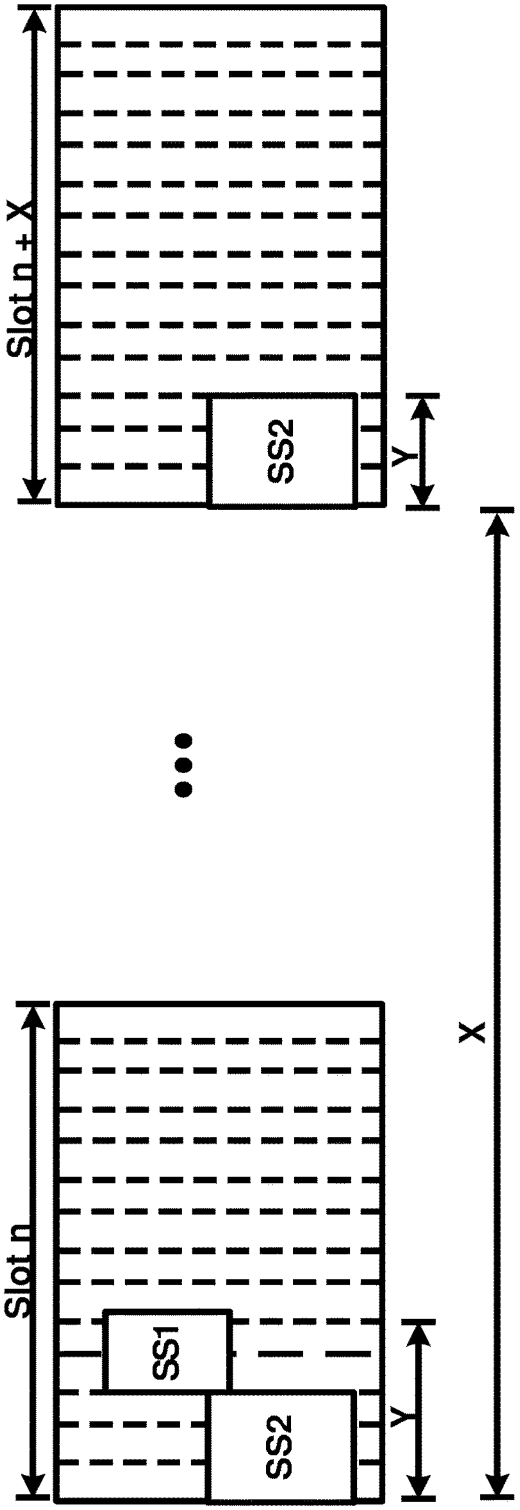
FIG. 24A illustrates an example of a multi-slot span as per an aspect of an embodiment of the present disclosure.

FIG. 24A illustrates an example of a multi-slot span as per an aspect of an embodiment of the present disclosure. For example, a span may be determined based on one or more consecutive symbols of a slot. A size/duration of the span may be up to Y symbols. Y may be greater than 3 symbols. FIG. 24A illustrates that a first span spans five OFDM symbols (e.g., Y=5). A second span may span three OFDM symbols (e.g., <=Y). In an example, a span may be determined as a slot where the wireless device may be configured with one or more monitoring occasions in the slot. The one or more monitoring occasions may occur consecutively or non-consecutively in time over the slot. For example, a first monitoring occasion based on a second search space (SS2) may occur symbols [9-11] in a slot n and a second monitoring occasion based on a first search space (SS1) may occur in symbols [4-5] in the slot n. The first monitoring occasion and the second monitoring occasion may not be contiguous. The span may comprise one or more contiguous or non-contiguous monitoring occasion in a slot.

A minimum time gap/separation between two spans may be determined based on first symbol of first slot of a first span and first symbol of first slot of a second span. The first span and the second span may be adjacent or consecutive spans. First symbol of first slot may be symbol 0 (or 1) of first slot of the first span. First symbol of first slot may be symbol 0 (or 1) of first slot of the second span. First symbol may or may not comprise a monitoring occasion. First slot of the first span may comprise a monitoring occasion. First slot of the second span may comprise a monitoring occasion.

Figure 24B:
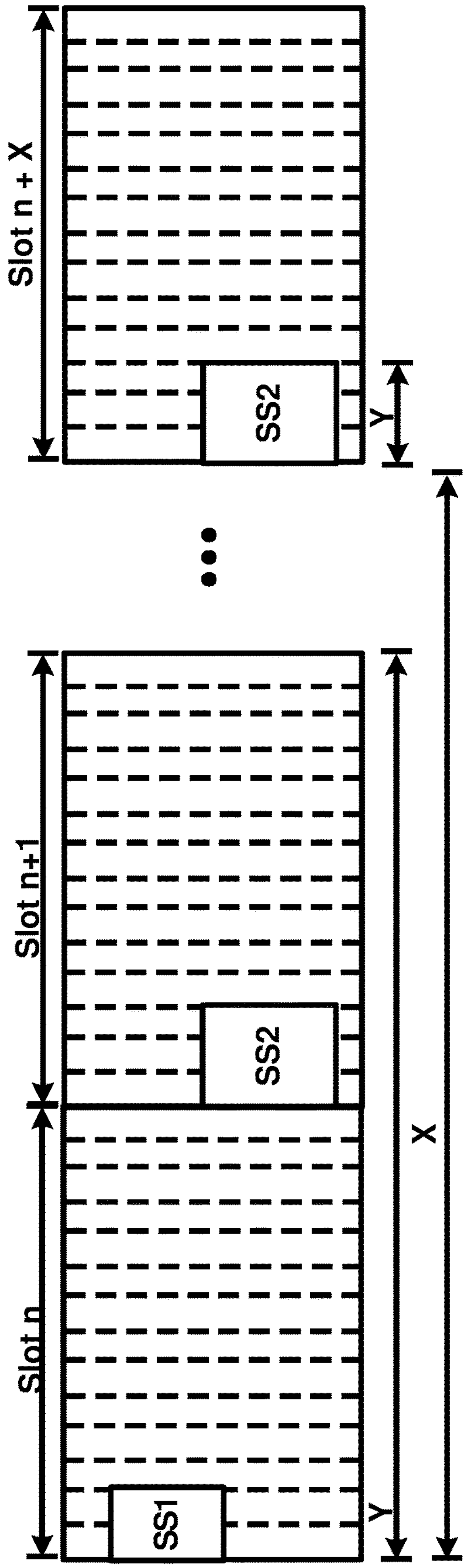
FIG. 24B illustrates an example of a multi-slot span as per an aspect of an embodiment of the present disclosure.

FIG. 24B illustrates an example of a multi-slot span as per an aspect of an embodiment of the present disclosure. In an example, a span may be determined based on one or more consecutive slots. A size/duration of the span may be up to Y slots. Y may be smaller than or equal to K slots (e.g., K=2, 4). A span may start a slot with index n such that n % K=0 or n % (K*X)=0. X may be determined as a minimum time gap/separation between two consecutive/adjacent spans. The X may be measured between first slot of a first span of the two spans and a second slot of a second span of the two spans. In FIG. 24B, a span may span two slots (e.g., slot n and slot n+1) with Y=2 slots and a minimum gap X may be X slots. In each span, a number of consecutive slots with one or more monitoring occasions may be smaller than or equal to Y.

In an example, a wireless device may support a multi-slot PDCCH monitoring capability based on a sliding window of N slots. For example, the wireless device may support M blind decodings and/or P non-overlapped CCEs within any sliding window of size N slots. The base station may configure one or more search spaces, wherein one or more monitoring occasions based on the one or more search spaces are within M blind decodings and P non-overlapped CCEs within a sliding window of N slots. The wireless device may determine a sliding window of N slots based on a current slot n and N sliding window size (e.g., [slot n, slot n+N−1]). The wireless device may support in every sliding window, up to M blind decodings and/or P non-overlapped CCEs. For example, the wireless device may support M and/or P between [slot n, slot n+N−1], [slot n+1, slot n+N], . . . , slot [n+k, slot n+k+N−1], . . . and/or the like.

The wireless device may determine a sliding window or update the sliding window in every slot (e.g., the wireless device may support M and/or P between [slot n, slot n+N−1], [slot n+1, slot n+N] . . . , slot [n+k, slot n+k+N−1], . . . and/or the like). The wireless device may determine or update the sliding window in every P slots (e.g., the wireless device may support M and/or P between [slot n, slot n+N−1], [slot n+P, slot n+P+N−1] . . . , slot [n+k*P, slot n+k*P+N−1], . . . and/or the like). For example, P may be 2 or 4 or N.

The wireless device may report one or more capabilities of one or more multi-slot PDCCH monitoring for a cell. The base station may transmit one or more RRC messages indicating one multi-slot PDCCH monitoring of the one or more capabilities of the one or more multi-slot PDCCH. The one or more RRC messages may indicate/comprise configuration parameters. The configuration parameters may comprise/indicate one or more search spaces for the cell. The wireless device may determine one of the one or more capabilities, for the cell, based on the configuration parameters.

For example, the first SCS is 960 kHz. The wireless device may determine a number of blind decoding for a combination of (X, Y) for a SCS of an active BWP of a cell.

In an example, a wireless device may be, via RRC signaling, configured with a first cell group comprising one or more serving cells. The wireless device may be, via RRC signaling, configured with a second cell group comprising one or more second serving cells. The wireless device may perform a hybrid automatic repeat request (HARQ) feedback procedure for the first cell group independently from a second HARQ feedback procedure for the second cell group. A cell group may be a master cell group or a secondary cell group. A cell group may be a first PUCCH cell group comprising a primary cell. A cell group may be a second PUCCH cell group not comprising the primary cell. A cell group may comprise one or more serving cells among a plurality of serving cells configured to the wireless device. A cell group may also represent one or more serving cells associated with a first service or a first link (e.g., sidelink, multicast, broadcast, MBSM, D2D, V2X, V2P, V2I, V2N, and/or the like). A cell group may represent one or more second serving cells associated with a second service or a second link (e.g., downlink/uplink, cellular communication, location service, and/or the like). The wireless device may be configured with, via RRC signaling, a first set of PUCCH resources for the first cell group. The wireless device may be configured with, via RRC signaling, a second set of PUCCH resources for the second cell group. The wireless device may determine a first PUCCH for the first cell group based on the HARQ feedback procedure. The wireless device may determine a second PUCCH for the second cell group based on the second HARQ feedback procedure. For example, the first PUCCH and the second PUCCH may overlap in time and/or frequency domain. The wireless device may determine the first PUCCH or the second PUCCH based on a priority of the first PUCCH and a second priority of the second PUCCH. For example, the wireless device may determine the first PUCCH or the second PUCCH based on a priority of the first PUCCH and a threshold for the first PUCCH. A base station may configure the threshold for the first cell group via RRC signaling.

In an example, a wireless device may be provided with a coreset pool index for one or more coresets of an active bandwidth part of a serving cell. The wireless device may determine a coreset pool index of a coreset as zero in response to the coreset pool index has not been provided for the coreset. The coreset pool index may be zero or one. The base station may transmit one or more RRC messages indicating configuration parameters. The configuration parameters may indicate/comprise a ACKNACKFeedbackMode between SeparateFeedback or JointFeedback. For example, when ACKNACKFeedbackMode is indicated as SeparateFeedback, the wireless device may determine first HARQ feedback bits corresponding to a first corset pool index (or coresets of the first coreset pool index). The wireless device may determine second HARQ feedback bits, independently from the first HARQ feedback bits, corresponding to a second corset pool index (or coresets of the second coreset pool index). When ACKNACKFeedbackMode is indicated as JointFeedback, the wireless device may generate/determine HARQ feedback bits for both coreset pool indexes jointly. When ACKNACKFeedbackMode is indicated as SeparateFeedback, the wireless device may perform a first HARQ feedback process for the first coreset pool independently from a second HARQ feedback process for the second coreset pool.

In an example, a wireless device may determine a priority index of a PUSCH or a PUCCH transmission. For example, the wireless device may determine the priority index of the PUSCH based on a DCI scheduling uplink resource(s) for the PUSCH. The DCI may comprise or indicate the priority index. In response to the DCI does not comprise a priority index field, the wireless device may determine the priority index of the PUSCH is zero (0). The wireless device may determine a priority index of a PUCCH transmission based on one or more priorities of corresponding PDSCH(s) and/or SPS PDSCH(s) or SPS PDSCH release(s) that the PUCCH transmission carries HARQ feedback bits for the corresponding PDSCH(s) and/or SPS PDSCH(s) or SPS PDSCH release(s). In an example, the base station may transmit one or more RRC messages comprising configuration parameters. The configuration parameters may indicate a harq-CodebookID for a SPS configuration, wherein the harq-CodebookID may be used to determine a priority value of a SPS PDSCH or a SPS PDSCH release based on the SPS configuration. The wireless device may receive a second DCI scheduling a PDSCH of the corresponding PDSCH(s). The wireless device may determine a priority of the PDSCH based on the second DCI. For example, the second DCI may comprise/indicate a priority index field indicating the priority. For example, the wireless device may determine the priority as zero (0) in response to the second DCI does not comprise/indicate the priority for the PDSCH.

In an example, a base station may schedule a PUSCH with a first priority that may be used to piggyback/carry HARQ feedback bits with a second priority. The first priority and the second priority may be different or same. The wireless device may determine a prioritization of an overlapping PUSCH with a first priority and a PUCCH with a second priority based on a rule. For example, the rule is that the wireless device may determine or resolve conflict/overlapping between one or more PUCCHs and one or more PUSCHs with a same priority. For example, based on the determining the conflict/overlapping, the wireless device may have a first PUCCH with a high priority (e.g., larger priority index) and either a PUSCH or a second PUCCH with a low priority (e.g., lower priority index) where the first PUCCH overlaps with either the PUSCH or the second PUCCH. The wireless device may determine to transmit the first PUCCH and may cancel either the PUSCH or the second PUCCH before a first symbol overlapping with the first PUCCH transmission. The wireless device may expect that a transmission of the first PUCCH may not start before Tproc+d1 after a last symbol of a first PDCCH reception. The first PDCCH is a DCI scheduling the first PUCCH. For example, Tproc is a processing delay and dl is an processing offset. For example, based on the determining the conflict/overlapping, the wireless device may have a PUSCH with a larger priority index scheduled by a first DCI format via a first PDCCH repetition and a PUCCH of a smaller priority index. The wireless device may determine to transmit the PUSCH and may cancel the PUCCH. The PUSCH and the PUCCH may overlap in time. The wireless device may cancel a transmission of the PUCCH before a first symbol overlapping with a transmission of the PUSCH. The wireless device may expect that the transmission of the PUSCH may not start before Tproc+d1 after a last symbol of the first PDCCH reception. For example, dl may be determined based on a UE capability.

When a wireless device may detect a first DCI format (or a first DCI) scheduling a PUCCH with a larger priority index or a PUSCH transmission with a larger priority index that may overlap with a second PUCCH with a smaller priority index or a second PUSCH with a smaller priority index, the wireless device may not expect to receive a second DCI format (or a second DCI), after receiving the first DCI format (or the first DCI), scheduling resource(s) mapped to/fully overlapped to the second PUSCH or the second PUCCH. The base station may not reschedule or reclaim the resource(s) of the second PUSCH or the second PUCCH that are cancelled by a prioritization.

In an example, a wireless device may receive a first DCI format (or a first DCI) in a first PDCCH reception scheduling a first PUCCH or a first PUSCH with a higher priority index. The wireless device may receive a second DCI format (or a second DCI) in a second PDCCH reception scheduling a second PUCCH or a second PUSCH with a smaller priority index. The first PUCCH or the first PUSCH may overlap with the second PUCCH or the second PUSCH. The wireless device may determine Tproc based on a numerology of a smaller subcarrier spacing between a first numerology of the first PDCCH and a second numerology of the second PDCCH and a third numerology of the first PUCCH or the first PUSCH and a fourth numerology of the second PUCCH or the second PUSCH.

In an example, a base station may not schedule a first PUCCH or a first PUSCH with a smaller priority index that may overlap with a second PUCCH with a larger priority index with a HARQ feedback bits corresponding to a SPS PDSCH reception only. The base station may not schedule a first PUCCH with a smaller priority index that may overlap in time with a PUSCH with a larger priority index and comprises SP-CSI report(s) without a corresponding scheduling DCI/PDCCH.

In an example, when a wireless device multiplex UCI(s) with a first priority to a PUCCH or a PUSCH, the wireless device may assume that a priority of the PUCCH or the PUSCH may have a same priority to the first priority. A base station may schedule to multiplex the UCI(s) with the first priority to the PUCCH or the PUSCH with the same priority (e.g., the first priority). In an example, when a wireless device may be scheduled with a PUSCH without UL-SCH (e.g., data) and the PUSCH may overlap with a PUCCH comprising a positive SR, the wireless device may drop/cancel a transmission of the PUSCH. In an example, a wireless device may multiplex HARQ feedback bits in a PUSCH transmission via a configured grant resource that comprises a CG-UCI based on a cg-CG-UCI-Multiplexing configuration parameter. For example, the wireless device may multiple the HARQ feedback bits to the PUSCH with the CG-UCI when the cg-CG-UCI-Multiplexing is provided or indicated or enabled. Otherwise, the wireless device may not multiplex. The wireless device may multiplex the HARQ feedback bits to another transmission of a second PUSCH or a PUCCH.

In an example, a base station may transmit one or more RRC messages comprising configuration parameters. The configuration parameters may comprise/indicate pdsch-HARQ-ACK-Codebook-List. The pdsch-HARQ-ACK-Codebook-List may indicate whether the wireless device needs to generate one HARQ codebook or two HARQ codebook. When the wireless device generates one HARQ codebook, the wireless device may multiplex in a single HARQ codebook of HARQ feedback bits associated with a same priority index. When the wireless device generates two HARQ codebooks, the wireless device may generate a first HARQ codebook for a PUCCH of a first priority index (e.g., priority index 0). The wireless device may generate a second HARQ codebook for a second PUCCH of a second priority index (e.g., priority index 1). For each HARQ codebook, the configuration parameters may indicate PUCCH-Config, UCI-OnPUSCH, and/or PDSCH-codeBlockGroupTransmission.

In an example, a wireless device may generate a positive acknowledgement (ACK) when the wireless device detects a DCI format that may schedule a transport block or indicates a SPS release and the wireless device detects the transport block or the SPS release successfully. Otherwise, the wireless device may generate a negative acknowledgement (NACK). For example, a value 0 may indicate an ACK. A value 1 may indicate an NACK.

In an example, the configuration parameters may indicate PDSCH-CodeBlockGroupTransmission for a serving cell to enable a code block group (CBG) based HARQ feedback. The wireless device may generate N bits of HARQ feedback bits for a transport block when the CBG based HARQ feedback is enabled. For example, N is a number of HARQ feedback bits (e.g., number of CBGs) for a transport block. The wireless device may determine M number of code blocks per each CBG based on a total number of code blocks of the transport block. The wireless device may generate an ACK for a CBG in response to the wireless device correctly receive all code blocks of the CBG. Otherwise, the wireless device may generate an NACK for the CBG. When a wireless device receives two transport blocks by a DCI or a DCI format, the wireless device may generate one or more HARQ feedback bits for a first transport block of the two transport blocks first and then generate one or more second HARQ feedback bits for a second transport block of the two transport blocks. In general, the wireless device may generate HARQ feedback bits for one or more CBGs of a transport block first and then generate next HARQ feedback bits for one or more next transport block and so on.

In an example, a base station may transmit one or more RRC messages comprising/indicating configuration parameters. The configuration parameters may indicate a semi-static HARQ feedback mode (e.g., pdsch-HARQ-ACK-Codebook=semi-static) or a dynamic HARQ feedback mode (e.g., pdsch-HARQ-ACK-Codebook=dynamic).

In an example, a wireless device may be configured with dynamic HARQ feedback mode or HARQ-ACK codebook determination. Based on the dynamic HARQ feedback mode, the wireless device may multiplex of one or more HARQ-ACK feedback bits based on a PDSCH scheduled by a DCI format that does not include/comprise a counter DAI field. In an example, a wireless device may determine monitoring occasions for receiving DCI(s) of PDCCH(s) with one or more DCI formats scheduling PDSCH or SPS PDSCH release via an active downlink BWP of a serving cell. The wireless device may determine one or more HARQ-ACK/HARQ feedback bits in a same PUCCH in a slot n based on (1) a value of a PDSCH-to-HARQ feedback timing indicator field of a DCI format scheduling a PDSCH reception or a SPS PDSCH release; and (2) a slot offsets or timing offsets between a PDCCH/DCI and a PDSCH (e.g., K0) provided by a time domain resource assignment filed in a DCI format scheduling a PDSCH or a SPS PDSCH release; and (3) a number of slot aggregations for the PDSCH or the SPS PDSCH release.

For example, a wireless device may determine a set of PDCCH monitoring occasions for one or more DCI format that may schedule a PDSCH reception or a SPS PDSCH release. The set of PDCCH monitoring occasions may comprise one or more monitoring occasions based on one or more search spaces of an active DL BWPs of configured serving cells. The one or more monitoring occasions may be indexed in an ascending order of a start time of a search space associated or determining a PDCCH monitoring occasion. A cardinality of the set of PDCCH monitoring occasions may be defined as a total number M of the one or more monitoring occasions. A value of a counter DAI field in one or more DCI formats may represent an accumulative number of {serving cell, PDCCH monitoring occasion}-pair(s) where PDSCH reception or SPS PDSCH release associated with the one or more DCI formats up to a current PDCCH monitoring occasion.

A base station may update (e.g., increment by 1) a counter DAI value for each PDCCH monitoring occasion to indicate accumulative number of PDSCH receptions and/or SPS PDSCH release up to the each PDCCH monitoring occasion. The wireless device may determine an order of a DCI, based on the counter DAI in each PDCCH monitoring occasion.

When a wireless device may support more than a PDSCH reception per each PDCCH monitoring occasion (e.g., PDSCH-Numerber-perMOperCell is larger than 1), the wireless device may order (e.g., list) one or more PDSCH reception starting time for a same {serving cell, PDCCH monitoring occasion} pair. The wireless device may then order (e.g., list out in an order) PDCCH monitoring occasion or PDSCH receptions based on a serving cell index. The wireless device may then order PDCCH monitoring occasion index (based on a starting time of PDCCH monitoring occasion). When a wireless device is provided with ACKNACKFeedbackMode=JointFeedback, a first coreset pool index may be ordered first than a second coreset pool index for a same serving cell.

Figure 25:
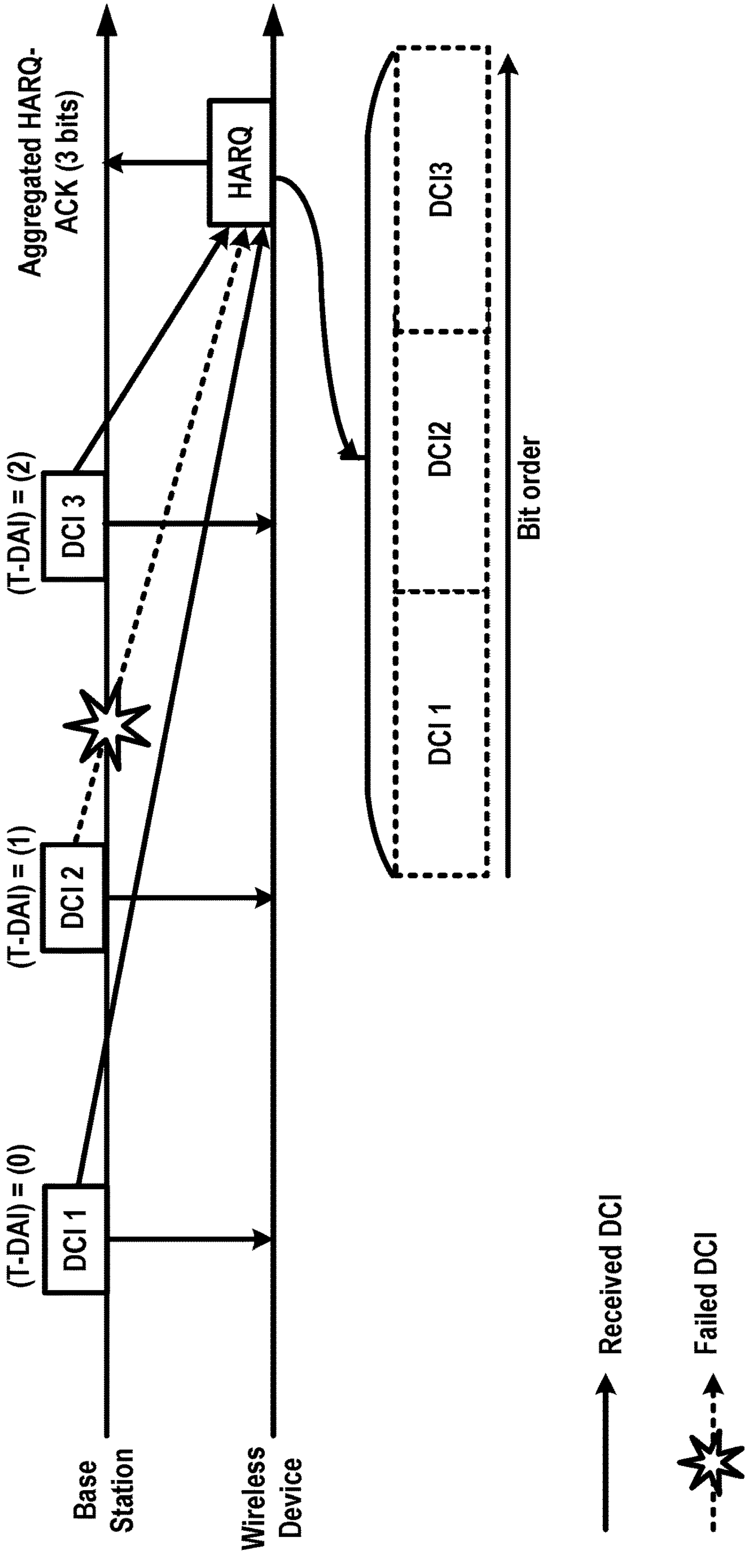
FIG. 25 illustrates an example of a HARQ-ACK codebook determination as per an aspect of an embodiment of the present disclosure.

In an example, a value of a total DAI may denote/represent a total number of {serving, PDCCH monitoring occasion}-pair(s) up to a current PDCCH monitoring occasion across one or more serving cells. FIG. 25 illustrates an example of a counter-DAI (C-DAI or DAI) and/or a total DAI (T-DAI) when a wireless device is configured with a single serving cell. For example, the wireless device may determine a first monitoring occasion (a left box), a second monitoring occasion (a middle box) and a third monitoring occasion (a right box) in FIG. 25. The wireless device may be scheduled/received DCI(s) based on one or more DCI formats via monitoring occasions (e.g., the first monitoring occasion, the second monitoring occasion, the third monitoring occasion). For example, the wireless device may receive a first DCI (DCI 1) via the first monitoring occasion where the first DCI indicates a DAI=0 and/or a T-DAI=0. The base station may set the DAI=0 and/or the T-DAI=0.

The wireless device may receive a third DCI (DCI 3) via the third monitoring occasion where the third DCI indicates a DAI=2 and/or a T-DAI=2. The first DCI and the third DCI may indicate a same PUCCH resource for HARQ feedback. The wireless device may generate a first HARQ feedback bit for a PDSCH or a SPS PDSCH release scheduled by the first DCI. The wireless device may generate a third HARQ feedback bit for a second PDSCH or a second SPS PDSCH release by the third DCI. The wireless device may not receive successfully a second DCI via the second monitoring occasion. The wireless device may determine a missed (e.g., failed to be received, failed in decoding, not received, failed) DCI (e.g., the second DCI) based on a DAI value of the third DCI.

The wireless device may generate NACK (e.g., negative ACK) for a third PDSCH or a third SPS PDSCH release. For example, the third PDSCH or the third SPS PDSCH release may have been scheduled via the second DCI. The wireless device may not receive the third PDSCH or the third SPS PDSCH release as the second DCI has not been received successfully.

The wireless device may generate 3 bits HARQ feedback bits, a first bit corresponding to the first DCI, a second bit for the second DCI and a third bit for the third DCI. The wireless device may determine a number of HARQ feedback/HARQ-ACK codebook based on a T-DAI or C-DAI of a most recent DCI for the PUCCH (or a PUCCH resource). The wireless device may transmit the HARQ feedback bits via the PUCCH or the PUCCH resource.

The wireless device may determine a first HARQ-ACK bit for a PDSCH scheduled by the first DCI or the first DCI (e.g., DCI1) in a HARQ-ACK codebook. The wireless device may determine a NACK for a second HARQ-ACK bit as the wireless device misses the second DCI. The wireless device may determine a third HARQ-ACK bit (e.g., DAI=2) for the third DCI.

Figure 26:
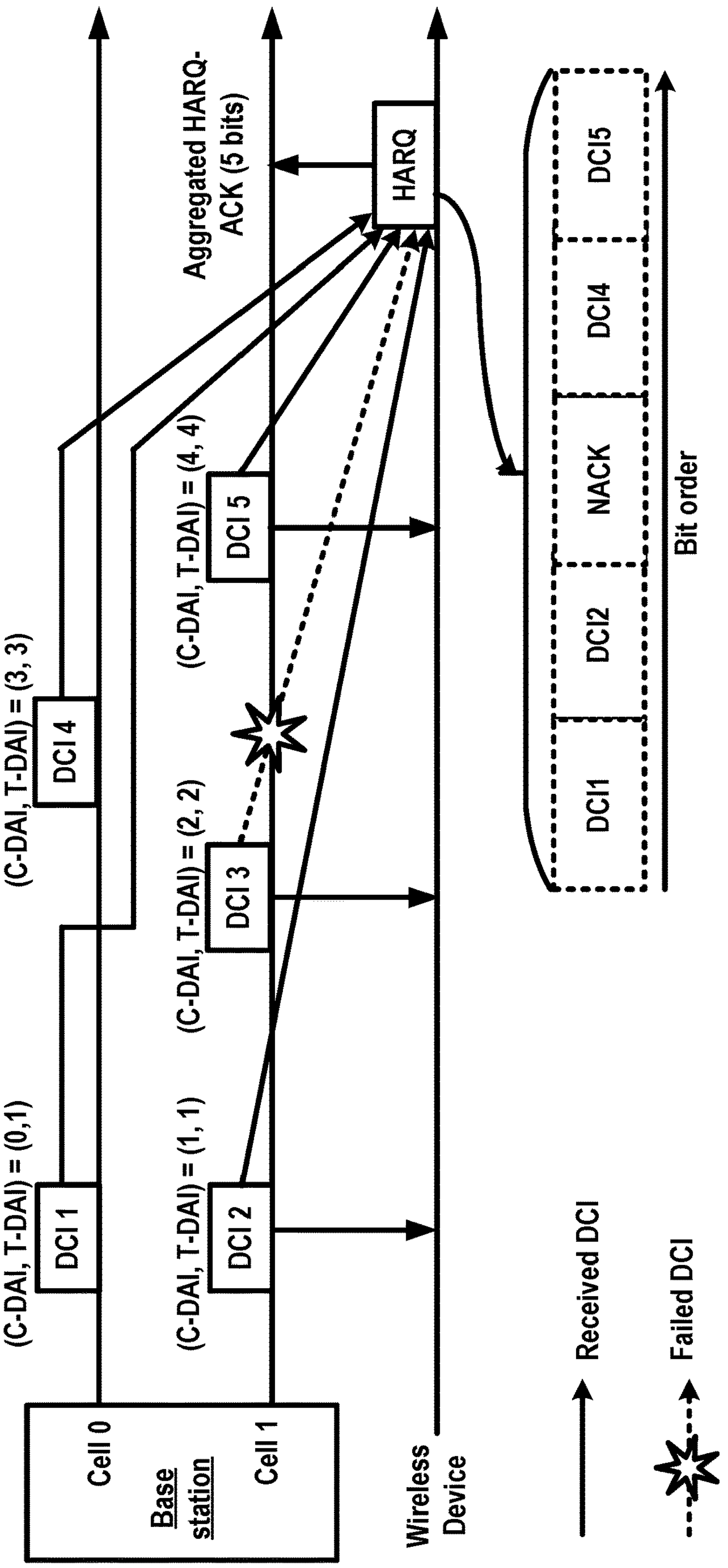
FIG. 26 illustrates an example of HARQ feedback determination with a plurality of serving cells as per an aspect of an embodiment of the present disclosure.

FIG. 26 illustrates an example of HARQ feedback/codebook determination when a wireless device is configured with a plurality of serving cells. For example, the wireless device may be configured with a first cell (Cell 0) and a second cell (Cell 1). For example, the wireless device may receive a first DCI via the first cell (DCI 1) that may indicate a DAI=0 and a T-DAI=1. The base station may determine a C-DAI (or DAI) and/or T-DAI for a DCI.

The T-DAI may accumulate a number of PDCCH monitoring occasions and/or a number of DCIs, across all serving cells, up to a current PDCCH monitoring occasion. A first monitoring occasion of the first cell may overlap and may have a same starting time to a first monitoring occasion of the second cell. A base station may set the T-DAI of the first DCI being two. The base station may set a T-DAI of a second DCI (DCI 2) via the second cell.

A DAI value of the second DCI may be set to 1 (e.g., counter DAI). For example, the base station may set the DAI value of the second DCI to 1. The wireless device may not receive successfully a third DCI (DCI3) that may indicate a T-DAI=2 and DAI=2. The wireless device may receive a fourth DCI (DCI4) with a T-DAI=3 and DAI=3.

The wireless device may receive a fifth DCI (DCI5) with a T-DAI=4 and DAI=4.

A value of a T-DAI may be wrapped around (e.g., modulo operation, such as a modulo n, which may be expressed as a mod n or a % n) when it reaches a maximum value (e.g., n) or a threshold (e.g., a maximum value=4 based on 2 bits of T-DAI field, a maximum value=2^K or 2^K−1 where K is a number of bits used for a T-DAI field in a DCI format). The wireless device may determine HARQ-ACK bits as follows. For example, actual value of T-DAI and C-DAI vale may be 0 for the fifth DCI based on the wrapping up mechanism (e.g., 4 mod 4=4% 4=0 when n is 4, an actual value may be determined based on modulo n, where n is 2^K with K bits used for a DAI field).

For example, for each PDCCH monitoring occasion (e.g., a first PDCCH monitoring occasion is a first time when the wireless device may monitor a first monitoring occasion via the first cell and a first monitoring occasion via the second cell), the wireless device may determine a number of HARQ-ACK feedback bits for each serving cell based on a cell index (e.g., determine the first cell and then determine the second cell when an index of the first cell is lower than an index of the second cell).

For example, a PDCCH monitoring occasion may indicate a starting time in a slot where a wireless device may start monitoring one or more PDCCH candidates via a monitoring occasion of a serving cell. For example, a PDCCH monitoring occasion may indicate a monitoring occasion determined/configured based on a search space configuration.

For example, the wireless device may determine a number of HARQ-ACK bits for a serving cell based on a DAI field of the each PDCCH monitoring occasion. For example, the wireless device may determine a bit index among HARQ-ACK bits to put ACK or NACK for a transport block or a SPS PDSCH release scheduled by a DCI for the serving cell, where the wireless device may receive the DCI via the each PDCCH monitoring occasion.

The wireless device may determine a first HARQ-ACK bit for a transport block of the first cell at the first PDCCH monitoring occasion. The wireless device may determine a second HARQ-ACK bit for a transport block of the second cell at the first PDCCH monitoring occasion. The wireless device may move to a next PDCCH monitoring occasion which occurs after the first monitoring occasion but occur before other monitoring occasions.

In FIG. 26, the wireless device may determine a second monitoring occasion via the first cell as the wireless device may not detect any DCI via a second monitoring occasion via the second cell. The wireless device may determine a third HARQ ACK bit corresponding to a PDSCH or a SPS PDSCH release scheduled via the fourth DCI (DCI 4). The wireless device may move to a next PDCCH monitoring occasion, where the wireless device receives a DCI with a DAI value. For example, the wireless device may determine a third monitoring occasion via the second cell as the next PDCCH monitoring occasion. The wireless device may determine a fourth HARQ ACK bit corresponding to a PDSCH or a SPS PDSCH scheduled by the fifth DCI (DCI5).

The wireless device may determine a total DAI value for a PUCCH resource, based on a last DCI received for the PUCCH resource. For example, the fifth DCI may be a last DCI that the wireless device receives for the PUCCH resource in FIG. 26. The fifth DCI indicates a T-DAI=4 that may indicate five DCIs have been scheduled up to the current PDCCH monitoring occasion.

The wireless device may determine a number of HARQ-ACK bits based on the T-DAI of the last DCI.

The wireless device may determine an order (e.g., a bit order) of each DCI or a PDSCH scheduled by the each DCI based on a C-DAI value of the each DCI. For example, a bit order of the fourth DCI (DCI 4) is 3, the wireless device may place a HARQ-ACK bit for the fourth DCI in a bit with index 3 as shown in FIG. 26.

The wireless device may determine NACK for a missed DCI between the second DCI and the fourth DCI. The wireless device may generate aggregated HARQ-ACK feedback by ascending order of a start time of a PDCCH monitoring occasion (e.g., the first DCI, the second DCI➔ (the third DCI➔) the fourth DCI➔ the fifth DCI) and for each PDCCH use monitoring occasion based on a cell index (e.g., the first cell➔ the second cell in the first monitoring occasion).

The wireless device may determine a bit order of HARQ-ACK feedback for one or more DCIs/PDSCHs based on C-DAI/T-DAI values of the one or more DCIs.

If the wireless device may be configured with a plurality of coreset pool indexes for a serving cell, the wireless device may further order based on a coreset pool index (e.g., a first coreset pool➔ a second coreset pool). When a wireless device may be configured with a plurality of transport blocks for any serving cell, the wireless device may determine two ACK and/or NACK bits for each PDCCH monitoring occasion of a serving cell. The wireless device may transmit 5 bits of HARQ ACK feedback corresponding to an order of DCI1, DCI2, DCI3, DCI4 and DCI5.

In an example, a wireless device may transmit a HARQ-ACK information (e.g., a HARQ-ACK codebook, one or more HARQ-ACK codebooks, and/or the like) in a PUCCH resource in a slot n. The wireless device may determine a bitmap of ACK-NACK information. The bitmap of ACK-NACK information may comprise a HARQ-ACK codebook, where the HARQ-ACK codebook may comprise one or more HARQ-ACK sub-codebooks. For example. The bitmap of ACK-NACK information may comprise one or more HARQ-ACK codebooks.

For example, the wireless device may generate a first bitmap for a first HARQ-ACK sub-codebook. The wireless device may generate a second bitmap for a second HARQ-ACK sub-codebook. For example, the wireless device may generate the first bitmap for a first HARQ-ACK codebook. The wireless device may generate the second bitmap for a second HARQ-ACK codebook. A PUCCH may comprise a HARQ-ACK codebook comprising one or more HARQ-ACK sub-codebooks. A PUCCH may comprise one or more HARQ-ACK codebooks.

For example, a wireless device may perform encoding based on a HARQ-ACK codebook. When a HARQ-ACK codebook comprises a plurality of HARQ-ACK sub-codebooks, the wireless device may append the plurality of HARQ-ACK sub-codebooks before performing encoding.

Example embodiments may generate a plurality of HARQ-ACK sub-codebooks for a HARQ-ACK codebook. Example embodiments may generate a plurality of HARQ-ACK codebooks, where each HARQ-ACK codebook, of the plurality of HARQ-ACK codebooks, may correspond to a HARQ-ACK sub-codebook of the examples.

In an example, a wireless device may generate a HARQ-ACK codebook comprising one or more HARQ-ACK sub-codebooks. The wireless device may encode the HARQ-ACK codebook and may transmit the encoded bits via a PUCCH resource.

For example, a first HARQ-ACK sub-codebook (e.g., a codebook, a sub-codebook, a first HARQ-ACK codebook) may correspond to one or more downlink channels (e.g., PDSCH), where each downlink channel carries one or more transport blocks. A second HARQ-ACK sub-codebook may correspond to one or more second downlink channels (e.g., PDSCH), where each second downlink channel carries one or more code block groups (CBGs).

For the first HARQ-ACK sub-codebook, the wireless device may generate P1 bits of ACK-NACK bits for a downlink channel of the one or more downlink channels. For example, P1 may be 1 in response to a number of transport block for a slot (e.g., maxNrofCodeWordsScheduledByDCI=1) being one. For example, P1 may be 2 in response to a number of transport block for a slot (e.g., maxNrofCodeWordsScheduledByDCI=2) being two. For example, the wireless device may generate P1 bits of ACK-NACK bit(s) for each DAI value based on counter DAI and/or T-DAI for the first HARQ-ACK sub-codebook.

For the second HARQ-ACK sub-codebook, the wireless device may generate P2 bits of ACK-NACK bits for a downlink channel of the one or more second downlink channels. For example, P2 may be M in response to a number of transport block for a slot (e.g., maxNrofCodeWordsScheduledByDCI=1) being one and a number of maximum CBGs configured to a serving cell being M. For example, P2 may be 2*M in response to a number of transport block for a slot (e.g., maxNrofCodeWordsScheduledByDCI=2) being two and a number of maximum CBGs configured to a serving cell being M. For example, the wireless device may generate P2 bits of ACK-NACK bit(s) for each DAI value based on counter DAI and/or T-DAI for the second HARQ-ACK sub-codebook.

In an example, the wireless device may determine a first C-DAI/T-DAI for the first HARQ-ACK sub-codebook. The wireless device may determine a second C-DAI/T-DAI for the second HARQ-ACK sub-codebook.

In an example, a wireless device may be configured with a first cell and a second cell. The first cell and the second cell may be activated. A base station may transmit one or more RRC messages indicating configuration parameters. The configuration parameters may indicate/comprise a number of CBGs for the second cell. The wireless device may determine a DCI format, for the second cell, comprising a CBG transmission information (CBGTI). The CBGTI may be a bitmap, where each bit may correspond to each CBG of one or more CBGs, where a number of the one or more CBGs may be limited by the number of CBGs configured for the second cell. The base station may not configure a CBG transmission for the first cell. The base station may transmit a second DCI format, for the first cell, based on a transport block transmission.

The wireless device may not be configured with a third DCI format, for the second cell, where the third DCI format may schedule resources of the second cell based on a transport block transmission.

The wireless device may receive a first DCI indicating downlink resources, of a first downlink channel, of the first cell with a PUCCH resource. The wireless device may receive a second DCI indicating second downlink resources, of a second downlink channel, of the second cell with the PUCCH resource. The wireless device may determine a first HARQ-ACK sub-codebook comprising ACK-NACK bit(s) corresponding to the first downlink channel. The wireless device may determine a second HARQ-ACK sub-codebook comprising ACK-NACK bit(s) corresponding to the second downlink channel. The wireless device may append the second HARQ-ACK sub-codebook to the first HARQ-ACK sub-codebook. The wireless device may transmit the appended bits via the PUCCH resource.

When a wireless device is configured with a multi-PDSCH scheduling for a serving cell, a DCI (e.g., one DCI, a single DCI, etc.) may schedule a plurality of PDSCHs via resources of the serving cell. The wireless device may receive one or more transport blocks (TBs) via the plurality of PDSCHs. The base station may need a feedback (e.g., ACK or NACK) for a TB of the one or more transport blocks. The base station may retransmit one or more second TBs of the one or more TBs, where the base station receives negative feedbacks for the one or more second TBs. The base station may transmit a first DCI scheduling a first number of PDSCHs at a first time. The base station may transmit a second DCI scheduling a second number of PSCHs at a second time. As the number of PDSCHs schedulable by each DCI may vary, a wireless device may not be able to easily determine the number of HARQ-ACK feedback bits corresponding to a single DCI when the wireless device fails to receive the single DCI.

In an example, a wireless device may determine a number of HARQ-ACK feedback bits based on one or more DAI values of one or more DCIs based on the one or more DCI formats via the set of PDCCH monitoring occasions. The wireless device may further determine the number of HARQ-ACK feedback bits based on one or more total DAI (T-DAI) values of the one or more DCIs based on the one or more DCI formats via the set of PDCCH monitoring occasions, if total DAI values are available. For example, the wireless device may determine a PDCCH monitoring occasion that may comprise one or more primary monitoring occasions of one or more serving cells.

In existing technologies, a base station may increment C-DAI and/or T-DAI of a multi-PDSCH DCI by a constant value C (e.g., C=1) from a previous C-DAI/T-DAI value indicated by a previous DCI. The base station may increment by C regardless how many PDSCH(s) the previous DCI has scheduled. For example, a wireless device may generate a fixed number of HARQ-ACK bits corresponding to each DCI scheduling resources for a serving cell, configured with a multi-PDSCH scheduling. For example, the fixed number may be same to a second serving cell not configured with a multi-PDSCH scheduling. For example, the fixed number may be same to a third cell configured with a CBG scheduling and not being configured with a multi-cell scheduling. The wireless device may generate the fixed number of HARQ-ACK bits for the serving cell regardless a number of PDSCHs scheduled by a DCI. The wireless device may generate the fixed number of HARQ-ACK bits for the serving cell even when the wireless device may have not received any DCI scheduling resources for the serving cell.

When the fixed number of HARQ-ACK bits is small (e.g., 1 or 2 depending on maxNrofCodeWordsScheduledByDCI), the wireless device may need to aggregate multiple HARQ-ACK bits, of multiple PDSCHs scheduled by a DCI, within 1 or 2 bits. This may reduce reliability of HARQ-ACK bits and may lead more retransmissions.

When the fixed number of HARQ-ACK bits is large (e.g., a maximum number of CBGs M), the wireless device may need to generate a large size of ACK-NACK bits regardless of actual number of PDSCHs scheduled by a DCI. This may increase a HARQ-ACK codebook size and may reduce performance of a HARQ-ACK feedback. Handling various number of PDSCHs scheduled by each multi-PDSCH DCI may require an enhancement in a HARQ-ACK codebook generation/determination.

In an example, a wireless device may determine/generate a HARQ-ACK codebook. The HARQ-ACK codebook may comprise a plurality of HARQ-ACK sub-codebooks. Each HARQ-ACK sub-codebook may comprise one or more HARQ-ACK entries (e.g., a HARQ-ACK entry may comprise one or more HARQ-ACK bits).

For example, each HARQ-ACK entry may correspond to a PDCCH monitoring occasion (in e.g., a slot, a mini-slot, a frame, a sub-frame, a span). For example, each HARQ-ACK entry may correspond to a downlink assignment index (e.g., each HARQ-ACK entry corresponds to a single DAI value). Each HARQ-entry may correspond to a DCI that the base station schedules.

Each HARQ-ACK entry may have a fixed size of a bitmap. For example, a first HARQ-ACK sub-codebook may have one or more first HARQ-ACK entries, where each of the one or more first HARQ-ACK entries has 1 or 2 bits (based on maxNrofCodeWordsScheduledByDCI configuration). The first HARQ-ACK sub-codebook is a sub-codebook with a first index (e.g., the first index=0). For example, a second HARQ-ACK sub-codebook may have one or more second HARQ-ACK entries, where each of the one or more second HARQ-ACK entries has M or 2*M bits (based on maxNrofCodeWordsScheduledByDCI configuration), where M is a maximum number of CBGs configured via one or more serving cells. The second HARQ-ACK sub-codebook is a sub-codebook with a second index (e.g., the second index=1).

For example, a third HARQ-ACK sub-codebook may have one or more third HARQ-ACK entries, where each of the one or more third HARQ-ACK entries has N or 2*N bits (based on maxNrofCodeWordsScheduledByDCI configuration), where N is a maximum number of PDSCHs scheduled by a multi-PDSCH DCI. The wireless device may determine the maximum number of PDSCHs among one or more maximum number of PDSCHs scheduled by a multi-PDSCH DCI across one or more serving cells configured with a multi-PDSCH scheduling. The third HARQ-ACK sub-codebook is a sub-codebook with a third index (e.g., the second index=2). In an example, the HARQ-ACK codebook may further comprise one or more fourth HARQ-ACK sub-codebooks, where a size of an entry of a HARQ-ACK sub-codebook of the one or more fourth HARQ-ACK sub-codebooks may be between [M, N] or [2M, 2N] (based on maxNrofCodeWordsScheduledByDCI configuration).

Each HARQ-ACK Entry May have a Variable Size.

The wireless device may receive a multi-PDSCH DCI scheduling resources for one or more PDSCHs for the serving cell. The wireless device may determine an index of a HARQ-ACK sub-codebook based on one or more criteria.

For example, a criterion of the one or more criteria may be based on a number of PDSCHs scheduled by the multi-PDSCH DCI. For example, the number of PDSCHs is smaller than or equal to K1 (e.g., a TB_HARQ_Threshold), the index is determined as zero. The number of PDSCHs is between (the TB_HARQ_Threshold, and M (CBG_HARQ_Threshold), the index is determined as one. The number of PDSCHs is larger than CBG_HARQ_Threshold, the index is determined as two.

For example, a criterion of the one or more criteria may be based on a comparison between a number of PDSCHs (P) scheduled by the multi-PDSCH DCI and a threshold. For example, the threshold may be configured by the base station via RRC/MAC-CE/DCI signaling. In response to the number of PDSCHs being smaller than or equal to the threshold, the index is determined as zero. Otherwise, the index is determined as one.

For example, a criterion of the one or more criteria may be based on whether a serving cell, of the multi-PDSCH scheduling, is configured with a CBG transmission. When the serving cell is configured with the CBG transmission, the wireless device may determine the index as one for the one or more PDSCHs. Otherwise, the wireless device may determine the index as zero for the one or more PDSCHs.

The wireless device may generate P number of HARQ-ACK bits corresponding to the multi-PDSCH DCI based on the index of the HARQ-ACK sub-codebook. For example, the wireless device may aggregate (e.g., multiplex, AND/OR operation) P number of HARQ-ACK bits to 1 or 2 bits in response to the index being zero. The wireless device may generate, based on the P number of HAQ-ACK bits, M or 2M bits in response to the index being one. The wireless device may generate, based on the P number of HAQ-ACK bits, N or 2N in response to the index being two.

The base station may increment a first DAI/T-DAI by 1 (or a predetermined value, such as 1, 2, etc.) in each of one or more DCIs, wherein the each schedules a single PDSCH based on a TB scheduling (e.g., no CBG is configured/applied for the DCI), for the first HARQ-ACK sub-codebook. The base station may increment a first DAI/T-DAI by 1 (or a predetermined value, such as 1, 2, etc.) in each of one or more DCIs, wherein the each schedules one or more PDSCHs based on a TB scheduling (e.g., no CBG is configured/applied for the DCI), for the first HARQ-ACK sub-codebook.

For example, the first DAI/T-DAI may be transmitted via one or more DCI fields of a DCI format. A maximum value of the first DAI/T-DAI may be determined based on one or more sizes of the one or more DCI fields. The base station may use a function of modulo n (e.g., a wrapping around function, a round-up function), where n is determined based on a size of a DCI field for the DAI or T-DAI (e.g., n=4). When the base station increments from a previous DAI=n−1 to a current DAI, based on a modulo function, the base station may set the current DAI=0.

The base station may increment a second DAI/T-DAI by 1 (or a predetermined value, such as 1, 2, etc.) in each one or more second DCIs, where each of the second DCIs schedules a single PDSCH based on a CBG scheduling. The base station may increment the second DAI/T-DAI by 1 (or a predetermined value, such as 1, 2, etc.) in each of one or more second DCIs, where each of the second DCIs schedules one or more PDSCHs based on a multi-PDSCH scheduling. The base station may increment the second DAI/T-DAI by 1 (or a predetermined value, such as 1, 2, etc.) in each of one or more second DCIs, each of the second DCIs schedules up to M PDSCHs.

The base station may increment a third DAI/T-DAI by 1 (or a predetermined value, such as 1, 2, etc.) in each of one or more third DCIs, where each of the third DCIs schedules more than M PDSCHs, for the third HARQ-ACK sub-codebook.

Example embodiments may allow selecting a minimum size of a HARQ-ACK feedback for a multi-PDSCH DCI based on an actual number of scheduled PDSCHs. Example embodiments may determine a closest fixed number of HARQ-ACK bits for a multi-PDSCH DCI, based on the actual number of scheduled PDSCHs. Example embodiments may reduce HARQ-ACK overhead with a multi-PDSCH scheduling. Example embodiments may allow flexible multiplexing of the multi-PDSCH scheduling with a CBG transmission. Example embodiments may reduce ambiguity between a base station and a wireless device when one or more DCIs, with varying number of scheduled PDSCHs, are missed (e.g., failed to be received). Example embodiments may minimize HARQ-ACK overhead caused by a multi-PDSCH scheduling, particularly when a maximum number of PDSCHs scheduled by a DCI is large.

In the specification, one or more RRC messages may comprise/indicate configuration parameters in response to the one or more RRC messages comprising the configuration parameters themselves and/or the one or more RRC messages comprising one or more parameter fields that point to configuration parameters and/or the one or more RRC messages comprising one or more parameters, where the wireless device may determine the configuration parameters based on the one or more parameters.

Figure 27:
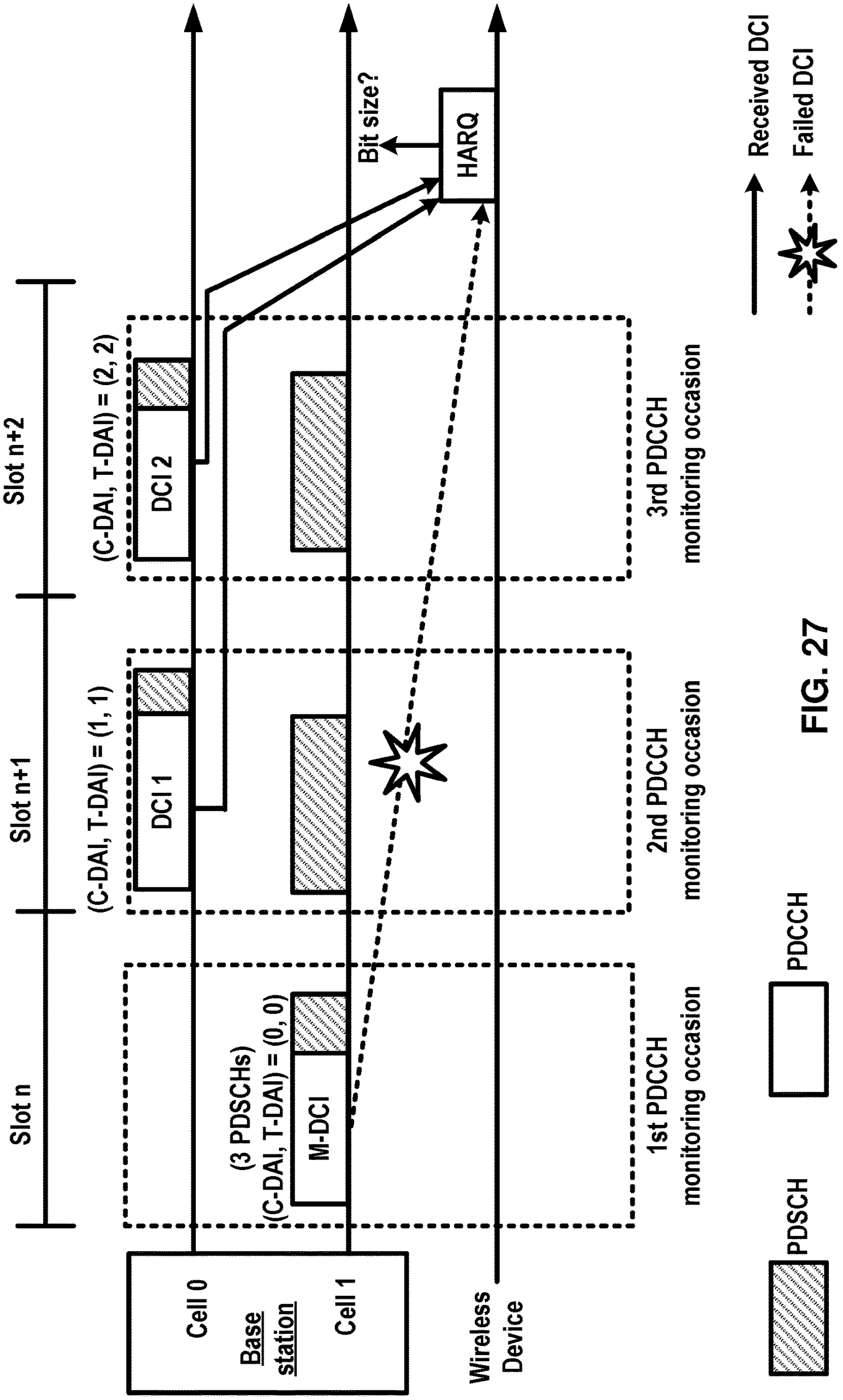
FIG. 27 illustrates an example scenario of a HARQ-ACK codebook with a multi-PDSCH scheduling as per an aspect of an embodiment of the present disclosure.

FIG. 27 illustrates an example scenario of a HARQ-ACK codebook with a multi-PDSCH scheduling as per an aspect of an embodiment of the present disclosure. A base station may transmit one or more RRC messages comprising/indicating configuration parameters. The configuration parameters may indicate/comprise a first cell (Cell 0) and a second cell (Cell 1) to a wireless device. The configuration parameters may indicate/comprise one or more first search spaces of the first cell. For example, a monitoring occasion based on the one or more first search spaces may occur (or be present) in a slot n. The configuration parameters may indicate/comprise one or more second search spaces of the second cell. For example, three monitoring occasions, based on the one or more second search spaces, may occur (or may be configured to be monitored) in the slot n, a slot n+1 and a slot n+2. (A monitoring occasion of the slot n may not be shown in FIG. 27).

The base station may transmit a first DCI (M-DCI) via a first monitoring occasion of the second cell in the slot n. The first DCI may schedule three PDSCHs over the slot n–n+2. The first DCI may indicate a PUCCH resource for a HARQ-ACK feedback for the three PDSCHs. The base station may transmit a second DCI (DCI 1) scheduling a single PDSCH in the slot n+1. The base station may transmit a third DCI (DCI 2) scheduling a second single PDSCH in the slot n+2.

For example, when a DAI is incremented per a PDCCH monitoring occasion with a scheduling DCI, the first DCI may initialize a C-DAI/T-DAI (e.g., C-DAI=0, T-DAI=0). The base station may reset a C-DAI value and a T-DAI value of a DCI for a PUCCH resource. For example, the DCI is first DCI scheduling downlink data where a HARQ-ACK feedback corresponding to the downlink data is scheduled to be transmitted via the PUCCH resource. For a second DCI indicating the PUCCH resource, the base station may increment (e.g., based on a modulo n) a C-DAI and/or a T-DAI value. The base station may increment the C-DAI/T-DAI value for the second DCI (e.g., C-DAI=1 and T-DAI=1). The base station may increment, by a constant value (e.g., 1), the C-DAI/T-DAI value of the third DCI from a previous C-DAI/T-DAI value of a previous DCI (e.g., the previous DCI is the second DCI, the pervious C-DAI/T-DAI value is C-DAI=0 and T-DAI=0). The second DCI and the third DCI may also indicate the PUCCH resource.

The wireless device may receive the second DCI and the third DCI. The wireless device may fail to receive (e.g., fail to detect and/or decode unsuccessfully) the first DCI (e.g., the entire DCI or a part of the DCI). When a base station may increment C-DAI/T-DAI by 1 in each PDCCH monitoring occasion regardless of whether a PDCCH monitoring occasion is for a single-PDSCH DCI or a multi-PDSCH DCI, an ambiguity may occur.

For example, when the wireless device receives the second DCI with C-DAI/T-DAI=1/1, the wireless device may determine the wireless device has missed a DCI (e.g., missed-DCI) before the second DCI.

The wireless device may, however, not be able to determine whether the missed-DCI is a multi-PDSCH DCI or a single-PDSCH DCI (e.g., a fallback DCI). The wireless device may determine a plurality of HARQ-ACK bits in response to determining the missed-DCI being the multi-PDSCH DCI. The wireless device may determine a single HARQ-ACK bit in response to determining the missed-DCI being the single-PDSCH DCI. Based on the determination, a size of a HARQ-ACK codebook, via the PUCCH resource, may change. This may cause complexity for a base station or may cause ambiguity in the HARQ-ACK codebook. This may degrade a performance of the HARQ-ACK feedback.

For example, when the wireless device does not receive the first DCI, the wireless device may not be able to know how many PDSCHs scheduled by the first DCI. The wireless device may need to assume (e.g., apply a default) a fixed number of PDSCH(s) scheduled by one or more DCIs sharing a DAI counting procedure (e.g., use a same DAI counter). In FIG. 27, the first DCI, the second DCI, and the third DCI share a DAI counter (procedure) (e.g., incremented for each DCI).

In an example, the base station and the wireless device may consider the fixed number may be 1 (e.g., a first number of HARQ-ACK bits for a multi-PDSCH DCI may be same as a second number of HARQ-ACK bits for a single-PDSCH DCI). The wireless device may generate a single bit ACK or NACK bit for one or more PDSCHs (e.g., when maxNrofCodeWordsScheduledByDCI=1 is configured). The wireless device may generate two bits ACK/NACK bits for the one or more PDSCHs (e.g., when maxNrofCodeWordsScheduledByDCI=2 is configured).

For example, the one or more PDSCHs may indicate three PDSCHs scheduled by the first DCI. For example, the one or more PDSCHs may be scheduled by a multi-PDSCH DCI. The wireless device may generate ACK when the wireless device receives successfully the one or more PDSCHs (or one or more TBs carried via the one or more PDSCHs). The wireless device may generate NACK when the wireless device may fail to receive at least one PDSCH of the one or more PDSCHs (or at least one TB of the one or more TBs). The wireless device may generate a HARQ-ACK bit for a first codeword of each TB or each PDSCH. The wireless device may generate a second HARQ-ACK bit for a second codeword of the each TB or the each PDSCH (if maxNrofCodeWordsScheduledByDCI=2 is configured).

Based on the fixed number being 1 or 2 (e.g., a TB_HARQ_Threshold), the wireless device may suppress/aggregate one or more HARQ-ACK bits of the one or more PDSCHs to 1 or 2 HARQ-ACK bits. This may decrease reliability of a HARQ-ACK feedback by aggregating ACK/NACK information of multiple TBs.

In an example, the base station and the wireless device may consider the fixed number may be N (e.g., a maximum number of PDSCHs scheduled by a multi-PDSCH DCI configured for one or more serving cells). Based on it, the wireless device may generate 3*N bits for the HARQ-ACK feedback where the wireless device may generate M=P*N HARQ-ACK bits (e.g., P=a last T-DAI value for the PUCCH resource). This may significantly increase overhead of a HARQ-ACK feedback.

In an example, a base station and a wireless device may use a first C-DAI/T-DAI counter (or a first DAI counter procedure) for one or more single-PDSCH DCIs (e.g., DCIs may schedule a single PDSCH, or DCIs are configured to schedule a single PDSCH). The base station and the wireless device may use a second C-DAI/T-DAI counter (or a second DAI counter procedure) for one or more multi-PDSCH DCIs (e.g., DCIs may schedule a plurality of PDSCHs, or DCIs are configured to schedule one or more PDSCHs).

For example, in FIG. 27, when separate DAI counters are used between single PDSCH DCIs and multi-PDSCH DCIs, a C-DAI/T-DAI value for the second DCI may be C-DAI=0 and T-DAI=0. A C-DAI/T-DAI value for the third DCI may be C-DAI=1 and T-DAI=1. The base station may reset C-DAI/T-DAI for the second DCI as the second DCI is a first DCI, for the PUCCH resource, based on a single-PDSCH DCI.

The wireless device may generate a first HARQ-ACK sub-codebook based on the first C-DAI/T-DAI counter procedure. For example, the wireless device may produce 2 HARQ-ACK entries for the first HARQ-ACK sub-codebook based on examples of FIG. 27.

The wireless device may generate a second HARQ-ACK sub-codebook based on the second C-DAI/T-DAI counter procedure. In FIG. 27, as the wireless device misses the first DCI, the wireless device may not generate the second HARQ-ACK sub-codebook.

In the example, when the wireless device may fail to receive the first DCI, the wireless device may transmit 2 bits of HARQ-ACK bits based on the first HARQ-ACK sub-codebook. This may lead ambiguity in terms of a HARQ-ACK bit size when a DCI is missed. Additionally, a fixed number of HARQ-ACK bits is used for a multi-PDSCH DCI, drawback with the fixed number may also present with the embodiment.

In an example, a base station may transmit one or more RRC messages indicating configuration parameters. The configuration parameters may indicate/comprise a plurality of serving cells comprising a first cell and a second cell for a wireless device. The configuration parameters may indicate/comprise a multi-PDSCH scheduling for the first cell. The configuration parameters may indicate/comprise a CBG based transmission for the second cell. The configuration parameters may indicate/comprise a parameter (e.g., maxCodeBlockGroupsPerTransportBlock=M) indicating a maximum number of CBGs or a number of CBGs in a DCI format, used for scheduling resources for the second cell. The first cell and/or the second cell may be configured with up to two codewords (e.g., maxNrofCodeWordsScheduledByDCI=2).

The configuration parameters may indicate/comprise one or more first coresets and/or one or more first search spaces. The configuration parameters may comprise/indicate a first DCI format, used for a multi-PDSCH scheduling, for the first cell, associated with the one or more first search spaces. The configuration parameters may indicate/comprise one or more second coresets and/or one or more second search spaces. The configuration parameters may comprise/indicate a second DCI format, used for a CBG based scheduling, for the second cell, associated with the one or more second search spaces.

The wireless device may receive a first DCI, based on the second DCI format, indicating resources, of the first cell, for one or more PDSCHs at a first time. The first DCI may indicate a PUCCH resource for the one or more PDSCHs. The first DCI may comprise a PDSCH-to-HARQ_feedback timing indicator (e.g., PDSCH-to-HARQ in FIG. 19) indicating a timing offset between (i) last PDSCH of the one or more PDSCHs and (ii) the PUCCH resource. The timing offset may be determined/applied from a slot (or a symbol) of the last PDSCH to a starting slot (or a starting symbol) of the PUCCH resource.

The first DCI may comprise a field of a time domain resource allocation (e.g., time domain RA in FIG. 19) indicating the resources via one or more slots for the one or more PDSCHs. Each PDSCH of the one or more PDSCHs may be scheduled via each slot of the one or more slots. One or more second PDSCHs of the one or more PDSCHs may be scheduled via a slot of the one or more slots. A PDSCH of the one or more PDSCHs may be scheduled via one or more second slots of the one or more slots.

For example, an entry of a TDRA table may comprise one or more fields, where each of the one or more fields may indicate a time domain resource of a PDSCH of the one or more PDSCHs. For example, an entry of a TDRA table may comprise one or more fields, where each of the one or more fields may indicate a time domain resource of the one or more second PDSCHs of the slot. For example, an entry of a TDRA table may comprise one or more fields, where each of the one or more fields may indicate a time domain resource for the PDSCH mapping to the one or more second slots. The wireless device may determine resources of each PDSCH based on the entry of the TDRA table, where the first DCI indicates the entry via the time domain RA field.

In the specification, DCI or multi-PDSCH DCI or single-PDSCH DCI may comprise a C-DAI field and/or a T-DAI field. Embodiments may be applied when a type-2 HARQ-ACK codebook determination is configured of the PUCCH group. Embodiments may be applied when a type-3 HARQ-ACK codebook determination is configured for the PUCCH group. A multi-PDSCH DCI may refer to a DCI indicating resources for one or more PDSCHs. The single-PDSCH DCI may refer to a DCI indicating resources for a single PDSCH. The multi-PDSCH DCI may be based on a multi-PDSCH DCI format. The single PDSCH DCI may be based on a single PDSCH DCI format or a fallback DCI format.

The configuration parameters may comprise pdsch-HARQ-ACK-Codebook being configured as dynamic or comprise pdsch-HARQ-ACK-Codebook-r16.

The wireless device may determine a number of PDSCHs of the one or more PDSCHs based on the first DCI. For example, the wireless device may determine a number of slots, where the one or more PDSCHs are scheduled. For example, when the first DCI schedules resources from slot n to slot n+K for the one or more PDSCHs, the wireless device may determine the number of PDSCHs as K+1. The wireless device may count a number of consecutive slots of first PDSCH, of the one or more PDSCHs, and last PDSCH of the one or more PDSCHs. The wireless may count a number of slots, where any PDSCH of the one or more PDSCHs is scheduled. The wireless device may count a number of the one or more PDSCHs, where the first DCI indicates resources for each of the one or more PDSCHs.

The wireless device may count a number of one or more second PDSCHs of the one or more PDSCHs, where each of the one or more second PDSCHs comprises a transport block (e.g., the each of the one or more second PDSCHs is not skipped).

The wireless device may determine a PDSCH is skipped based on a SLIV entry corresponding to the PDSCH or based on a combination of one or more DCI fields. The wireless device may count the number of un-skipped (e.g., non-skipped, delivered, transmitted) or transmitted PDSCHs. The wireless device may determine the number of PDSCHs based on a field by the first DCI. the first DCI may comprise the field indicating the number of PDSCHs scheduled by the first DCI.

For a PUCCH resource and/or a HARQ-ACK feedback and/or a HARQ-ACK codebook (e.g., HARQ codebook, HARQ feedback), the wireless device may generate a first HARQ sub-codebook and a second HARQ sub-codebook. The first HARQ sub-codebook may not be present when there is no PDSCH scheduled based on a first category. The second HARQ sub-codebook may not be present when there is no PDSCH scheduled based on a second category. For example, a category may comprise one or more cases (e.g., conditions, examples). The wireless device may determine which category a DCI satisfies based on the one or more cases. For example, the first category may be satisfied when the DCI satisfies at least one of the one or more first cases/conditions. For example, the second category may be satisfied when the DCI satisfies at least one of the one or more second cases/conditions. For example, the second category may be satisfied when the DCI does not satisfy the one or more first cases/conditions and satisfies at least one of the one or more second cases/conditions.

The first category may comprise the one or more first cases/conditions. For example, a case, of the one or more first cases/conditions, may be based on an applicability of a multi-PDSCH scheduling and a CBG transmission. For example, when a scheduled cell, of a DCI, is configured with a single-PDSCH scheduling (e.g., not configured with a multi-PDSCH scheduling) and a TB-based transmission (e.g., not configured with a CBG transmission), the wireless device may determine the case of the first category are satisfied for the DCI.

For example, a case, of the one or more first cases/conditions, may be based on a DCI format. For example, when a DCI is based on a fallback DCI format (e.g., DCI format 10), the wireless device may determine the case of the first category are satisfied for the DCI.

For example, a case, of the one or more first cases/conditions, may be based on a number of PDSCHs scheduled by a DCI. When the number of PDSCHs is smaller than or equal to K1, the wireless device may determine a scheduling DCI or one or more PDSCHs scheduled by the scheduling DCI satisfies the case of the first category.

In the example, the third cell may be configured with a multi-PDSCH scheduling. The multi-PDSCH DCI may be based on the first DCI format (e.g., a multi-DPSCH DCI format). The multi-PDSCH may indicate resources for the one or more third PDSCHs. In the example, a number of transport blocks, via the one or more third PDSCHs, may be smaller than or equal to K1 (e.g., TB_HARQ_Threshold, a first threshold). For example, K1 may be 2, in response to any serving cell of one or more serving cells to a wireless device, being configured with a maximum codeword being equal to 2 (e.g., maxNrofCodeWordsScheduledByDCI=2 for any BWP of any serving cell). For example, K1 may be 1, in response to all serving cells of one or more serving cells to a wireless device, being configured/indicated with a maximum codeword being equal to 1 (e.g., maxNrofCodeWordsScheduledByDCI=1 for all BWPs of all serving cells).

In the example, the third cell may be configured with a maximum codeword being 1 for any configured BWP of the third cell. For example, a maxNrofCodeWordsScheduledByDCI of a PDSCH-Config of a BWP of the third cell may be configured with n1 (e.g., 1) or maxNrofCodeWordsScheduledByDCI of a PDSCH-Config of a BWP of the third cell may be absent). In response to maxNrofCodeWordsScheduledByDCI=1 for the third cell, the wireless device may determine the first category for the one or more first PDSCHs in response to a number of the one or more first PDSCHs being lower than or equal to K1. In response to maxNrofCodeWordsScheduledByDCI=2 for the third cell, the wireless device may determine the first category for the one or more first PDSCHs in response to a number of the one or more first PDSCHs being lower than or equal to K1/2 (e.g., 1).

In another example, the wireless device may determine that the one or more third PDSCHs may not belong to or may not satisfy the first category. The wireless device may determine a PDSCH, scheduled via a multi-PDSCH DCI, as the second category. The wireless device may determine the first category or the second category for a PDSCH, based on a DCI schedules the PDSCH.

For example, a case, of the one or more first cases/conditions, may be based on a number HARQ-ACK bits, before any HARQ-ACK aggregation, corresponding to one or more PDSCHs scheduled by a DCI. When the number of HARQ-ACK bits is smaller than or equal to K1, the wireless device may determine the DCI or the one or more PDSCHs satisfies the case of the first category.

In an example, when a DCI does not satisfy any of the one or more first cases of the first category, the DCI is considered as the second category (e.g., the DCI satisfies the second category).

For example, the wireless device may determine a first DCI, CRC-scrambled with a first RNTI, satisfying a case of the first category (or is considered as the first category, or is feedbacked via a first HARQ-ACK sub-codebook). The wireless device may determine a second DCI, CRC-scrambled with a second RNTI, satisfying a case of the second category (or is considered as the second category, or is feedbacked via a second HARQ-ACK sub-codebook).

For example, the first RNTI may be a C-RNTI, CS-RNTI, MCS-C-RNTI. For example, the second RNTI may be different from the first RNTI such as Multi-PDSCH-C-RNTI.

For example, the wireless device may determine a first DCI, based on a first DCI format, satisfying a case of the first category (or is considered as the first category, or is feedbacked via a first HARQ-ACK sub-codebook). The wireless device may determine a second DCI, based on a second DCI format, satisfying a case of the second category (or is considered as the second category, or is feedbacked via a second HARQ-ACK sub-codebook).

For example, the first DCI format may comprise a fallback DCI format (e.g., DCI format 1_0). For example, the first DCI format may comprise a non-fallback DCI format (e.g., DCI format 1_1, DCI format 12). For example, the second DCI format may comprise a multi-PDSCH DCI format (e.g., DCI format 1_3). For example, the second DCI format may comprise a non-fallback DCI format for a cell configured with a CBG transmission.

The second category (e.g., a CBG-transmission category) may comprise a case for one or more fourth PDSCHs, for a fourth cell, where the fourth cell is configured/enabled with a CBG transmission, and the one or more fourth PDSCHs may be scheduled based on a non-fallback DCI format.

The base station may enable the CBG transmission for the fourth cell via one more MAC CE and/or DCI signaling (e.g., activate the CBG transmission for the fourth cell). The second category may comprise a case for one or more fifth PDSCHs, scheduled by a multi-PDSCH DCI, for a fifth cell, where the fifth cell is configured with a multi-PDSCH scheduling and a number of the one more fifth PDSCHs is larger than K1 (e.g., TB_HARQ_Threshold, a first threshold). In the example, the fifth cell may be also configured with a CBG transmission. The first DCI format, of a multi-PDSCH scheduling, may be used for indicating a PDSCH with a CBG transmission or one or more PDSCHs. For example, the first DCI format may have a DCI field indicating whether to enable a CBG transmission or a multi-PDSCH scheduling/transmission.

For example, when the fifth cell is configured with a CBG transmission, the wireless device may determine a maximum number (M) of HARQ-ACK bits, for a multi-PDSCH DCI for the fifth cell, based on a maximum number of CBGs configured for the fifth cell or a maximum number of CBGs configured for a serving cell. For example, when the fifth cell is not configured with a CBG transmission, the wireless device may determine a maximum number of HARQ-ACK bits, for a multi-PDSCH DCI for the fifth cell, based on a maximum codewords configured for a serving cell. For example, when the fifth cell is not configured with a CBG transmission, the wireless device may determine a maximum number of HARQ-ACK bits, for a multi-PDSCH DCI for the fifth cell, based on a maximum {a maximum number of CBGs configured for a (any) serving cell, a maximum codewords configured for a (any) serving cell}.

The wireless device may generate up to M or 2*M bits HARQ-ACK bits for a multi-PDSCH DCI for the fifth cell, when one or more PDSCHs scheduled by the multi-PDSCH satisfy the second category. The wireless device may generate up to 1 or 2 bis HARQ-ACK bits for a second multi-PDSCH DCI for the fifth cell, when one or more second PDSCHs scheduled by the second multi-PDSCH satisfy the first category.

In an example, the wireless device may determine a first HARQ-ACK sub-codebook for a DCI in response to the DCI satisfying at least one of the one or more first cases of the first category. The wireless device may determine a second HARQ-ACK sub-codebook for the DCI, otherwise.

The wireless device may generate 1 or 2 HARQ-ACK bits for one or more PDSCHs, scheduled by a DCI, that satisfies the first category (e.g., satisfy at least one of the one or more first cases). The wireless device may generate 1 bit in response to maxNrofCodeWordsScheduledByDCI for all serving cells being 1. Otherwise, the wireless device may generate 2 bits.

For example, the wireless device may determine a total bit size of a HARQ-ACK feedback for a PUCCH resource based on a total DAI value of a most recent DCI among one or more DCIs. The one or more DCIs may satisfy at least one of the one or more first cases of the first category. The one or more DCIs may indicate a same PUCCH resource.

The one or more DCIs schedule one or more PDSCHs.

The wireless device may determine an order (e.g., a bit order in the HARQ-ACK feedback) of each PDSCH of the one or more PDSCHs, based on a counter DAI of a scheduling DCI for the each PDSCH and/or resource allocation by the DCI.

The wireless device may generate the HARQ-ACK feedback/the first HARQ-ACK sub-codebook based on one or more T-DAIs and/or one or more C-DAIs of the one or more DCIs scheduling the one or more PDSCHs.

The wireless device may generate M bits for a DCI that is for the second HARQ-ACK sub-codebook (or the second category).

For example, M is a CBG_HARQ_Threshold. The wireless device may determine the CBG_HARQ_Threshold as max {M_cbg(cell_j)*maxNrofCodeWordsScheduledByDCI (cell_j)} for all configured serving cells). For example, M_cbg(cell_j) is a number of CBGs configured for a serving cell with index j.

For example, the wireless device may determine a total bit size of a HARQ-ACK feedback for a PUCCH resource based on a total DAI value of a most recent DCI among one or more second DCIs. The one or more second DCIs may satisfy the second category. The one or more second DCIs may be for the second HARQ-ACK sub-codebook. The one or more second DCIs may schedule one or more second PDSCHs. The wireless device may determine an order (a bit order in the HARQ-ACK feedback) of a PDSCH of the one or more second PDSCHs, based on a counter DAI of a DCI scheduling PDSCH and/or resource allocation by the DCI (e.g., an order of the PDSCH of one or more PDSCHs scheduled by the DCI). The wireless device may generate the HARQ-ACK feedback based on one or more T-DAIs and/or one or more C-DAIs of the one or more second DCIs scheduling the one or more second PDSCHs.

Figure 28:
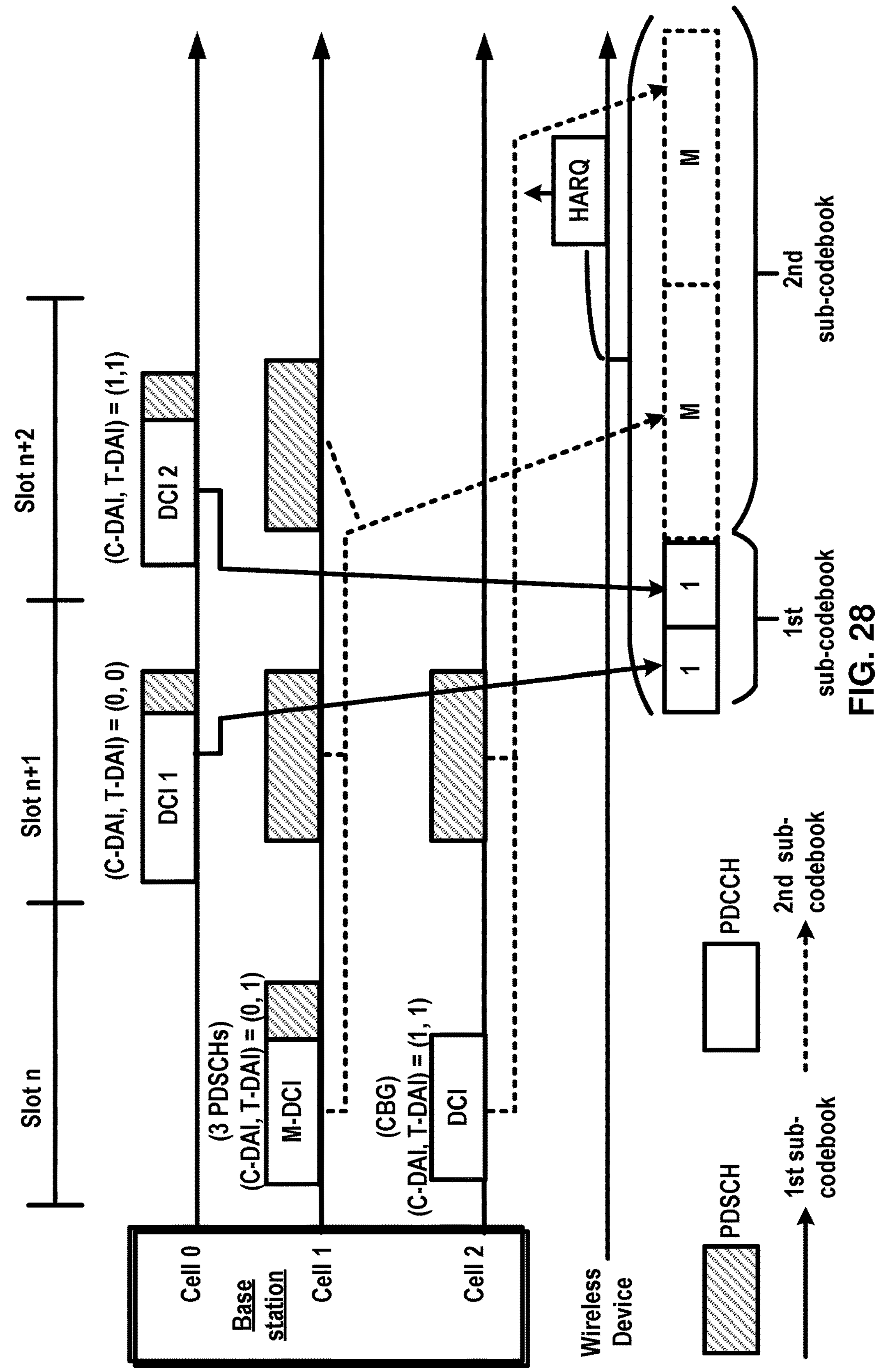
FIG. 28 illustrates an example HARQ codebook generation as per an aspect of an embodiment of the present disclosure.

FIG. 28 illustrates an example HARQ codebook generation as per an aspect of an embodiment of the present disclosure. For example, the base station may configure three serving cells (a first cell, a second cell, a third cell with Cell 0, Cell 1 and Cell 2 indices) to the wireless device.

The first cell may be configured with a TB based transmission (e.g., no CBG transmission and no multi-PDSCH scheduling). The second cell may be configured with a multi-PDSCH scheduling. The second may be also configured with a CBG transmission, when a scheduled PDSCH by a multi-PDSCH DCI is one. The third cell may be configured with a CBG transmission, where a maximum CBG size is M.

The wireless device may receive a first multi-PDSCH DCI (M-DCI) in a slot n for the second cell. In the example, the first multi-PDSCH DCI may be transmitted via the second cell. The first multi-PDSCH DCI may schedule three PDSCHs via the slot n to slot n+2.

The wireless device may receive a first DCI (DCI) in the slot n. The first DCI may schedule M CBGs via a first PDSCH, where the first PDSCH may be scheduled via a slot n+1.

The wireless device may receive a second DCI (DCI 1) in the slot n+1, scheduling a second PDSCH in the slot n+1.

The wireless device may receive a third DCI (DCI 2) in the slot n+2, scheduling a third PDSCH in the slot n+2.

The wireless device may determine the three PDSCHs scheduled by the first multi-PDSCH DCI satisfying the second category (e.g., a number of scheduled PDSCH is larger than 1 or 2). The wireless device may determine the first PDSCH satisfying the second category (e.g., scheduled based on a CBG transmission). The wireless device may determine a second HARQ-ACK sub-codebook for the first multi-PDSCH DCI/the three PDSCHs.

The wireless device may determine the second PDSCH or the second DCI satisfying the first category (e.g., a TB based transmission). The wireless device may determine the third PDSCH or the third DCI satisfying the first category. The wireless device may determine a first HARQ-ACK sub-codebook for the second DCI/the second PDSCH and the third DCI/the third PDSC.

The wireless device may determine first HARQ-ACK bits for the second PDSCH and the third PDSCH for the first HARQ-ACK sub-codebook. The wireless device may determine second HARQ-ACK bits for the three PDSCHs and the first PDSCH for the second HARQ-ACK sub-codebook. For example, the HARQ feedback or the HARQ-ACK codebook via a PUCCH resource may comprise the first HARQ-ACK sub-codebook and the second HARQ-ACK sub-codebook.

Figure 29:
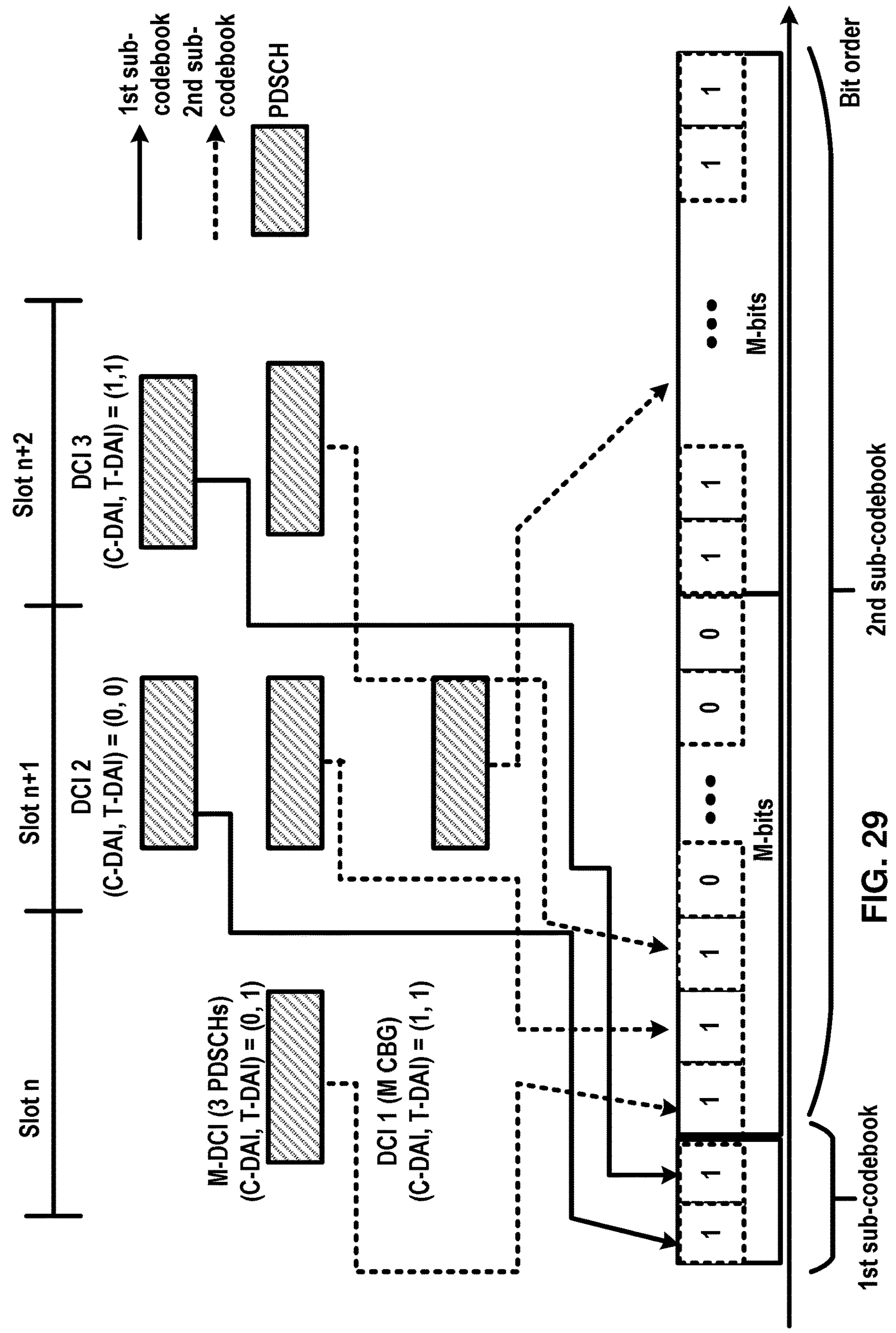
FIG. 29 illustrates an order of HARQ-ACK bits in each HARQ-ACK sub-codebook, based on C-DAI/T-DAI of DCIs scheduling PDSCHs as per an aspect of an embodiment of the present disclosure.

FIG. 29 illustrates an order of HARQ-ACK bits in each HARQ-ACK sub-codebook, based on C-DAI/T-DAI of DCIs scheduling PDSCHs as per an aspect of an embodiment of the present disclosure. FIG. 29 shows a simplified version of FIG. 28 with a mapping between a PDSCH to one or more HARQ-ACK bits. FIG. 29 illustrates a case of a maximum codeword for the three serving cells being 1. The wireless device may map a HARQ-ACK bit of the second PDSCH to first bit of the first HARQ-ACK sub-codebook based on C-DAI/T-DAI value of the second DCI (e.g., C-DAI=0). The wireless device may map a HARQ-ACK bit for the third PDSCH to second bit of the first HARQ-ACK sub-codebook based on C-DAI/T-DAI value of the third DCI (e.g., C-DAI=1). The wireless device may determine a size of the first HARQ-ACK sub-codebook as 2 based on the T-DAI of the third DCI (e.g., a most recent DCI for the first category).

The wireless device may generate two bits of the first HARQ-ACK sub-codebook.

The wireless device may determine first M-bits of HARQ-ACK bits, of the second HARQ-ACK sub-codebook, for the three PDSCHs scheduled by the first multi-PDSCH DCI. The wireless device may generate ACK and/or NACK bits for first three bits, of the first M-bits of HARQ-ACK bits, corresponding to the three PDSCHs. The wireless device may fill in (e.g., map, append, concatenate, put in) the first three bits with the HARQ-ACK bits of the three PDSCHs (e.g., ACKs [1, 1, 1] in FIG. 29). The wireless device may fill in/map rest HARQ-ACK bits of the first M-bits of the HARQ-ACKs as NACK (e.g., 0 in FIG. 29) as the wireless device has not received any PDSCH to report ACK or NACK.

The wireless device may determine second M-bits of the HARQ-ACK bits, of the second HARQ-ACK sub-codebook, for the first PDSCH scheduled by the first DCI. The wireless device may determine ACK or NACK for a CBG of M CBGs of a transport block via the first PDSCH. The wireless device may fill in (e.g., map, append, concatenate, put in) ACK or NACK for each transmitted CBG in a bit order of the second M HARQ-ACK bits. The wireless device may fill in NACK for any CBG index where corresponding CBG has not been transmitted. The wireless device may determine the bit order based on a CBG index of the each transmitted CBG.

In the example, the first PDSCH may carry the M CBGs. The wireless device may fill in M bits, where each bit corresponds to each CBG of the M CBGs. The wireless device may determine first M-bits for the three PDSCHs based on the C-DAI/T-DAI of the first multi-PDSCH DCI (e.g., C-DAI/T-DAI=0). The wireless device may determine second M bits for the first PDSCH based on the C-DAI/T-DAI of the first DCI (e.g., C-DAI/T-DAI=1).

The wireless device and the base station may use a first DAI counter (procedure) for the first category and/or the first HARQ-ACK sub-codebook. The wireless device and the base station may use a second DAI counter (procedure) for the second category and/or the second HARQ-ACK sub-codebook. The wireless device and the base station may use respective C-DAI/T-DAI for each counter procedure. The wireless device and the base station may increment (e.g., based on a modulo function) C-DAI/T-DAI value for a successive DCI compared to a previous DCI, where both DCIs schedule PDSCHs of a same category (e.g., the first category or the second category) or where both DCIs schedule PDSCHs for a same HARQ-ACK sub-codebook.

The wireless device may generate a HARQ-ACK codebook by appending the first HARQ-ACK sub-codebook and the second HARQ-ACK sub-codebook. For example, the wireless device may append the second HARQ-ACK sub-codebook after the first HARQ-ACK sub-codebook (if any). The wireless device may transmit a PUCCH comprising the first HARQ-ACK sub-codebook (encoded separately) and the second HARQ-ACK sub-codebook (encoded separately from the first HARQ-ACK sub-codebook). The wireless device may transmit a first PUCCH comprising the first HARQ-ACK sub-codebook. The wireless device may transmit a second PUCCH comprising the second HARQ-ACK sub-codebook.

The wireless device may append the second HARQ-ACK sub-codebook to the first HARQ-ACK sub-codebook. The wireless device may generate/encode a bitstream based on the both first HARQ-ACK sub-codebook and the second HARQ-ACK sub-codebook. The wireless device may generate/encode a first bitstream based on the first HARQ-ACK sub-codebook. The wireless device may generate/encode a second bitstream based on the second HARQ-ACK sub-codebook.

In an example, the wireless device may determine a maximum HARQ-ACK bits for the second category based on a maximum number of CBGs configured to a serving cell among one or more configured serving cells or among one or more activated serving cells. When the one or more configured serving cells are used, a maximum CBG for an deactivated serving cell may be used. To avoid any ambiguity in a HARQ-ACK codebook, the wireless device may determine a maximum number of CBGs configured to any bandwidth part of a configured serving cell for the maximum HARQ-ACK bits for the second category. For example, the wireless device may determine a largest (or smallest) value among one or more maximum number of CBGs configured to one or more BWPs of one or more configured serving cells.

In an example, a wireless device may determine a number of HARQ-ACK bits (e.g., M, the CBG_HARQ_threshold, the second threshold), generated for a DCI, for the second category based on a maximum number of schedulable PDSCHs by a multi-PDSCH DCI for a serving cell and a maximum number of CBGs for a serving cell. For example, when a maximum number of codeword is C. The wireless device may determine M (e.g., the number of HARQ-Ack bits, CBG_HARQ_Threshold, a second threshold) as max (max{N(cell_i)*maxNrofCodeWordsScheduledByDCI (cell_i)} for all configured serving cells (cell_0, . . . , cell_k), max {M_cbg(cell_j)*maxNrofCodeWordsScheduledByDCI (cell_j)} for all configured serving cells). For example, N (cell_i) is a number of schedulable PDSCHs by a single DC for a cell with index i. N(cell_i)=1 for a cell without being configured with a multi-PDSCH scheduling. For example, maxNrofCodeWordsScheduledByDCI(cell_i) may a maximum number of codewords configured for the cell with index i. For example, M-cbg(cell_j) is a maximum number of CBGs configured for a cell with index j. M_cbg(cell_j)=1 for a cell without being configured with a CBG transmission. For example, maxNrofCodeWordsScheduledByDCI(cell_j) may a maximum number of codewords configured for the cell with index j.

In an example, the wireless device may determine M=max {M_cbg(cell_j)*maxNrofCodeWordsScheduled-ByDCI(cell_j)} for all serving cells.

In an example, the wireless device may determine M=max {N(cell_i)*maxNrofCodeWordsScheduledByDCI (cell_i)} for all serving cells.

In an example, the wireless device may determine M=max (max {N(cell_i)}, max {M_cbg(cell_j)*maxN-rofCodeWordsScheduledByDCI(cell_j)}). The wireless device may assume that a single codeword is used for a multi-PDSCH DCI scheduling. The wireless device may generate a single HARQ-ACK bit for a PDSCH of one or more PDSCHs scheduled by the multi-PDSCH DCI. In the example, maxNrofCodeWordsScheduledByDCI(cell_i) may be determined as a maximum codeword that a multi-PDSCH DCI may schedule for a cell with index i. In the example, maxNrofCodeWordsScheduledByDCI(cell_j) may be determined as a maximum codeword that a non-fall DCI, enabled with a CBG transmission (e.g., comprising a CBG transmission indicator), may schedule for a cell with index j.

In the example, a wireless device may be configured with a plurality of PUCCH groups comprising a first PUCCH group and a second PUCCH group. The wireless device may determine all serving cells within each PUCCH group. The wireless device may generate separate HARQ-ACK codebook for each PUCCH group. For example, the wireless device may generate a first HARQ codebook for one or more cells of the first PUCCH group. The wireless device may generate a second HARQ codebook for one or more second cells of the second PUCCH group.

The wireless device may generate/encode each HARQ-ACK codebook independently. The wireless device may transmit each HARQ-ACK codebook independently via one or more PUCCH resources.

In an example, a wireless device may determine M (a number of HARQ-ACK bits for a multi-PDSCH DCI). For example, the M may be smaller than a maximum number of PDSCHs schedulable by a multi-PDSCH DCI for a cell. The wireless device may need to aggregate HARQ-ACK bits for one or more PDSCHs by a multi-PDSCH DCI, when a number of the one or more PDSCHs is larger than M.

Figure 30:
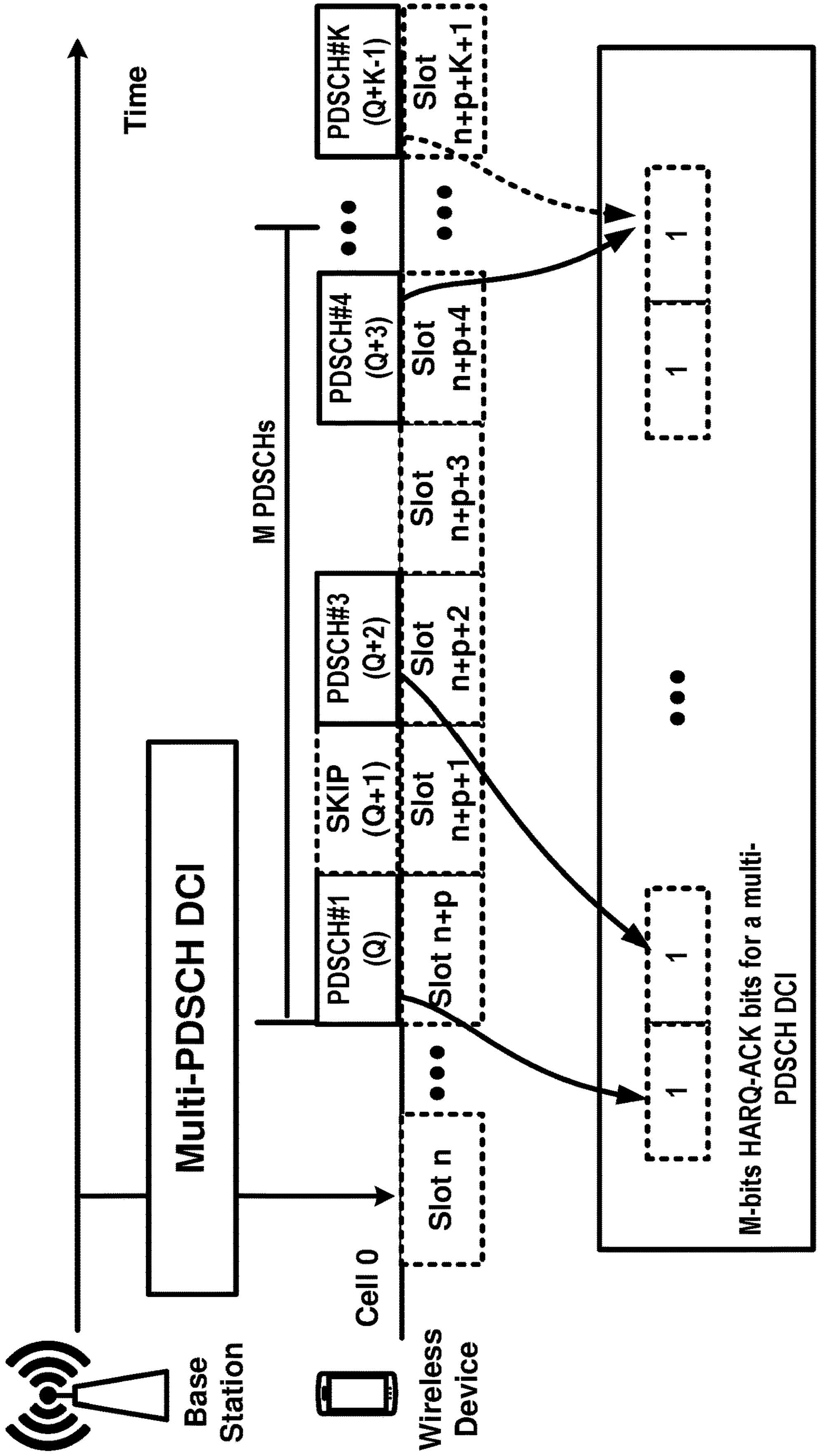
FIG. 30 illustrates an example of a HARQ-ACK aggregation as per an aspect of an embodiment of the present disclosure.

FIG. 30 illustrates an example of a HARQ-ACK aggregation as per an aspect of an embodiment of the present disclosure.

The base station may schedule a multi-PDSCH DCI in a slot n via a first cell (e.g., cell 0). The multi-PDSCH DCI may schedule N PDSCHs (e.g., PDSCH #1, . . . , PDSCH #K) via a TDRA entry of a TDRA table. For example, the TDRA entry may indicate K time domain resources, where each time domain resource of the K time domain resources may map to at most one PDSCH of the N PDSCHs. For example, N may be smaller than or equal to K. For example, the wireless device may exclude one or more skipped PDSCHs. For example, the wireless device may determine a PDSCH is skipped that is scheduled via the slot n+p+1. The wireless device may not count the PDSCH for the N PDSCHs.

For example, N may be larger than M.

When N is larger than M, the wireless device may aggregate HARQ-ACK bits for N PDSCHs based on one or more following rules. For example, the wireless device may sequentially map from first bit of M-bits to last bit of M-bits to first valid PDSCH (e.g., non-skipped PDSCH, an earliest non-skipped PDSCH) to M-th valid PDSCH. The wireless device may drop HARQ-ACK bit(s) for remaining valid PDSCHs.

For example, the wireless device may determine S=ceil (N/M). The wireless device may determine a HARQ-ACK bits for each S PDSCHs sequentially. For example, HARQ-ACK bits for $1^{st}$ PDSCH, . . . , S-th PDSCH are aggregated to a single HARQ-ACK bit (e.g., first bit). The wireless device may determine the single HARQ-ACK bit based on "AND" operation or based on "OR" operation. For example, when "AND" operation is used, ACK is reported when all PDSCHs are received correctly/successfully. For example, when "OR" operation is used, ACK is reported when any PDSCH is received correctly/successfully. The wireless device may determine second HARQ-ACK bit for S+1-th PDSCH to 2*S-th PDSCH. The wireless device may determine I-th HARQ-ACK bit for S*(I−1)-th PDSCH to S*I-th PDSCH.

For example, the wireless device may determine M−1 HARQ-ACK bits, where each HARQ-ACK bit corresponds to first valid PDSCH to M−1-th valid PDSCH. The wireless device may aggregate and generate a single HARQ-Ack bits for remaining PDSCHs (e.g., M-th valid PDSCH to N-th valid PDSCH). FIG. 30 illustrates the example. Each valid PDSCH may map to each bit of M-bits until M−1-th valid PDSCH (shown between PDSCH #4 to PDSCH #K). The wireless device may aggregate M-th valid PDSCH to N-th valid PDSCH (e.g., PDSCH #K) to a single bit mapping to the last bit of the M-bits. The wireless device may transmit the M-bits via the second HARQ-ACK sub-codebook.

In an example, a HARQ-ACK codebook may comprise a first HARQ-ACK sub-codebook, a second HARQ-ACK sub-codebook, and a third HAQ-ACK sub-codebook. The wireless device may determine first HARQ-ACK bit(s) for the first HARQ-ACK sub-codebook based on the first category (e.g., one or more first PDSCHs satisfying the first category). The wireless device may determine second HARQ-ACK bis for the second HARQ-ACK sub-codebook based on a third category. For example, the wireless device may determine the second HARQ_ACK sub-codebook for a DCI or one or more PDSCHs scheduled by the DCI in response to the DCI or the one or more PDSCHs satisfying at least one of one or more third cases of the third category or in response to the DCI or the one or more PDSCHs satisfying the third category.

The wireless device may determine third HARQ-ACK bits for the third HARQ-ACK sub-codebook based on a fourth category. For example, the wireless device may determine the second HARQ_ACK sub-codebook for a DCI or one or more PDSCHs scheduled by the DCI in response to the DCI or the one or more PDSCHs satisfying at least one of one or more fourth cases of the fourth category or in response to the DCI or the one or more PDSCHs satisfying the fourth category.

For example, the first category may be determined as described in the specification. For example, the first category may comprise a case of a PDSCH scheduled via a fallback DCI format and/or a single-PDSCH DCI without a CBG transmission. The first category may comprise a case of a PDSCH scheduled via a multi-PDSCH DCI where the multi-PDSCH DCI may schedule a single PDSCH. The first category may comprise a case of one or more PDSCHs scheduled by a single DCI, where a number of HARQ-ACK bits, without any HARQ-ACK aggregation (e.g., at least one HARQ-ACK bit for a PDSCH), for the one or more PDSCHs may be smaller than or equal to K1 (e.g., TB_HARQ_Threshold, a first threshold), where one or two bits may correspond to each PDSCH of the one or more PDSCHs. For example, K1 may be 1.

In response to a PDSCH, scheduled by a DCI, satisfying the first category or determined as the first HARQ-ACK sub-codebook, the wireless device may generate K1 bit(s) of HARQ-ACK bits for the PDSCH.

For example, the third category may be determined based on one or more of following examples/cases. For example, the second category may comprise a case of a PDSCH scheduled via a non-fallback DCI format with a CBG transmission indicator field (e.g., a CBG transmission is enabled for a cell where the PDSCH is scheduled).

For example, the third category may comprise a case one or more PDSCHs scheduled via a multi-PDSCH DCI, where a number of one or more PDSCHs may be smaller than or equal to M (e.g., CBG_HARQ_Threshold, a second threshold). For example, the M may be determined based on a maximum number of CBGs configured for a serving cell (e.g., M=max {N_cbg(cell_j)}). For example, M may be a maximum number of HARQ-ACK bits for a CBG transmission of a serving cell (e.g., max {N_cbg(cell_j)*{maxNrofCodeWordsScheduledByDCI(cell_j)}).

For example, a base station may transmit one or more RRC messages indicating configuration parameters. The configuration parameters may indicate/comprise a value for M (e.g., a CBG_HARQ_Threshold, a second threshold, a second sub-codebook threshold, a second HARQ-ACK sub-codebook threshold). The wireless device may determine the M based on one or more equations or a maximum number of HARQ-ACK bits for a CBG transmission or a RRC parameter or a rule.

The wireless device may receive a multi-DCI scheduling one or more PDSCHs for a serving cell. The wireless device may determine a number (P) of the one or more PDSCHs. For example, when maxNrofCodeWordsScheduledByDCI is configured as two for the serving cell (e.g., codeword may be two), the number of the one or more PDSCHs may be doubled (e.g., 2P). For example, the base station may configure maxNrofCodeWordsScheduledByDCI=2. The wireless device may apply two codeword for a single-PDSCH DCI format, for the serving cell. The wireless device may apply a single codeword for a multi-PDSCH DCI regardless of maxNrofCodeWordsScheduledByDCI configuration.

For example, the base station may configure separate parameter (e.g., maxNrofCodeWordsScheduledByM-DCI=2) to enable two codewords by a multi-PDSCH DCI. The wireless device may determine a number of necessary HARQ-ACK feedback bits (Hp) for the one or more PDSCHs as P or 2P depending on a maximum number of codeword that each PDSCH of the one or more PDSCHs may schedule.

When Hp (e.g., P or 2P) is smaller than or equal to K1, the wireless device may determine the multi-PDSCH DCI and/or the one or more PDSCHs may satisfy the first category. The wireless device may determine the first HARQ-ACK sub-codebook for the one or more PDSCHs in response to satisfying the first category. When Hp (e.g., P or 2P) is smaller than or equal to K1, the wireless device may determine the first HARQ-ACK sub-codebook for the one or more PDSCHs. The wireless device may generate K1 HARQ-ACK bits for the one or more PDSCHs.

When Hp (e.g., P or 2P) is between (K1, M] (e.g., larger than K1 and smaller than or equal to M), the wireless device may determine that the one or more PDSCHs (or the multi-PDSCH DCI scheduling the one or more PDSCs) may satisfy the third category. In another example, when Hp (e.g., P or 2P) is smaller than or equal to M (e.g., ≤M), the wireless device may determine that the one or more PDSCHs (or the multi-PDSCH DCI scheduling the one or more PDSCs) may satisfy the third category. When Hp (e.g., P or 2P) is between (K1, M], the wireless device may determine the second HARQ-ACK sub-codebook for the one or more PDSCHs. The wireless device may determine M HARQ-ACK bits for one or more PDSCHs scheduled by the multi-PDSCH DCI. For example, a PDSCH scheduled by a DCI with a CBG transmission, the wireless device may determine the PDSCH satisfying the third category and may generate M bits of HARQ-ACK feedback for the PDSCH.

When Hp is larger than M, the wireless device may determine the one or more PDSCHs (or the multi-PDSCH DCI scheduling the one or more PDSCs) may satisfy the fourth category. When Hp (e.g., P or 2P) is larger than M, the wireless device may determine the third HARQ-ACK sub-codebook for the one or more PDSCHs. In an example, the wireless device may determine the one or more PDSCHs (or the multi-PDSCH DCI scheduling the one or more PDSCs) may satisfy the fourth category in response to the one or more PDSCHs scheduled via the multi-PDSCH DCI. In an example, the wireless device may determine the one or more PDSCHs may satisfy the fourth category in response to the one or more PDSCHs activated via the multi-PDSCH DCI. In an example, the wireless device may determine N HARQ-ACK bits for the one or more PDSCHs in response to the one or more PDSCHs satisfying the fourth category.

The wireless device may generate N bits of HARQ-ACK feedback for the one or more PDSCHs. For example, N is a maximum number of PDSCHs for a multi-PDSCH scheduling of a serving cell. For example, N=max {N(cell_i)}. For example, N={N(cell_i)*maxNrofCodeWordsScheduledByDCI(cell_i)}.

For example, cell_i may comprise a configured cell (e.g., a maximum number of PDSCHs for all configured serving cells). For example, cell_i may comprise an activated cell (e.g., a maximum number of PDSCHs for all activated serving cells by excluding deactivated serving cells).

For example, N(cell_i) may be determined as a maximum number of PDSCHs scheduled by a multi-PDSCH DCI for a cell with an index i. The wireless device may determine N(cell_i) based on one or more TDRA entries of a TDRA table configured for the cell. For example, a maximum number of slots or SLIV entries that a TDRA entry of the TDRA table may be determined as N(cell_i).

For example, the base station may configure, via RRC, MAC-CE and/or DCI signaling, a parameter of N(cell_i) for the cell. The base station may configure, independently, for a cell, configured with a multi-PDSCH scheduling, a maximum number of PDSCHs scheduled by a DCI.

The base station may transmit one or more RRC messages indicating configuration parameters. The configuration parameters may indicate/comprise a multi-PDSCH scheduling for a cell. The configuration parameters may indicate a maximum number of HARQ-ACK bits for the cell, where N(cell_i) may be determined based on the maximum number of HARQ-ACK bits.

The configuration parameters may indicate N (e.g., a number of HARQ-ACK bits for the fourth category) for the fourth category.

The wireless device may determine N(cell_i) based on a (a minimum time separation between two spans, a maximum span duration)=(X, Y) configured to the cell. For example, N(cell_i) may be same as X. For example, N(cell_i) may be X*P (e.g., P=4).

For example, the wireless device may determine N based on a highest subcarrier spacing of a serving cell. The wireless device may determine N=N(cell_x), where N(cell_x) is a maximum number of PDSCHs scheduled by a DCI for a cell with an index x. The cell may have a highest (or lowest) subcarrier spacing among serving cells.

For example, M (the CBG_HARQ_Threshold) may be same as TB_HARQ-Threshold when a CBG transmission is not configured to a serving cell. The wireless device may determine the second HARQ-ACK sub-codebook may not present in that case.

For example, the base station may configure a CBG transmission and a multi-PDSCH scheduling for a serving cell. For example, the base station and/or a wireless device may enable the CBG transmission in response to enabling the multi-PDSCH scheduling for the serving cell. The base station may configure a number of CBGs. When a CBG transmission is used for the serving cell, the wireless device may assume that a number of PDSCHs scheduled by a DCI may be limited to C (e.g., C=1). A multi-PDSCH DCI format may be used to schedule either a single PDSCH with a CBG transmission or one or more PDSCHs.

For example, a maximum number of PDSCHs scheduled by a multi-PDSCH DCI format may be larger than or equal to a maximum number of CBGs scheduled by the multi-PDSCH DCI format. For example, the multi-PDSCH DCI format may comprise N bits of NDI bits, where each bit may correspond to a PDSCH of the one or more PDSCHs. The wireless device may determine N bits of NDI bits as 1 bit NDI+M CBGTI (where N>=1+M). The 1 bit NDI may be used for a single PDSCH scheduled by the multi-PDSCH DCI format. M CBGTI may be used for M CBGs of a TB of the single PDSCH. For example, a plurality of RV bits may be used between N RV values for N PDSCHs (e.g., the one or more PDSCHs) or RV value+M CBGTI (e.g., the single PDSCH+CBG). Other field(s) may be used.

For example, the wireless device may determine a CBG transmission with a single PDSCH based on a number of scheduled PDSCH being equal to 1 and a CBG transmission is configured of a serving cell (e.g., scheduled cell).

For example, the wireless device may determine a multi-PDSCH scheduling with one or more PDSCHs based on a number of scheduled PDSCH being larger than 1 or a CBG transmission not being configured for the serving cell.

When a multi-PDSCH scheduling is used, a PDSCH of one or more PDSCHs may carry one or more transport blocks. The wireless device may decode the one or more transport blocks in response to receiving the one or more PDSCHs. The wireless device may transmit one or more HARQ-ACK bits corresponding to decoding results (e.g., success or fail) for the one or more transport blocks.

In an example, a base station may trigger to use a DCI format to schedule a single TB with a CBG transmission (e.g., CBG transmission) or to schedule a plurality of TBs based on a TB-based scheduling (e.g., a multi-PDSCH scheduling) via RRC, MAC-CE and/or DCI signaling.

Figure 31:
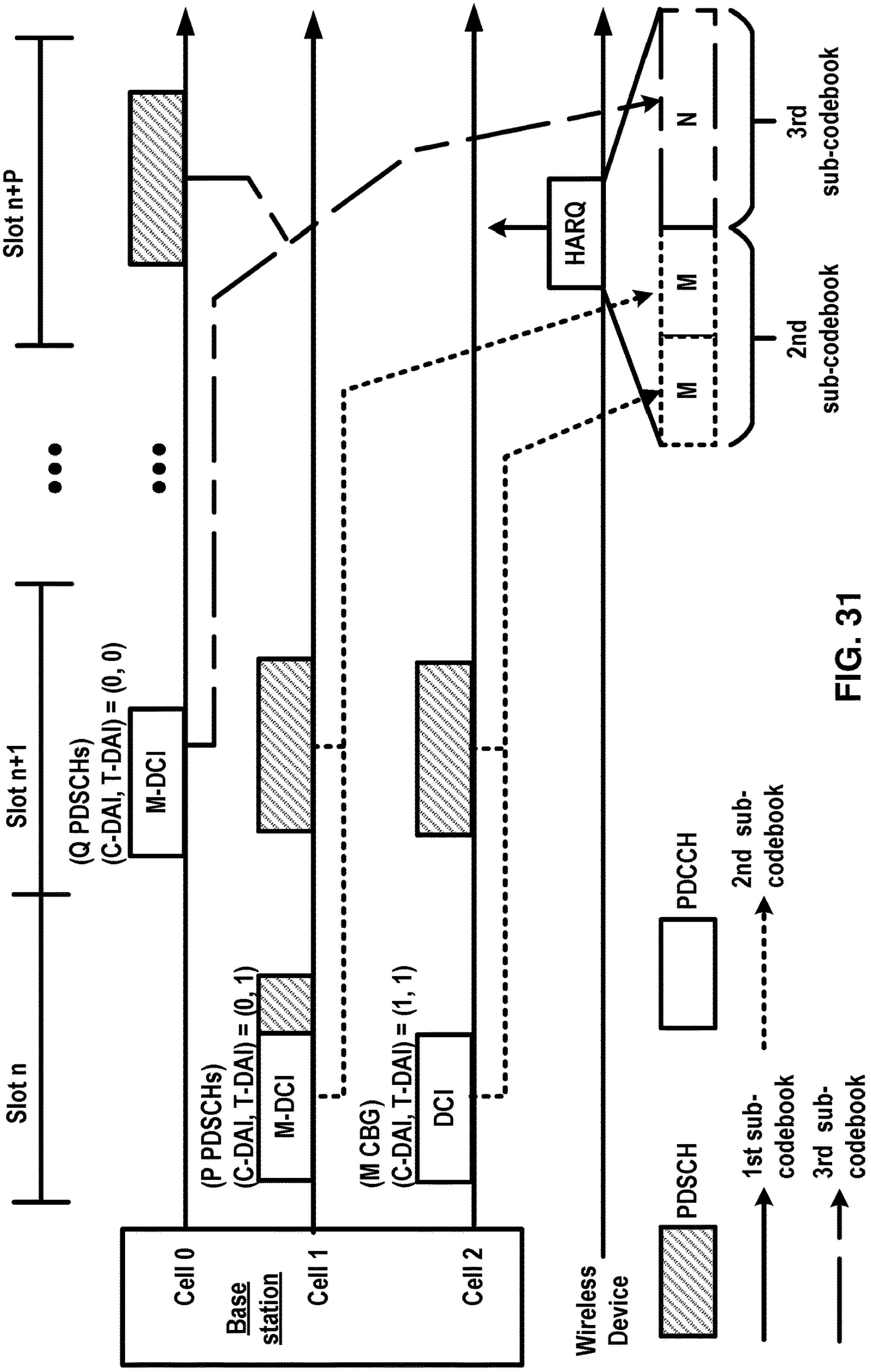
FIG. 31 illustrates an example embodiment as per an aspect of an embodiment of the present disclosure.

FIG. 31 illustrates an example embodiment as per an aspect of an embodiment of the present disclosure. The base station may transmit one or more RRC messages indicating configuration parameters. The configuration parameters may comprise/indicate a plurality of serving cells comprising a first cell (e.g., cell 0) and a second cell (e.g., cell 1). The base station may transmit a first multi-PDSCH DCI (M-DCI 1) in a slot n. The first multi-PDSCH DCI may indicates resources for a plurality of PDSCHs. The first multi-PDSCH DCI may indicate a C-DAI=1 and a T-DAI=1. T-DAI may be set to 1 (e.g., two are scheduled up to a current PDCCH monitoring occasion) as the base station schedules the first multi-PDSCH DCI and a first DCI (DCI) via the second cell in the slot n.

The wireless device may receive the first multi-PDSCH DCI.

The wireless device may receive the first DCI, via the second cell, in the slot n. The first DCI may indicate a C-DAI=0 and a T-DAI=1. The first multi-PDSCH DCI may be considered as scheduled later than the first DCI in terms of a HARQ-ACK codebook generation (e.g., one or more HARQ-ACK bis corresponding to the first DCI may be placed before one or more second HARQ-ACK bits corresponding to the first multi-PDSCH DCI). C-DAI value of each DCI may be used to determine an order between DCIs received via one or more PDCCH monitoring occasions occurring in a same time. An order between DCIs may be further determined based on a timing of a PDCCH monitoring occasions, where the wireless device receives a DCI. For example, an earlier PDCCH monitoring may be placed or have earlier order than later PDCCH monitoring occasion. DCI_x via the earlier PDCCH monitoring occasion may have an earlier order than DCI_y via the later PDCCH monitoring occasion. One or more first PDSCHs scheduled via DCI_x may be placed before one or more second PDSCHs scheduled via DCI_y in response to DCI_x and DCI_y sharing a DAI counter procedure and DCI_x having earlier order than DCI_y.

The configuration parameters may indicate a CBG transmission for the second cell. A maximum number of CBGs for the second cell may be configured as M. A number of codeword may be configured as 1 for the second cell. A CBG_HARQ_Threshold or a second threshold M may be determined as the maximum number of CBGs.

The first DCI may schedule a PDSCH in a slot n+1, where the PDSCH may comprise one or more CBGs. A number of the one or more CBGs may be smaller than or equal to M.

The first multi-PDSCH may schedule a first plurality of PDSCHs (e.g., P PDSCHs) between [slot n, . . . , slot n+P] (slot n+P is not shown in FIG. 31). For example, P may be smaller than M.

The configuration parameters may indicate a maximum codeword for the first cell being 1 (e.g., a single codeword is used). For example, the wireless device may determine a single codeword for a PDSCH scheduled via a multi-PDSCH DCI format.

The wireless device may receive a second multi-PDSCH DCI (e.g., M-DCI 2) in the slot n+1. The second multi-PDSCH DCI may schedule a second plurality of PDSCHs. A number of the second plurality of PDSCHs may be Q, where Q is larger than M. For example, the second multi-PDSCH DCI may schedule the second plurality of PDSCHs between [slot n+S, n+K] (slot n+S is not shown in FIG. 31).

The second multi-PDSCH DCI may comprise/indicate a C-DAI=0 and a T-DAI=0. In the example, the base station and the wireless device may use a first DAI counter procedure for the first DCI and the first multi-PDSCH DCI. The base station and the wireless device may use a second DAI counter procedure for the second multi-PDSCH DCI. The base station and the wireless device may use independent/respective DAI counter for each HARQ-ACK sub-codebook.

The base station may reset the C-DAI and T-DAI for the second multi-PDSCH DCI as the second multi-PDSCH DCI may correspond to a third HARQ-ACK sub-codebook. The first DCI and the first multi-PDSCH may schedule PDSCHs that may correspond to a second HARQ-ACK sub-codebook.

The wireless device may determine the second plurality of PDSCHs satisfying the fourth category in response to the number of the second plurality of PDSCHs (Q) being larger than the CBG_HARQ_Threshold or the second threshold M. The wireless device may determine the second multi-PDSCH DCI satisfying the fourth category in response to the number of the second plurality of PDSCHs (Q) being larger than the CBG_HARQ_Threshold or the second threshold M.

The wireless device may determine the second plurality of PDSCHs satisfying the third category in response to the number of the second plurality of PDSCHs (P) being larger than a TB_HARQ_Threshold or a first threshold K1 (e.g., 1) and being smaller than or equal to the CBG_HARQ_Threshold M. The wireless device may determine the first multi-PDSCH DCI satisfying the third category in response to the number of the first plurality of PDSCHs (Q) being larger than the TB_HARQ_Threshold K1 and being smaller than or equal to the CBG_HARQ_Threshold M.

The wireless device may determine a HARQ-ACK codebook (e.g., HARQ) for a PUCCH resource. The HARQ-ACK codebook, in FIG. 31, comprises two sub-codebook of a second HARQ-ACK sub-codebook (second codebook) and a third HARQ-ACK sub-codebook. A first HARQ-ACK sub-codebook (e.g., a sub-codebook for one or more TBs based on a TB scheduling or a single PDSCH scheduling) may be empty in the example.

The wireless device may determine M HARQ-ACK bits for each DCI satisfying the third category. The wireless device may determine M HARQ-ACK bits for each C-DAI value for the third category/the second HARQ-ACK sub-codebook.

The wireless device may determine first M bits for the second HARQ-ACK sub-codebook based on a C-DAI=0. The wireless device may place P HARQ-ACK bits corresponding to P PDSCHs (the first plurality of PDSCHs) starting from first bit of the first M bits. The wireless device may fill in NACK bit(s) for any remaining bits in the first M bits.

The wireless device may determine second M bits for the second HARQ-ACK sub-codebook based on a C-DAI=1. The wireless device may determine M HARQ-ACK bits corresponding to M CBGs of the PDSCH. When a number of CBGs, transmitted/configured/indicated, of the PDSCH is smaller than M, the wireless device may fill in NACK bit(s) for remaining HARQ-ACK bits of the second M bits, when P is smaller than M (e.g., M-P NACK bit(s)).

The wireless device may not determine third M bits for the second HARQ-ACK sub-codebook in response to the T-DAI, of the most recent DCI for the second HARQ-ACK sub-codebook, being 1 (e.g., up to two counts).

The wireless device may determine first N HARQ-ACK bits of the third HARQ-ACK sub-codebook based on a C-DAI=0 for the third HARQ-ACK sub-codebook.

The wireless device may determine Q HARQ-ACK bits, of the second plurality of PDSCHs, for the first N HARQ-ACK bits based on the second multi-PDSCH DCI comprising the C-DAI=0. The wireless device may fill the first N HARQ-ACK bits based on the Q HARQ-ACK bits starting from first bit (e.g., least significant bit or most significant bit). The wireless device may fill in NACK bit(s) for any remaining bit(s) in the first N HARQ-ACK bits, when Q is smaller than N (e.g., N-Q of NACK bit(s)).

The wireless device may not determine second N HARQ-ACK bits for the third HARQ-ACK sub-codebook in response to a T-DAI, for the third HARQ-ACK sub-codebook, being 0 based on a most recent DCI (e.g., the second multi-PDSCH DCI).

The wireless device may append/concatenate, for the HARQ-ACK codebook, the second HARQ-ACK sub-codebook and the third HARQ-ACK sub-codebook. The wireless device may transmit the HARQ-ACK codebook via the PUCCH resource. The wireless device may order one or more HARQ-ACK sub-codebooks based on an order of a lower index or has a lower threshold (e.g., TB_HARQ_Threshold→CBG_HARQ_Threshold→N) or has a lower number of HARQ-ACK bits for each DCI (e.g., K1→M→N).

The wireless device may place the first HARQ-ACK sub-codebook in a LSB or a MSB. The wireless device may append the second HARQ-ACK sub-codebook to the first HARQ-ACK sub-codebook. The wireless device may append the third HARQ-ACK sub-codebook to the first/second HARQ-ACK sub-codebook(s).

In an example, a wireless device may be configured with a plurality of monitoring occasion for a serving cell, where the plurality of monitoring occasions may be ordered based on a timing (e.g., earlier PDCCH monitoring occasion has an earlier index or an earlier order than later PDCCH monitoring occasions). When a starting symbol of a first PDCCH monitoring occasion of a first cell and a starting symbol of a second PDCH monitoring occasion of a second cell are occurring at a same time, the first PDCCH monitoring occasion and the second PDCCH monitoring occasion may be considered as a PDCCH monitoring occasion across the first cell and the second cell for a T-DAI determination. A PDCCH monitoring occasion of a serving cell may be determined based on one or more search spaces of the serving cell. The PDCCH monitoring occasion of the serving cell may refer a monitoring occasion. A PDCCH monitoring occasion across a plurality of cells may comprise one or more PDCCH monitoring occasions of one or more serving cells. The PDCCH monitoring occasion, in the specification, may refer a PDCCH monitoring of a serving cell or a PDCCH monitoring occasion for a plurality of serving cells.

The base station and the wireless device may determine/update a C-DAI of a DCI in each {a serving cell, a PDCCH monitoring occasion}-pair. A set of {a serving cell, a PDCCH monitoring occasion}-pairs may be ordered first based on a PDCCH monitoring order (e.g., earlier PDCCH monitoring occasion to later PDCCH monitoring occasion, and a PDCCH monitoring occasion may have one or more of {a serving cell, a PDCCH monitoring occasion} across one or more serving cells). One or more {a serving cell, a PDCCH monitoring occasion}-pairs with a same PDCCH monitoring occasion may be then ordered based on a serving cell index (e.g., the first cell with lower index may be ordered first than the second cell with higher index when the first PDCCH monitoring occasion and the second PDCCH monitoring occasion belong to the same PDCCH monitoring occasion).

One or more {a serving cell, a PDCCH monitoring occasion}-pairs with a same serving cell index and a same PDCCH monitoring occasion may be ordered based on a reception timing of an earliest (or a latest) PDSCH scheduled by a DCI of one or more DCIs via the one or more {a serving cell, a PDCCH monitoring occasion}-pairs. The earliest PDSCH may be first PDSCH scheduled by the DCI. The earliest (or the first) PDSCH may be the DCI when the DCI may not have scheduled a PDSCH. The latest PDSCH may be last PDSCH scheduled by the DCI. The latest PDSCH (or last) may be the DCI when the DCI may not have scheduled a PDSCH. The reception timing may be determined based on the DCI when the DCI may not have scheduled a PDSCH.

An order of (or a rule to order) the set of {a serving cell, a PDCCH monitoring occasion}-pair(s) may be referred as a PDCCH-monitoring-order.

Figure 32:
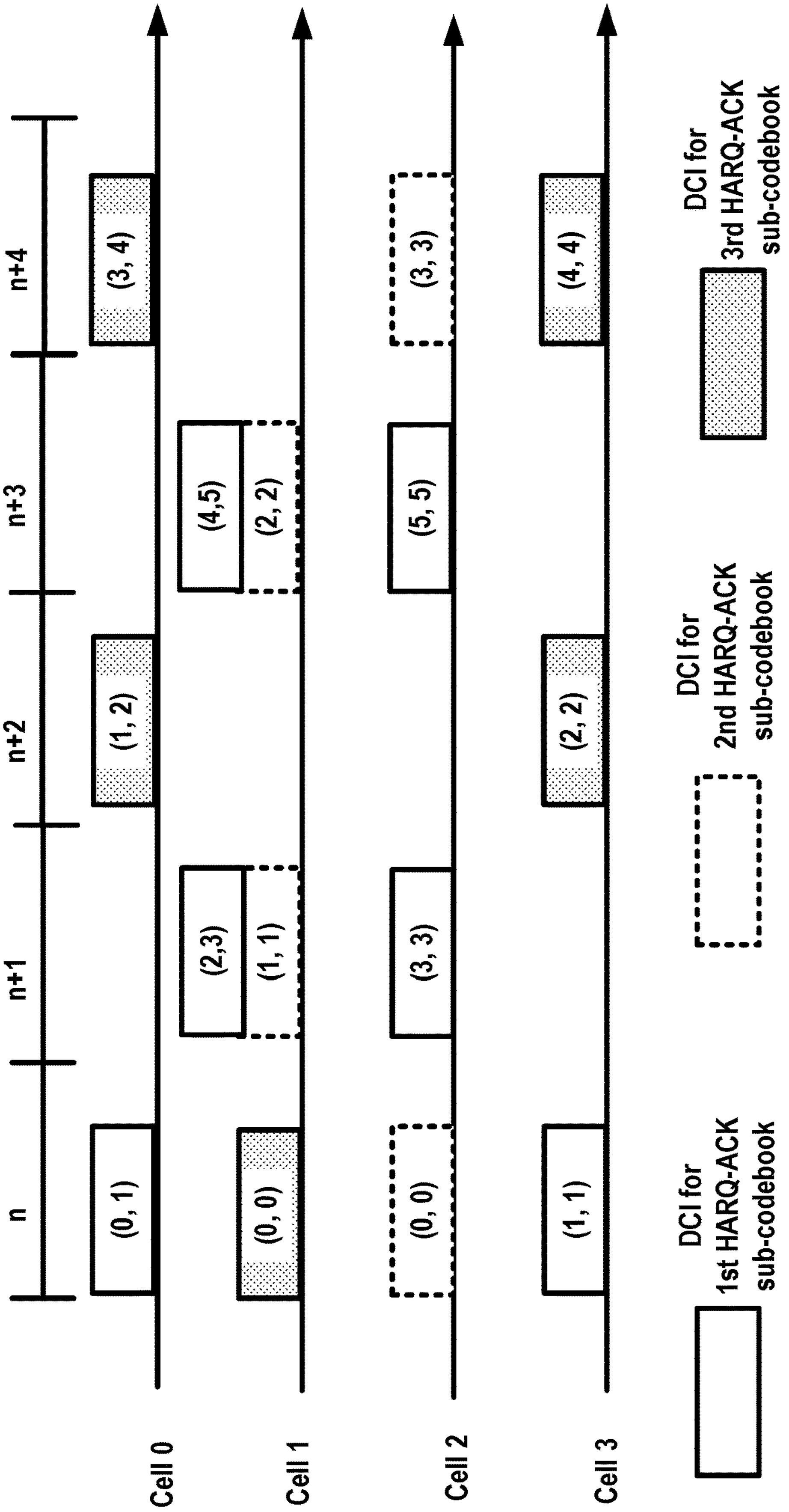
FIG. 32 illustrates a DAI procedure for each HARQ-ACK sub-codebook as per an aspect of an embodiment of the present disclosure.

FIG. 32 illustrates a DAI procedure for each HARQ-ACK sub-codebook as per an aspect of an embodiment of the present disclosure. FIG. 32 illustrates an example of how DAI value is incremented in each DCI transmission via a PDCCH monitoring occasion.

An actual value in a DCI field for a DAI value may be different based on a modulo operation. For example, when a bit size of the DCI field for the DAI value is 2, a maximum value, that the DCI field may indicate, is 4. The wireless device and the base station may determine DAI value as DAI value % the maximum value. For example, in case of DAI=4, instead of 4, 0 is indicated. In the FIG. 32, (4, 5) may be transmitted as (0, 1). (3, 4) may be indicated as (3, 0).

For example, a wireless device may be configured with four serving cells (e.g., cell 0, cell 1, cell 2, and cell 3). In a slot n, or a PDCCH monitoring occasion n, the wireless device may receive four DCIs via each cell.

A set of {a serving cell, a PDCCH monitoring occasion} may be ordered based on a PDCCH-monitoring-order for each DAI counter procedure. For example, a set of {(cell 0, slot n), (cell 3, slot n), (cell 1, slot n+1), (cell 2, slot n+1), (cell 1, slot n+3), (cell 2, slot n+3)} may be ordered for a first DAI counter for a first HARQ-ACK sub-codebook.

For example, a set of {(cell 2, slot n), (cell 1, slot n+1), (cell 1, slot n+3), (cell 2, slot n+4)} may be ordered for a second DAI counter for a second HARQ-ACK sub-codebook.

For example, a set of {(cell 1, slot n), (cell 1, slot n+2), (cell 3, slot n+2), (cell 1, slot n+4), (cell 3, slot n+4)} may be ordered for a second DAI counter for a second HARQ-ACK sub-codebook.

A first cell (cell 0) may indicate (C-DAI, T-DAI)=(0, 1) indicating a counter DAI for a first DCI being first (e.g., $1^{st}$ order) in a first HARQ-ACK sub-codebook and there are two DCIs scheduled by the PDCCH monitoring n for the first HARQ-ACK sub-codebook.

A second cell (cell 1) may indicate (C-DAI, T-DAI)=(0, 0) indicating a counter DAI for a second DCI being first (e.g., $1^{st}$ order) in a third HARQ-ACK sub-codebook and there is one DCI scheduled by the PDCCH monitoring n for the third HARQ-ACK sub-codebook.

A third cell (cell 2) may indicate (C-DAI, T-DAI)=(0, 0) indicating a counter DAI for a third DCI being first (e.g., $1^{st}$ order) in a second HARQ-ACK sub-codebook and there is one DCI scheduled by the PDCCH monitoring n for the second HARQ-ACK sub-codebook.

A fourth cell (cell 3) may indicate (C-DAI, T-DAI)=(1, 1) indicating a counter DAI for a fourth DCI being second (e.g., $2^{nd}$ order) in the first HARQ-ACK sub-codebook and there are two DCIs scheduled by the PDCCH monitoring n for the first HARQ-ACK sub-codebook.

In a slot n+1 or a second PDCCH monitoring occasion n+1, the wireless device may receive three DCIs.

The second cell (cell 1) may indicate (C-DAI, T-DAI)=(2, 3) indicating a counter DAI for a fifth DCI being third (e.g., 3rd order) in the first HARQ-ACK sub-codebook and there are four DCIs scheduled by the PDCCH monitoring n+1 for the first HARQ-ACK sub-codebook.

The second cell (cell 1) may indicate (C-DAI, T-DAI)=(1, 1) indicating a counter DAI for a sixth DCI being third (e.g., 2nd order) in the second HARQ-ACK sub-codebook and there are two DCIs scheduled by the PDCCH monitoring n+1 for the second HARQ-ACK sub-codebook.

The third cell (cell 1) may indicate (C-DAI, T-DAI)=(3, 3) indicating a counter DAI for a seventh DCI being fourth (e.g., $4^{th}$ order) in the first HARQ-ACK sub-codebook and there are four DCIs scheduled by the PDCCH monitoring n+1 for the first HARQ-ACK sub-codebook.

Similarly, a DAI procedure for each sub-codebook may increment per each DCI in a PDCCH monitoring occasion (e.g., (1,2) and (2,2) for the third HARQ-ACK codebook in a PDCCH monitoring occasion n+2).

In a slot n+4 or a PDCCH monitoring occasion n+4, the wireless device may receive three DCIs. Two DCIs may be mapped to the third HARQ-ACK codebook ($4^{th}$ and $5^{th}$ of total 5 entries). One DCI may be mapped to the second HARQ-ACK codebook ($4^{th}$ of total 4 entries).

Each entry of each HARQ-ACK sub-codebook may comprise K1, M, or N bits of HARQ-ACK bit(s) based on which sub-codebook (e.g., the first HARQ-ACK sub-codebook with K1 bit(s), the second HARQ-ACK sub-codebook with M bits, the third HARQ-ACK sub-codebook with N bits).

In an example, a fallback DCI may satisfy the first category regardless of a CBG configuration and/or a multi-PDSCH scheduling for a cell. The fallback DCI may schedule resources for the cell. The wireless device may determine HARQ-ACK bit(s) based on the fallback DCI for the first HARQ-ACK codebook.

The wireless device may determine whether to include the third HARQ-ACK sub-codebook in a HARQ-ACK codebook based on one or more conditions being met. For example, the wireless device may determine to transmit the third HARQ-ACK sub-codebook in response to the HARQ-ACK codebook being transmitted via a PUSCH (e.g., multiplexed with the PUSCH, piggybacked with the PUSCH). For example, the wireless device may determine to transmit the third HARQ-ACK sub-codebook in response to a number of PRBs (resource blocks) of a PUCCH resource, for the HARQ-ACK codebook, being larger than a threshold (e.g., 3 PRBs or 2 PRBs). For example, the wireless device may determine to transmit the third HARQ-ACK sub-codebook in response to a PUCCH is indicated as a PUCCH SCell (or a PCell).

When the wireless device may determine not to transmit the third HARQ-ACK sub-codebook, the wireless device may determine one or more HARQ-ACK bits (<=M bits) for one or more PDSCHs scheduled by a multi-PDSCH DCI, wherein the multi-PDSCH DCI may not satisfy the first category. For example, a number of the one or more PDSCHs may be between (K1, M].

In an example, a wireless device may determine a first HARQ-ACK codebook comprising a first HARQ-ACK sub-codebook and a second HARQ-ACK sub-codebook. The wireless device may determine a second HARQ-ACK codebook comprising a third HARQ-ACK sub-codebook. The wireless device may encode/generate bitstream for each HARQ-ACK codebook (e.g., separate bitstreams for the first HARQ-ACK codebook and the second HARQ-ACK codebook).

The wireless device may be scheduled with the second HARQ-ACK codebook and a CSI feedback via a PUCCH resource or a PUSCH resource. The wireless device may drop the CSI feedback and transmit the second HARQ-ACK codebook when the second HARQ-ACK codebook and the CSI feedback overlap in the same resource.

The wireless device may drop the second HARQ_ACK codebook when the second HARQ-ACK codebook and the CSI feedback overlap in the same resource.

The wireless device may drop the CSI feedback, when the second HARQ-ACK codebook and the CSI feedback overlap in the same resource, in response to the CSI feedback is for a second CSI feedback (e.g., CSI part 2)). For example, a CSI report may comprise a first CSI (e.g., CSI part 1) and the second CSI feedback (e.g., CSI part 2). For example, CSI part 1 may be based on a Type1 report configuration. CSI part 2 may be based on a type 2 report configuration. The wireless device may prioritize CSI part 1 over the second HARQ-ACK codebook. The wireless device may prioritize the second HARQ-ACK codebook over CSI part 2. The wireless device may transmit a prioritized transmission and drop a deprioritized transmission when an overlap occurs.

In an example, a wireless device may be configured with a serving cell. The wireless device may receive one or more RRC messages indicating configuration parameters. The configuration parameters may indicate a multi-PDSCH scheduling, based on a multi-PDSCH DCI format, for the serving cell. The configuration parameters may comprise/indicate one or more search spaces associated with a plurality of DCI formats. The plurality of DCI formats may comprise a fallback DCI format (e.g., DCI format 1_0) and the multi-PDSCH DCI format.

The wireless device may receive a first DCI, based on the multi-PDSCH DCI format and via a first PDCCH monitoring occasion, indicating resources for a first PDSCH scheduling a first transport block. The first DCI may schedule a single PDSCH that is the first PDSCH. The second PUCCH may indicate a PUCCH resource.

The wireless device may receive a second DCI, based on the fallback DCI format and via a second PDCCH monitoring occasion, indicating resources for a second PDSCH scheduling a second transport block. The second DCI may indicate the PUCCH resource. The first PDCCH monitoring occasion occurs before the second PDCCH monitoring occasion.

The wireless device may determine a first HARQ-ACK bit corresponding to the transport block. The wireless device may determine a second HARQ-ACK bit corresponding to the second transport block.

The wireless device may generate a HARQ-ACK codebook comprising the first HARQ-ACK bit and the second HARQ-ACK bit, wherein the first HARQ-ACK bit is placed before the second HARQ-ACK bit.

For example, the first DCI may comprise a first C-DAI and a first T-DAI where the first C-DAI indicates a first predetermined value (e.g., 0) and the first T-DAI indicates the first predetermined value (e.g., 0).

For example, the second DCI may comprise a second C-DAI and a second T-DAI where the second C-DAI indicates the first predetermined value (e.g., 0) and the second T-DAI indicates the first predetermined value (e.g., 0).

For example, the HARQ-ACK codebook comprises a first HARQ-ACK sub-codebook and a second HARQ-ACK sub-codebook. The first HARQ-ACK sub-codebook may comprise the second HARQ-ACK bit. The second HARQ-ACK sub-codebook may comprise the first HARQ-ACK bit. The first HARQ-ACK sub-codebook may be placed before the second HARQ-ACK sub-codebook (e.g., the second HARQ-ACK sub-codebook is appended to the first HARQ-ACK sub-codebook).

In an example, a wireless device may determine a DCI may satisfy the first category in response to the DCI being based on a fallback DCI format (e.g., DCI format 1_0). The wireless device may determine a DCI may satisfy the second category in response to the DCI being based on a multi-PDSCH DCI format.

Figure 33:
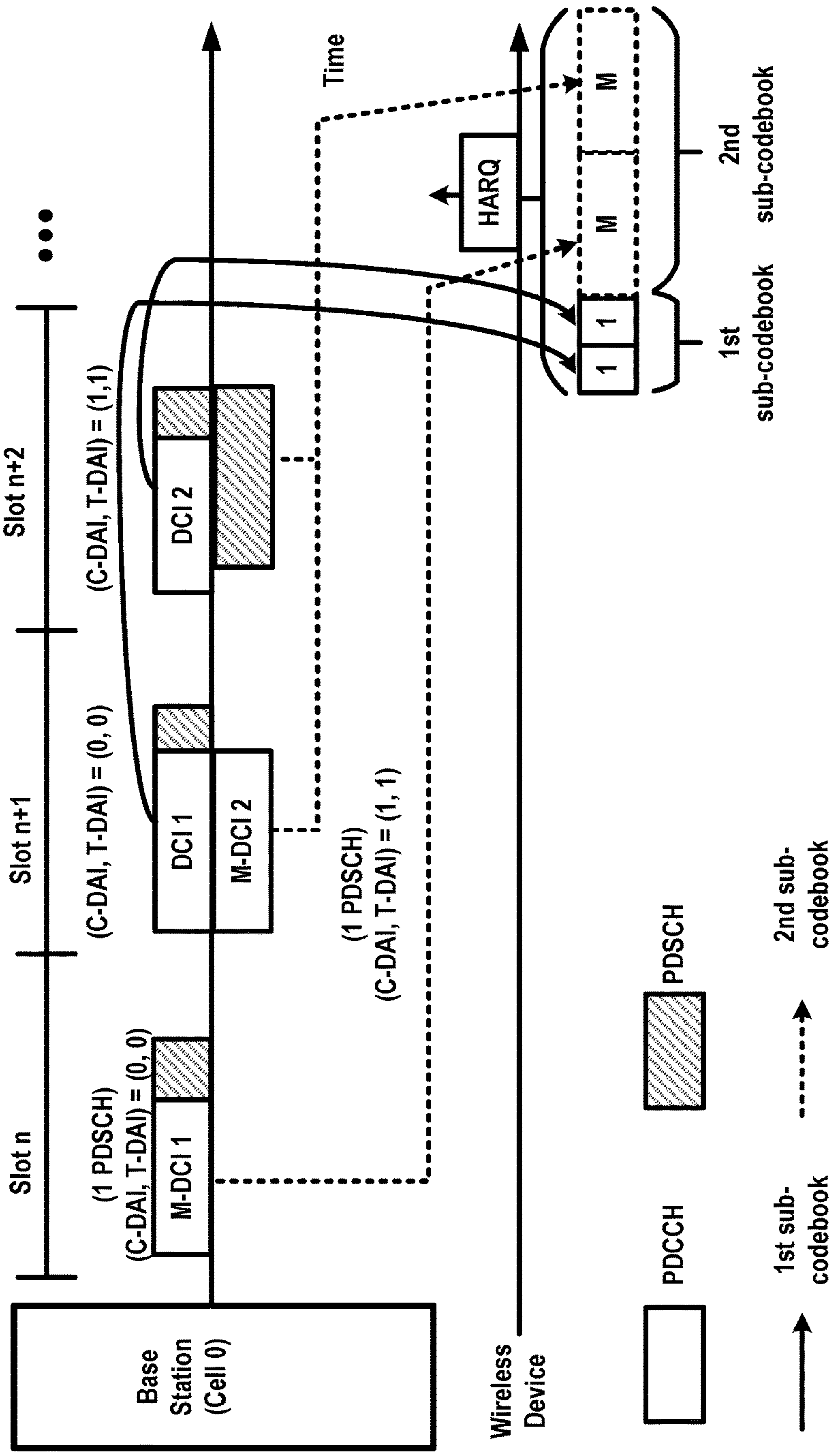
FIG. 33 illustrates an example embodiment as per an aspect of an embodiment of the present disclosure.

FIG. 33 illustrates an example embodiment as per an aspect of an embodiment of the present disclosure.

The wireless device may be configured with a serving cell (e.g., Cell 0). The wireless device may receive one or more RRC messages indicating a multi-PDSCH scheduling for the serving cell. The base station may transmit (and the wireless device may receive) a first multi-PDSCH DCI (M-DCI 1), based on a multi-PDSCH DCI format, scheduling a first PDSCH at a slot n. The wireless device may receive a first DCI (DCI 1), based on a fallback DCI format, scheduling a second PDSCH at a slot n+1.

The wireless device may receive a second multi-PDSCH DCI (M-DCI 2), via the slot n+1, scheduling a third PDSCH. The wireless device may receive the first DCI and the second DCI via a same PDCCH monitoring occasion (e.g., the same slot, the same mini-slot, the same frame, the same subframe) or one or more PDCCH monitoring occasions occurring simultaneously.

The wireless device may receive a second DCI (DCI 2), based on the fallback DCI format, scheduling a fourth PDSCH.

The wireless device may determine an order of a HARQ-ACK codebook based on one or more PDSCHs scheduled based on a fallback DCI format, and then one or more second PDSCHs scheduled based on a multi-PDSCH DCI format. The first/second DCIs and the first/second multi-PDSCH DCIs may indicate a PUCCH resource.

The wireless device may generate the HARQ-ACK codebook comprising a first bit for the second PDSCH, a second bit for the fourth PDSCH, [2, 1+M] bits for the second PDSCH (e.g., a first bit of [2, 1+M] bits for the first PDSCH, and [0, . . . , 0] (NACK values) for the remaining bit(s)), and [2+M, 1+2M] bits for the third PDSCH.

The multi-PDSCH DCI format may be a non-fallback DCI format. The multi-PDSCH DCI format may comprise a TDRA resource allocation field indicating a TDRA table, where a TDRA entry of the TDRA table may indicate a plurality of SLIV values across a plurality of slots.

The wireless device may transmit the HARQ_ACK codebook via the PUCCH resource.

In an example, following shows an example embodiment.

When a wireless device receives a first DCI format that the wireless device detects in a first PDCCH monitoring occasion and comprises a PDSCH-to-HARQ_feedback timing indicator field providing an inapplicable value from dl-DataToUL-ACK-r16, the wireless device may perform the followings.

When the wireless device detects a second DCI format, the wireless device may multiplex the corresponding HARQ-ACK information in a PUCCH or PUSCH transmission in a slot that is indicated by a value of a PDSCH-to-HARQ_feedback timing indicator field in the second DCI forma. For example, when the wireless device is not provided (e.g., not configured with) pdsch-HARQ-ACK-Codebook-r16, the wireless device may detect the second DCI format in any PDCCH monitoring occasion after the first one, and where the slot indicated by the value of the PDSCH-to-HARQ_feedback timing indicator field in the second DCI format is no later than a slot for HARQ-ACK information in response to a SPS PDSCH reception, if any, received after the PDSCH scheduled by the first DCI format.

When the wireless device is provided pdsch-HARQ-ACK-Codebook-r16, the wireless device may detect the second DCI format in any PDCCH monitoring occasion after the first one, and the second DCI format may indicate a HARQ-ACK information report for a same PDSCH group index as indicated by the first DCI format, and where the slot indicated by the value of the PDSCH-to-HARQ_feedback timing indicator field in the second DCI format is no later than a slot for HARQ-ACK information in response to a SPS PDSCH reception, if any, received after the PDSCH scheduled by the first DCI format.

When the wireless device is provided pdsch-HARQ-ACK-Codebook=enhancedDynamic-r16, the wireless device may receive the second DCI format later than the slot for HARQ-ACK information in response to a SPS PDSCH reception received after the PDSCH scheduled by the first DCI format, and the second DCI format indicates a HARQ-ACK information report for a same PDSCH group index as indicated by the first DCI format.

When the wireless device is provided pdsch-HARQ-ACK-OneShotFeedback, the first DCI format does not indicate SPS PDSCH release or SCell dormancy, the wireless device detects the second DCI format in any PDCCH monitoring occasion after the first one, and the second DCI format comprises a One-shot HARQ-ACK request field with value 1, the wireless device comprises the HARQ-ACK information in a Type-3 HARQ-ACK codebook, and where the slot indicated by the value of the PDSCH-to-HARQ_feedback timing indicator field in the second DCI format is no later than a slot for HARQ-ACK information in response to a SPS PDSCH reception, if any, received after the PDSCH scheduled by the first DCI format.

When the wireless device is provided pdsch-HARQ-ACK-OneShotFeedback-r16, the first DCI format does not indicate SPS PDSCH release or SCell dormancy, and the wireless device receives the second DCI format later than the slot for HARQ-ACK information in response to a SPS PDSCH reception received after the PDSCH scheduled by the first DCI format, and the second DCI format comprises a One-shot HARQ-ACK request field with value 1, the wireless device may determine the HARQ-ACK information in a Type-3 HARQ-ACK codebook.

When the above condition(s) may not be met, the wireless device may not multiplex the corresponding HARQ-ACK information in a PUCCH or PUSCH transmission.

In an example, a wireless device may determine monitoring occasions for PDCCH with a DCI format scheduling PDSCH receptions or SPS PDSCH release or indicating SCell dormancy on an active DL BWP of a serving cell c, and for which the wireless device may transmit HARQ-ACK information in a same PUCCH in slot n based on the followings. For example, it may be based on PDSCH-to-HARQ_feedback timing indicator field values for PUCCH transmission with HARQ-ACK information in slot n in response to PDSCH receptions, SPS PDSCH release or SCell dormancy indication. For example, it may be based on slot/scheduling offsets $K_0$ provided by time domain resource assignment field in a DCI format scheduling PDSCH receptions and by pdsch-AggregationFactor, or pdsch-AggregationFactor-r16, or repetitionNumber, when provided.

The set of PDCCH monitoring occasions for a DCI format scheduling PDSCH receptions or SPS PDSCH release or indicating SCell dormancy may be defined as the union of PDCCH monitoring occasions across active DL BWPs of configured serving cells. PDCCH monitoring occasions are indexed in an ascending order of start time of the search space sets associated with a PDCCH monitoring occasion. The cardinality of the set of PDCCH monitoring occasions defines a total number M of PDCCH monitoring occasions.

A value of the counter downlink assignment indicator (DAI) field in DCI formats may denote the accumulative number of {serving cell, PDCCH monitoring occasion}-pair(s) in which PDSCH reception(s), SPS PDSCH release or SCell dormancy indication associated with the DCI formats is present up to the current serving cell and current PDCCH monitoring occasion, based on one or more followings. First, when a wireless device may indicate supporting for more than one PDSCH reception (e.g., receiving more than one DCIs via a PDCCH monitoring occasion) on a serving cell that may be scheduled from a same PDCCH monitoring occasion, increasing order of the PDSCH reception starting time for the same {serving cell, PDCCH monitoring occasion} pair may be used for a DAI determination/procedure. Second, an order may be determined based on ascending order of serving cell index. Third, an order may be further based on ascending order of PDCCH monitoring occasion index m, where $0 \leq m < M$.

If, for an active DL BWP of a serving cell, the wireless device is not provided coresetPoolIndex or is provided coresetPoolIndex with value 0 for one or more first CORESETs and is provided coresetPoolIndex with value 1 for one or more second CORESETs, and is provided ackNackFeedbackMode=joint, the value of the counter DAI may be in the order of the one or more first CORESETs and then the one or more second CORESETs for a same serving cell index and a same PDCCH monitoring occasion index.

The value of the total DAI in a DCI format may denote the total number of {serving cell, PDCCH monitoring occasion}-pair(s) in which PDSCH reception(s), SPS PDSCH release or SCell dormancy indication associated with DCI formats is present, up to the current PDCCH monitoring occasion m and is updated from PDCCH monitoring occasion to PDCCH monitoring occasion. If, for an active DL BWP of a serving cell, the wireless device is not provided coresetPoolIndex or is provided coresetPoolIndex with value 0 for one or more first CORESETs and is provided coresetPoolIndex with value 1 for one or more second CORESETs, and is provided ackNackFeedbackMode=joint, the total DAI value may count the {serving cell, PDCCH monitoring occasion}-pair(s) for both the first CORESETs and the second CORESETs.

The number of bits for the counter DAI may be denoted by $$N_{C-DAI}^{DL} \text{ and } T_D = 2^{N_{C-DAI}^{DL}}$$

may be set.

The value of the counter DCAI may be denoted as $$(V_{C-DAI,c,m}^{DL}).$$

The value may be carried via/in a DCI format scheduling PDSCH reception, SPS PDSCH release or SCell dormancy indication on serving cell c in PDCCH monitoring occasion m.

$$V_{T-DAI,m}^{DL}$$

may indicate the value of the total DAI in a DCI format in PDCCH monitoring occasion m. The wireless device may assume/consider/determine a same value of total DAI in one or more DCI formats in PDCCH monitoring occasion m. For example, the wireless device may determine the one or more DCI formats based on a sub-codebook.

For example, the wireless device may determine a DCI format 1_0 and/or DCI format 11 (without CBGTI field, and not used for a multi-PDSCH scheduling) and/or DCI format 12 (without CBGTI field, and not used for a multi-PDSCH scheduling) may have a same total DAI value in a PDCCH monitoring occasion.

For example, the wireless device may determine a DCI format 1_0 and/or DCI format 11 (without CBGTI field, and not used for a multi-PDSCH scheduling) and/or DCI format 12 (without CBGTI field, and not used for a multi-PDSCH scheduling) and/or a DCI format X (e.g., a multi-PDSCH DCI format) scheduling up to K1 PDSCHs may have a same total DAI value in a PDCCH monitoring occasion.

For example, the wireless device may determine a DCI format 1 DCI format 1_1 (with CBGTI field, and not used for a multi-PDSCH scheduling) and/or DCI format 1_2 (with CBGTI field, and not used for a multi-PDSCH scheduling) and/or a DCI format X (e.g., a multi-PDSCH DCI format) (scheduling between (K1, M] PDSCHs may have a same total DAI value in a PDCCH monitoring occasion.

For example, the wireless device may determine a DCI format 1 DCI format 1_1 (with CBGTI field, and not used for a multi-PDSCH scheduling) and/or DCI format 1_2 (with CBGTI field, and not used for a multi-PDSCH scheduling) and/or a DCI format X (e.g., a multi-PDSCH DCI format) may have a same total DAI value in a PDCCH monitoring occasion.

For example, the wireless device may determine a first total DAI for a multi-PDSCH DCI format different from a second total DAI for a fallback DCI format (or DCI format 1_1 or DCI format 1_2) in a same PDCCH monitoring occasion.

A wireless device may not expect to multiplex, in a same Type-2 HARQ-ACK codebook, HARQ-ACK information that is in response to detection of DCI formats with different number of bits for the counter DAI field.

The wireless device may transmit HARQ-ACK information in a PUCCH in slot n and for any PUCCH format, the wireless device determines the $$\tilde{o}_0^{ACK}, \tilde{o}_1^{ACK}, \ldots \tilde{o}_{o_{ACK}-1}^{ACK},$$

for a total number of $O_{ACK}$ HARQ-ACK information bits, according to Pseudo-Code (1) as follows:

Denote by $$N_{C-DAI}^{DL}$$

the number of bits for the counter DAI and set $$T_D = 2^{N_{C-DAI}^{DL}}.$$

Denote by $$V_{C-DAI,c,m}^{DL}$$

the value of the counter DAI in a DCI format scheduling PDSCH reception, SPS PDSCH release or SCell dormancy indication on serving cell c in PDCCH monitoring occasion m. Denote by $$V_{T-DAI,m}^{DL}$$

the value of the total DAI in a DCI format in PDCCH monitoring occasion m. The UE assumes a same value of total DAI in all DCI formats that include a total DAI field in PDCCH monitoring occasion m. A UE does not expect to multiplex, in a same Type-2 HARQ-ACK codebook, HARQ-ACK information that is in response to detection of DCI formats with different number of bits for the counter DAI field. If the UE transmits HARQ-ACK information in a PUCCH in slot n and for any PUCCH format, the UE determines the $$\tilde{o}_0^{ACK}, \tilde{o}_1^{ACK}, \ldots \tilde{o}_{o_{ACK}-1}^{ACK},$$

for a total number of $O_{ACK}$ HARQ-ACK information bits, according to the following pseudo-code:

Set m = 0 - PDCCH with DCI format scheduling PDSCH reception, SPS PDSCH release or SCell dormancy indication monitoring occasion index: lower index corresponds to earlier PDCCH monitoring occasion
Set j = 0
Set $V_{temp} = 0$
Set $V_{temp2} = 0$
Set $V_s = \emptyset$ Set $N_{cells}^{DL}$ to the number of serving cells configured by higher layers for the UE
if, for an active DL BWP of a serving cell, the UE is not provided coresetPoolIndex or is provided coresetPoolIndex with value 0 for one or more first CORESETs and is provided coresetPoolIndex with value 1 for one or more second CORESETs, and is provided ACKNackFeedbackMode = JointFeedback, the serving cell is counted two times where the first time corresponds to the first CORESETs and the second time corresponds to the second CORESETs
if the UE indicates type2-HARQ-ACK-Codebook, a serving cell is counted $N_{PDSCH}^{MO}$ times where $N_{PDSCH}^{MO}$ is the number of PDSCH receptions that can be scheduled for the serving cell by DCI formats in PDCCH receptions at a same PDCCH monitoring occasion based on the reported value of type2-HARQ-ACK-Codebook
Set M to the number of PDCCH monitoring occasion(s)
while m < M
Set c = 0 - serving cell index: lower indexes correspond to lower RRC indexes of corresponding cell while $c < N_{cells}^{DL}$ if PDCCH monitoring occasion m is before an active DL BWP change on serving cell c or an active UL BWP change on the PCell and an active DL BWP change is not triggered in PDCCH monitoring occasion m
c = c + 1;
else
if there is a PDSCH on serving cell c associated with PDCCH in PDCCH monitoring occasion m, or there is a PDCCH indicating SPS PDSCH release or SCell dormancy on serving cell c if $V_{C-DAI,c,m}^{DL} \leq V_{temp}$ j = j + 1
end if $V_{temp} = V_{C-DAI,c,m}^{DL}$ if $V_{T-DAI,m}^{DL} = \emptyset$ $V_{temp,2} = V_{C-DAI,c,m}^{DL}$ else $V_{temp} = V_{T-DAI,m}^{DL}$ end if -continued if harq-ACK-SpatialBundlingPUCCH is not provided and the UE is configured by maxNrofCodeWordsScheduledByDCI with reception of two transport blocks for at least one configured DL BWP of at least one serving cell, $$\tilde{o}^{ACK}_{2\cdot T_D\cdot j+2\left(V^{DL}_{C-DAI,c,m}-1\right)} = HARQ\text{-}ACK$$

information bit corresponding to the first transport block of this cell $$\tilde{o}^{ACK}_{2\cdot T_D\cdot j+2\left(V^{DL}_{C-DAI,c,m}-1\right)+1} = HARQ\text{-}ACK$$

information bit corresponding to the second transport block of this cell $$V_s = V_s \cup \left\{2\cdot T_D\cdot j + 2\left(V^{DL}_{C-DAI,c,m}-1\right),\ 2\cdot T_D\cdot j + 2\left(V^{DL}_{C-DAI,c,m}-1\right)+1\right\}$$

elseif harq-ACK-SpatialBundlingPUCCH is provided to the UE and m is a monitoring occasion for PDCCH with a DCI format that supports PDSCH reception with two transport blocks and the UE is configured by maxNrofCodeWordsScheduledByDCI with reception of two transport blocks in at least one configured DL BWP of a serving cell, $$\tilde{o}^{ACK}_{T_D\cdot j+V^{DL}_{C-DAI,c,m}-1} = \text{binary}$$

AND operation of the

HARQ-ACK information bits corresponding to the first and second transport blocks of this cell $$V_s = V_s \cup \left\{T_D\cdot j + V^{DL}_{C-DAI,c,m}-1\right\}$$

else $$\tilde{o}^{ACK}_{T_D\cdot j+V^{DL}_{C-DAI,c,m}-1} = HARQ\text{-}ACK$$

information bit of this cell $$V_s = V_s \cup \left\{T_D\cdot j + V^{DL}_{C-DAI,c,m}-1\right\}$$

end if
end if
c = c+ 1
end if
end while
m = m + 1
end while $$V_{temp} = \left(j \bmod \left(\frac{4}{T_D}\right)\right)\times\left(\frac{4}{T_D}\right) + V_{temp}$$

if UE does not set $V_{temp2} = V^{UL}_{DAI}$ and $T_D = 2$ $V_{temp2} = V_{temp}$
end if $$J = \left\lfloor \frac{j\times T_D}{4} \right\rfloor$$

-continued

```
if V_temp2 < V_temp
  j = j + 1
end if
if harq-ACK-SpatialBundlingPUCCH is not provided to the UE and
the UE is configured by maxNrofCodeWordsScheduledByDCI with
reception of two transport blocks for at least one configured DL
BWP of a serving cell,
  O^ACK = 2 · (4 · j + V_temp2)
else
  O^ACK = 4 · j + V_temp2
end if
```

$\tilde{o}_i^{ACK} = NACK$ for any $i \in \{0, 1, \ldots, O^{ACK}-1\} \setminus V_s$ Pseudo-Code (1)

When a wireless device is configured to receive SPS PDSCH and the wireless device may multiplex HARQ-ACK information for one activated SPS PDSCH reception in the PUCCH in slot n, the wireless device may generate one HARQ-ACK information bit associated with the SPS PDSCH reception and appends it to the $O^{ACK}$ HARQ-ACK information bits.

When a wireless device is configured to receive SPS PDSCH and the wireless device multiplexes HARQ-ACK information for multiple activated SPS PDSCH receptions in the PUCCH in slot n, the wireless device generates the HARQ-ACK information as described and appends it to the $O^{ACK}$ HARQ-ACK information bits.

For a PDCCH monitoring occasion with DCI format scheduling PDSCH reception or SPS PDSCH release or indicating SCell dormancy in the active DL BWP of a serving cell, when a wireless device receives a PDSCH with one transport block or a SPS PDSCH release or indicating SCell dormancy and the value of maxNrofCodeWordsScheduledByDCI is 2, the HARQ-ACK information is associated with the first transport block and the wireless device may generate a NACK for the second transport block if harq-ACK-SpatialBundlingPUCCH is not provided and generates HARQ-ACK information with value of ACK for the second transport block if harq-ACK-SpatialBundlingPUCCH is provided.

The HARQ-ACK information (e.g., the $O^{ACK}$ HARQ-ACK information bits) may correspond to the first HARQ-ACK sub-codebook. The wireless device may determine one or more multi-PDSCH DCIs satisfying the first category in response to a number of one or more PDSCHs scheduled by each of the one or more multi-PDSCH DCIs is lower than a TB_HARQ_Threshold. The wireless device may determine $$N_{cells}^{DL}$$

comprises/counts a serving cell configured with a multi-PDSCH scheduling.

When a wireless device is not provided PDSCH-CodeBlockGroupTransmission for each of the $$N_{cells}^{DL}$$

serving cells, or for PDSCH receptions scheduled by a DCI format that does not support CBG-based PDSCH receptions, or for SPS PDSCH reception, or for SPS PDSCH release, or for SCell dormancy indication, and if $O_{ACK}+O_{SR}+O_{CSI} \leq 11$, the wireless device determines a number of HARQ-ACK information bits $n_{HARQ\text{-}ACK}$ as $$n_{HARQ-ACK} =$$

$$n_{HARQ-ACK,TB} = \left(\left(V_{DAI,m_{last}}^{DL} - \sum_{c=0}^{N_{cells}^{DL}-1} I_{DAI,c}\right) \bmod(T_D)\right) N_{TB,max}^{DL} + \sum_{c=0}^{N_{cells}^{DL}-1} \left(\sum_{m=0}^{M-1} N_{m,c}^{received} + N_{SPS,c}\right).$$

When $$N_{cells}^{DL} = 1,\ V_{DAI,m_{last}}^{DL}$$

may be the value of the counter DAI in the last DCI format scheduling PDSCH reception or indicating SPS PDSCH release or indicating Scell dormancy, for any serving cell c that the wireless device detects within the M PDCCH monitoring occasions.

When the wireless device does not detect any DCI format that comprises a total DAI field in a last PDCCH monitoring occasion within the M PDCCH monitoring occasions where the wireless device detects at least one DCI format scheduling PDSCH reception, indicating SPS PDSCH release or indicating Scell dormancy for any serving cell c, $$V_{DAI,m_{last}}^{DL}$$

is the value of the counter DAI in a last DCI format the wireless device detects in the last PDCCH monitoring occasion.

When the wireless device may detect at least one DCI format that comprises a total DAI field in a last PDCCH monitoring occasion within the M PDCCH monitoring occasions where the wireless device detects at least one DCI format scheduling PDSCH reception, indicating SPS PDSCH release or indicating Scell dormancy for any serving cell c, $$V_{DAI,m_{last}}^{DL}$$

is the value of the total DAI in the at least one DCI format that comprises a total DAI field.

When the wireless device does not detect any DCI format scheduling PDSCH reception, indicating SPS PDSCH release or indicating Scell dormancy for any serving cell c in any of the M PDCCH monitoring occasions, $$V_{DAI,m_{last}}^{DL}=0.$$

For example, $U_{DAI,c}$ may be a total number of a DCI format scheduling PDSCH reception, indicating SPS PDSCH release or indicating Scell dormancy that the wireless device detects within the M PDCCH monitoring occasions for serving cell c. $U_{DAI,c}=0$ if the wireless device does not detect any DCI format scheduling PDSCH reception, indicating SPS PDSCH release or indicating Scell dormancy for serving cell c in any of the M PDCCH monitoring occasions.

$$N_{TB,max}^{DL}=2$$

if the value of maxNrofCodeWordsScheduledByDCI is 2 for any serving cell c and harq-ACK-SpatialBundlingPUCCH is not provided; otherwise, $$N_{TB,max}^{DL}=1.$$

$$N_{m,c}^{received}$$

may be a number of transport blocks the wireless device receives in a PDSCH scheduled by a DCI format that the wireless device detects in PDCCH monitoring occasion m for serving cell c if harq-ACK-SpatialBundlingPUCCH is not provided, or the number of PDSCH scheduled by a DCI format that the wireless device detects in PDCCH monitoring occasion m for serving cell c if harq-ACK-SpatialBundlingPUCCH is provided, or the number of DCI format that the wireless device detects and indicate SPS PDSCH release in PDCCH monitoring occasion m for serving cell c, or the number of DCI format that the wireless device detects and indicate Scell dormancy in PDCCH monitoring occasion m for serving cell c.

$N_{SPS,c}$ may be a number of SPS PDSCH receptions by the wireless device on serving cell c for which the wireless device transmits corresponding HARQ-ACK information in the same PUCCH as for HARQ-ACK information corresponding to PDSCH receptions within the M PDCCH monitoring occasions.

When the wireless device is provided PDSCH-CodeBlockGroupTransmission for $$N_{cells}^{DL,CBG}$$

serving cells; and is not provided PDSCH-CodeBlockGroupTransmission, for $$N_{cells}^{DL,TB}$$

serving cells where $$N_{cells}^{DL,TB}+N_{cells}^{DL,CBG}=N_{cells}^{DL},$$

the wireless device may determine the $$\tilde{o}_0^{ACK},\tilde{o}_1^{ACK},\ldots,\tilde{o}_{o^{ACK}-1}^{ACK}$$

according to the previous example pseudo-code with the following modifications.

For example, $$N_{cells}^{DL}$$

is used for the determination of a first HARQ-ACK sub-codebook for SPS PDSCH release, SPS PDSCH reception, DCI format 1_1 indicating SCell dormancy, and for TB-based PDSCH receptions on the $$N_{cells}^{DL,CBG}$$

serving cells and on the $$N_{cells}^{DL,TB}$$

serving cells, $$N_{cells}^{DL}$$

may be replaced by $$N_{cells}^{DL,CBG}$$

for the determination of a second HARQ-ACK sub-codebook corresponding to the $$N_{cells}^{DL,CBG}$$

serving cells for CBG-based PDSCH receptions.

If, for an active DL BWP of a serving cell, the wireless device is not provided coresetPoolIndex or is provided coresetPoolIndex with value 0 for one or more first CORESETs and is provided coresetPoolIndex with value 1 for one or more second CORESETs, and is provided ackNackFeedbackMode=joint, the serving cell is counted as two times where the first time corresponds to the first CORESETs and the second time corresponds to the second CORESETs.

The wireless device may generate, instead of generating one HARQ-ACK information bit per transport block for a serving cell from the $$N_{cells}^{DL,CBG}$$

serving cells, $$N_{HARQ-ACK,max}^{CBG/TB,max}$$

HARQ-ACK information bits.

$$N_{HARQ-ACK,max}^{CBG/TB,max}$$

may be the maximum value of $$N_{TB,c}^{DL} \cdot N_{HARQ-ACK,c}^{CBG/TB,max}$$

across all $$N_{cells}^{DL,CBG}$$

serving cells and $$N_{TB,c}^{DL}$$

may be the value of maxNrofCodeWordsScheduledByDCI for serving cell c. If for a serving cell c it is $$N_{TB,c}^{DL} \cdot N_{HARQ-ACK,c}^{CBG/TB,} < N_{HARQ-ACK,max}^{CBG/TB,max},$$

the wireless device generate NACK for the last $$N_{HARQ-ACK,max}^{CBG/TB,max} - N_{TB,c}^{DL} \cdot N_{HARQ-ACK,c}^{CBG/TB,max}$$

HARQ-ACK information bits for serving cell c.

When the wireless device is provided a multi-PDSCH scheduling for $$N_{cells}^{DL,mDCI}$$

serving cells; and is not provided multi-PDSCH scheduling, for $$N_{cells}^{DL,sDCI}$$

serving cells where $$N_{cells}^{DL,sDCI} + N_{cells}^{DL,mDCI} = N_{cells}^{DL},$$

the wireless device may determine the $$\tilde{o}_0^{ACK}, \tilde{o}_1^{ACK}, \ldots , \tilde{o}_{O^{ACK}-1}^{ACK}$$

according to the previous example pseudo-code with the following modifications.

For example, $$N_{cells}^{DL}$$

is used for the determination of a first HARQ-ACK sub-codebook for SPS PDSCH release, SPS PDSCH reception, DCI format 1_1 indicating SCell dormancy, and for a single PDSCH and TB-based PDSCH receptions on the $$N_{cells}^{DL,sDCI} \text{ and } N_{cells}^{DL,mDCI}$$

serving cells. For example, the single PDSCH and TB-based PDSCH receptions may indicate a PDSCH scheduled via a DCI scheduling the PDSCH based on a TB transmission. A multi-PDSCH DCI, scheduling less than or equal to K1 number of PDSCHs, may be feedbacked via the first HARQ-ACK sub-codebook.

$$N_{cells}^{DL}$$

be replaced by $$\left(N_{cells}^{DL,CBG} + N_{cells}^{DL,mDCI}\right)$$

for the determination of a second HARQ-ACK sub-codebook corresponding to the $$N_{cells}^{DL,CBG}$$

serving cells for CBG-based PDSCH receptions and the $$N_{cells}^{DL,CBG}$$

serving cells for a multi-PDSCH receptions. A multi-PDSCH DCI, scheduling less than or equal to M number of PDSCHs, may be feedbacked via the second HARQ-ACK sub-codebook.

$$N_{cells}^{DL}$$

may be replaced by $$N_{cells}^{DL,mDCI}$$

for the determination of a third HARQ-ACK sub-codebook corresponding to the $$N_{cells}^{DL,CBG}$$

serving cells for a multi-PDSCH receptions. A multi-PDSCH DCI, scheduling more than M number of PDSCHs, may be feedbacked via the second HARQ-ACK sub-codebook.

If, for an active DL BWP of a serving cell, the wireless device is not provided coresetPoolIndex or is provided coresetPoolIndex with value 0 for one or more first CORESETs and is provided coresetPoolIndex with value 1 for one or more second CORESETs, and is provided ackNackFeedbackMode=joint, the serving cell is counted as two times where the first time corresponds to the first CORESETs and the second time corresponds to the second CORESETs.

The wireless device may generate, instead of generating one HARQ-ACK information bit per transport block for a serving cell from the $$N_{cells}^{DL,CBG}$$

serving cells, $$N_{HARQ\text{-}ACK,max}^{CBG/TB,max}$$

HARQ-ACK information bits.

$$N_{HARQ\text{-}ACK,max}^{CBG/TB,max}$$

may be the maximum value of $$N_{TB,c}^{DL} \cdot N_{HARQ\text{-}ACK,c}^{CBG/TB,max}$$

across all $$N_{cells}^{DL,CBG}$$

serving cells and $$N_{TB,c}^{DL}$$

may be the value of maxNrofCodeWordsScheduledByDCI for serving cell c. If for a serving cell c it is $$N_{TB,c}^{DL} \cdot N_{HARQ\text{-}ACK,c}^{CBG/TB,max} < N_{HARQ\text{-}ACK,max}^{CBG/TB,max},$$

the wireless device generate NACK for the last $$N_{HARQ\text{-}ACK,max}^{CBG/TB,max} - N_{TB,c}^{DL} \cdot N_{HARQ\text{-}ACK,c}^{CBG/TB,max}$$

HARQ-ACK information bits for serving cell c.

The counter DAI value and the total DAI value may apply separately for each HARQ-ACK sub-codebook.

The wireless device may generate the HARQ-ACK codebook by appending the second HARQ-ACK sub-codebook to the first HARQ-ACK sub-codebook.

In an example, a HARQ-ACK codebook may be multiplexed via a PUSCH. Based on the previous pseudo code, the wireless device may set $$V_{temp2} = V_{DAI}^{UL} \text{ where } V_{DAI}^{UL}$$

is the value of the DAI field indicated by an uplink grant scheduling the PUSCH.

For the case of first and second HARQ-ACK sub-codebooks, the DCI format comprises a first DAI field corresponding to the first HARQ-ACK sub-codebook and a second DAI field corresponding to the second HARQ-ACK sub-codebook.

For the case of first, second and third HARQ-ACK sub-codebooks, the DCI format comprises a first DAI field corresponding to the first HARQ-ACK sub-codebook, a second DAI field corresponding to the second HARQ-ACK sub-codebook and a third DAI field corresponding to the third HARQ-ACK sub-codebook.

In an example, a wireless device may receive one or more RRC messages indicating configuration parameters. The configuration parameters may comprise/indicate a multi-PDSCH scheduling for a serving cell. The configuration parameters may comprise/indicate a number of maximum HARQ-ACK bits for the serving cell. The number of maximum HARQ-ACK bits may be smaller than or equal to a maximum number of PDSCHs schedulable by a DCI based on the multi-PDSCH scheduling for the serving cell.

The configuration parameters may indicate/comprise an index of a HARQ-ACK sub-codebook for the multi-PDSCH scheduling. For example, the index of the HARQ-ACK sub-codebook may be zero to indicate a first HARQ-ACK sub-codebook to be used for the multi-PDSCH scheduling. The index of the HARQ-ACK sub-codebook may be one to indicate a second HARQ-ACK sub-codebook to be used for the multi-PDSCH scheduling. The index of the HARQ-ACK sub-codebook may be two to indicate a third HARQ-ACK sub-codebook to be used for the multi-PDSCH scheduling.

When the number of maximum HARQ-ACK bits for the serving cell is configured, the wireless device may determine an index of a HARQ-ACK sub-codebook based on a comparison between the maximum HARQ-ACK bits and {a TB_HARQ_Threshold, a CBG_HARQ_Threshold}. For example, when the number of maximum HARQ-ACK bits is smaller than or equal to the TB_HARQ_Threshold, the wireless device may determine the first HARQ-ACK sub-codebook (e.g., the index is zero). For example, when the number of maximum HARQ-ACK bits is larger than the TB_HARQ_Threshold and is smaller than or equal to the CBG_HARQ_Threshold, the wireless device may determine the second HARQ-ACK sub-codebook (e.g., the index is zero). For example, the CBG_HARQ_Threshold may be same to TB_HARQ_Threshold when a CBG transmission is not configured for a serving cell of the wireless device.

The wireless device may determine the third HARQ-ACK sub-codebook (e.g., the index is two), when the number of maximum HARQ-ACK bits is larger than the CBG_HARQ_Threshold. When the second HARQ-ACK sub-codebook may not be present, the third HARQ-ACK sub-codebook may be appended to the first HARQ-ACK sub-codebook.

The wireless device may determine one or more PDSCHs, scheduled for the serving cell and by a multi-PDSCH DCI, or the multi-PDSCH DCI satisfying the first category in response to the number of maximum HARQ-ACK bits being smaller than or equal to K1 (e.g., TB_HARQ_Threshold). The wireless device may determine the one or more PDSCHs or the multi-PDSCH DCI satisfying the second category in other cases.

In another example, the wireless device may determine the one or more PDSCHs or the multi-PDSCH DCI satisfying the third category in response to the number of maximum HARQ-ACK bits being smaller than or equal to M (e.g., CBG_HARQ_Threshold) (and larger than the TB_HARQ_Threshold). The wireless device may determine the one or more PDSCHs or the multi-PDSCH DCI satisfying the fourth category in other cases.

In an example, the configuration parameters may indicate a threshold value, where the wireless device may use the threshold value to determine a first HARQ-ACK sub-codebook or a second HARQ-ACK sub-codebook (e.g., the first category or the second category) for a multi-PDSCH DCI.

For example, the wireless device may determine a number of PDSCHs or a number of valid PDSCHs scheduled by a multi-PDSCH DCI. In response to the number of PDSCHs or the number of valid PDSCHs being smaller than or equal to the threshold, the wireless device may determine the first HARQ-ACK sub-codebook (e.g., the multi-PDSCH DCI or the one or more PDSCHs may satisfy the first category). The wireless device may determine a number of HARQ-Ack bits for the multi-PDSCH DCI as the TB-HARQ_Threshold in response to the determining the first HARQ-ACK sub-codebook.

When the number of PDSCHs or the number of valid PDSCHs is greater than the TB_HARQ_Threshold (e.g., 1 or 2), the wireless device may aggregate one or more HARQ-ACK bits, corresponding to the one or more PDSCHs or one or more valid PDSCHs, based on one or more mechanisms (refer FIG. 30)), for example until a size of HARQ-ACK bit(s) for the one or more (valid) PDSCHs becomes the TB_HARQ_Threshold.

When the number of PDSCHs or the number of valid PDSCHs is smaller than the TB_HARQ_Threshold, remaining bit(s) may be filled with NACK.

In response to the number of PDSCHs or the number of valid PDSCHs being larger than the threshold, the wireless device may determine the second HARQ-ACK sub-codebook (e.g., the multi-PDSCH DCI or the one or more PDSCHs may satisfy the second category). The wireless device may determine a number of HARQ-CK bits for the multi-PDSCH DCI as the CBG-HARQ_Threshold in response to the determining the second HARQ-ACK sub-codebook.

When the number of PDSCHs or the number of valid PDSCHs is greater than the CBG_HARQ_Threshold (e.g., a maximum number of CBGs), the wireless device may aggregate (e.g., suppress) one or more HARQ-ACK bits, corresponding to the one or more PDSCHs or one or more valid PDSCHs, based on one or more mechanisms (refer FIG. 30), for example until a size of HARQ-ACK bit(s) for the one or more (valid) PDSCHs becomes the CBG_HARQ_Threshold.

When the number of PDSCHs or the number of valid PDSCHs is smaller than the CBG_HARQ_Threshold, remaining bit(s) may be filled with NACK.

Figure 34:
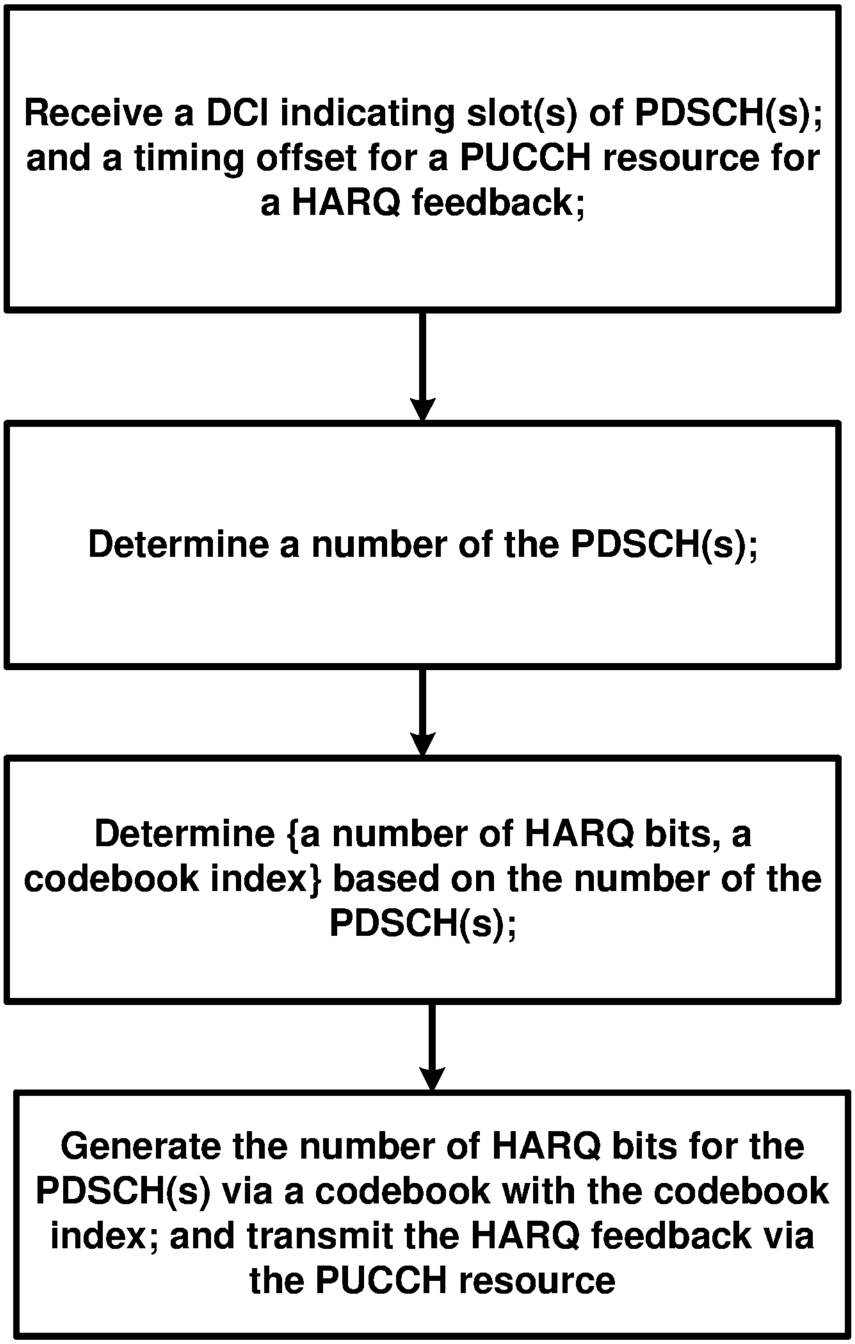
FIG. 34 illustrates a flow diagram of an example embodiment as per an aspect of an embodiment of the present disclosure.

FIG. 34 illustrates a flow chart as per an aspect of an embodiment of the present disclosure. The wireless device may receive a DCI indicating resources (e.g., via one or more slots) for one or more PDSCHs, wherein a slot of the resources corresponds to each of the one or more PDSCHs. The DCI may indicate a PUCCH resource for a HARQ-ACK feedback corresponding to one or more transport blocks via the one or more PDSCHs.

The wireless device may determine a number of the one or more PDCHs based on the DCI.

The wireless device may determine an index of a sub-codebook based on the number of the one or more PDSCHs.

The wireless device may determine a number of HARQ-ACK bits for the DCI based on the index of the sub-codebook.

The wireless device may generate the number of HARQ-ACK bits based on the one or more PDSCHs.

The wireless device may generate a HARQ-ACK codebook comprising the sub-codebook.

The wireless device may transmit the HARQ-ACK feedback of the HARQ-ACK codebook via the PUCCH resource.

In an example, a wireless device may receive a downlink control information (DCI). The DCI may indicate resources for a plurality of one or more downlink shared channel (PDSCH); a physical uplink control channel (PUCCH) resource for a hybrid automatic repeat request (HARQ) feedback of the plurality of one or more PDSCHs; and a downlink assignment index (DAI) value. The wireless device may determine a number of valid PDSCHs of the one or more PDSCHs based on the DCI. For example, the wireless device may determine a number of scheduled PDSCHs as the number of valid PDSCHs. The wireless device may determine, based on the number of valid PDSCHs, an index of a HARQ sub-codebook and a number of HARQ bits for the one or more PDSCHs. The wireless device may determine a starting bit, for the number of HARQ bits, in the HARQ sub-codebook based on the DAI value. The wireless device may map the number of HARQ bits starting from the starting bit of the HARQ sub-codebook. The wireless device may generate a HARQ codebook comprising the HARQ sub-codebook. The wireless device may transmit the HARQ codebook via the PUCCH resource.

In an embodiment, the DAI may be a counter DAI.

In an embodiment, the DCI may further indicate a total DAI;

In an embodiment, the DCI may comprise a first field for the counter DAI and a second field for the total DAI.

In an embodiment, the wireless device may determine a size of the HARQ sub-codebook based on a value of the total DAI indicated by the DCI.

In an embodiment, the stating bit may be zero in response to the DAI value being zero.

In an embodiment, the number of HARQ bits may be 1 in response to the index of the HARQ sub-codebook being zero and a maximum number of codewords for a PDSCH being 1.

In an embodiment, the number of HARQ bits may be 2 in response to the index of the HARQ sub-codebook being zero and the maximum number of codewords for a PDSCH being 2.

In an embodiment, the HARQ sub-codebook with the index zero may be a first HARQ-ACK sub-codebook.

In an embodiment, the number of HARQ bits with the first HARQ-ACK sub-codebook may be K1.

In an embodiment, the number of HARQ bits may be M in response to the index of the HARQ sub-codebook being one.

In an embodiment, the wireless device may determine M based on a maximum number of code block groups (CBGs) configured to a serving cell of the wireless device.

In an embodiment, the wireless device may determine M based on a maximum number of code block groups (CBGs) configured to a serving cell multiplied by a maximum number of codewords for the serving cell.

In an embodiment, the wireless device may determine a largest M among one or more serving cells configured with a CBG transmission.

In an embodiment, the HARQ sub-codebook with the index one may be a second HARQ-ACK sub-codebook.

In an embodiment, the number of HARQ bits may be N in response to the index of the HARQ sub-codebook being two.

In an embodiment, the wireless device may determine N based on a maximum number of PDSCH scheduled by a DCI for a second serving cell of the wireless device.

In an embodiment, the wireless device may determine M based on a maximum number of PDSCH scheduled by a DCI for the second serving cell multiplied by a maximum number of codewords for the second serving cell.

In an embodiment, the wireless device may determine a largest N among one or more second serving cells configured with a multi-PDSCH scheduling.

In an embodiment, the HARQ sub-codebook with the index two may be a third HARQ-ACK sub-codebook.

In an embodiment, the number of HARQ bits with the third HARQ-ACK sub-codebook may be N.

In an embodiment, N may be larger than M.

In an embodiment, M may be larger than 1 or 2.

In an embodiment, the wireless device may determine a PDSCH, of the one or more PDSCHs, as valid in response to the PDSCH comprise a transport block.

In an embodiment, a second PDSCH of the one or more PDSCHs does not comprise a transport block in response to a NDI bit corresponding to the second PDSCH being a first predetermined value and a RV bit corresponding to the second PDSCH being a second predetermined value.

In an embodiment, a second PDSCH of the one or more PDSCHs does not comprise a transport block in response to a corresponding resource allocation, for the second PDSCH, indicates a reserved value.

In an embodiment, the wireless device may determine the index, of the HARQ sub-codebook, as zero in response to the number of valid PDSCHs being smaller than or equal to K1.

In an embodiment, the wireless device may determine the index, of the HARQ sub-codebook, as one in response to the number of valid PDSCHs being larger than K1 and being smaller than or equal to M.

In an embodiment, the wireless device may determine the index, of the HARQ sub-codebook, as one in response to the number of valid PDSCHs being smaller than or equal to M.

In an embodiment, the wireless device may determine the index, of the HARQ sub-codebook, as one in response to the number of valid PDSCHs being larger than K1.

In an embodiment, the wireless device may determine the index, of the HARQ sub-codebook, as one in response to the DCI being based on a DCI format, wherein the DCI format is for a multi-PDSCH scheduling.

In an embodiment, the DCI format may be for the multi-PDSCH scheduling in response to the DCI format indicates one or more slots for one or more PDSCHs.

In an embodiment, the DCI format may be for the multi-PDSCH scheduling in response to the DCI format being a non-fallback DCI format and a cell of the resources being configured with a multi-PDSCH scheduling.

In an embodiment, the wireless device may determine the index, of the HARQ sub-codebook, as two in response to the number of valid PDSCHs being larger than M and being smaller than or equal to N.

In an embodiment, the wireless device may determine the index, of the HARQ sub-codebook, as two in response to the number of valid PDSCHs being larger than M.

In an embodiment, the wireless device may determine the index, of the HARQ sub-codebook, as two in response to the number of valid PDSCHs being larger than M.

In an embodiment, the wireless device may determine a PDSCH, of the one or more PDSCHs, as valid in response to the DCI indicating resources for the PDSCH.

In an embodiment, the wireless device may generate one or more HARQ-ACK bits, where each of the one or more HARQ-ACK bits corresponds to a valid PDSCH of the one or more PDSCHs.

In an embodiment, the wireless device may append predefined values after the one or more HARQ-ACK bits until a size of the one or more HARQ-ACK bits being equal to the number of HARQ bits.

In an embodiment, the predefined values may indicate negative acknowledgement.

In an embodiment, the wireless device may aggregate the one or more HARQ-ACK bits, based on a rule, until a number of the HARQ-ACK bits being equal to the number of HARQ bits.

In an embodiment, the wireless device may append the third HARQ-ACK sub-codebook to the second HARQ-ACK sub-codebook.

In an embodiment, the wireless device may append the second HARQ-ACK sub-codebook to the first HARQ-ACK sub-codebook.

In an embodiment, the HARQ-ACK codebook may be the first HARQ-ACK sub-codebook.

In an embodiment, the wireless device may determine the index as zero in response to a cell of the resources not being configured with a CBG transmission.

In an embodiment, the wireless device may receive one or more radio resource control (RRC) messages indicating M.

In an embodiment, the wireless device may receive one or more RRC messages indicating N.

In an embodiment, the wireless device may receive one or more radio resource control (RRC) messages indicating a number of HARQ feedback bits for a multi-PDSCH scheduling of a cell of the resources.

In an embodiment, the wireless device may determine the number of valid PDSCHs based on the number of HARQ feedback bits for the multi-PDSCH scheduling of the cell.

In an example, a wireless device may receive one or more configuration parameters. The configuration parameters indicate a multi-physical downlink shared channel (PDSCH) scheduling, for a first cell, based on a downlink control information (DCI) format; a number of hybrid automatic repeat request (HARQ) bits for a DCI, for the first cell and based on the DCI format, wherein a HARQ sub-codebook is associated with the number of HARQ bits; and a number of code block groups (CBGs) for a second cell. The wireless device may receive a DCI based on the DCI format. The DCI may indicate resources for one or more physical downlink shared channel (PDSCH); a physical uplink control channel (PUCCH) resource for a hybrid automatic repeat request (HARQ) feedback of the one or more PDSCHs; and a downlink assignment index (DAI) value. The wireless device may determine a starting bit, for the number of HARQ bits, in the HARQ sub-codebook based on the DAI value. The wireless device may map the number of HARQ bits starting from the starting bit of the HARQ sub-codebook. The wireless device may generate a HARQ codebook comprising the HARQ sub-codebook. The wireless device may transmit transmitting the HARQ codebook via the PUCCH resource.

In an embodiment, the configuration parameters may comprise the index of the HARQ sub-codebook.

In an embodiment, the wireless device may determine the number of HARQ bits based on the index of the HARQ sub-codebook.

In an embodiment, the number of HARQ bits may be K1 in response to the index being zero.

In an embodiment, the number of HARQ bits may be M in response to the index being one.

In an embodiment, the number of HARQ bits may be N in response to the index being two.

A wireless device may receive one or more configuration parameters for a cell. The configuration parameters may indicate a multi-physical downlink shared channel (PDSCH) scheduling, based on a first downlink control information (DCI) format; and a single-PDSCH scheduling, based on a second DCI format. The wireless device may receive a first DCI based on the first DCI format and in a first monitoring occasion. The first DCI may indicate resources for a first PDSCH; and a physical uplink control channel (PUCCH) resource for a hybrid automatic repeat request (HARQ) feedback of the first PDSCH. The wireless device may receive a second DCI, based on the second DCI format and in a second monitoring occasion, wherein the second monitoring occasion occurs after the first monitoring occasion. The second DCI may indicate second resources for a second PDSCH; and the PUCCH resource for a second HARQ feedback of the second PDSCH. The wireless device may generate a HARQ-ACK codebook comprising a first HARQ-ACK bit for the second PDSCH and a second HARQ-ACK bit for the first PDSCH. The first HARQ-ACK bit may be placed before the second HARQ-ACK bit in the HARQ-ACK codebook. The wireless device may transmit the HARQ-ACK codebook via the PUCCH resource.

A wireless device may receive a downlink control information (DCI), The DCI may indicate a plurality of resources. Each resource corresponds to a physical downlink shared channel (PDSCH), of a plurality of PDSCHs, in a slot. The DCI may further indicate a timing offset between last PDSCH, indicated by the plurality of resources, and a physical uplink control channel (PUCCH) resource for a hybrid automatic repeat request (HARQ) feedback. The wireless device may determine, based on the plurality of resources, a number of PDSCHs scheduled by the DCI. The wireless device may determine, based on the number of PDSCHs, a number (P) of bits for the HARQ feedback and an index (I) of a HARQ feedback codebook. The (P, I) may be one of {a first threshold, a first predetermined value} in response to the number of PDSCHs being between one and the first threshold value; {a second threshold, a second predetermined value} in response to the number of PDSCHs being between the first threshold value and the second threshold value; or {a third threshold, a third predetermined value} in response to the number of PDSCHs being between the second threshold value and the third threshold value. The wireless device may generate, based on the number of PDSCHs, one or more HARQ feedback bits of the HARQ feedback bits. Each bit of the one or more HARQACK bits may correspond to each PDSCH to the plurality of PDSCHs. The wireless device may generate, based on the index, one or more second HARQ feedback bits of the HARQ feedback bits. Each bit of the one or more second HARQ feedback bits may be a NACK. The wireless device may transmit the HARQ feedback via the PUCCH resource.

A wireless device may receive a downlink control information (DCI), The DCI may indicate a plurality of resources. Each resource corresponds to a physical downlink shared channel (PDSCH), of a plurality of PDSCHs, in a slot. The DCI may further indicate a timing offset between last PDSCH, indicated by the plurality of resources, and a physical uplink control channel (PUCCH) resource for a hybrid automatic repeat request (HARQ) feedback. The wireless device may determine, based on the plurality of resources, a number of PDSCHs scheduled by the DCI. The wireless device may determine, based on the number of PDSCHs, a number (P) of bits for the HARQ feedback and an index (I) of a HARQ feedback codebook. The (P, I) may be one of {a first threshold, a first predetermined value} in response to the cell not being configured with a code block group, wherein the first predetermined value is one; {a second threshold, a second predetermined value} in response to in response to the cell being configured with a code block group, wherein the second predetermined value is two. The wireless device may generate, based on the number of PDSCHs, one or more HARQ feedback bits of the HARQ feedback bits. Each bit of the one or more HARQACK bits may correspond to each PDSCH to the plurality of PDSCHs. The wireless device may generate, based on the index, one or more second HARQ feedback bits of the HARQ feedback bits. Each bit of the one or more second HARQ feedback bits may be a NACK. The wireless device may transmit the HARQ feedback via the PUCCH resource.

What is claimed is:

1. A wireless device comprising:
one or more processors; and
memory storing instructions that, when executed by the one or more processors, cause the wireless device to:
receive, from a base station, a multi-physical downlink shared channel (PDSCH) scheduling downlink control information (M-DCI) scheduling multiple PDSCH receptions, via code block groups (CBGs), for a cell; and
transmit, via an uplink resource, a sub-codebook comprising feedback bits for the M-DCI, wherein:
a number of the feedback bits is based on a larger of a number of schedulable PDSCHs by the M-DCI and a number of the CBGs;
a number of first feedback bits, of the feedback bits, is less than the number of the feedback bits;
each bit, of the first feedback bits, maps to a corresponding schedulable PDSCH;
a last bit, of the feedback bits, maps to a remaining number of schedulable PDSCHs; and the remaining number is equal to a difference between the number of the feedback bits and the number of schedulable PDSCHs.

2. The wireless device of claim 1, wherein the instructions further cause the wireless device to receive one or more configuration parameters indicating:

the number of schedulable PDSCHs by the M-DCI; and the number of the CBGs.

3. The wireless device of claim 1, wherein the CBGs are for CBG-based reception of a transport block (TB).

4. The wireless device of claim 1, wherein the M-DCI indicates the uplink resource for the feedback bits.

5. The wireless device of claim 1, wherein each of the multiple PDSCH receptions corresponds to a single transport block.

6. The wireless device of claim 1, wherein the sub-codebook comprises feedback bits for both the M-DCI and a downlink control information (DCI) scheduling a single PDSCH.

7. A base station comprising:

one or more processors; and memory storing instructions that, when executed by the one or more processors, cause the base station to:

transmit, to a wireless device, a multi-physical downlink shared channel (PDSCH) scheduling downlink control information (M-DCI) scheduling multiple PDSCH transmissions, via code block groups (CBGs), for a cell; and receive, from the wireless device and via an uplink resource, a sub-codebook comprising feedback bits for the M-DCI, wherein:

a number of the feedback bits is based on a larger of a number of schedulable PDSCHs by the M-DCI and a number of the CBGs;

a number of first feedback bits, of the feedback bits, is less than the number of the feedback bits;

each bit, of the first feedback bits, maps to a corresponding schedulable PDSCH;

a last bit, of the feedback bits, maps to a remaining number of schedulable PDSCHs; and the remaining number is equal to a difference between the number of the feedback bits and the number of schedulable PDSCHs.

8. The base station of claim 7, wherein the instructions further cause the base station to transmit one or more configuration parameters indicating:

the number of schedulable PDSCHs by the M-DCI; and the number of the CBGs.

9. The base station of claim 7, wherein the CBGs are for CBG-based transmission of a transport block (TB).

10. The base station of claim 7, wherein the M-DCI indicates the uplink resource for the feedback bits.

11. The base station of claim 7, wherein each of the multiple PDSCH transmissions corresponds to a single transport block.

12. The base station of claim 7, wherein the sub-codebook comprises feedback bits for both the M-DCI and a downlink control information (DCI) scheduling a single PDSCH.

13. A non-transitory computer-readable medium comprising instructions that, when executed by one or more processors of a wireless device, cause the wireless device to:

receive, from a base station, a multi-physical downlink shared channel (PDSCH) scheduling downlink control information (M-DCI) scheduling multiple PDSCH receptions, via code block groups (CBGs), for a cell; and transmit, via an uplink resource, a sub-codebook comprising feedback bits for the M-DCI, wherein:

a number of the feedback bits is based on a larger of a number of schedulable PDSCHs by the M-DCI and a number of the CBGs;

a number of first feedback bits, of the feedback bits, is less than the number of the feedback bits;

each bit, of the first feedback bits, maps to a corresponding schedulable PDSCH;

a last bit, of the feedback bits, maps to a remaining number of schedulable PDSCHs; and the remaining number is equal to a difference between the number of the feedback bits and the number of schedulable PDSCHs.

14. The non-transitory computer-readable medium of claim 13, wherein the instructions further cause the wireless device to receive one or more configuration parameters indicating:

the number of schedulable PDSCHs by the M-DCI; and the number of the CBGs.

15. The non-transitory computer-readable medium of claim 13, wherein the CBGs are for CBG-based reception of a transport block (TB).

16. The non-transitory computer-readable medium of claim 13, wherein the M-DCI indicates the uplink resource for the feedback bits.

17. The non-transitory computer-readable medium of claim 13, wherein each of the multiple PDSCH receptions corresponds to a single transport block.

18. The non-transitory computer-readable medium of claim 13, wherein the sub-codebook comprises feedback bits for both the M-DCI and a downlink control information (DCI) scheduling a single PDSCH.

* * * * *